United States Patent [19]

Troudet et al.

[11] Patent Number: 5,486,112
[45] Date of Patent: Jan. 23, 1996

[54] AUTONOMOUS WEARABLE COMPUTING DEVICE AND METHOD OF ARTISTIC EXPRESSION USING SAME

[76] Inventors: Farideh Troudet; Terry Troudet, both of 18612 Buccaneer Creek - P.O. Box 360664, Strongsville, Ohio 44136

[21] Appl. No.: 159,194

[22] Filed: Nov. 30, 1993

Related U.S. Application Data

[63] Continuation-in-part of Ser. No. 128,821, Sep. 28, 1993, which is a continuation-in-part of Ser. No. 912,874, Jul. 13, 1992, abandoned, which is a continuation-in-part of Ser. No. 770,610, Oct. 3, 1991, abandoned.

[51] Int. Cl.$^6$ ............................................. A63B 69/00
[52] U.S. Cl. ............................. 434/250; 434/233; 2/160; 341/20
[58] Field of Search ..................... 434/227, 233, 434/81, 247, 250; 2/160, 161.6, 163; 400/87, 473, 477, 479, 479.1, 479.2, 485; 341/20, 21; 340/825.19

[56] References Cited

U.S. PATENT DOCUMENTS

| | | | |
|---|---|---|---|
| 3,022,878 | 2/1962 | Seibel et al. | 400/485 X |
| 3,166,856 | 1/1965 | Uttal | 434/233 X |
| 4,414,537 | 11/1983 | Grimes | 400/479.2 X |
| 4,635,516 | 1/1987 | Giannini | 2/160 X |
| 4,864,658 | 9/1989 | Russell et al. | 2/160 |

FOREIGN PATENT DOCUMENTS

| | | | |
|---|---|---|---|
| 2173597 | 10/1986 | United Kingdom | 341/20 |
| 9108559 | 6/1991 | WIPO | 434/233 |

*Primary Examiner*—Nicholas D. Lucchesi
*Assistant Examiner*—Jeffrey A. Smith
*Attorney, Agent, or Firm*—Frank H. Foster; Kremblas, Foster & Millard

[57] ABSTRACT

Educational devices using process-oriented educational methods are disclosed to prepare pre-school children, school children, and teenagers for keyboarding. The devices include sets of gloves and indicia applied to the fingers of the gloves to provide pictorial and alphanumeric representations of the computer keyboard. The visual and tactile memorization of the glove images are complemented by auditory and associative memorization provided by a story-telling educational method. Synergistic use of the gloves in the context of supervised story-telling also trains the pre-school children to develop and practise both lateral and vertical thinking skills[1,2], thus preparing them for coping creatively with the inherent hardware/software limitations of computers. The memorization of the alphanumeric representation of the computer keyboard is reinforced through synergistic use of the gloves in a variety of activities including learning the alphabet, learning word-spelling, and learning languages. To best fit the psychology of teenagers, sets of picture-rings and medallion-rings are disclosed to specifically prepare that age-group for keyboarding. A process-oriented method based on the aforementioned devices is disclosed to facilitate the self-expression of children and/or help towards a more healthy communication and healing (therapy). A process-oriented method based on the aforementioned devices is disclosed to assist in the learning of the alphabet and the numbers, and in the learning of languages and scientific disciplines (arithmetic, mathematics, physics, chemistry, medical sciences, etc.). The functionality of the aforementioned devices and the efficiency of the aforementioned educational methods are enhanced through a highly integrated device disclosed under the term "keygloves" in analogy with the term "keyboard", since the "keygloves" extends the power of the "keyboard" to the very hands of the learner/user.

15 Claims, 97 Drawing Sheets

AUTONOMOUS WEARABLE COMPUTING DEVICE AND METHOD OF ARTISTIC EXPRESSION USING SAME

This is a Continuation-In-Part of Application entitled "Adaptive Method And Device For Creative Teaching Based On Artistic Appreciation And Self-Expression" Ser. No. 08/128,821 filed on Sep. 28, 1993 (pending), which is a Continuation-In-Part of application Ser. No. 07/912874 filed on Jul. 13, 1992 (abandoned), which in turn is a Continuation-In-Part of application Ser. No. 07/770610 filed on Oct. 3, 1991 (abandoned).

BACKGROUND OF THE INVENTION

1. Field of the Invention

Computers are playing an ever more important role in the economical, scientific, and educational development of our society. It is therefore not uncommon to see curricula granting them a significant role in the educational process of young children.

Children are most likely to fully utilize the resources that computers have to offer, as they become more comfortable in interacting with their physical interface, in particular the keyboard. Although computer interfacing has been greatly simplified through the standardization of the touch-typing keyboard, much is to be gained from educational systems that can help children to painlessly develop the needed keyboarding skills, as early as pre-school age.

After acquiring keyboarding skills, children will need both lateral and vertical thinking to express their ideas as freely as possible with the computer while accommodating for its hardware/software limitations.

Therefore, much is to be gained from wholistic educational systems that can motivate children, as early as pre-school age, to develop their lateral and vertical thinking skills, while preparing them for keyboarding.

2. Analytical Description of the Relevant Art

Since the invention of the first type-writer, various means and devices have been proposed to teach/train students to type, or to type more efficiently, as exemplified by the following United States and Foreign Patents.

U.S. Pat. No. 4,909,739 issued in 1990 to Ladner et al. entitled "Interactive Typing/Training System" discloses a set of color-coded finger guides to be worn at the top of the hand, and indicating the character of the home key that each finger is to be used for in touch-typing. The color-coding of the keys of the keyboard match the color-coding of the finger guides to indicate to the typist which keys each finger should be used for.

U.S. Pat. No. 2,570,908 issued in 1949 to Behr entitled "Indicator To Be Worn On The Hands While Learning To Typewrite" discloses a device constructed so as to be secured on the hand without impeding the use of the fingers in any way, and showing to the typist the correct keys of a type-writer to be struck by each finger, and the position of the keys relative to the actuating finger.

In the aforementioned patents by Ladner and Behr, the key-finger assignment of the keyboard is indicated to the student-typist by means of devices which represent the keys by the letters and numbers they bear, as specified by the standardized keyboard. Such key-finger assignment cannot however be used by pre-school children, since they do not yet know their alphabet nor their numbers. Moreover, the systems disclosed by Ladner and Behr are to be used by students in the actual act of touch-typing, or keyboarding. The latter training devices have therefore been specifically designed so as not to obstruct the student view of the keyboard, nor impede the free motion of the fingers. Such specificities are of no benefit to pre-school children, since it is highly desirable that they do not actually use the keyboard (because of the fragility of their joints), and are moreover responsible for the awkward characteristics of the aforementioned hand indicators, which would make them impractical to be worn by pre-school children.

U.S. Pat. No. 3,258,858 issued in 1966 to Cariffe entitled "Articles Of Wearing Apparel For Training" discloses a method and device for designating left and right sections forming a pair of articles of wearing apparel.

British Pat. No. 1,851,453 issued in 1977 to Matthew entitled "Improved Communication Device" discloses a hand garment marked on its outer surface with at least half the letters of an alphabet in a non-lexical arrangement for aiding "conversation" with a deaf and/or dumb person, or in areas of high ambient noise or through a sound-proof but transparent barrier.

U.S. Pat. No. 3,831,296 issued in 1974 to Hagle entitled "Alphanumeric Tactile Information Communication System" discloses a method and system for communicating with the blind and deaf person producing a sequence of electrical impulses corresponding to the characters being typed by the learner/user on a typewriter keyboard.

U.S. Pat. No. 4,519,781 issued in 1985 to Boyd entitled "Teaching Tool" discloses a glove with a plurality of tags with indicia which are removably attachable to the glove.

U.S. Pat. No. 1,823,130 issued in 1931 to Smith entitled "Typewriting Machine" discloses sensorial identification signs for the keyboard, whereby the sightless, with their highly sensitive finger-tips, can quickly learn to operate a typewriting machine through the touch system.

U.S. Pat. No. 4,846,687 issued in 1989 to White and White entitled "Sign Language Blocks" discloses educational sign language blocks as an educational tool enabling individuals to enhance an understanding of sign language, as typically utilized by hearing impaired individuals.

U.S. Pat No. 5,199,876 issued in 1993 to Waldman entitled "Hand Reflexology Glove" discloses a hand reflexology glove with a morphological map thereon for reflexology treatment.

U.S. Pat. No. 3,501,849 issued in 1970 to Olsen entitled "Method And Device For Teaching Typing And Language Skills" discloses a set of color-coded bands worn on each finger of the typist, and a set of color-coded discs to be affixed on the keys of a typewriter, whereby the color matching between bands and keys indicate to the typist which keys each finger should be used for.

French Pat. No. 925,459 issued in 1964 to Azan entitled "Dispositif pour le guidage cybernétique des doigts dans l'apprentissage de la dactylographie et permettre la correction de la mauvaise dactylographie" discloses a set of rings to be worn by the student typist. The letters assigned to each ring show to the typist the correct keys of a type-writer to be struck by each finger.

British Pat. No 931,038 issued in 1963 to Haid entitled "Typewriter Key Markers to Teach Touch Typing" discloses rings which can be placed upon the fingers, and which have the color which marks the keys associated with any particular finger.

U.S. Pat. No. 623,966 issued in 1899 to Barkley entitled "Method Of And Apparatus For Type-Writer Instruction"

discloses a set of rings to be worn by a typist with the aim of acquiring speed. The letters assigned to each ring show to the typist the correct keys of a type-writer to be struck by each finger.

In the aforementioned patents by Azan, Haid, and Barkley, the disclosed key-finger assignments are based on indexing the keys of the keyboard by the letters they bear (which index said keys), and therefore could not be used by pre-school children, since they do not know their alphabet.

Although the aforementioned ring sets can in principle be used by any student-typist who knows how to read, the bare representation of the keyboard in terms of plain letters can be in practise demotivating for young learners who usually look for excitement in any learning process. Without nurturing the student with opportunities for associative memorization, the learning process may indeed be reduced to just practising on the keyboard, and shy away many potential teenager students.

U.S. Pat. No. 4,465,477 issued in 1984 to AvGavaar entitled "Typewriter Instruction Device" discloses a device consisting of small ferromagnetic tips to be worn by the typist at the ends of his fingers, while the typewriter keys have electromagnets which attract the correct finger when a certain key has to be struck. These electromagnets could be attached at the fingertips by means of gloves, fingercots, or adhesives.

By requiring actual use of the keyboard and knowledge of the alphabet, the training system disclosed by AvGavaar is not adapted to prepare pre-school children for keyboarding for the same reasons mentioned above.

U.S. Pat. No. 4,902,231 issued in 1990 to Freer entitled "Learn To Type Via Mnemonic Devices, And Methods Of Constructing And Utilizing Same" discloses a large chart depicting the standardized computer keyboard, and mnemonic means including visual aids and phrases to help the student typist remember the locations of the keys. The chart is to be positioned within the view of the typing students.

Pre-school children do not know their alphabet, and therefore could not benefit from Freer's mnemonic devices that are based on phrases and pictures showing the phrases. Moreover, the letters indexing the keys of the keyboard are associated in irregular patterns within either words or phrases, which makes it difficult to identify these indexing letters from the pictures. Such mnemonic devices are addressed to the student-typist who knows how to read and make sentences, and present a degree of complexity by far exceeding the level of young children. Moreover, these mnemonic devices are applied to a large chart to be positioned within the view of the student-typist, preferably on the wall of a classroom, which would be of little practicality and convenience for a pre-school child in home environment.

There is therefore a need for process-oriented educational systems that are not only attractive to the child, but also easy-to-use and easy-to-be-accessed, in order to start the keyboarding training process as early as the pre-school-age group.

The present invention differs from the prior art in that it answers the aforementioned need, and provides simple picture-based (or object-based) devices using process-oriented methods in order to:

1) prepare the pre-school child (and any illiterate child or adult) for keyboarding before he has even learned the alphabet and the numbers;

2) while developing his lateral and vertical thinking;

3) and thereby realize a wholistic preparation of the pre-school child (and any illiterate child or adult) towards coping creatively with the inherent hardware/software limitations of the computer;

4) prepare teenagers for keyboarding through a learning process that is well-adapted to the behavioral characteristics of that age-group.

Further advantages, and differences from the prior art are contained in the further objects and characteristics of the invention, as disclosed in the following summary and detailed description of the invention.

SUMMARY OF THE INVENTION

The present invention relates to educational devices using process-based methods for training various age groups to memorize the key-finger assignment of the keyboard, and in particular for preparing pre-school children for keyboarding while developing their lateral and vertical thinking.

The devices disclosed comprise various sets of gloves and rings which are to be worn accordingly by pre-school children, school children, and teenagers. These gloves and rings provide various representations of the keyboard, and various mnemonic means to facilitate the memorization of the key-finger assignment. The mnemonic means include various types of indicia mounted on the fingers of the gloves and on the rings, The choice of indicia is adaptive to the needs and psychology of each individual child or teenager.

For the pre-school child who has not yet learned his alphabet, the indicia comprise pictures defining objects, which object names begin with the letter corresponding to the key of the keyboard to be struck by the proper finger. The indicia evolve with the learning process into an association of pictures and letters for teaching the alphabet to the pre-school child in the context of the key-finger assignment of the keyboard.

After the pre-school child has learned his alphabet with his/her mnemonic gloves, the set of indicia is reduced to the alphanumeric characters of the keyboard, i.e. the letters, numbers, and punctuation symbols. The child then further learns to memorize the location of the keys in the keyboard.

Towards further reinforcing the memorization of the key-finger assignment of the keyboard, the indicia are then extended to incorporate word-spelling and language vocabulary. With these new sets of indicia, the school child or teenager will be motivated to use his/her knowledge of the keyboard for learning how to spell and for learning a foreign language. In return, these new learning activities will also strengthen the memorization of the keyboard.

It is an object of the invention to meet adaptively the psychological and behavioral needs of each age group to motivate the child/teenager to learn the standardized keyboard.

It is therefore an object of the invention to prepare pre-school children for keyboarding by providing them mnemonic means to start learning the key-finger assignment of the keyboard; yet without training them to actually practise on the keyboard to begin with, because of the fragility of their joints.

It is also an object of the present invention to provide a comfortable and protective feeling to the pre-school child to be encouraged to learn as early as three-year old. There lies the motivation for choosing the picture gloves to meet the child's needs for control and comfort. The fact that these gloves do not give to the fingers the mobility and sense of touch that is needed by the typist actually using the keyboard is of no relevance to the scope of the present invention, since the pre-school child will not practise at the keyboard to begin with. This structural characteristic of the present invention sets it further apart from the prior art which primarily aimed at securing unhindered use of the fingers in using the keyboard, without giving prime consideration to the psychological and behavioral needs of the learner.

It is a further object of the invention to help the pre-school child memorize his pictures and their locations on his/her glove fingers. The fact that the learner typist would not be able to see the images at the tip of his fingers is of no relevance to the scope of the present invention, since the pre-school child will not practise at the keyboard to begin with. The latter structural characteristic of the present invention sets it further apart from the prior art which primarily aimed at providing the learner typist with an unobstructed view of the key-finger assignment, without giving prime consideration to the impracticalities resulting from such a requirement (e.g. upward finger like extensions leaving the top of the hands).

It is also an object of the invention to address the dual needs of teenagers for peer group communication and secrecy towards facilitating their learning of the keyboard. There lies the motivation for choosing the picture rings that have the dual characteristics of being both attractive and mysterious.

It is a further object of the invention to provide mnemonic aids in terms of column (vertical series of images on each finger), row (lateral series of images handwide), and matrix (array of pictures on each picture-glove) to facilitate the memorization of the representation of the keyboard.

Another object of the present invention is to allow for tactile memorization of the shapes and textures of the pictures, thus enabling the use of these mnemonic gloves by a visually-impaired learner.

Another object of the present invention is to reinforce the memorization of the glove pictures by means of auditory and mental associations in the context of story-telling. For example, the puzzling shades of the punctuation symbols on the right little finger (corresponding to the P-key) could be introduced to the pre-school child in a fun way with the intriguing story of Piggy (for the letter P):

---

"Once upon a time, there was a little Pig named "Piggy".
Piggy was all pink but had a black tail.
Because of its black tail, the other little pigs would not play with him.
So, Piggy was all alone, and very sad.
On the tenth day of Christmas, "Piggy" decided to have fun and be happy in spite of all.
So, he went to pick the "dot" over the letter "i" in his name "Piggy", and he attached its black curly tail to it.
"Piggy" laughed so much when he realized he had created a "semi-colon".
(Can you see the semi-colon on your Magic Gloves?)
Then, "Piggy" went on attaching the dot to its black curly tail.
"Piggy" laughed so much when he realized he had created a "question-mark".
(Can you see the question-mark on your Magic Gloves?)
"Piggy" was more and more happy about his black tail.
When he pulled on his curly black tail, he was so happily surprised to create a "slash".
(Can you see the "slash" sign on your Magic Gloves?).
With his new creative skills, "Piggy" felt brave enough

---

-continued to go and challenge the other little pigs.
So, Piggy went and picked the "dot" from the "i" in the name of another little Pig, and he put it exactly above his own "dot".
When the other little pigs realized that "Piggy" has just created a "colon", they all laughed so much.
(Now can you find the colon on your Magic Gloves?).
Now in the village, every little pig is talking about "Piggy" and his black curly tail.

---

It is a further object of the invention to train the child how to relate the pictures with one-another on each finger in the context of story-telling, thereby setting the foundations for the intellectual framework that he/she will need later in his/her adult life in relating concepts, systems, and disciplines altogether.

It is also an object of the invention to educate the pre-school child to simultaneously deal with the concepts of limitation and freedom by motivating him to invent and tell his own stories within the limitation of the glove pictures, with the goals of:

1) training the pre-school child to simultaneously practise his lateral and vertical thinking;
2) indirectly raising the child's awareness to the future necessity of learning about the hardware/software limitations of the computer (e.g. programming language) to be able to use it as creatively and productively as possible;
3) exposing the child at a very early age to the art of compromise, in teaching him the importance of accommodating for the limitations of the outside world without suppressing his own creative abilities.

It is an advantage of the present invention to generate dynamic interactions between parents (or care-takers) and children, thereby involving the parents, or grandparents, in the child education at the earliest stages of the educational process.

The above as well as further objects, essential details and advantages of the invention will become apparent from the following detailed description of the devices, and their utilization in conjunction with the story-telling educational method.

3d: palm portion of a second left-hand glove with alphanumeric indicia.

FIG. 4 depicts elevated views of gloves with object-indicia on the back portions (illustrated with a first style of gloves) and raised Braille-indicia on the palm portions (illustrated with a second style of gloves) for use by a visually impaired person:

4a: back portion of a first left-hand glove with object-indicia;

4b: palm portion of a second right-hand glove having Braille indicia, with a possible opening in the thumb portion for tactile recognition;

4c: back portion of a first right-hand glove with object-indicia;

4d: palm portion of a second left-hand glove having Braille indicia, with a possible opening in the thumb portion for tactile recognition (together with a side view of the Braille representation of the letter "p").

FIG. 5 depicts elevated views of gloves with color-coded picture-indicia on the back portions (illustrated with a first style of gloves) and sign-language-indicia on the palm portions (illustrated with a second style of gloves) for use by a hearing-impaired person:

5a: back portion of a first left-hand glove with picture-indicia;

5b: palm portion of a second right-hand glove with sign-language indicia;

5c: back portion of a first right-hand glove with picture-indicia;

5d: palm portion of a second left-hand glove with sign-language indicia.

Figure 6A:
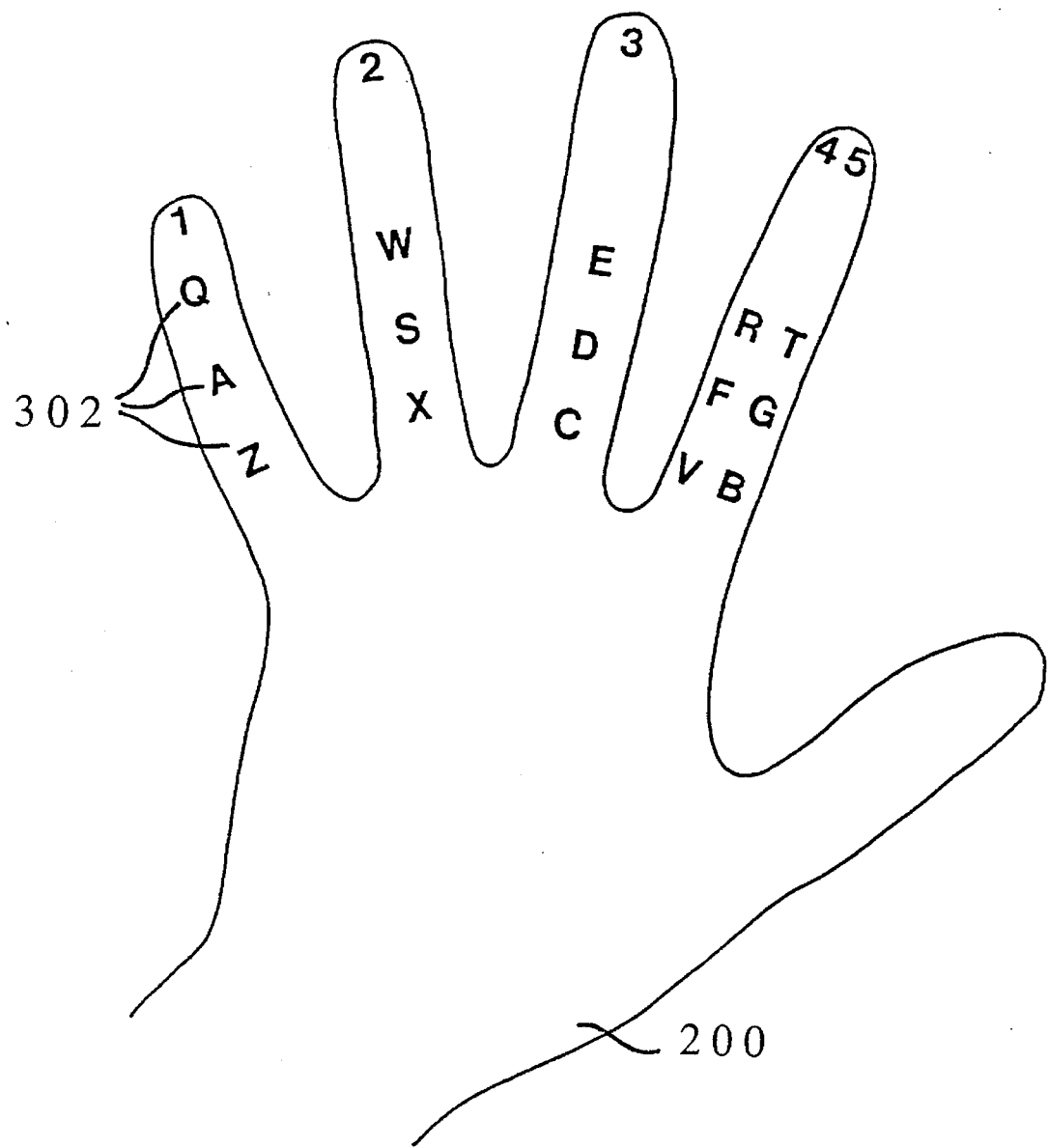
Figure 6B:
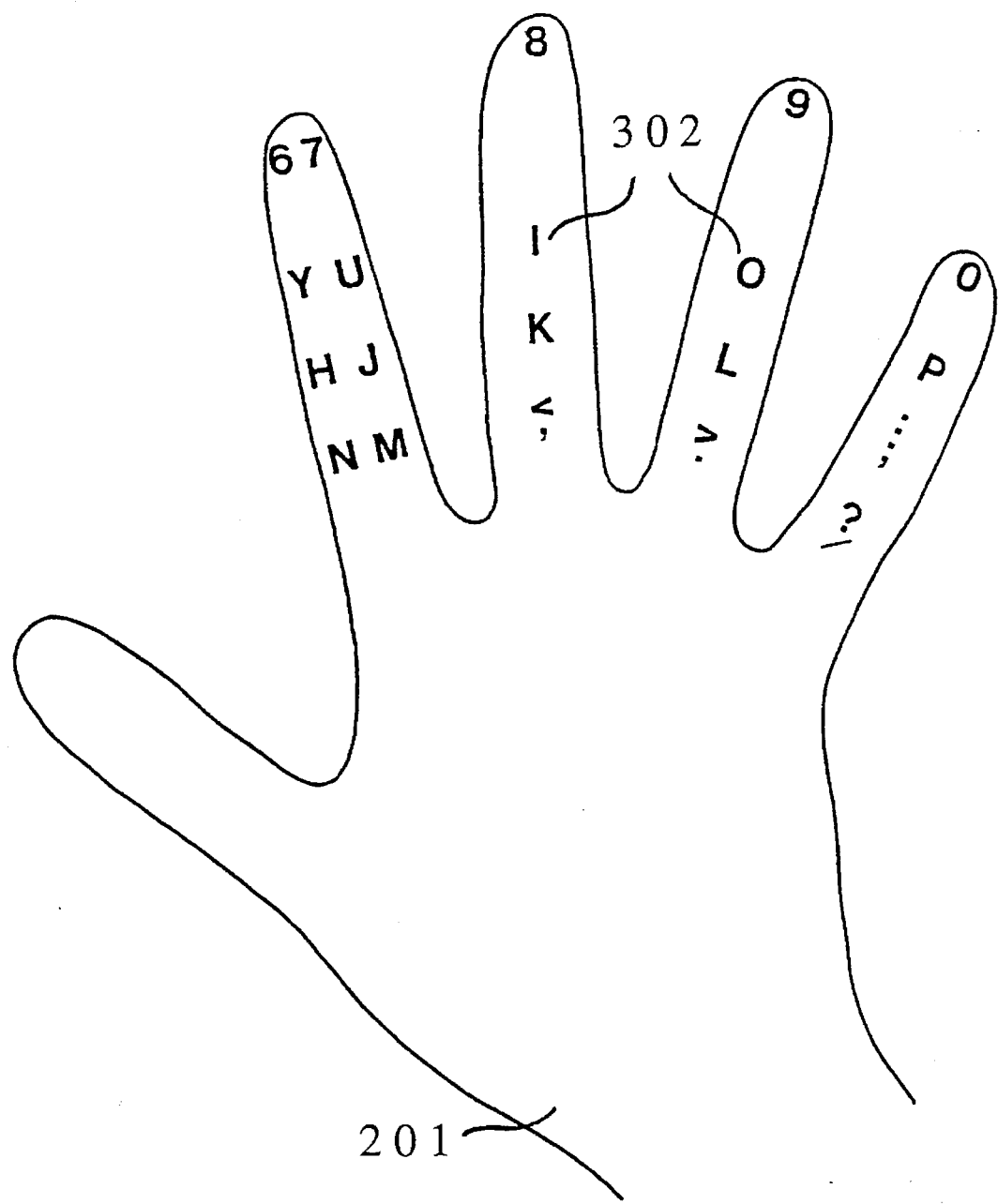

FIG. 6 depicts elevated views of alphanumeric gloves (i.e. letters, numbers, and punctuation symbols of the keyboard mounted on the back portions) with color-coded fingers:

6a: back portion of left hand glove;

6b: back portion of right hand glove.

Figure 1:
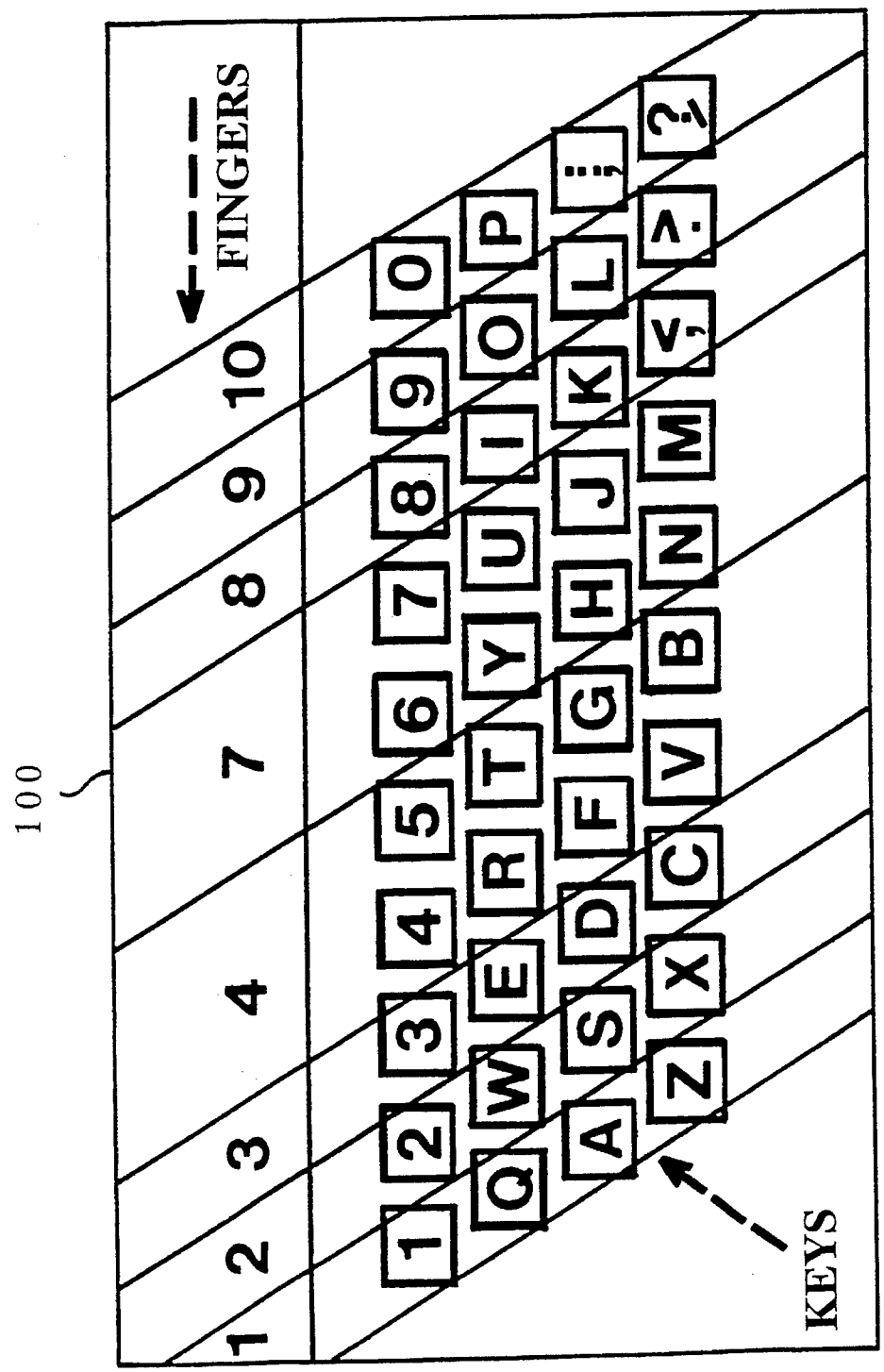
FIG. 1 is a matrix representation of the standardized keyboard (letters, numbers, and punctuation symbols) which indicates the key-finger assignment.
Figure 7:
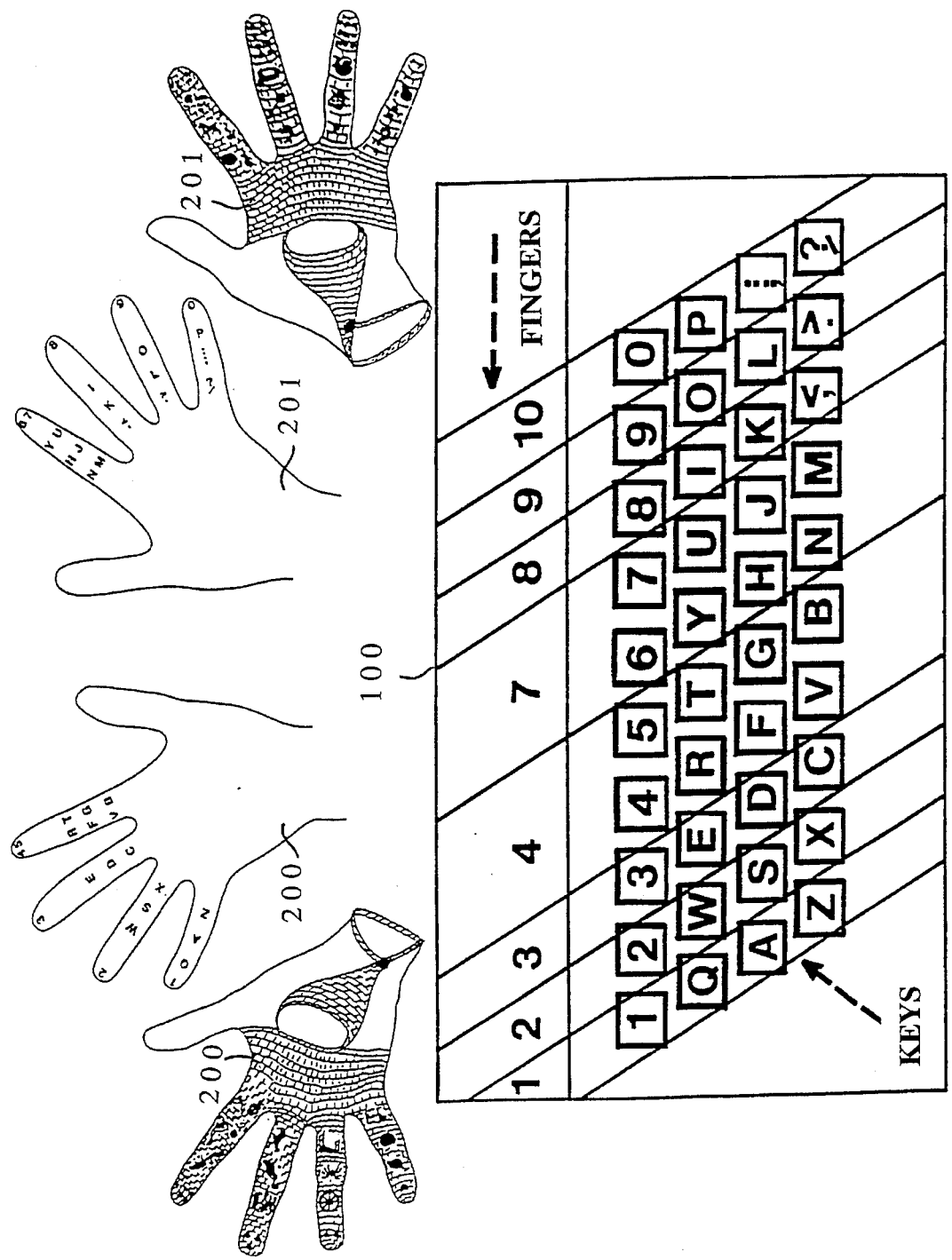
Figure 8A:
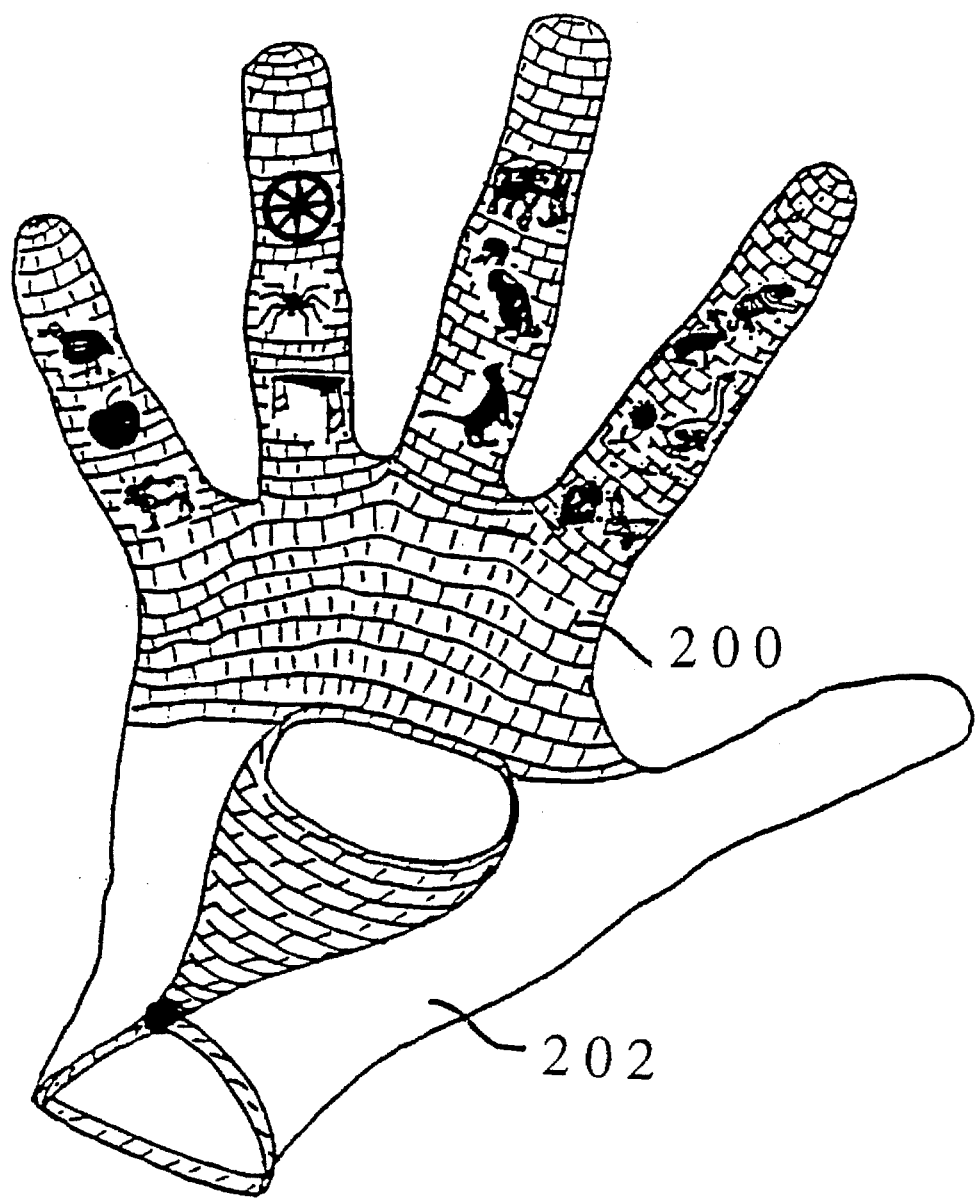
Figure 8B:
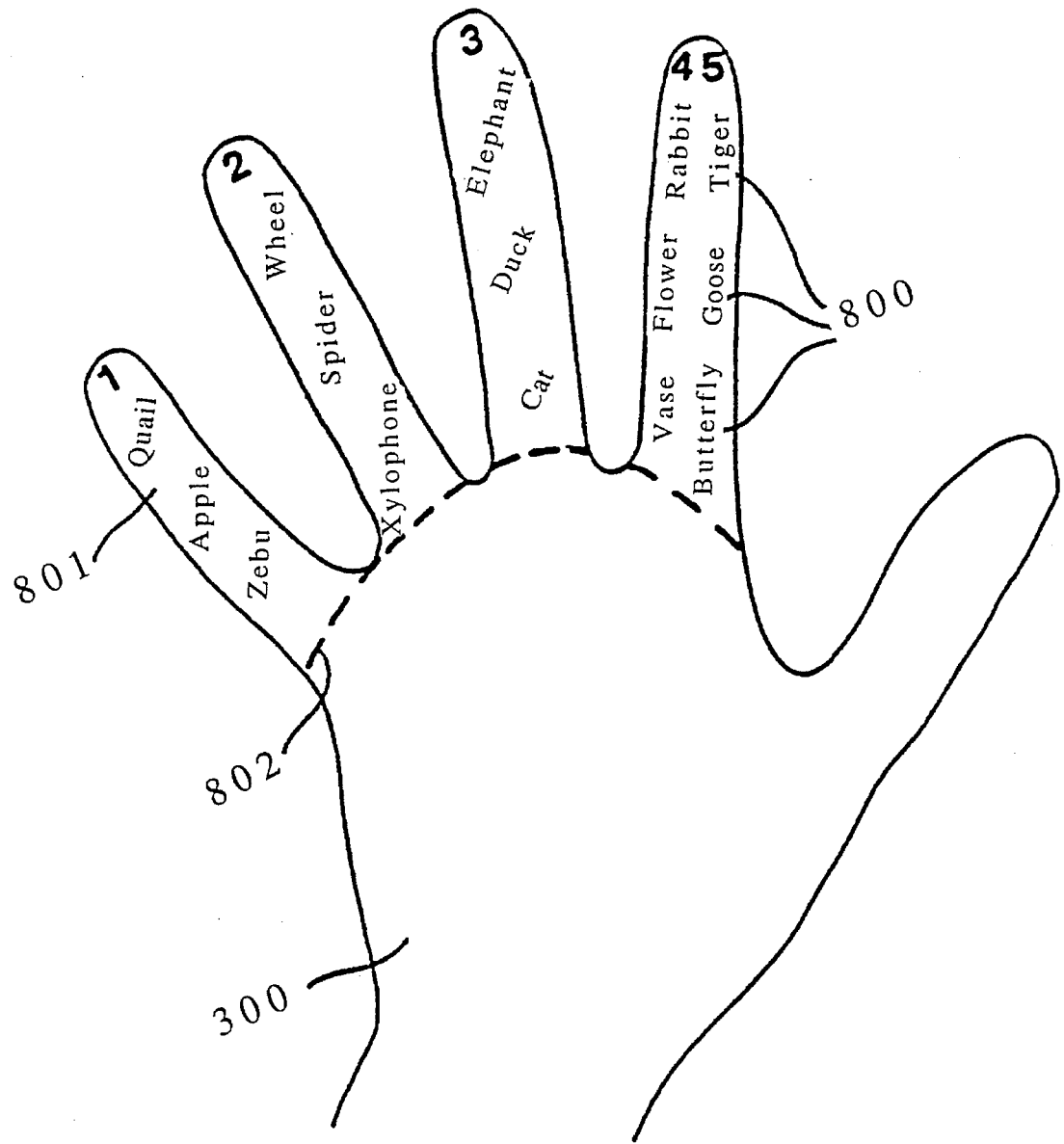
Figure 8C:
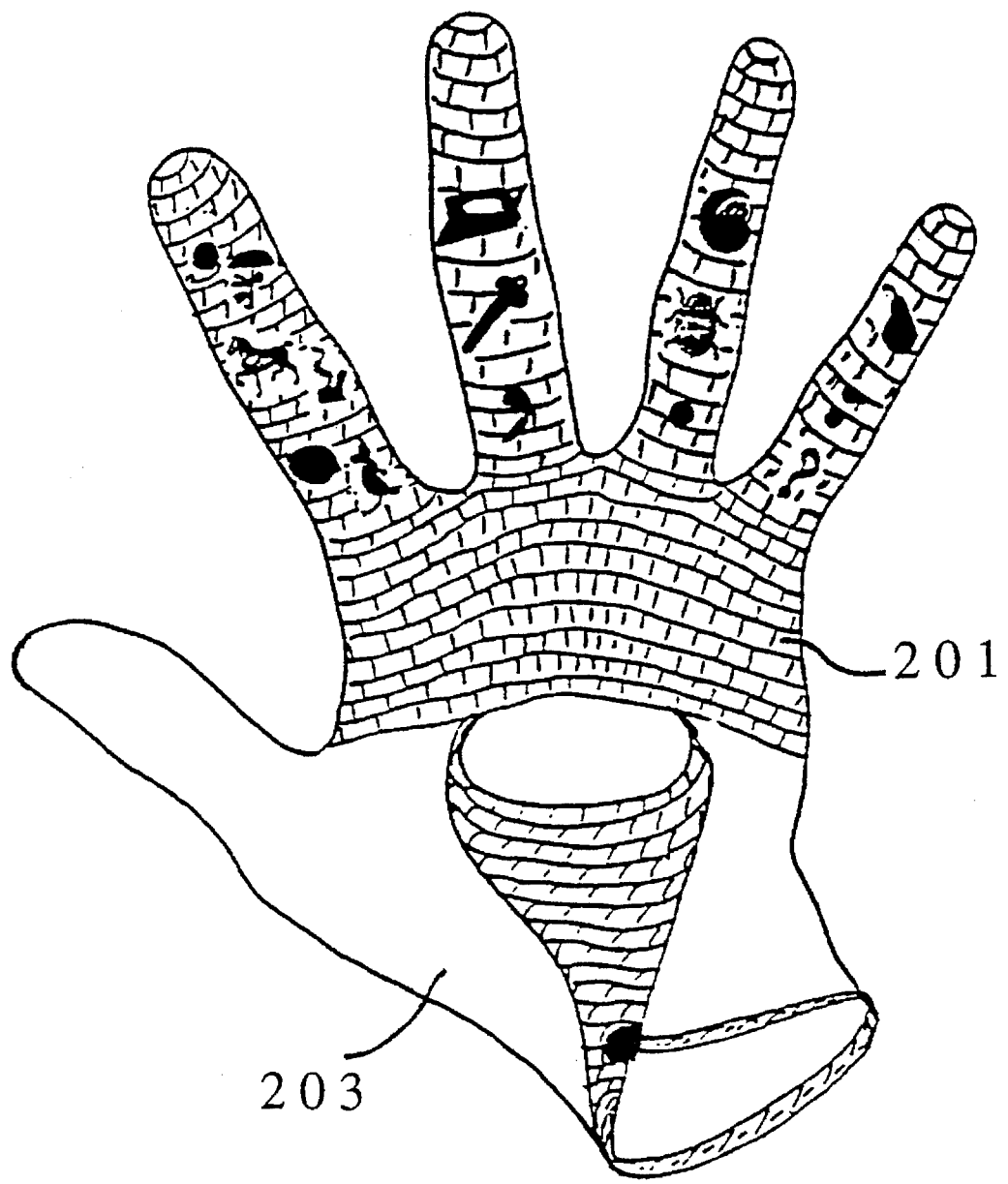
Figure 8D:
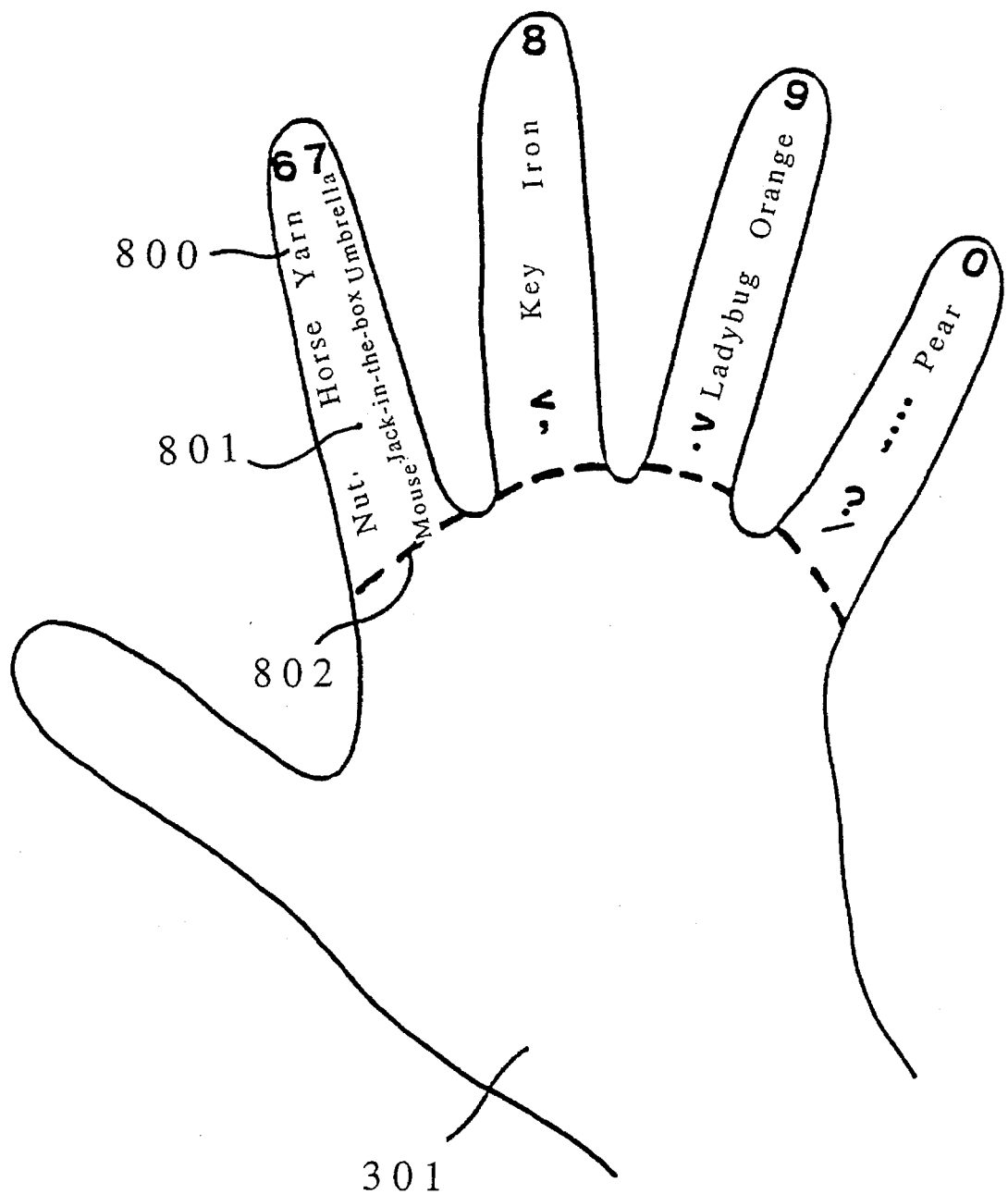
Figure 9A:
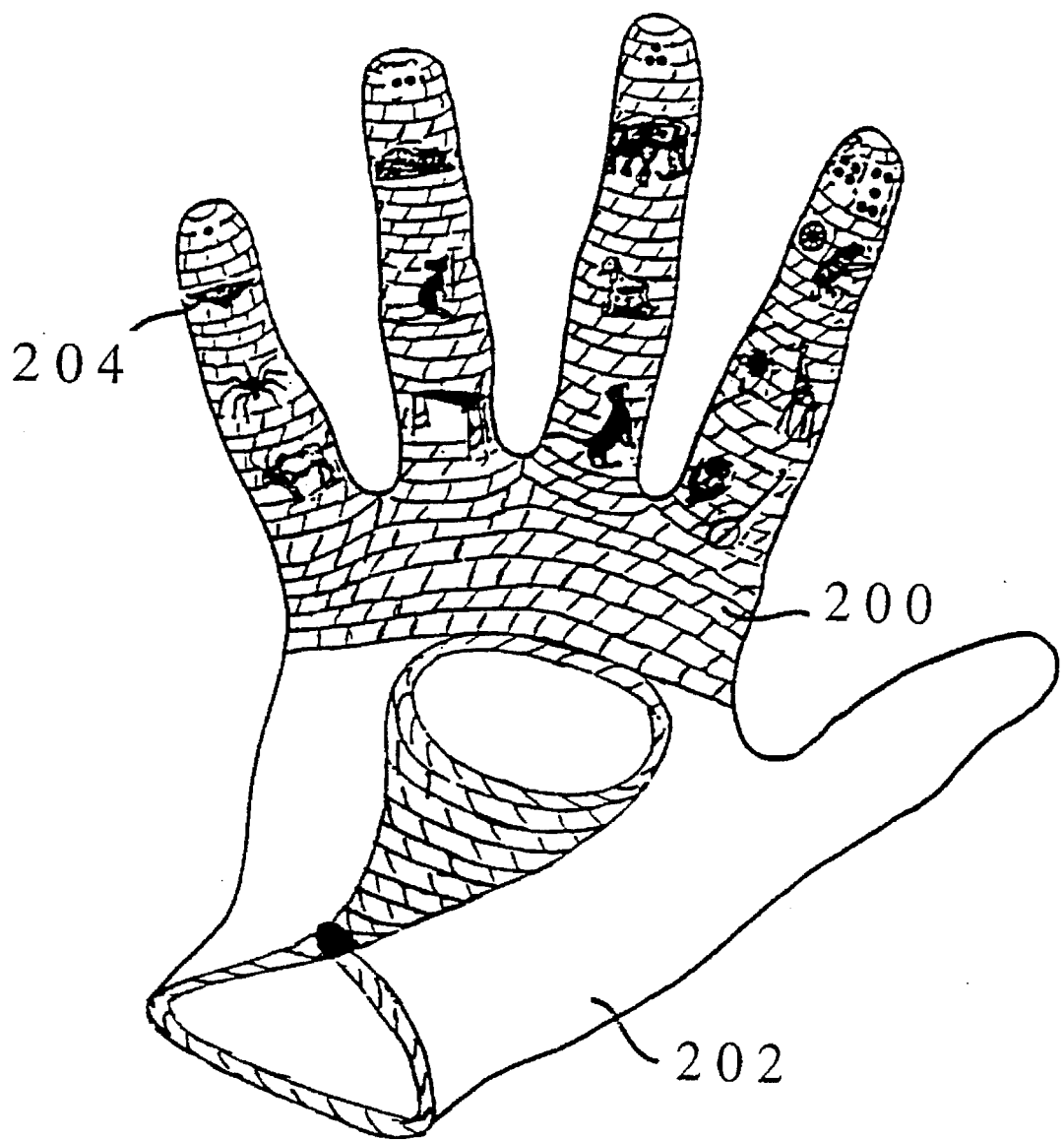
Figure 9B:
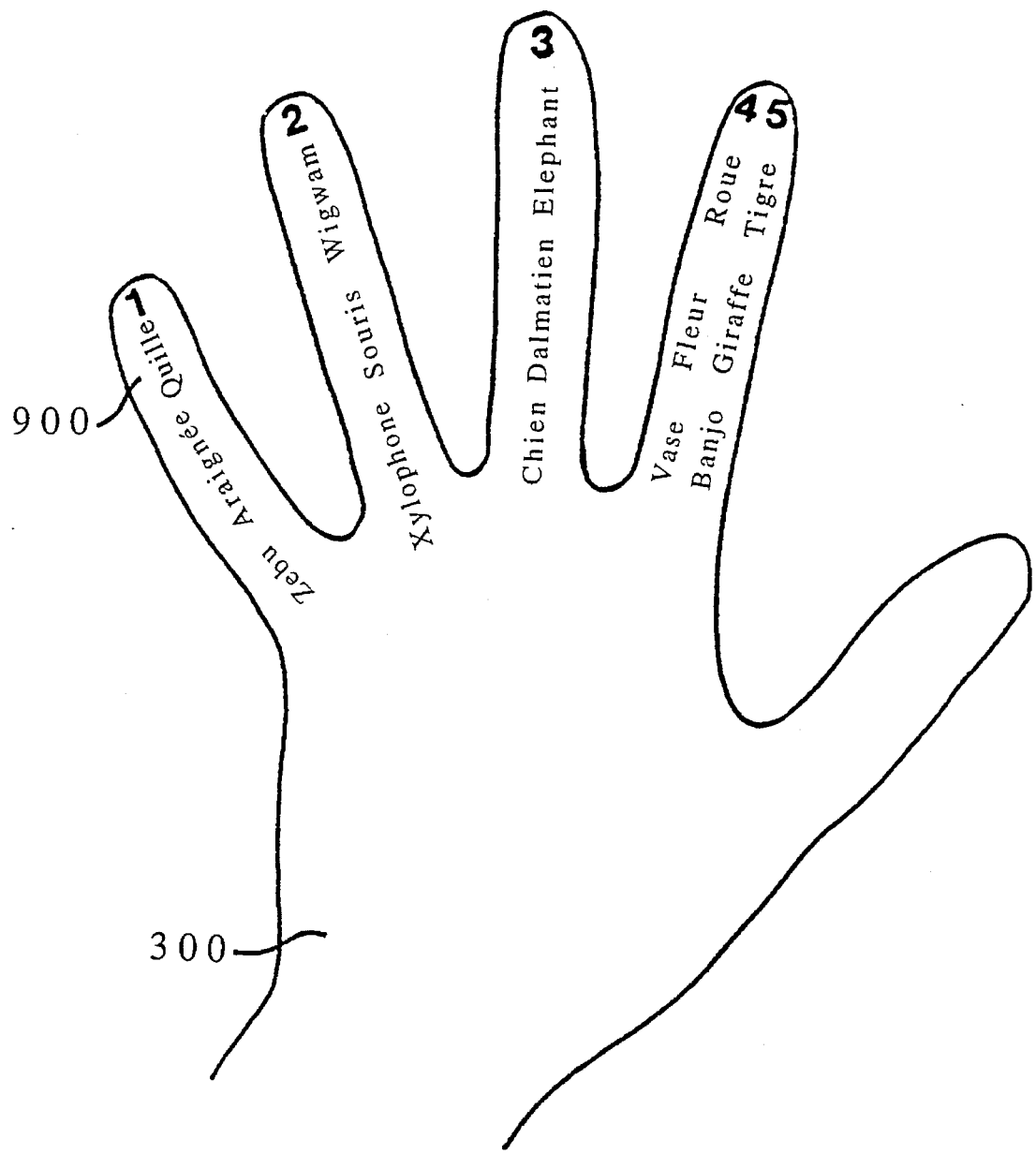
Figure 9C:
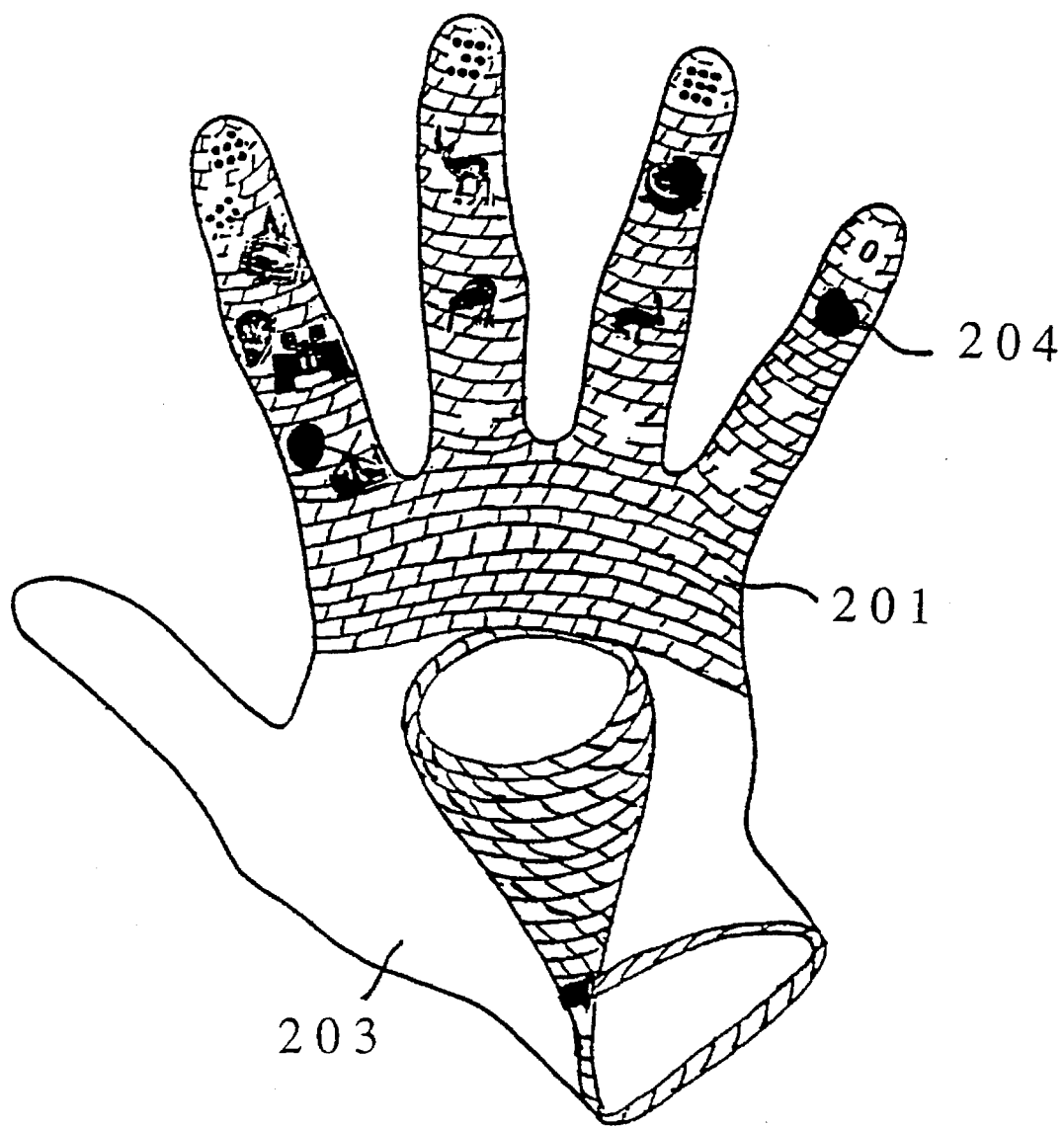
Figure 9D:
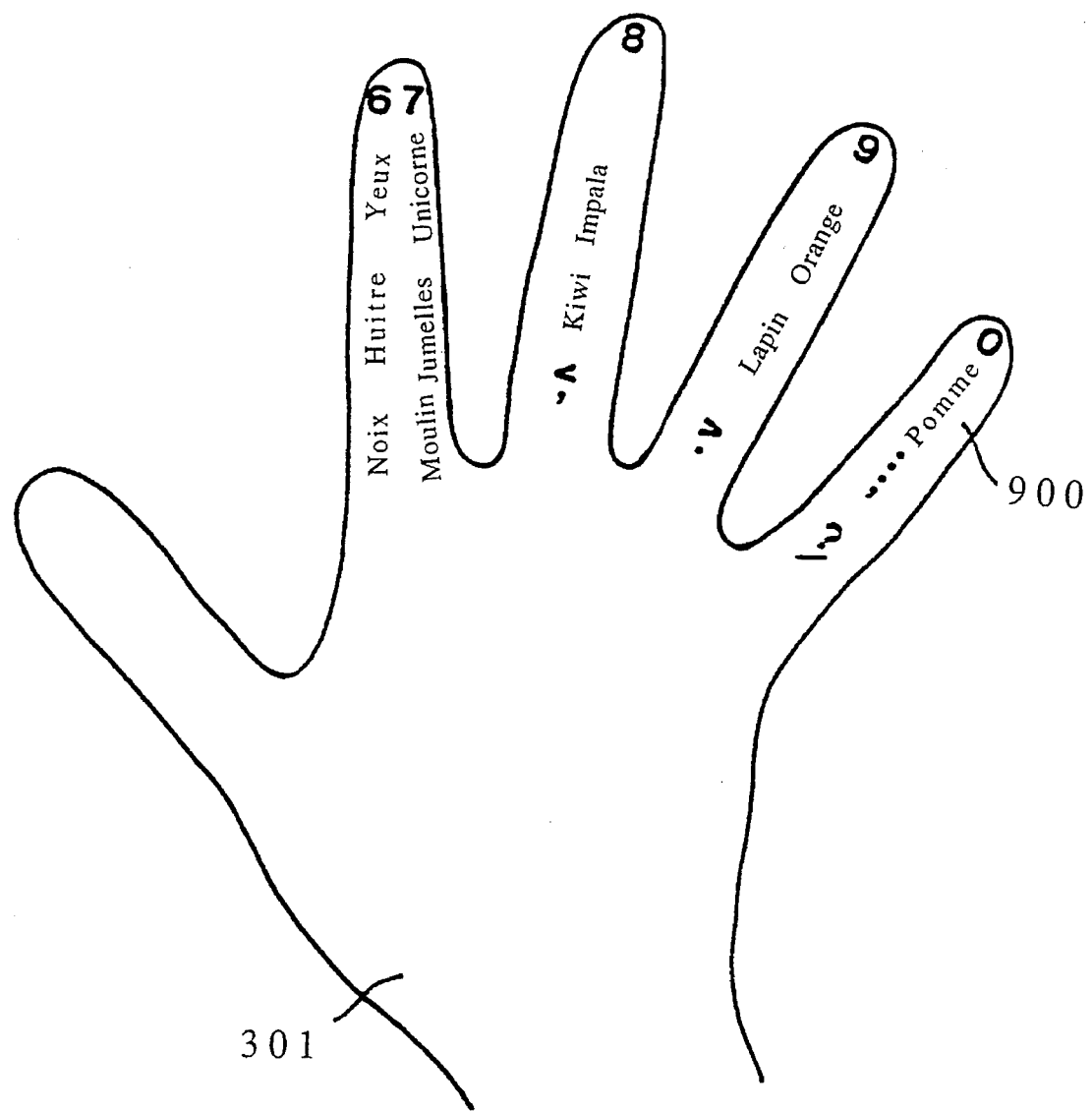
Figure 10A:
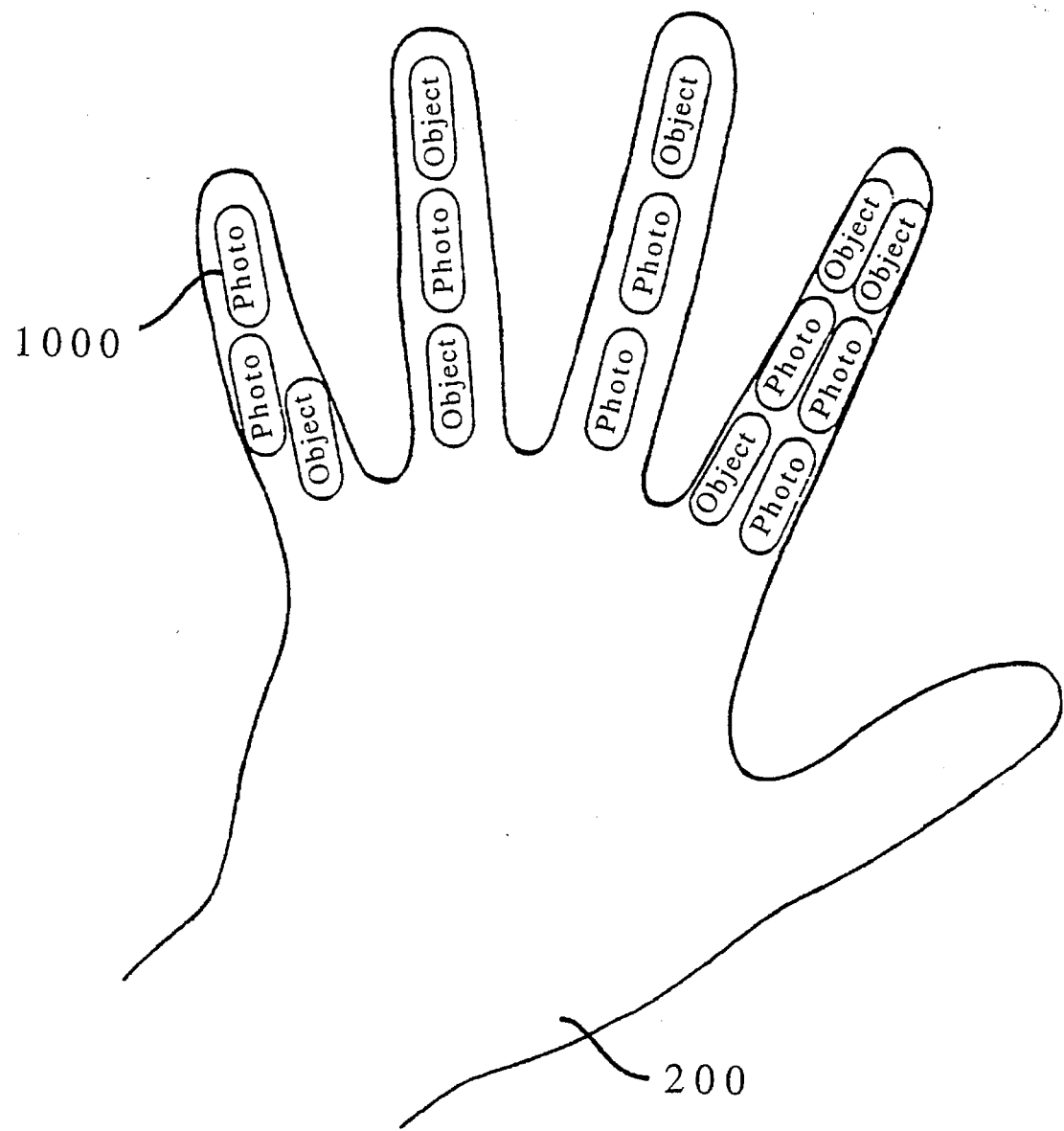
Figure 10B:
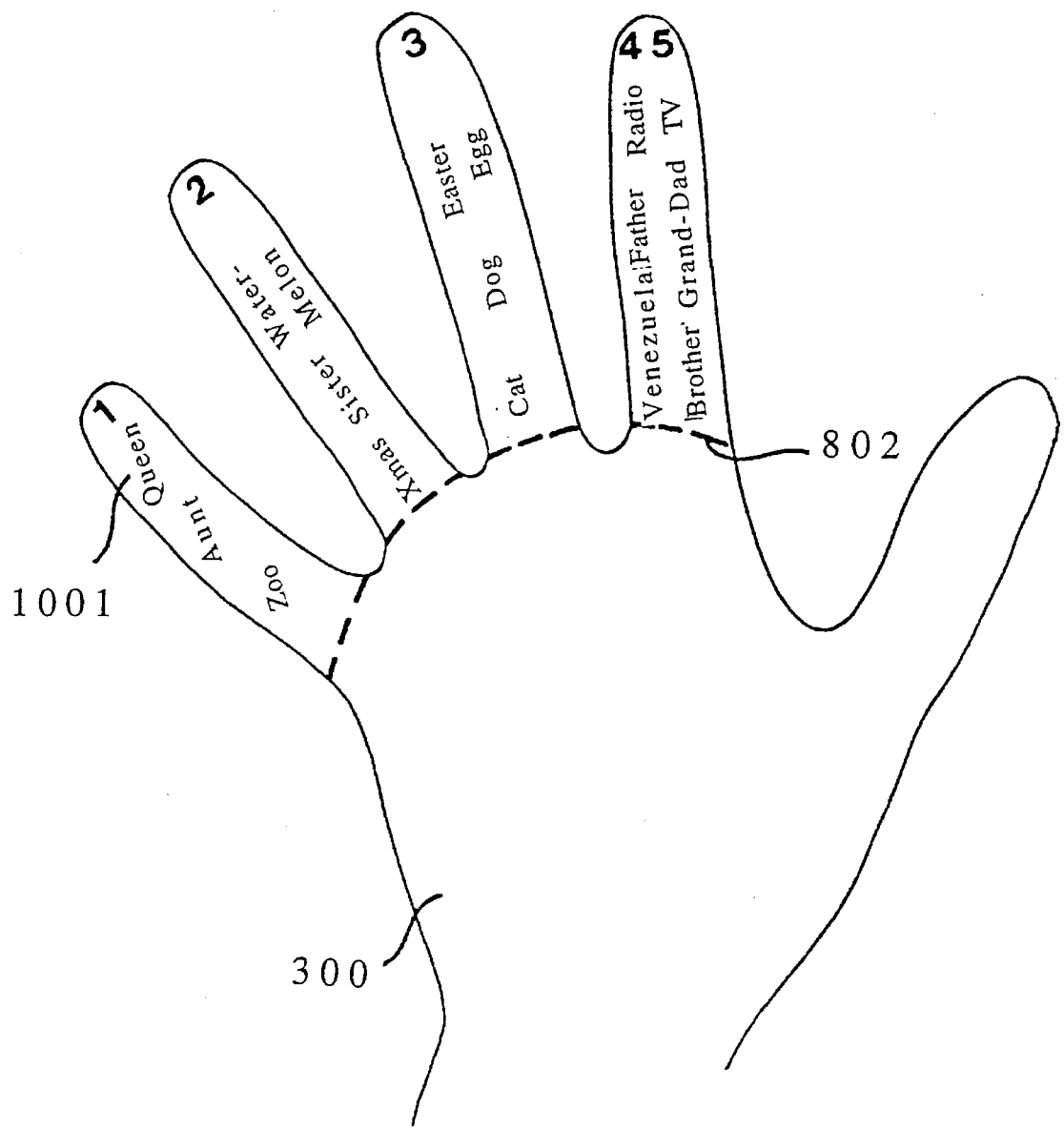
Figure 10C:
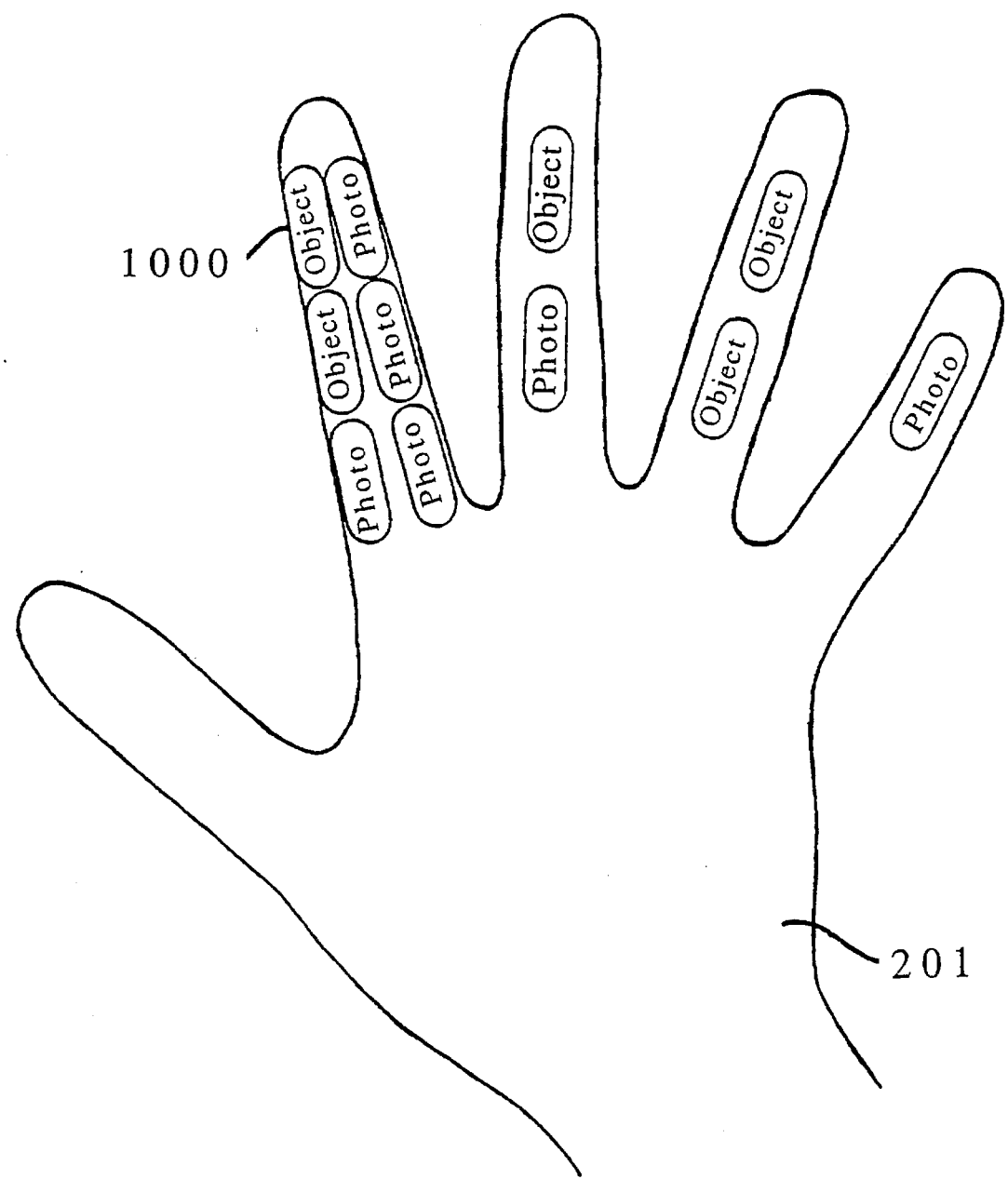
Figure 10D:
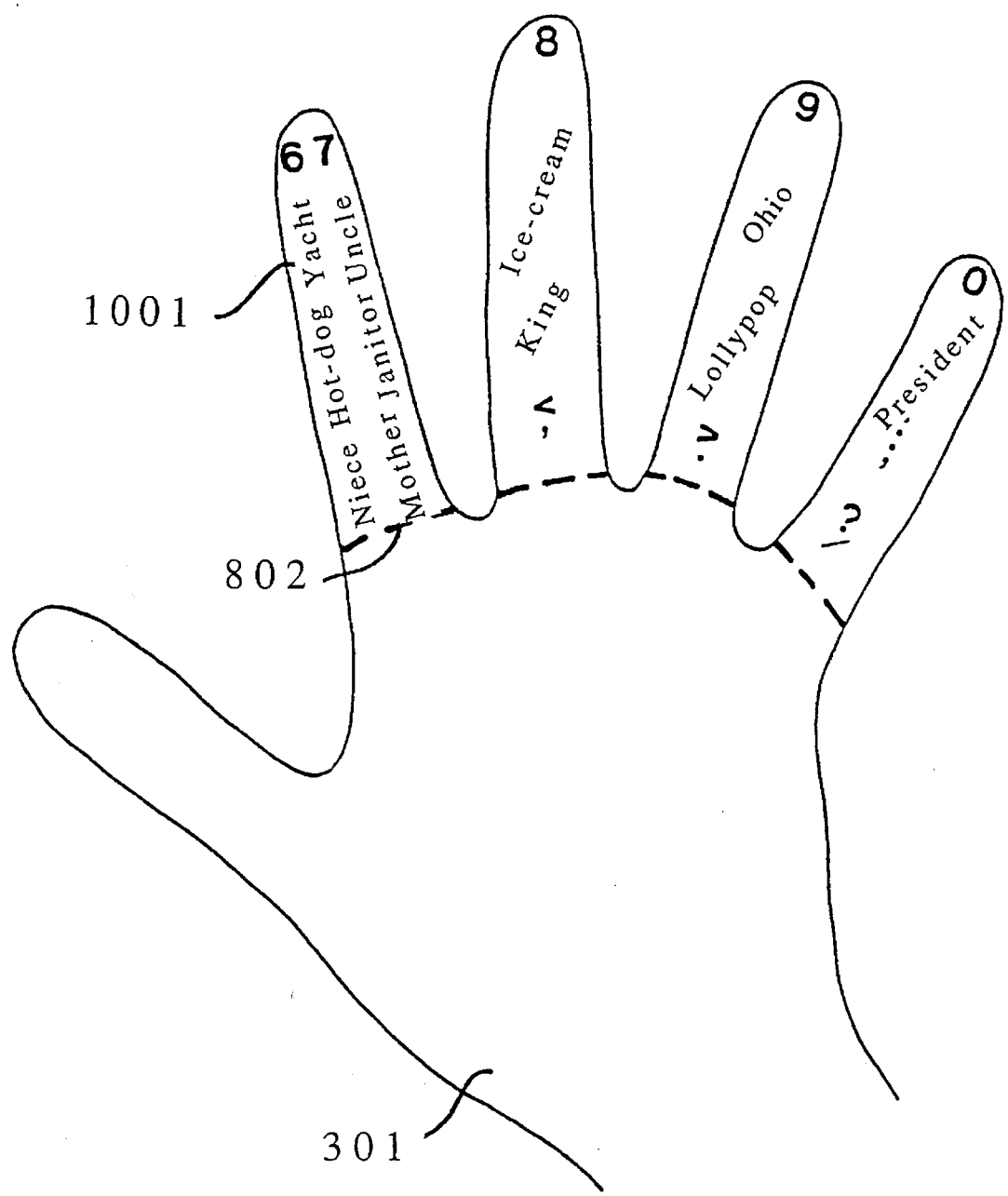

FIG. 7 depicts elevated views of the picture gloves illustrated in FIG. 2, and the alphanumeric gloves shown in FIG. 6, in relation to the representation of the standardized keyboard given in FIG. 1.

FIG. 8 depicts elevated views of gloves with inserted color-coded picture-indicia on the back portions (illustrated with a first style of gloves) and inserted picture-name-indicia on the palm portions (illustrated with a second style of gloves) for assisting in the learning of writing, spelling, and language vocabulary:

8a: back portion of a first left-hand glove with picture-indicia;

8b: palm portion of a second right-hand glove with the corresponding names in English;

8c: back portion of a first right-hand glove with picture-indicia;

8d: palm portion of a second left-hand glove with the corresponding names in English.

FIG. 9 depicts elevated views of gloves with inserted color-coded picture-indicia on the back portions (illustrated with a first style of gloves) and inserted picture-name-indicia on the palm portions (illustrated with a second style of gloves) for assisting in the learning of writing, spelling, and language vocabulary:

9a: back portion of a first left-hand glove with picture-indicia;

9b: palm portion of a second right-hand glove with the corresponding names in French;

9c: back portion of a first right-hand glove with picture-indicia;

9d: palm portion of a second left-hand glove with the corresponding names in French.

FIG. 10 depicts elevated views of gloves with inserted color-coded photo/object-indicia on the back portions, and inserted photo/object-name indicia on the palm portions for facilitating self-expression:

10a: back portion of a left-hand glove with photo/object indicia;

10b: palm portion of a right-hand glove with the names of the corresponding photo/object indicia;

10c: back portion of a right-hand glove with photo/object indicia;

10d: palm portion of a left-hand glove with the names of the corresponding photo/object indicia.

Figure 11:
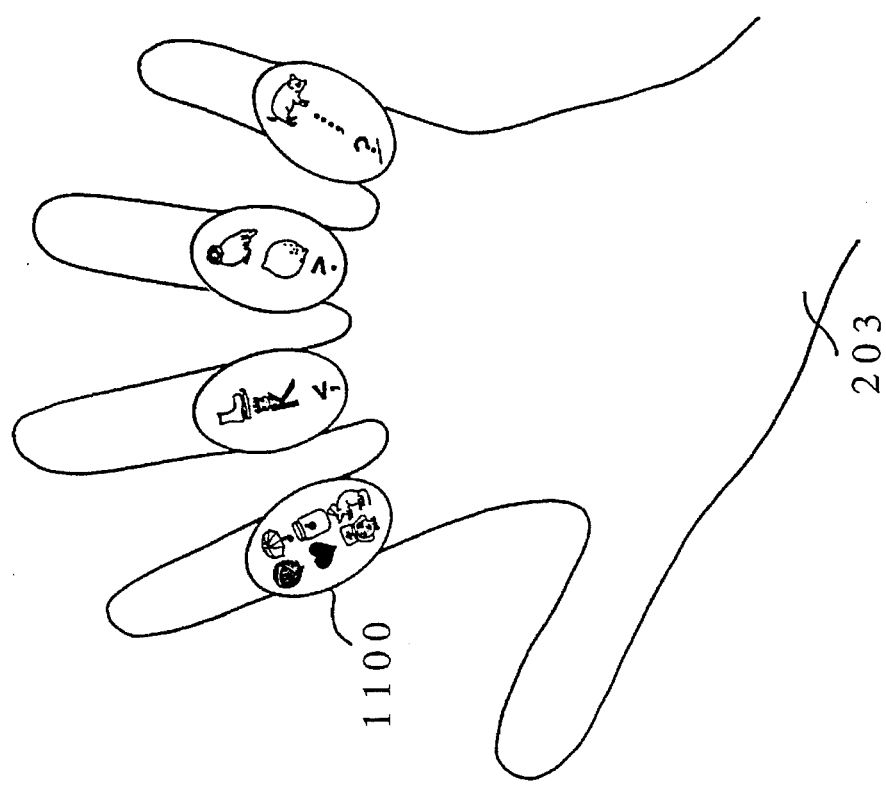
Figure 11:
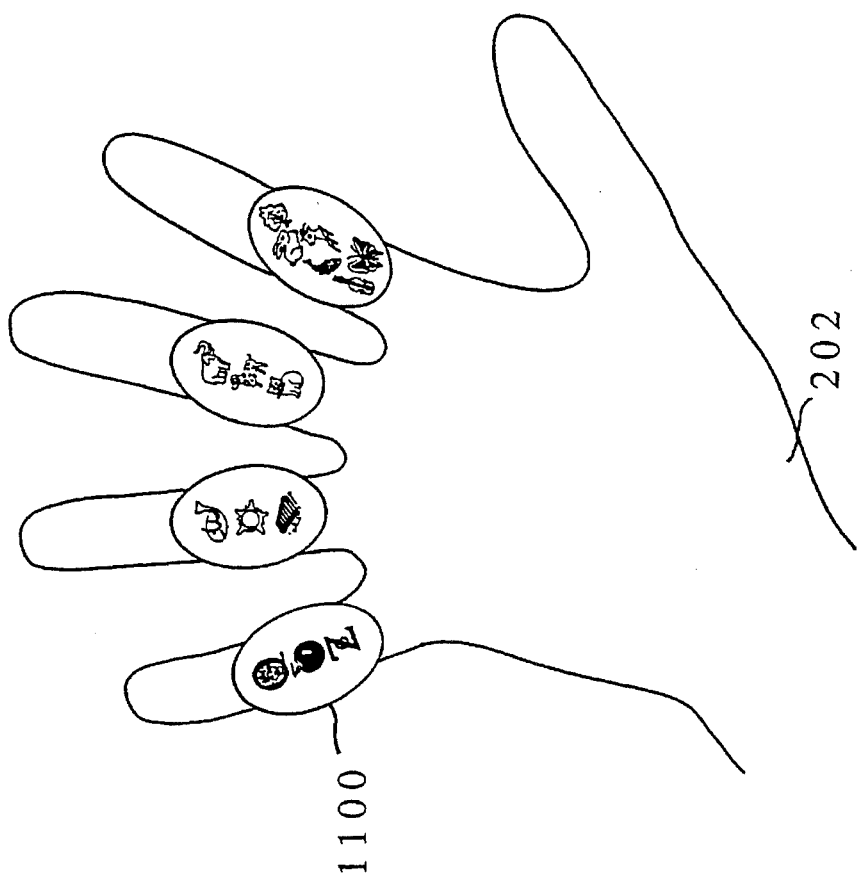

FIG. 11 depicts elevated views of a set of picture-rings worn on the hands of a teenager, for assisting the memorization of the key-finger assignment of the keyboard.

Figure 12:
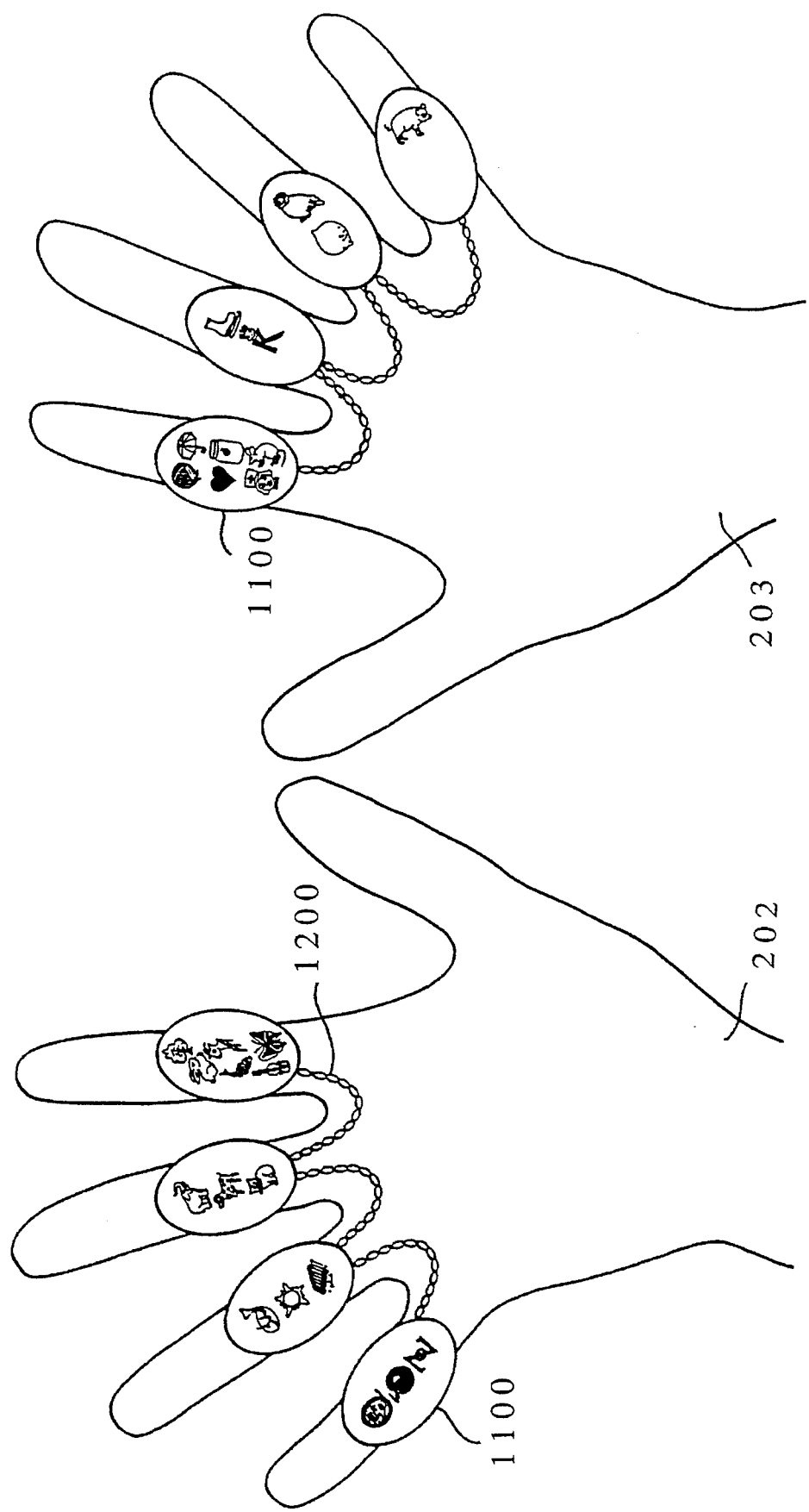

FIG. 12 depicts elevated views of a set of picture-rings worn on the hands of a teenager, and nearest-neighbor interconnected in order to facilitate proper wearing of the rings according to the key-finger assignment of the keyboard.

FIG. 13 depicts the set of picture-rings as shown in FIG. 12, where:

13a: the picture-ring worn on the little finger of the left hand is connected to a wrist bracelet worn on the left hand (to give a touch of simplicity to the hand);

13b: the picture-ring worn on the major finger of the right hand is attached to the top of a triangular-shaped network of chains ending at its base to a wrist bracelet worn on the right hand (to give a touch of sophistication to the hand).

FIG. 14 depicts views of medallion picture rings crowned with decorative stones, for use by teenagers and adults:

14a: medallion picture rings worn on the left hand, with elevated view of medallions open (medallion lid in horizontal position);

14b: medallion picture rings worn on the right hand, with elevated view of medallions open (medallion lid in horizontal position);

14c: medallion picture rings worn on the left hand, with elevated view of medallions closed, and a side view of the medallion ring worn on the forefinger;

14d: medallion picture rings worn on the right hand, with elevated view of medallions closed.

FIG. 15 depicts elevated views of medallion picture rings associated with the manual alphabet:

15a: medallion picture rings worn on the left hand of a user, with elevated view of medallions open (medallion lid in horizontal position);

15b: medallion picture rings worn on the right hand of a user, with elevated view of medallions open (medallion lid in horizontal position);

15c: medallion picture rings worn on the left hand of a user, with elevated view of medallions closed;

15d: medallion picture rings worn on the right hand of a user, with elevated view of medallions closed.

FIG. 16 depicts elevated views of medallion picture rings associated with the Braille alphabet:

16a: medallion picture rings worn on the left hand of a user, with elevated view of medallions open (medallion lid in horizontal position);

16b: medallion picture rings worn on the right hand of a user, with elevated view of medallions open (medallion lid in horizontal position);

16c: medallion picture rings worn on the left hand of a user, with elevated view of medallions closed;

16d: medallion picture rings worn on the right hand of a user, with elevated view of medallions closed.

FIG. 17 depicts adaptive electronic medallion rings crowned with decorative stones, for assisting in the learning of spelling and vocabulary:

17a: electronic medallion rings worn on the left hand of a user, with elevated views of medallions open (medallion lid in horizontal position);

17b: electronic medallion rings worn on the right hand of a user, with elevated views of medallions open (medallion lid in horizontal position);

17c: electronic medallion rings worn on the left hand of a user, with elevated views of medallions closed;

17d: electronic medallion rings worn on the right hand of a user, with elevated views of medallions closed.

FIG. 18 depicts the adaptive mechanical medallion rings for spelling and vocabulary:

18a: medallion picture rings worn on the left hand of a user, with elevated views of medallions open (medallion lid in horizontal position);

18b: medallion picture rings worn on the right hand of a user, with elevated views of medallions open (medallion lid in horizontal position);

18c: medallion picture rings worn on the left hand of a user, with elevated views of medallions closed.

18d: medallion picture rings worn on the right hand of a user, with elevated views of medallions closed.

Figure 19:
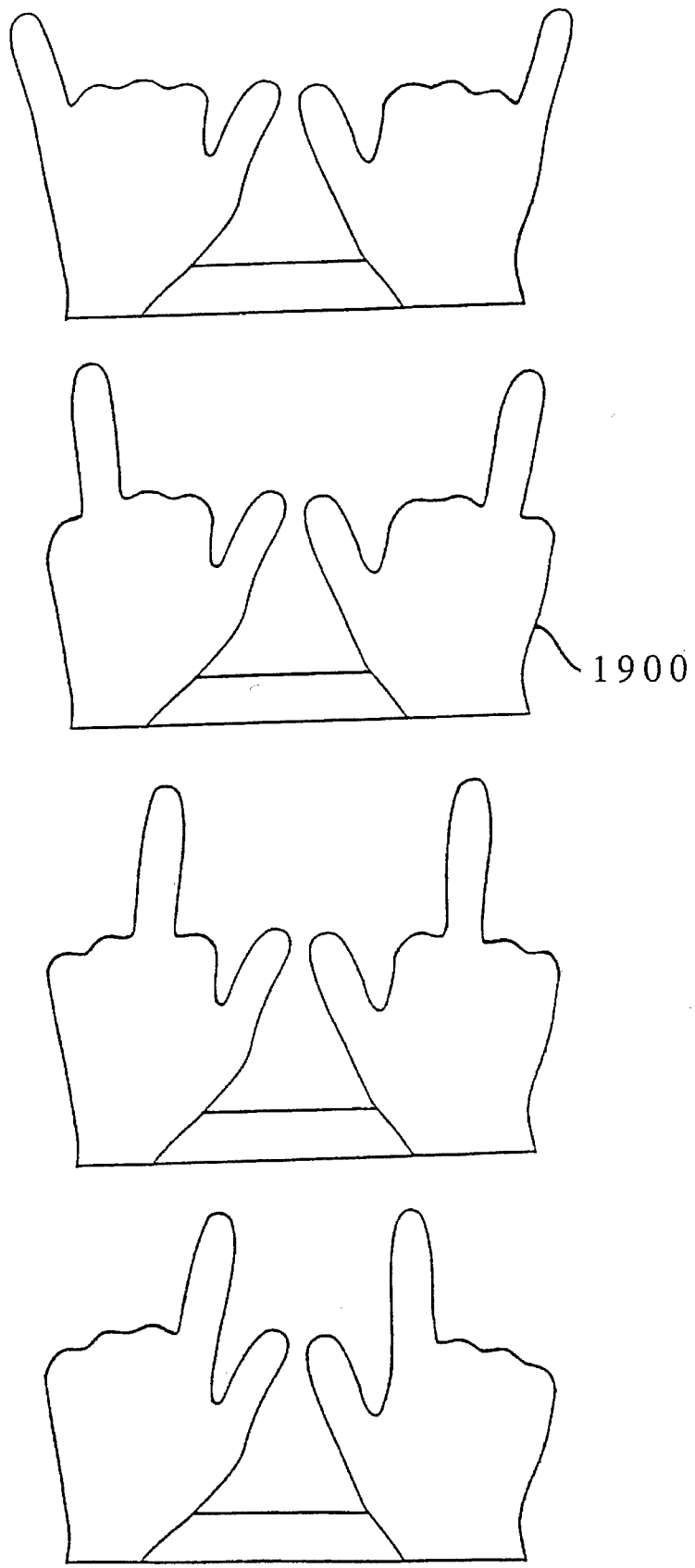

FIG. 19 depicts a set of four finger-cards for self-expression and/or therapy.

Figure 20A:
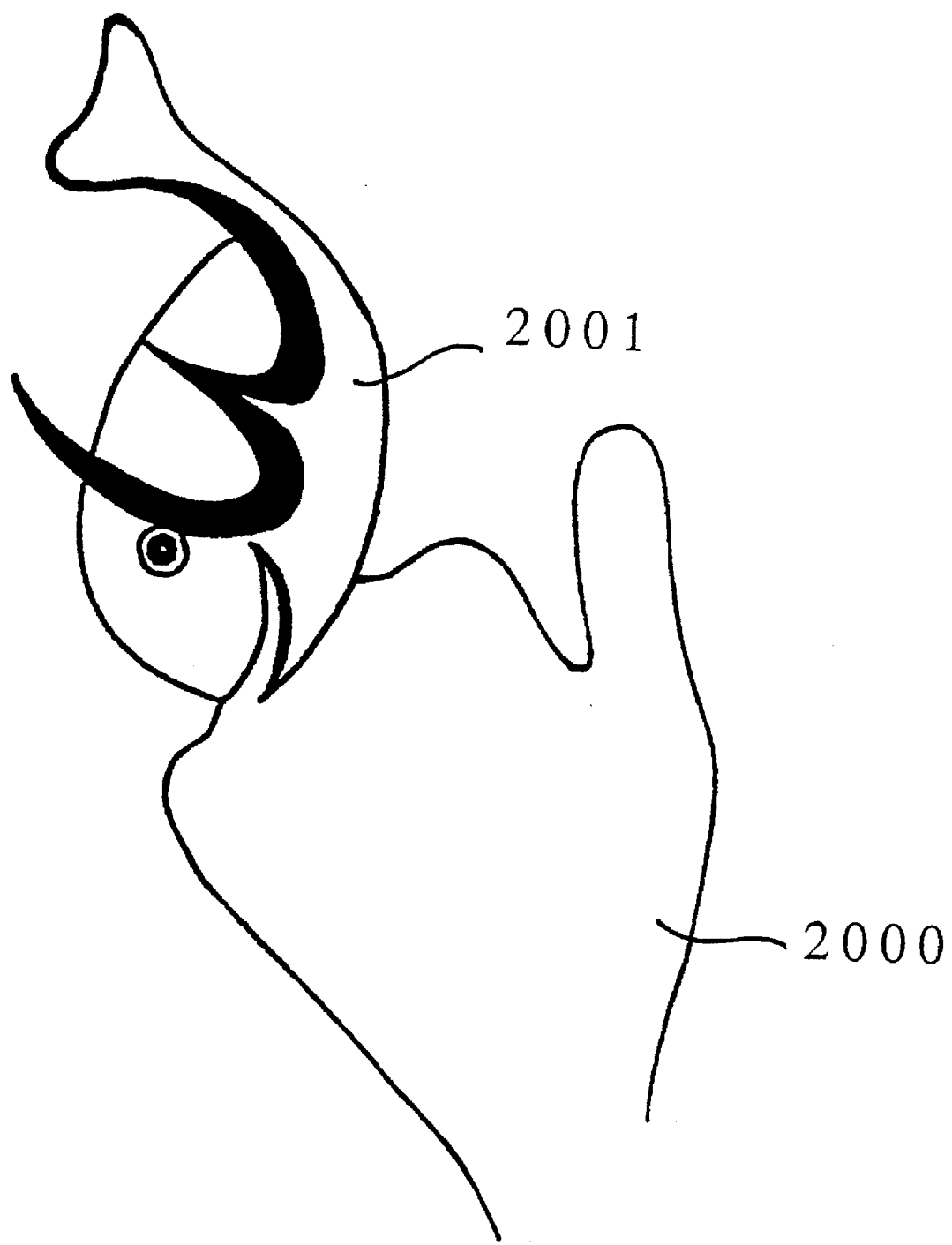
Figure 20B:
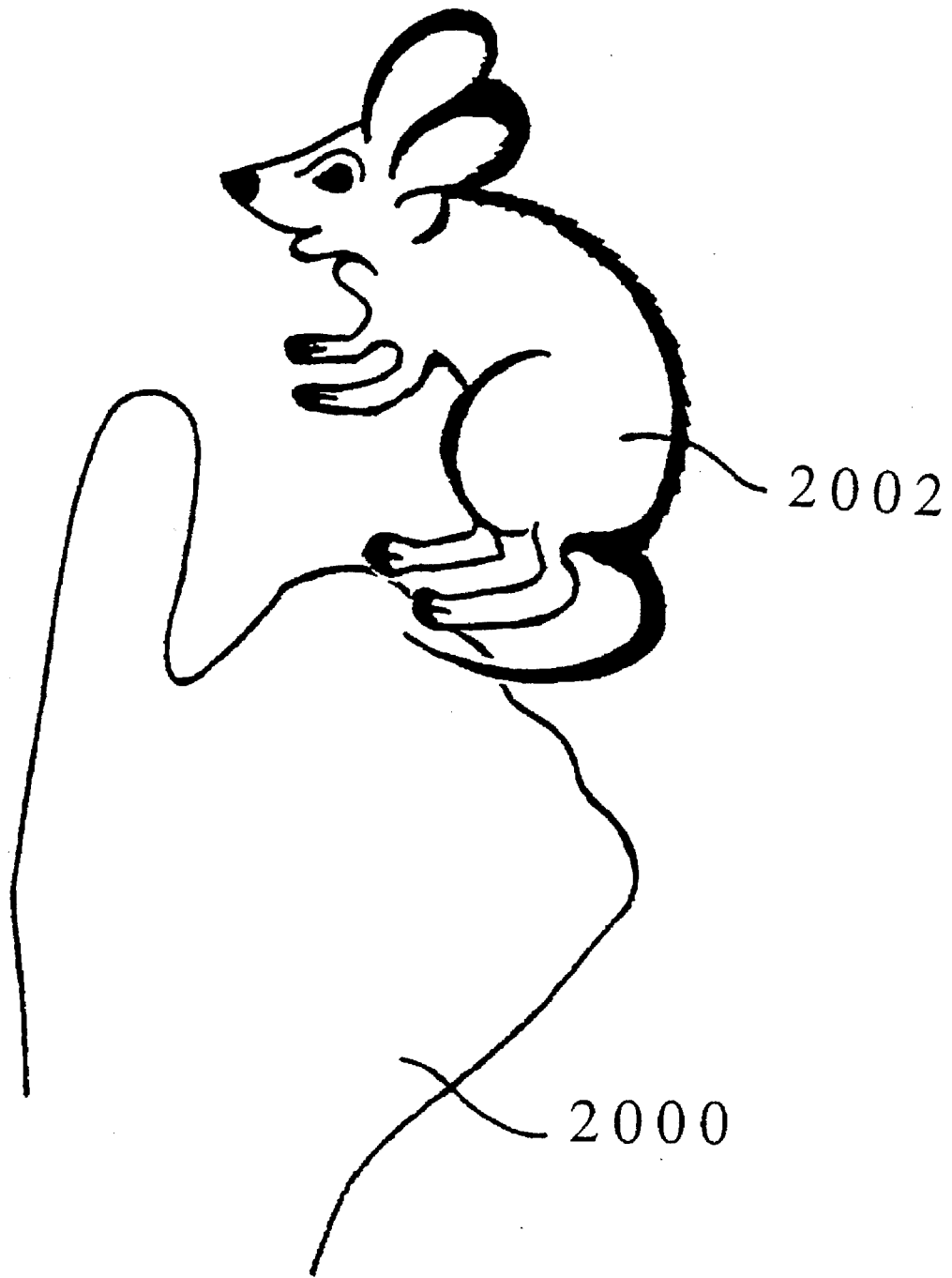

FIG. 20 depicts two picture-finger cards for self-expression and/or therapy.

20a: Whale-finger card;

20b: Mouse-finger card.

Figure 21A:
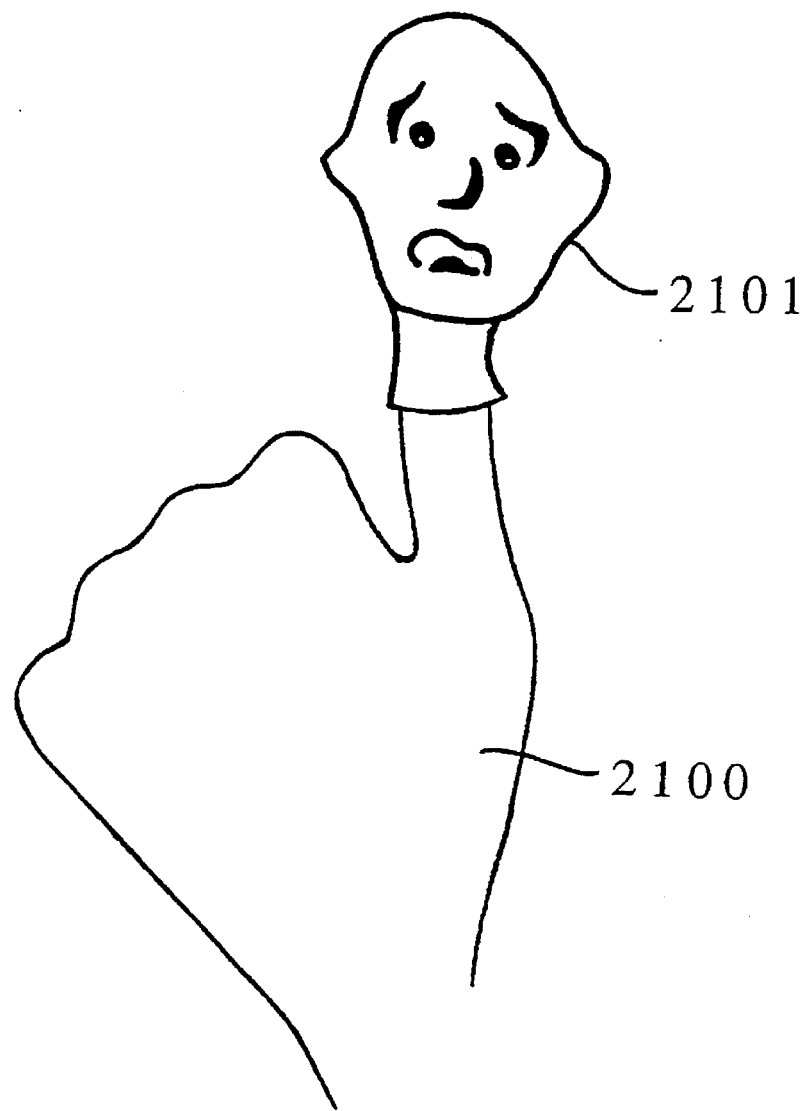
Figure 21B:
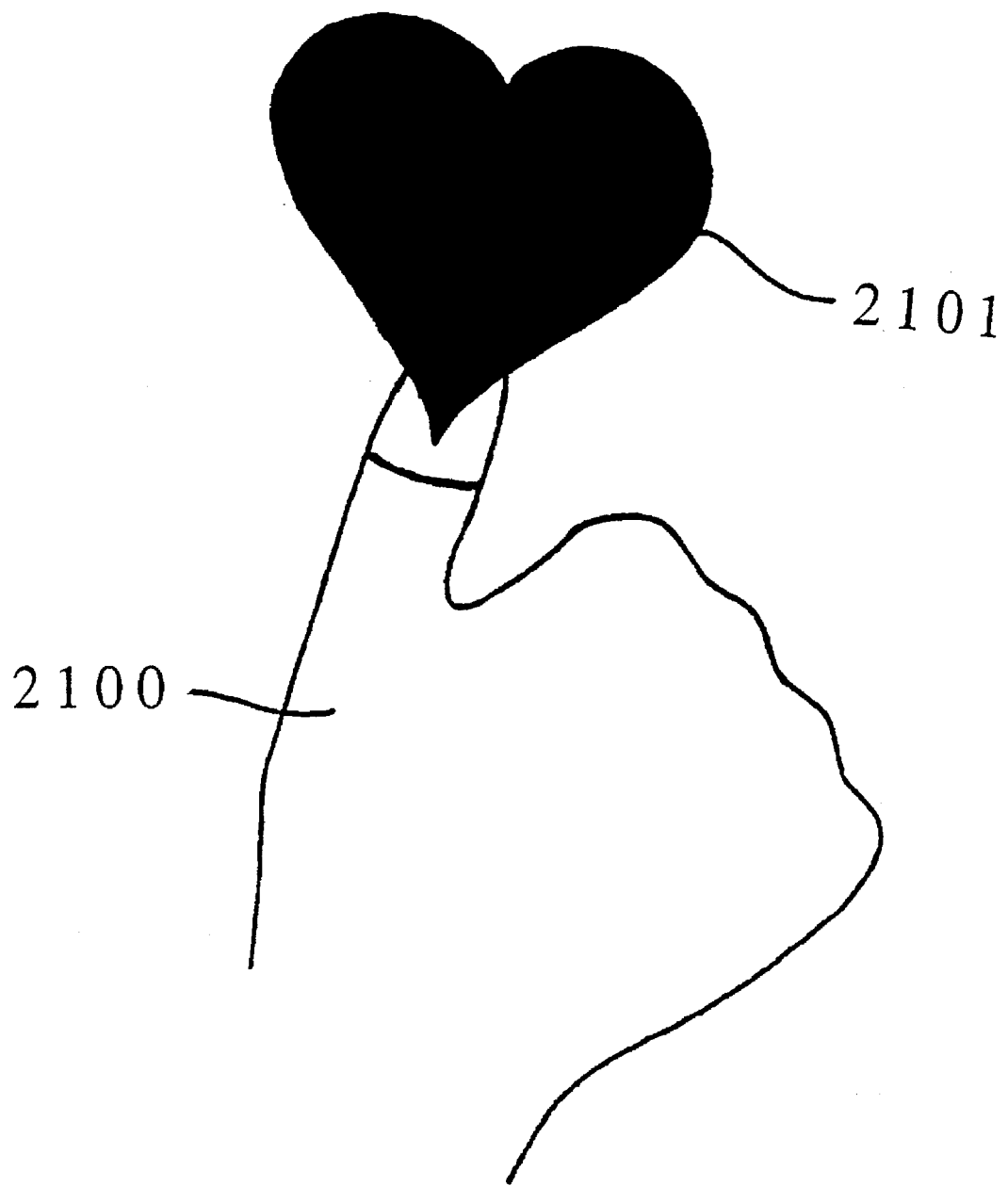

FIG. 21 depicts two picture-thumb cards for self-expression and/or therapy.

21a: Left-hand picture-thumb card with an unhappy-face;

21b: Right-hand picture-thumb card with a heart.

Figure 22:
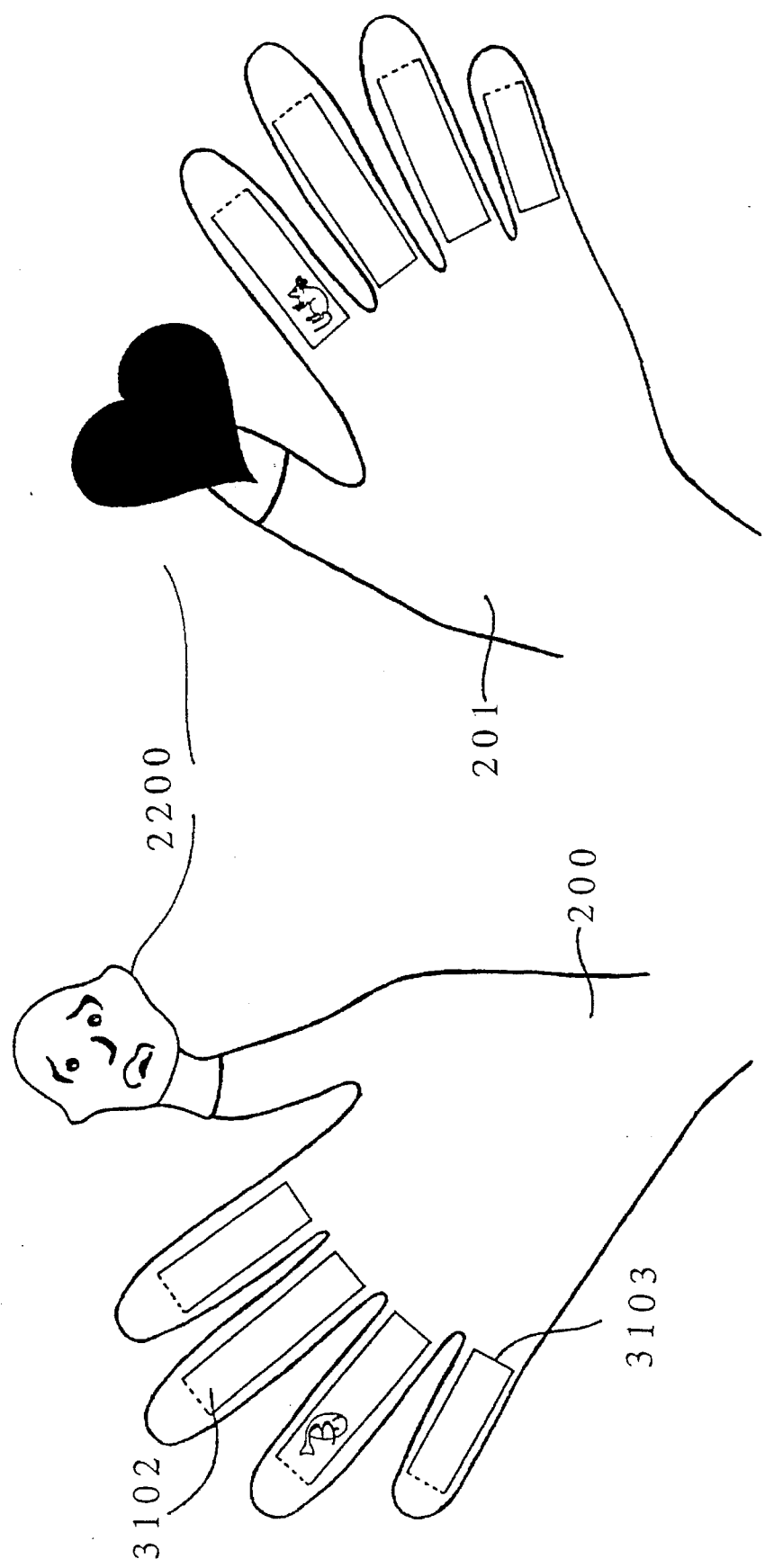

FIG. 22 depicts a pair of adaptive picture gloves (showing the pictures of FIG. 20) together with two thumb-puppets (showing the pictures of FIG. 21).

Figure 23:

FIG. 23 depicts a double picture-thumb card for self-expression and/or therapy.

Figure 24:
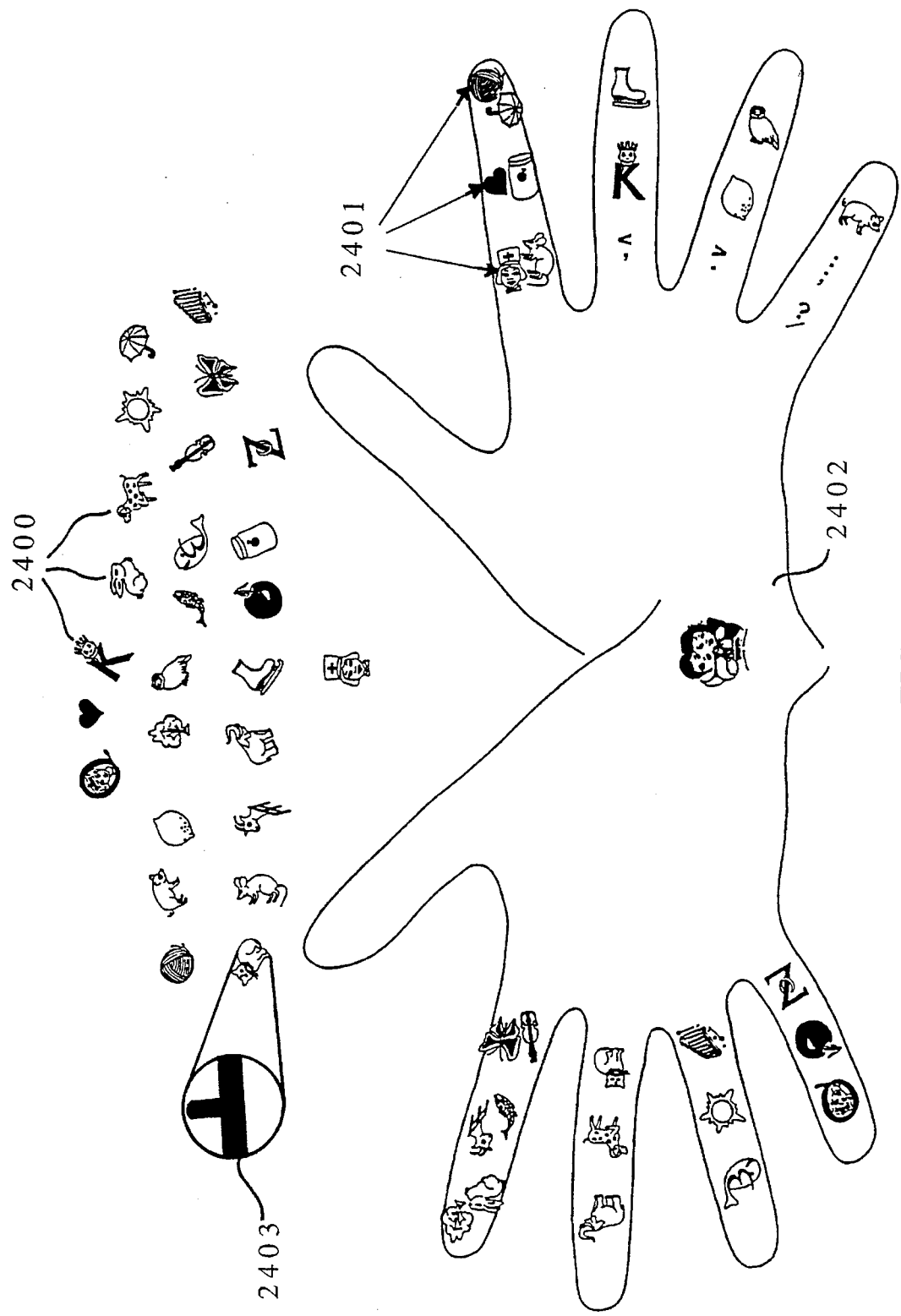

FIG. 24 depicts the "Magic Fit-In Puzzle", and its puzzle pieces (with a side-view of the "cat" puzzle piece), for reinforcement learning.

FIG. 25 depicts the "Magic Lottery" for reinforcement learning:

25a: Winning configuration.

25b: Loosing configuration.

Figure 26:
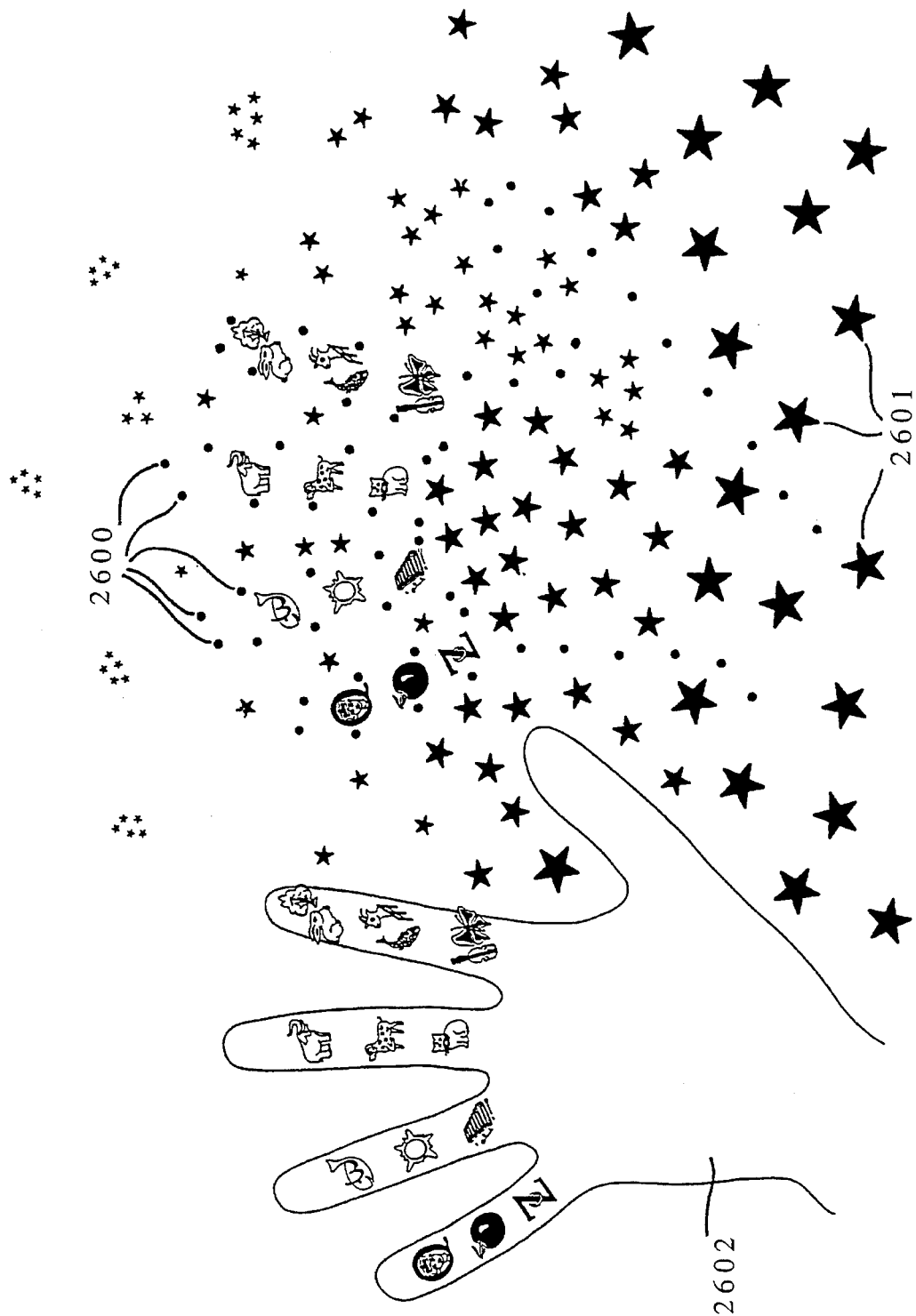

FIG. 26 depicts the "Magic Maze" for reinforcement learning.

Figure 27:
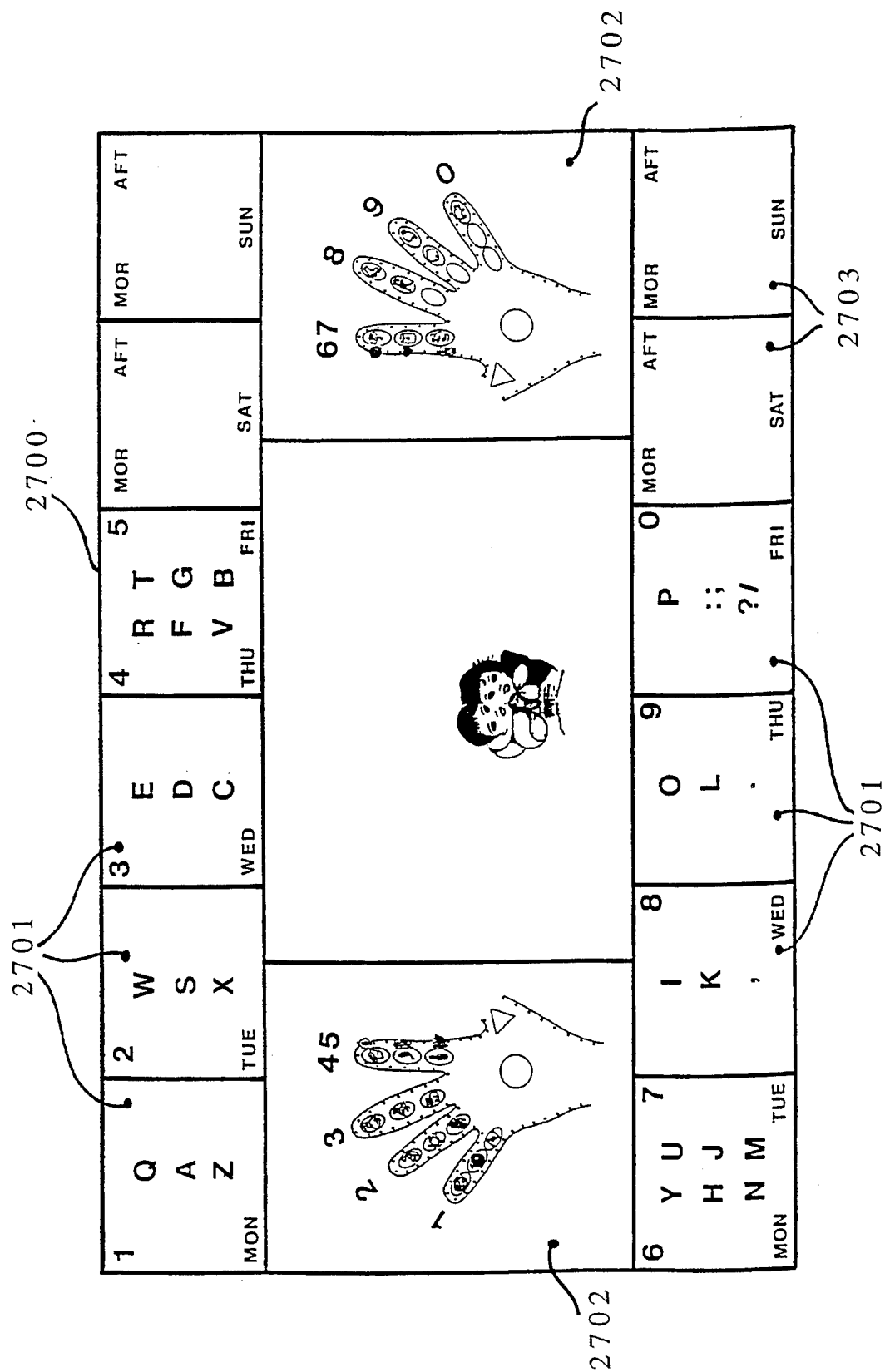

FIG. 27 depicts the "Magic Box" for reinforcement learning.

Figure 28:
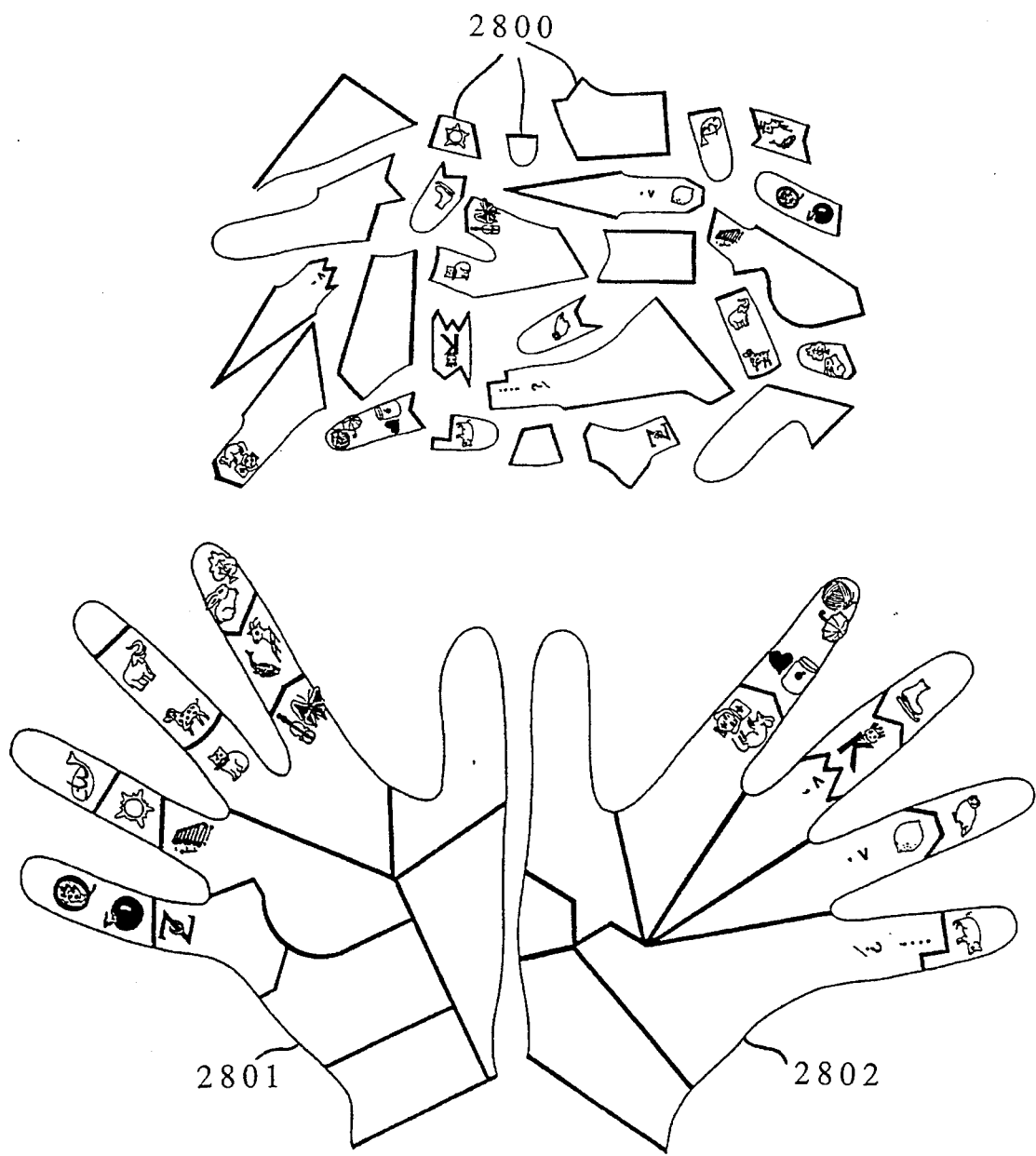

FIG. 28 depicts the "Magic Fitting Puzzle", and its puzzle pieces, for reinforcement learning.

Figure 29:
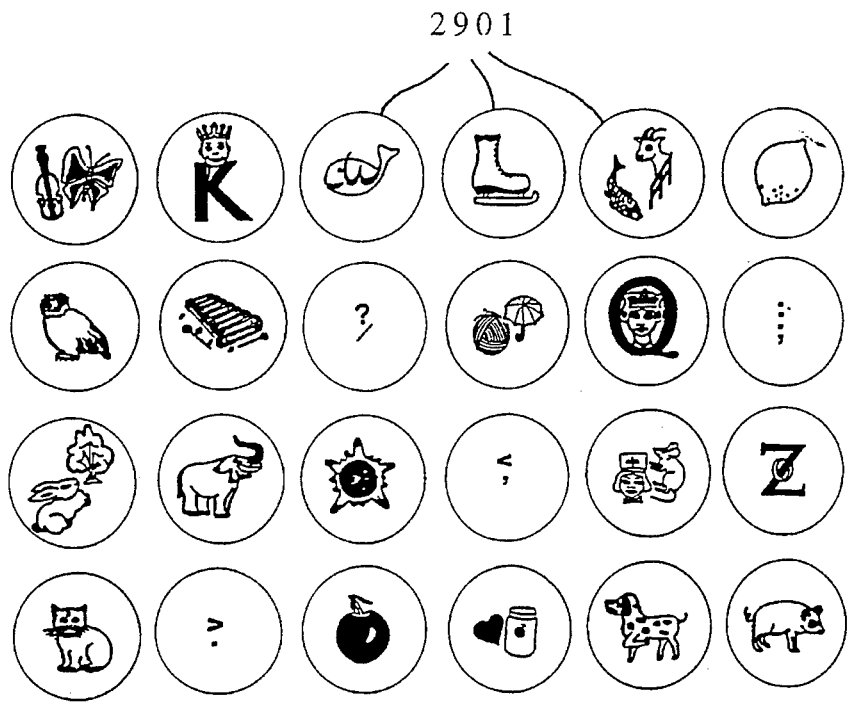
Figure 29:
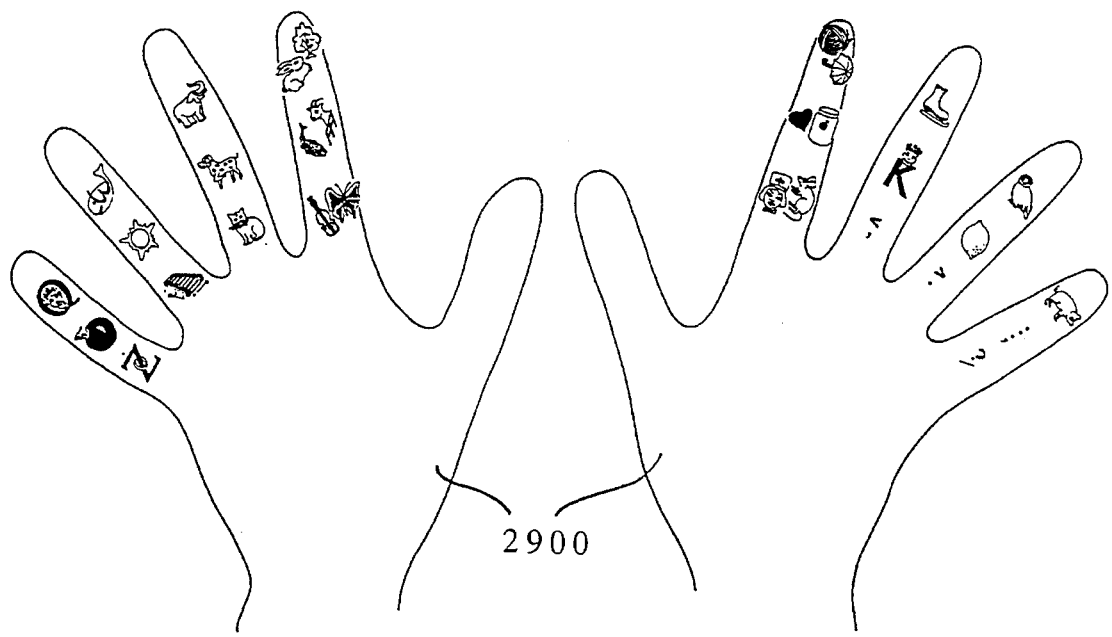

FIG. 29 depicts the "Magic Bingo" for reinforcement learning.

FIG. 30 depicts the "Magic Cards Game" for reinforcement learning:

30a: Cards with pictures and letters;

30b: Cards with pictures, letters, and numbers.

Figure 31A:
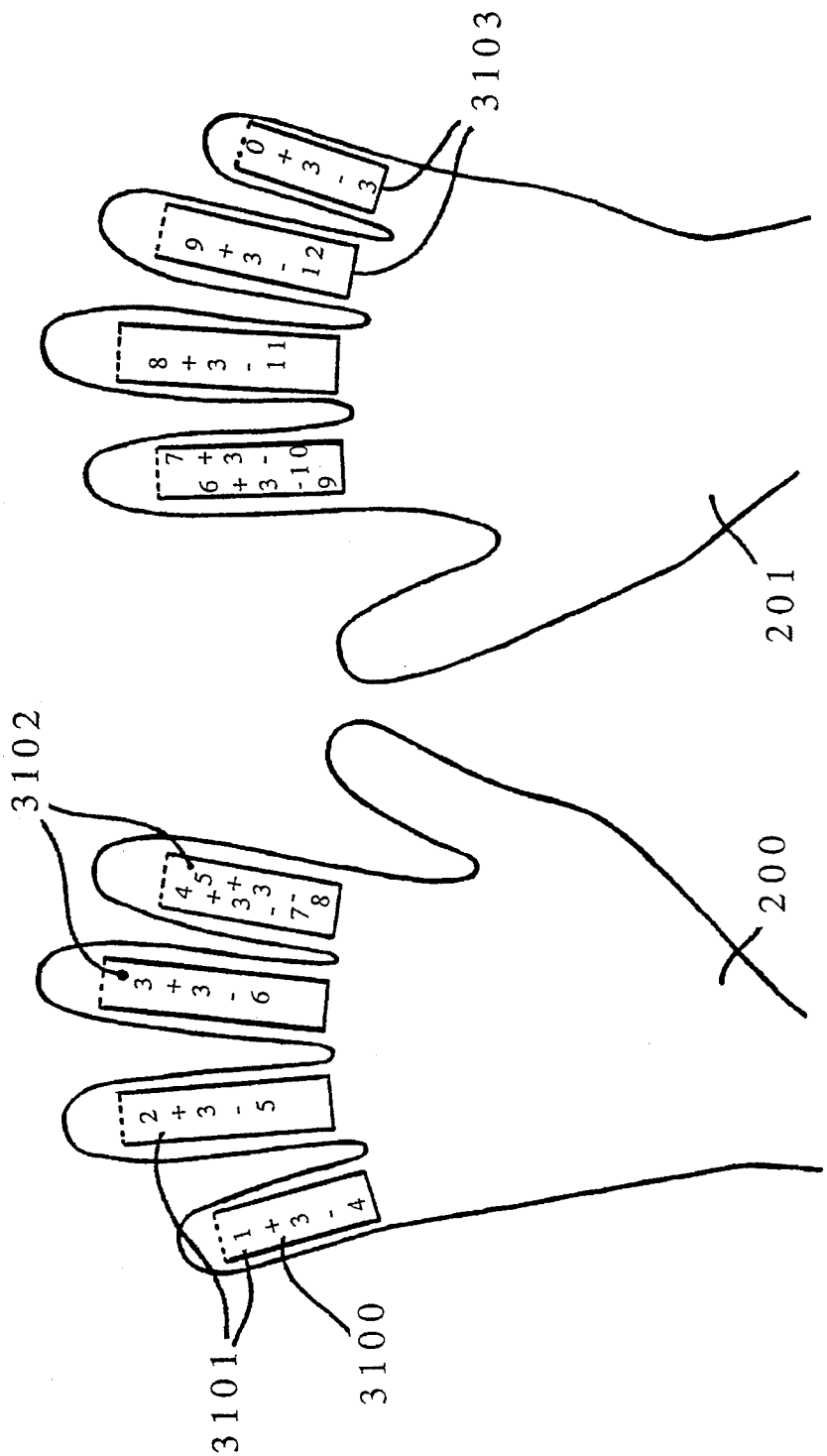
Figure 31B:
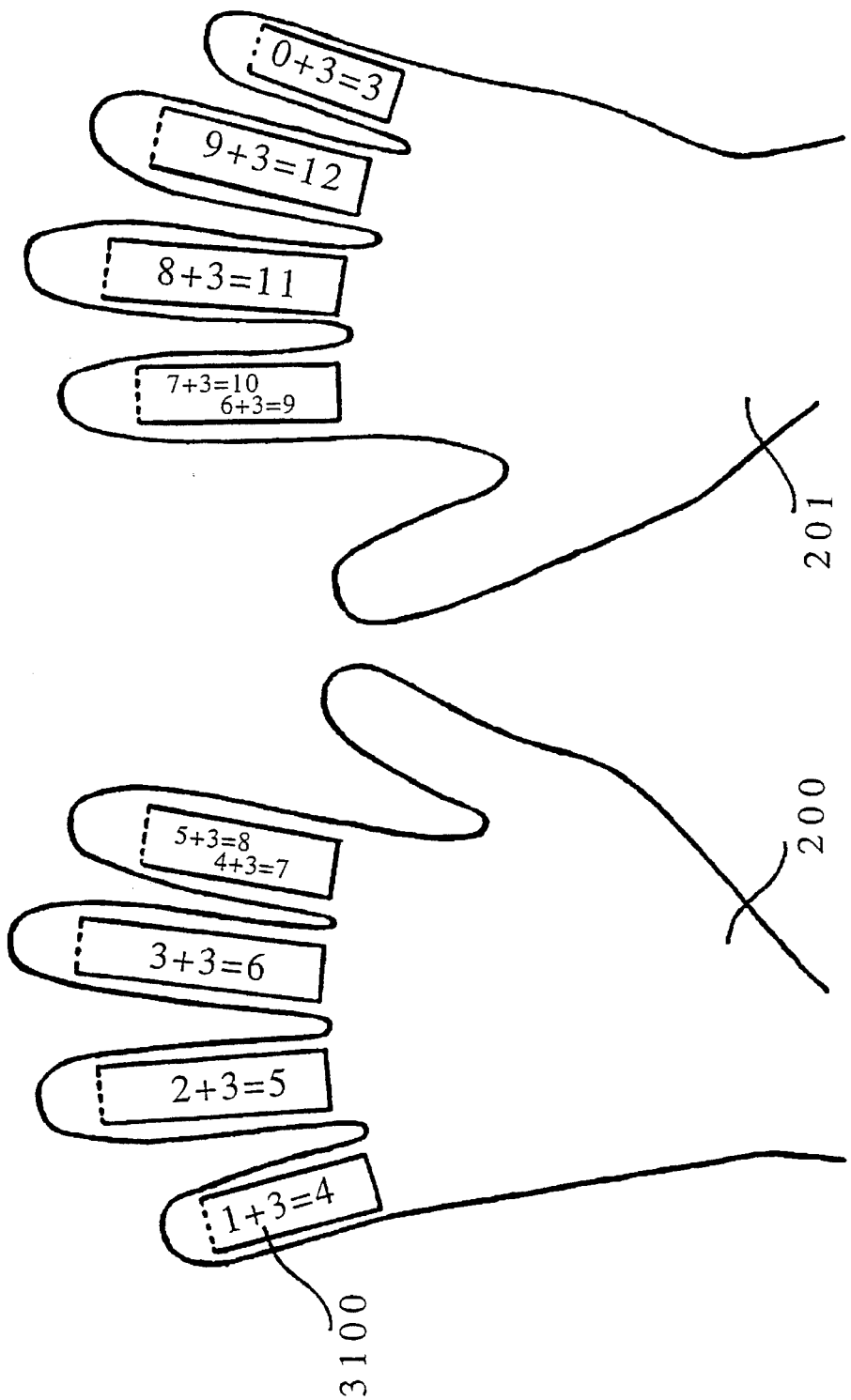

FIG. 31 depicts the "Magic Addition Tables" for reinforcement learning:

31a: elementary form;

31b: equation form.

Figure 32A:
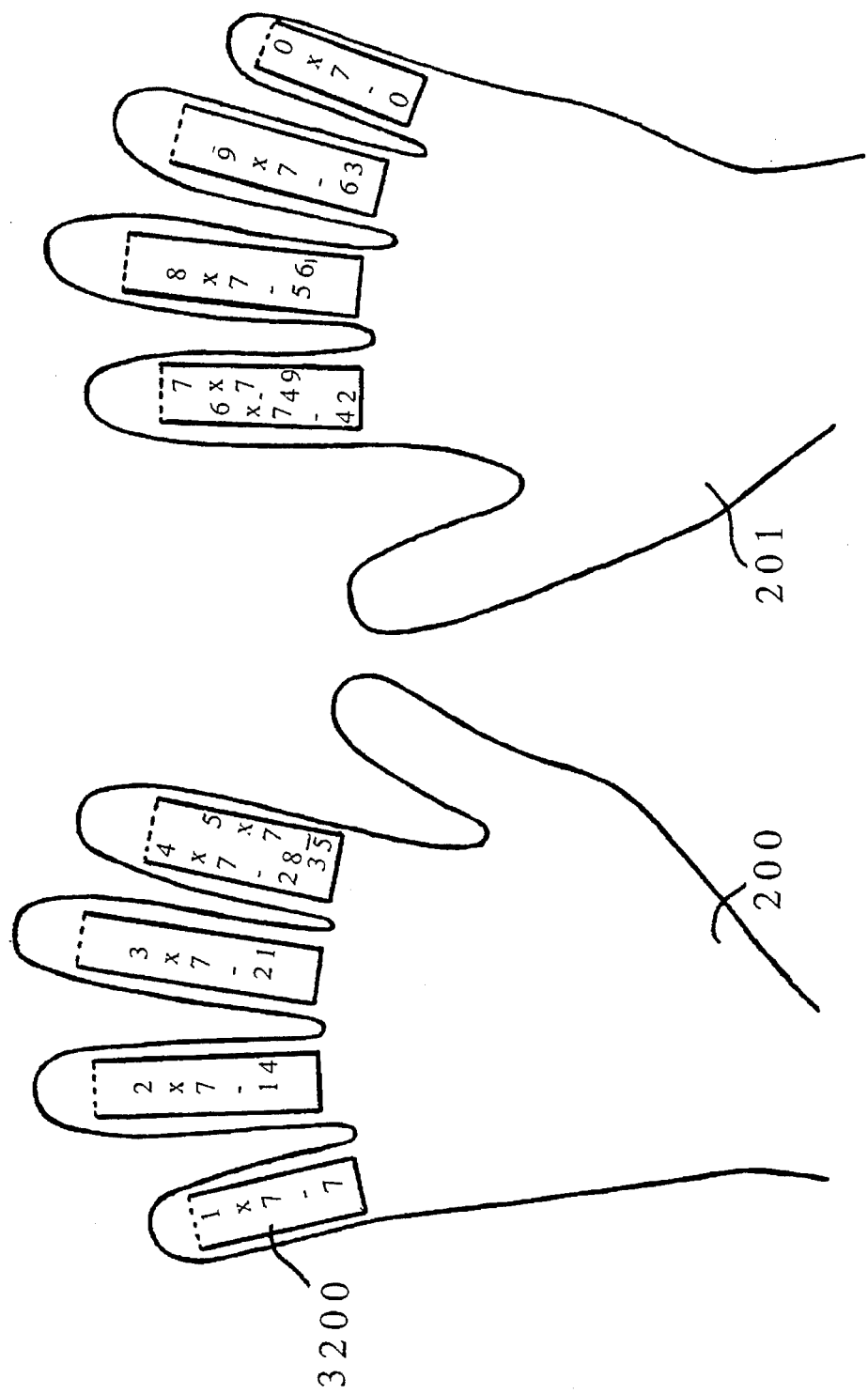
Figure 32B:
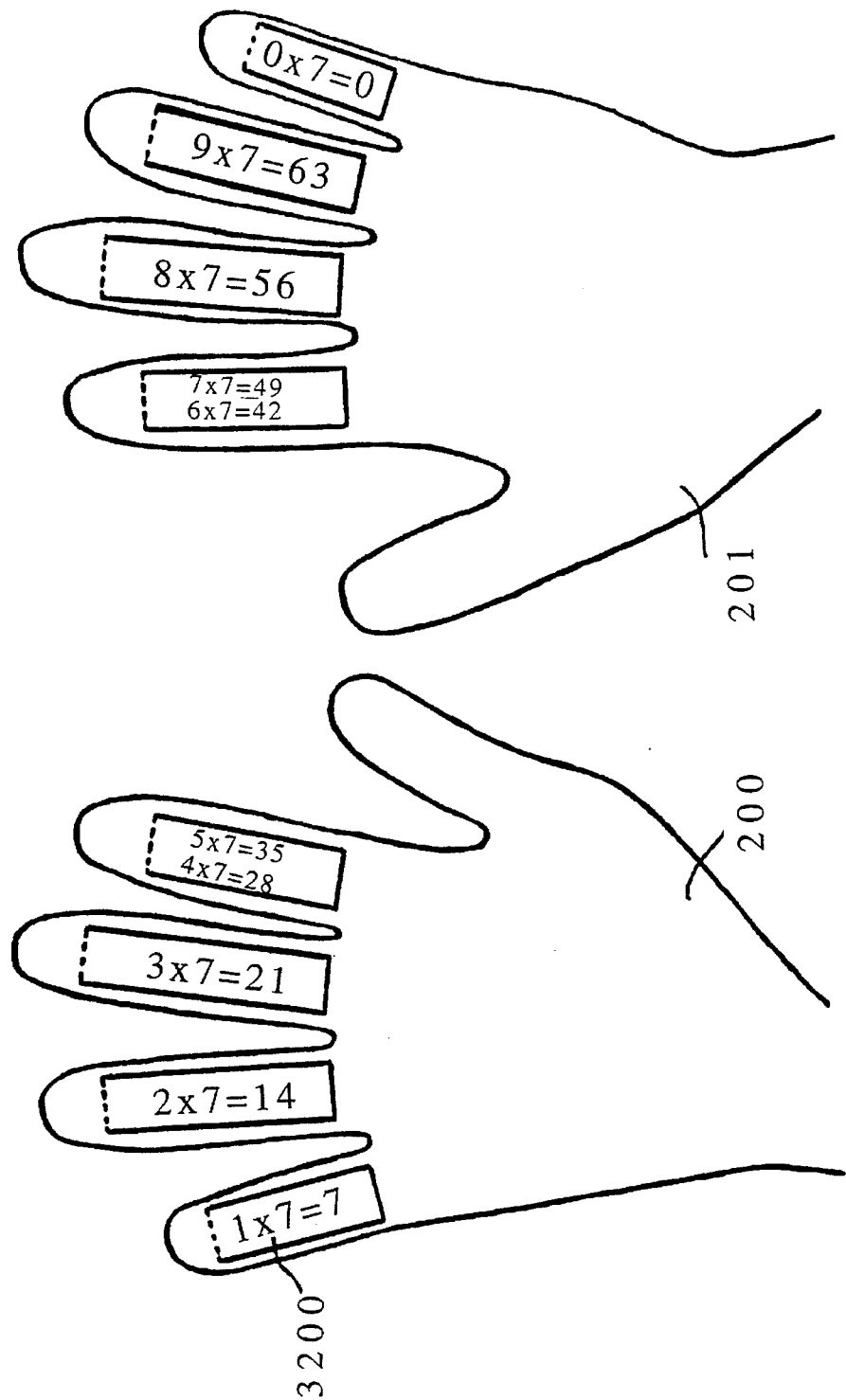

FIG. 32 depicts the "Magic Multiplication Tables" for reinforcement learning:

32a: elementary form;

32b: equation form.

Figure 33A:
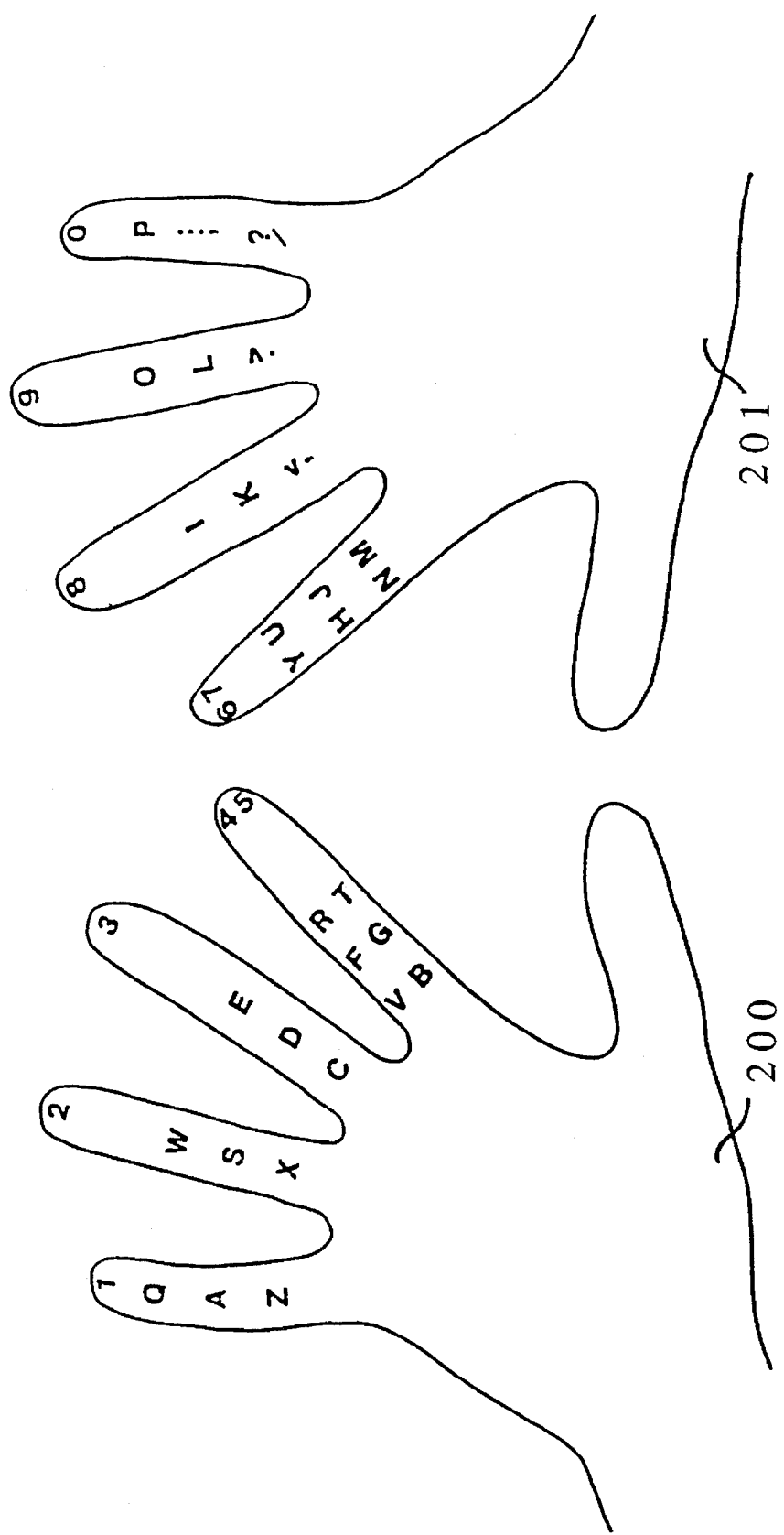
Figure 33B:
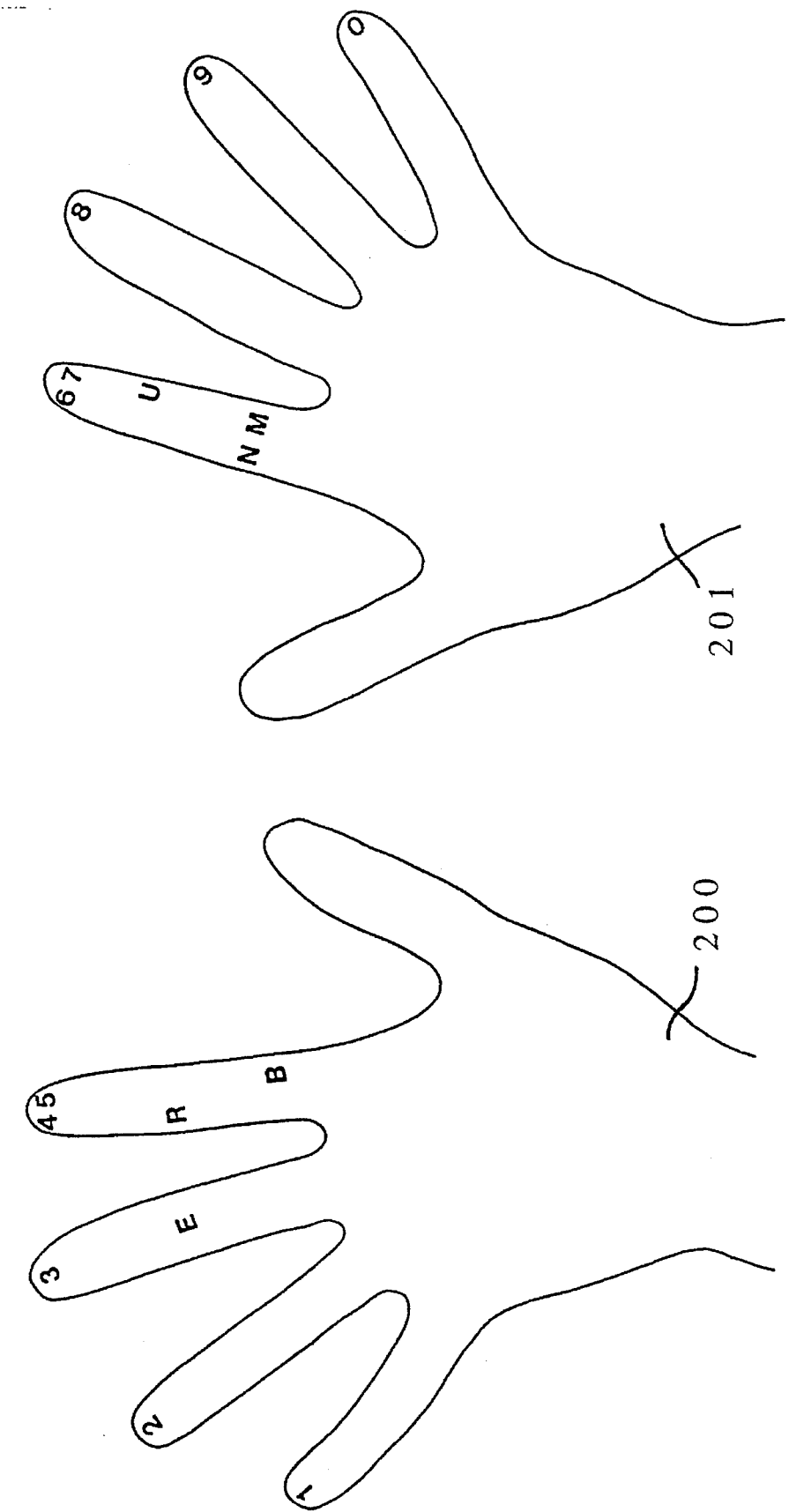

FIG. 33 illustrate the "Magic Numbers Game" for reinforcement learning:

33a: back portions of heft-hand and right-hand alphanumeric gloves;

33b: alphanumeric glove representation of the word "NUMBER".

Figure 34:
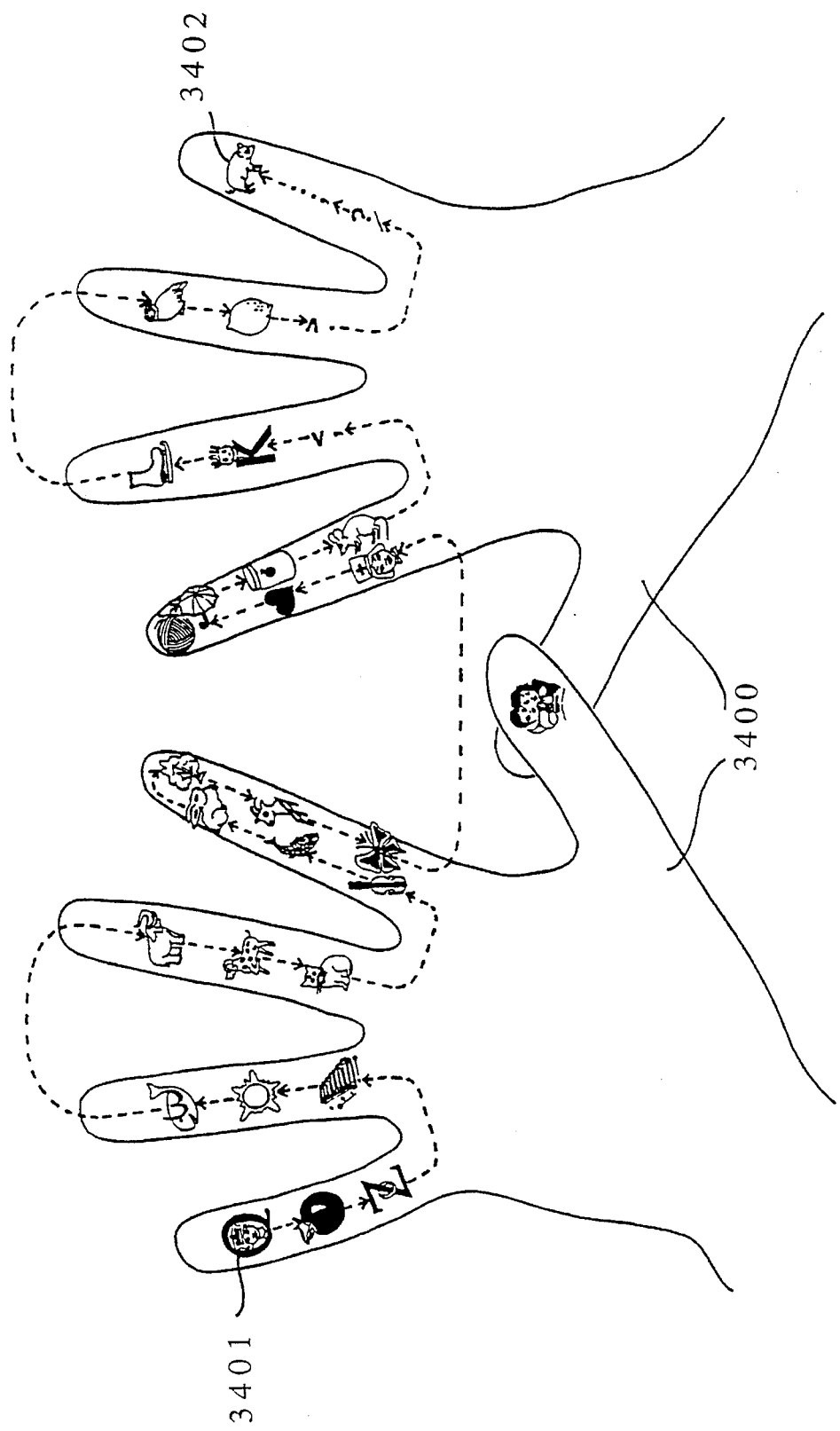

FIG. 34 depicts the "Magic Race Game" for reinforcement learning.

Figure 35:
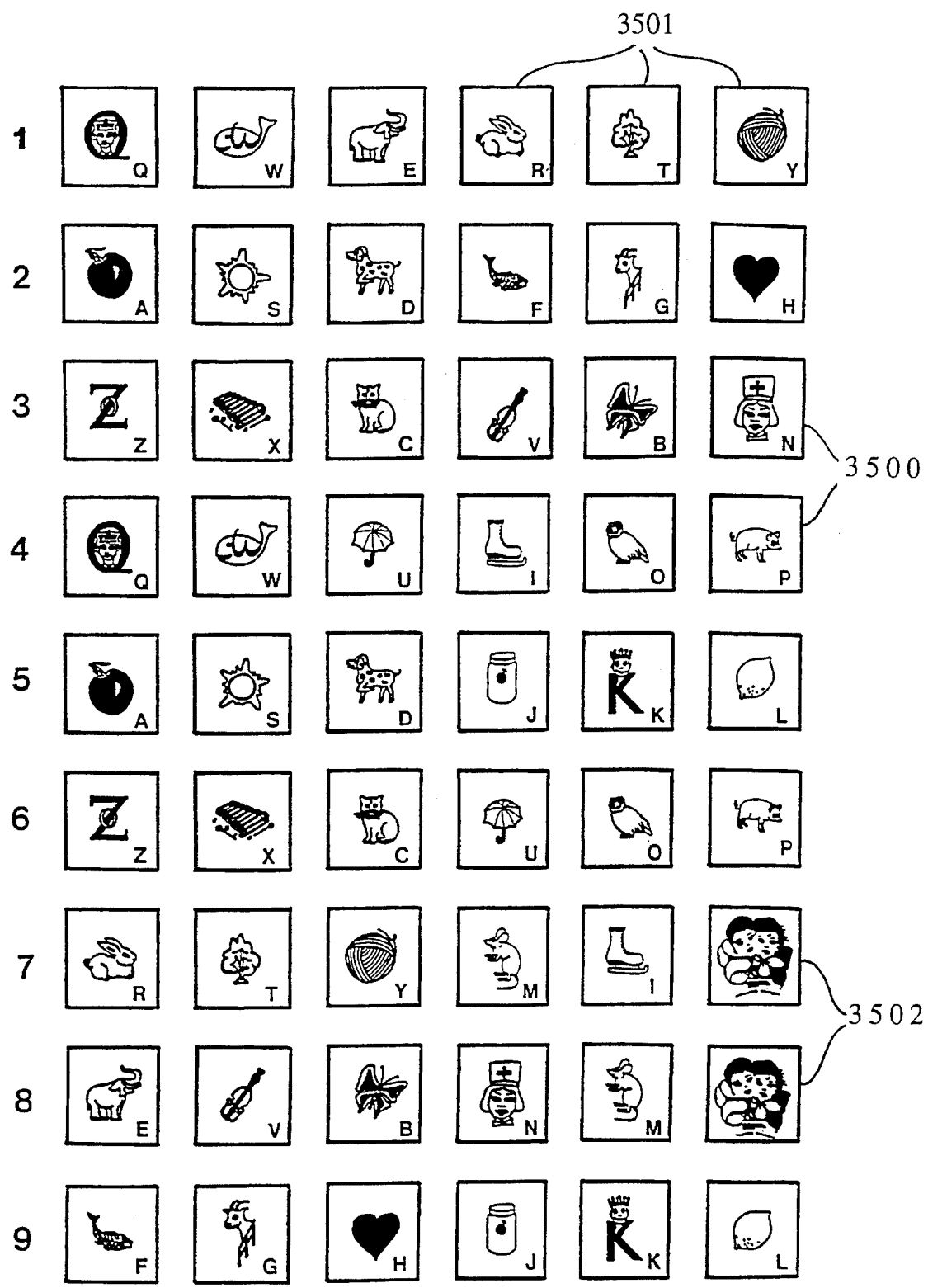

FIG. 35 depicts the "Magic Dices Game" for reinforcement learning.

Figure 36:
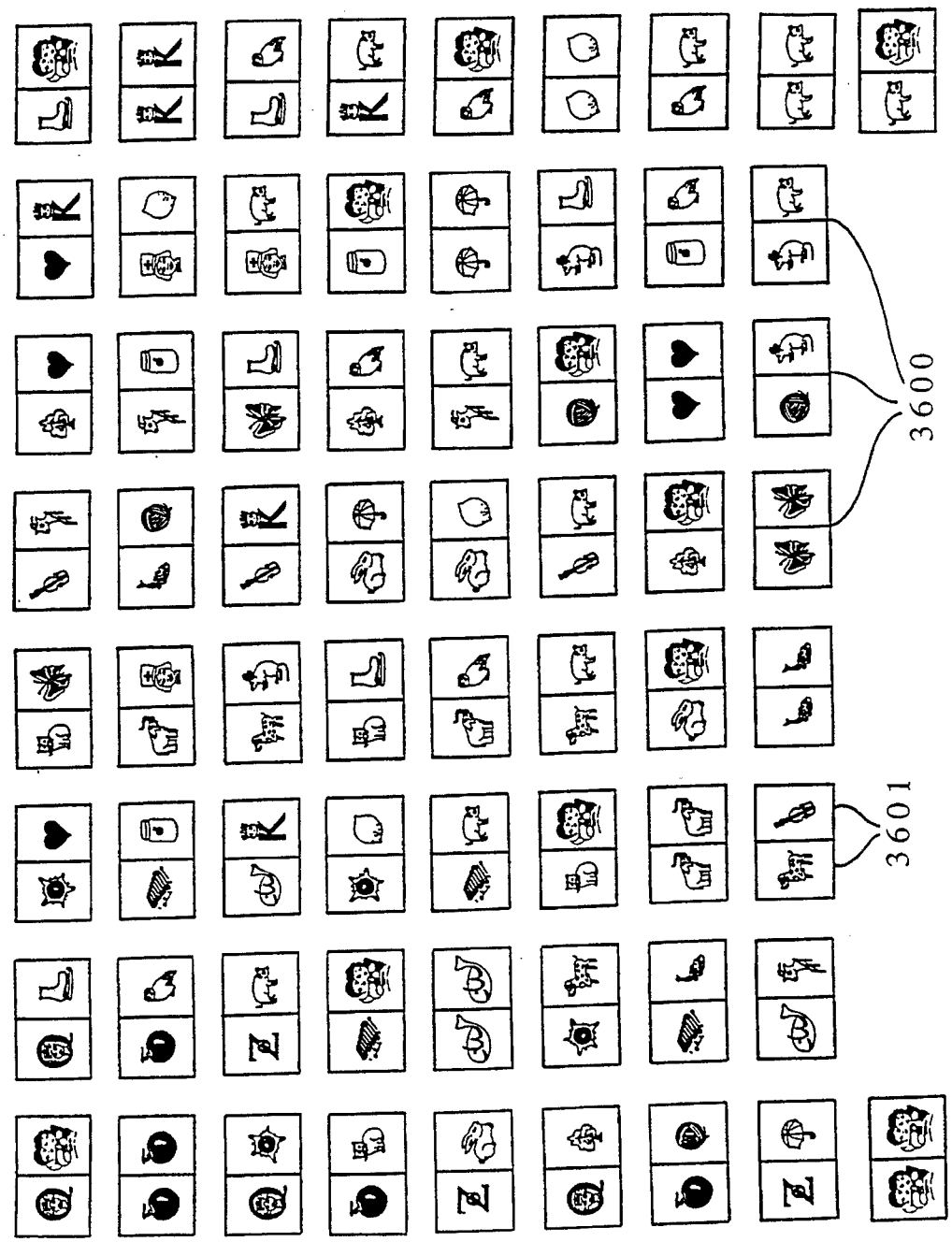

FIG. 36 depicts the "Magic Dominoes" for reinforcement learning.

FIG. 37 depicts the medallion picture rings for assisting in the learning of physics:

37a: medallion picture rings worn on the left hand and right hand of a user, with elevated views of medallions closed;

37b: medallion picture rings worn on the left and right hand of a user, with elevated views of medallions open (medallion lid in horizontal position).

Figure 38A:
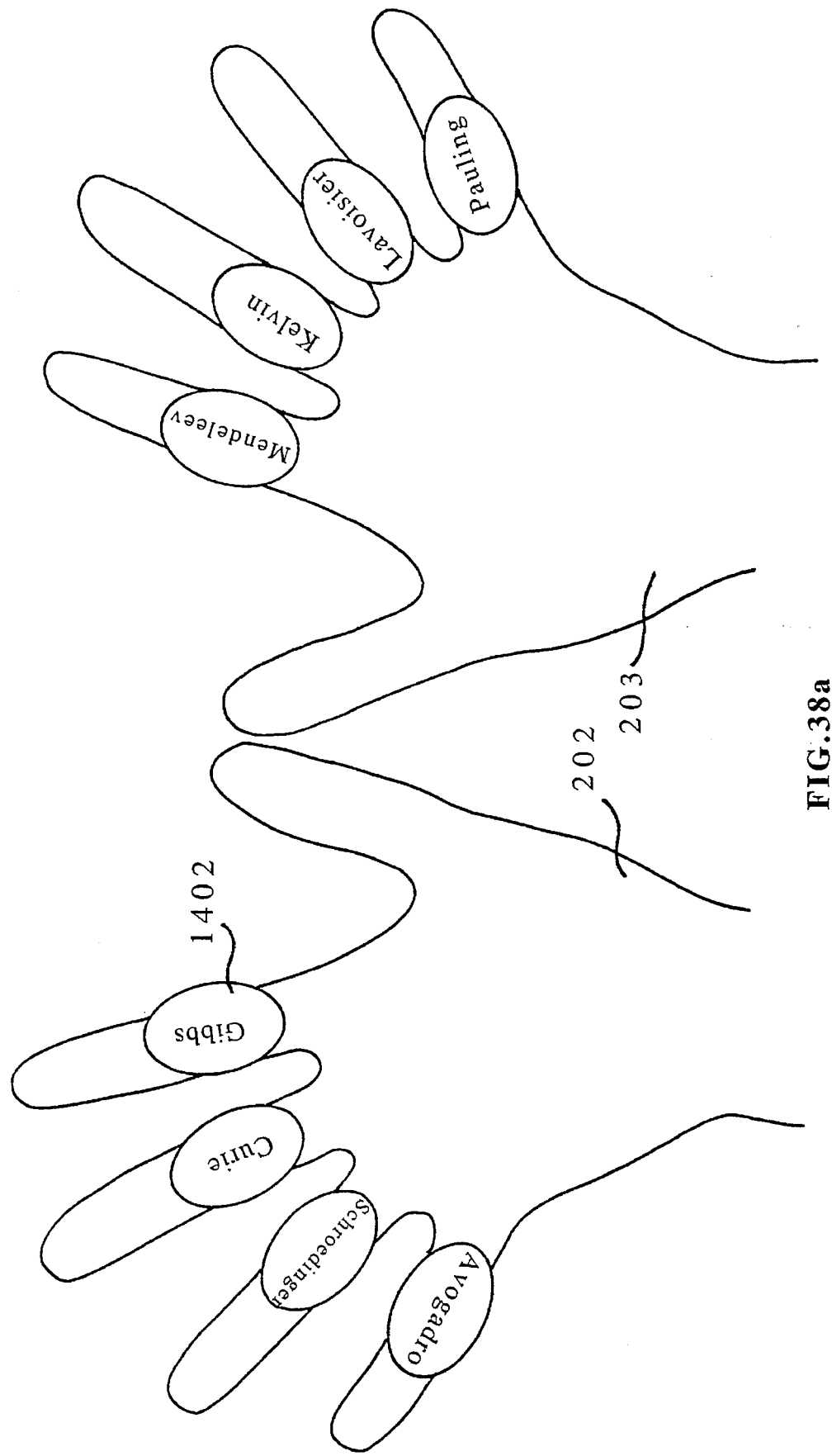
Figure 38B:
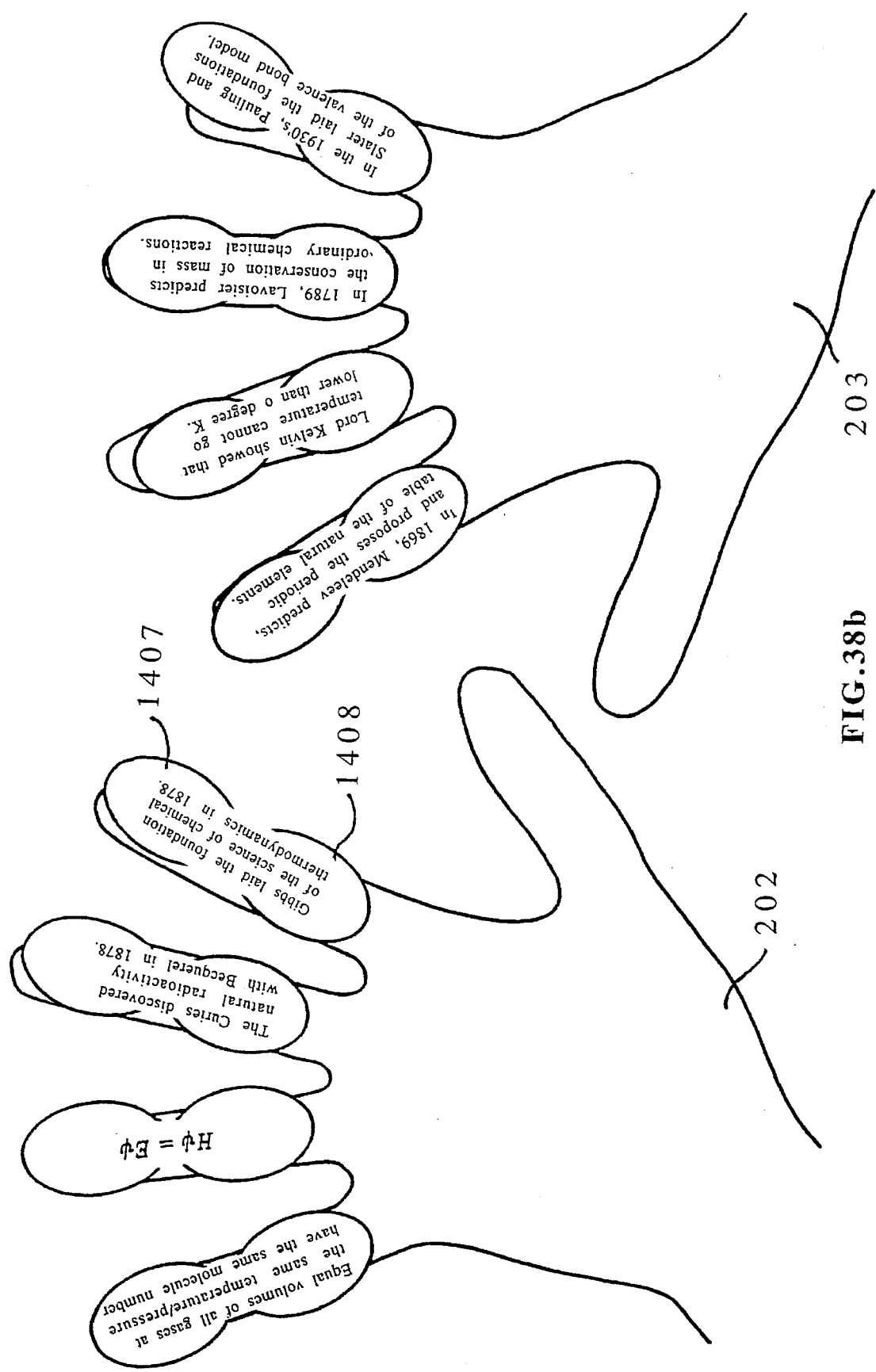

FIG. 38 depicts the medallion picture rings for assisting in the learning of chemistry:

38a: medallion picture rings worn on the left hand and right hand of a user, with elevated views of medallions closed;

38b: medallion picture rings worn on the left hand and right hand of a user, with elevated views of medallions open (medallion lid in horizontal position).

Figure 39A:
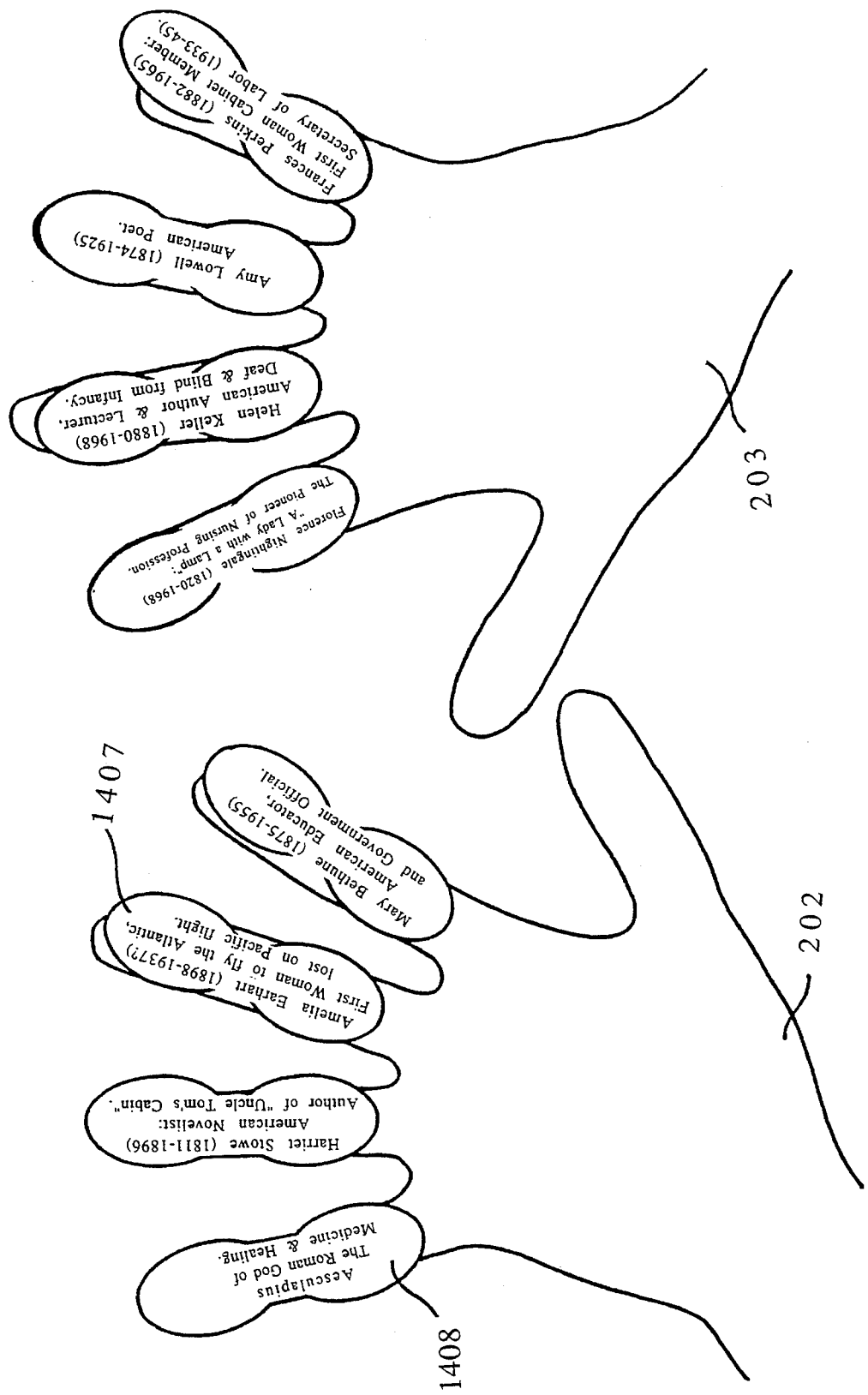
Figure 39B:
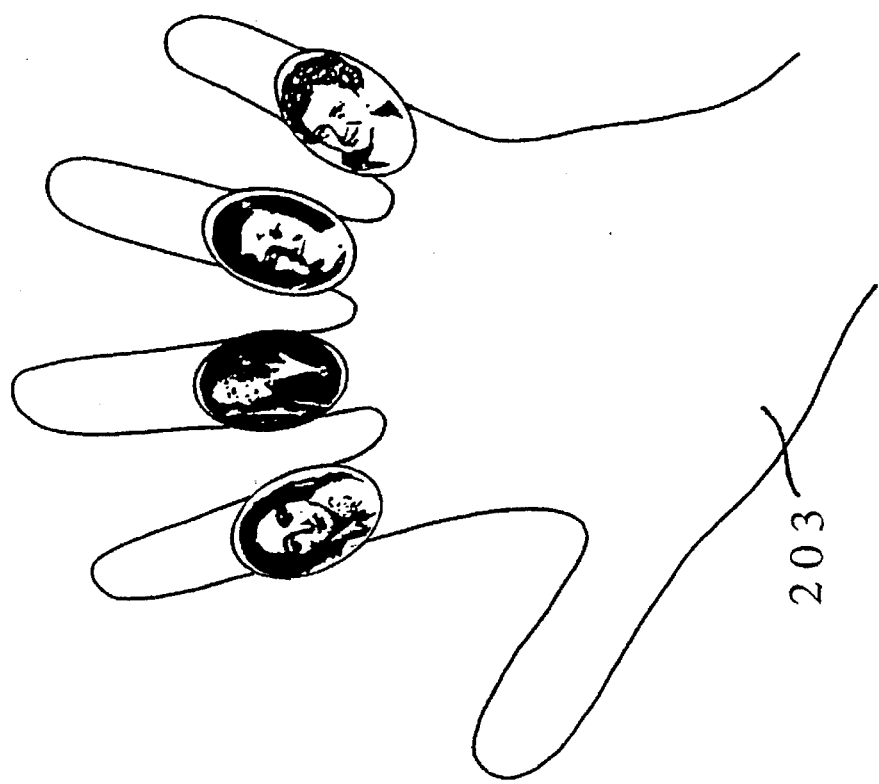
Figure 39B:
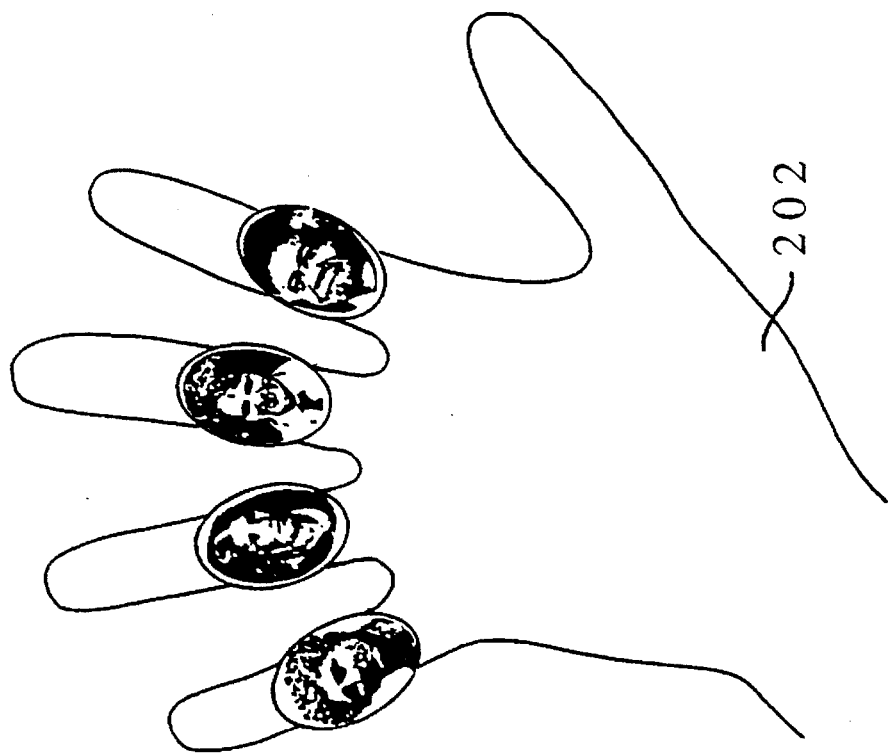

FIG. 39 depicts the medallion picture rings for assisting in the learning about various leaders:

39a: medallion picture rings worn on the left hand and right hand of a user, with elevated views of medallions open (medallion lid in horizontal position);

39b: medallion picture rings worn on the left hand and right hand of a user, with elevated views of medallions closed.

FIG. 40 depicts elevated views of a pair of left hand and right hand "keygloves":

40a: Back portion of a left hand keyglove;

40b: Back portion of a right hand keyglove;

40c: Palm portion of a left hand keyglove;

40d: Palm portion of a right hand keyglove.

FIG. 41 depicts a pair of keygloves with an audio-cassette player/recorder mounted in the back portion thereof:

41a: Back-side of a left hand audio-keyglove;

41b: Palm-side of a left hand audio-keyglove;

41c: Back-side of a right hand audio-keyglove;

41d: Palm-side of a right hand audio-keyglove.

FIG. 42 depicts a pair of keygloves with a telephone-cell and speaker/receiver mounted within the material thereof:

42a: Back-side of a left hand tele-keyglove;

42b: Palm-side of a left hand tele-keyglove;

42c: Back-side of a right hand tele-keyglove;

42d: Palm-side of a right hand tele-keyglove.

DETAILED DESCRIPTION OF THE INVENTION

In accordance with the aforementioned needs, a system is proposed for teaching which keys of the keyboard are to be struck by which fingers. The system is founded on a finger-based representation of the keyboard as a wholistic entity for the consecutive stages of sensory-motor, pre-operational stage, concrete operations, and formal operations of Piaget's developmental psychology. From simple to complex, it is implemented in terms of little molded gloves with fingers, gloves with fingers, and sets of rings. The disclosed educational devices using a process-based educational method account not only for the learner's needs and limitations at every stage of growth and development, but also for the needs of today's working parents in terms of lack of time, money, and energy in dealing with the education of their children.

Sensory-Motor Stage

At this stage, the child has not yet learned to use symbols and language to label objects and events in his environment. He is dependent on the raw evidence of his senses and bodily actions. The child gradually gets to know his environment in terms of sensory impressions and motor activities. For this age group, the educational value of a "toy" depends not only on its ability to interest the child (by giving him the opportunity to develop his sensory-motor skills), but also on its ability to contribute to the overall learning process (by giving the child the opportunity to be "exposed" to symbolic representations or patterns that will play an important role later in his life). From that perspective, the child's growth and development can benefit from the playful use of little molded gloves whose fingers are colored following a pattern that matches the color-coding of the keys of the keyboard. By pressing and pulling the fingers of these little molded gloves, the child will strengthen his motor skills. The diversified colors of the molded fingers will stimulate the development of the child's visual information processing. As he grows, his perception of differences and similarities of his fingers will be enhanced. At the same time, the child will also be exposed to the global color pattern of the key-finger assignment of the keyboard. Sounds could also be generated by the molded fingers under tactile pressure, to stimulate the child's auditory perception and motor activity, while "exposing" him further to the associative pattern of the key-finger assignment of the keyboard. For example, squeezing the left major finger which is associated with the letter "D" of the keyboard would emulate the sound of a barking "Dog".

Pre-School Age Group

First Phase: Picture Gloves.

Although the pre-school child has not yet learned his alphabet, he is very receptive to associations between images and spoken words. This receptivity is the basis for providing the pre-school child with a pair of gloves carrying a series of images on their four left/right fingers. The spatial distribution of the images on the four fingers of each glove is determined as follows. The position of an image on a glove matches the position of the key of the keyboard which bears the initial letter of the (spoken) word representing the said image. This procedure is explained in detail by comparing the standardized keyboard 100 of FIG. 1 with the drawings of the left-hand glove 200 and right-hand glove 201 in FIG. 2a and FIG. 2b, worn on the left hand 202 and the right hand 203 of a user respectively.

Figure 2A:
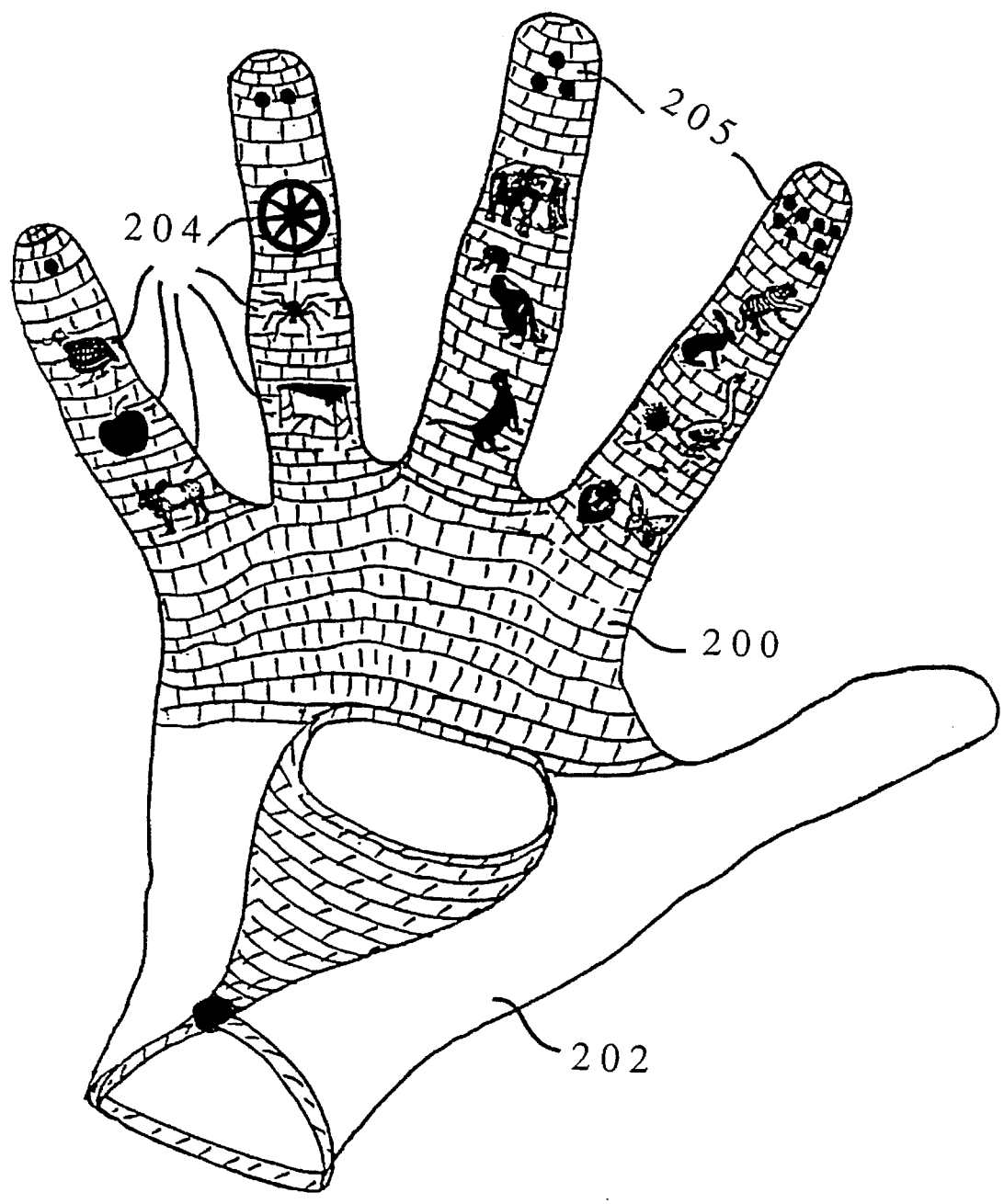
FIG. 2 depicts elevated views of the back-portion of picture gloves with color-coded fingers:
 2a: left-hand glove with picture-indicia worn on the left hand of a user;
 2b: right-hand glove with picture-indicia worn on the right hand of a user.

In FIG. 2a, the little finger carries from bottom-to-top the pictures 204 of a "Zebu", an "Apple", and a "Quail"; thus matching the series of letters "ZAQ" of the first column in FIG. 1. The second finger carries the pictures 204 of a "Xylophone", a "Spider", and a "Wheel"; thus matching the series of letters "XSW" of the second column of FIG. 1. The third finger carries the pictures of a "Cat", a "Duck", and an "Elephant"; thus matching the series of letters "CDE" of the third column of FIG. 1. The fourth finger carries two series of pictures slightly shifted from each other. The series of pictures that are shifted to the left is a "Vase", a "Flower", and a "Rabbit"; thus matching the series of letters "VFR" of the fourth column in FIG. 1. The other series of pictures (shifted to the right) is a "Butterfly", a "Goose", and a "Tiger"; thus matching the series of letters "BGT" of the fifth column in FIG. 1. Therefore, the left-hand picture-glove also identifies the correspondence between left-hand fingers and the columns of the keyboard: little finger strikes column 1, second finger strikes column 2, third finger strikes column 3, fourth finger strikes columns 4 and 5. This finger/column association can be reinforced during training by color-coding the keys of the keyboard 100 to match the four different colors of the four fingers of the left-hand glove 200, which would have to be standardized. For example in FIG. 2a, the choice of colors is pink for the little finger, red for the second finger, green for the third finger, and yellow and orange for the fourth finger.

The tip of each finger of the left-hand picture glove 200 in FIG. 2a shows a cluster of black dots 205. The number of dots 205 in each cluster is chosen to coincide with the number printed on the matching key of the keyboard. The single dot on the little finger matches number "1" on the upper key in column 1 of FIG. 1. The two dots on the second finger tip match number "2" on the upper key in column 2 of FIG. 1. The three dots on the third finger tip match number "3" on the upper key in column 3 of FIG. 1. The fourth finger tip of the left glove shows two clusters of dots that are slightly shifted. The cluster shifted to the left has four dots to match number "4" on the upper key of column 4 in FIG. 1, whereas the cluster shifted to the right has five dots to match number "5" on the upper key of column 5 in FIG. 1. This structure is beneficial to the education of the pre-school child age group. First, it will help the child to learn how to count on the fingers of his hands while becoming familiar with the concept of symbol or abstract representation. Second, he will learn how to do that by associating each number with the finger that will be used later to strike the matching key on the keyboard.

Figure 2B:
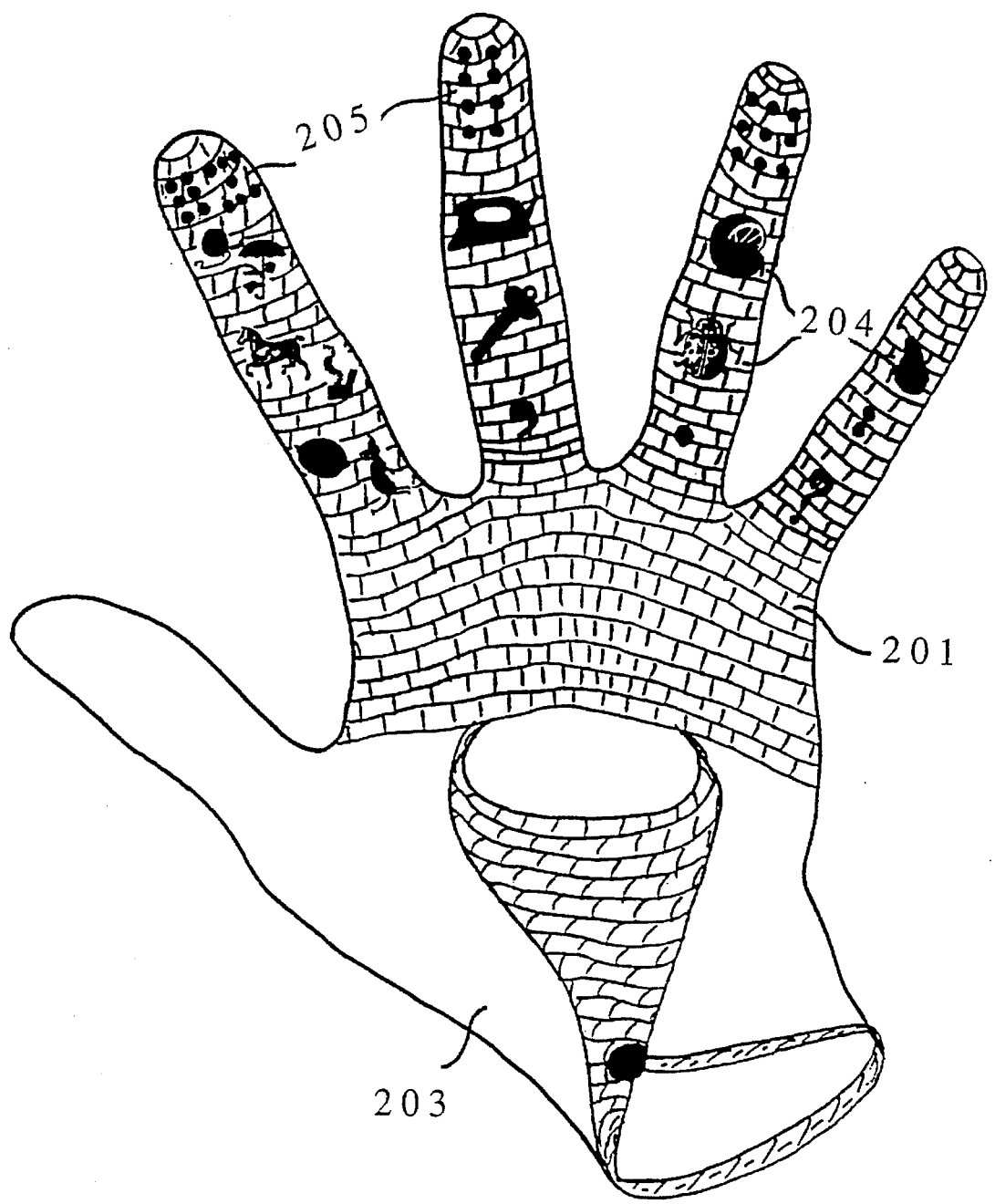

The functional role of the right-hand picture-glove 201 depicted in FIG. 2b is the same as above. The little finger shows a "Pear" 204, matching the "P" key of the 10th column of FIG. 1; the second finger shows a "Ladybug" 204 and an "Orange" 204, 204, matching the "LO" keys of the 9th column; the third finger shows a "Key" and an "Iron", matching the "KI" keys of the 8th column; the fourth finger shows a "Mouse", a "Jack-in-the-box", and an "Umbrella" (shifted right), and a "Nut", a "Horse", and "Yarn" (shifted left), matching the "MJU" keys of the 7th column and the "NHY" keys of column 6 in FIG. 1. The association between fingers and keyboard columns is reinforced by color-coding the little finger in pink, the second finger in red, the third finger in green, and the fourth finger in yellow and orange.

Like with the left-hand glove 200, the finger tips of the right-hand glove 201 show clusters of black dots 205 to symbolize the number printed on the matching keys of the keyboard 100. The little finger tip shows the number "0" itself to match the upper key of column 10 in FIG. 1. The nine dots on the second finger tip match number "9" on the upper key of column 9 in FIG. 1. The eight dots on the third finger tip match number "8" on the upper key of column 8 in FIG. 1. The fourth finger tip shows two clusters of black dots slightly shifted from each other. The right-shifted cluster has seven dots, and matches number "7" on the upper key of column 7 in FIG. 1, whereas the six dots of the left-shifted cluster match number "6" on the upper key of column 6 in FIG. 1.

By construction, the choice of images 204 of the picture gloves 200 & 201 is clearly not unique, and by no means restricted to the choice given in FIG. 2a and FIG. 2b. In FIG. 2a for example, one could choose the picture 204 of a "Queen" instead of a "Quail". The only requirement is that the initial letter of the word representing the picture matches the key which occupies the same position, as illustrated above. Nevertheless, because of the associative nature of the memorizing process, enhanced memorization performance will result from choosing pictures which share some common features, and which are most appropriate to the age of each small child. For example, at an age when the child discovers the fairy tale of Snow-White, a pertinent choice for the pictures 204 on the little finger of the left-hand could be a mean-looking "Queen", an "Apple", and the "Zees" of Snow-White lying on her bed, plunged in a deep sleep after eating the cursed apple given to her by the mean queen. Such a pictorial representation of Snow-White's fairy tale would take definite advantage of the child's driving-times[3], and enhance visual memorization by the child.

[3] Brodey, M. W.: "Information Exchange In The Time-Domain", 122nd Annual Meeting of the Psychiatric Association, Atlantic City, N.J., May 9th–13th, 1966.

Such picture correlations towards enhanced visual memorization can be need-adaptively implemented throughout the child's growth. During early childhood for example, the child could wear picture gloves illustrating family relationship. As the child grows older, he could wear picture gloves with more emphasis on cultural or social content for example. Picture gloves could thus be manufactured according to a certain theme, following the procedure described above and using screen-printing or "decal" technologies that are known to be safe for the very young children. A cost-effective alternative to having multiple pairs of gloves is proposed as a single pair of gloves with removable pictures. For older children, the latter structure would be done by printing on the glove VELCRO bases instead of pictures. VELCRO is a registered trademark for hook and loop fasteners which are manufactured by Velcro, Inc. of Manchester, N.H. Such fasteners are well-known in the art and comprise a plurality of small hooks affixed to one surface and a plurality of complementary loops affixed to another surface. The pictures would be separate entities with a VELCRO back that could be easily attached on, or removed from, the complementary VELCRO base of the gloves. Letters matching the keys of the keyboard should be printed on the proper VELCRO bases of the gloves. This would indicate unambiguously where to put the pictures on the gloves in accordance with the touch-typing/training procedure described above. As another alternative, the pictures could also be mounted on flexible labels that would be inserted within transparent covers permanently mounted on each one of the four fingers of each hand. Such a transparent cover could be made of plastic, or knitted laces, depending on the structure of the gloves. Of course, proper setting of such need-adaptive picture gloves would require close supervision of the child by an adult.

For safety, economy, comfort, and beauty purposes, the picture gloves can be made of cotton, or any kind of see-through material. They can also be crocheted out of cotton. When crocheted, the picture gloves are stretchable, so that a pair of gloves can be worn by children with hands of different size, or by the same child during his pre-school growth. Besides this economical advantage, crocheted cotton provides comfort by not retaining sweat on the fingers, but instead letting the skin breath openly. In winter time however, picture gloves that cover entirely the hands may be needed when the child is playing outside.

In summary, these pedagogical picture gloves are:

1) convenient and functional;
2) safe and comfortable;
3) fun and unique;
4) colorful and attractive;
5) fundamental to learning;
6) cost-effective.

Second Phase: Alphanumeric/Picture Gloves.

Figure 3A:
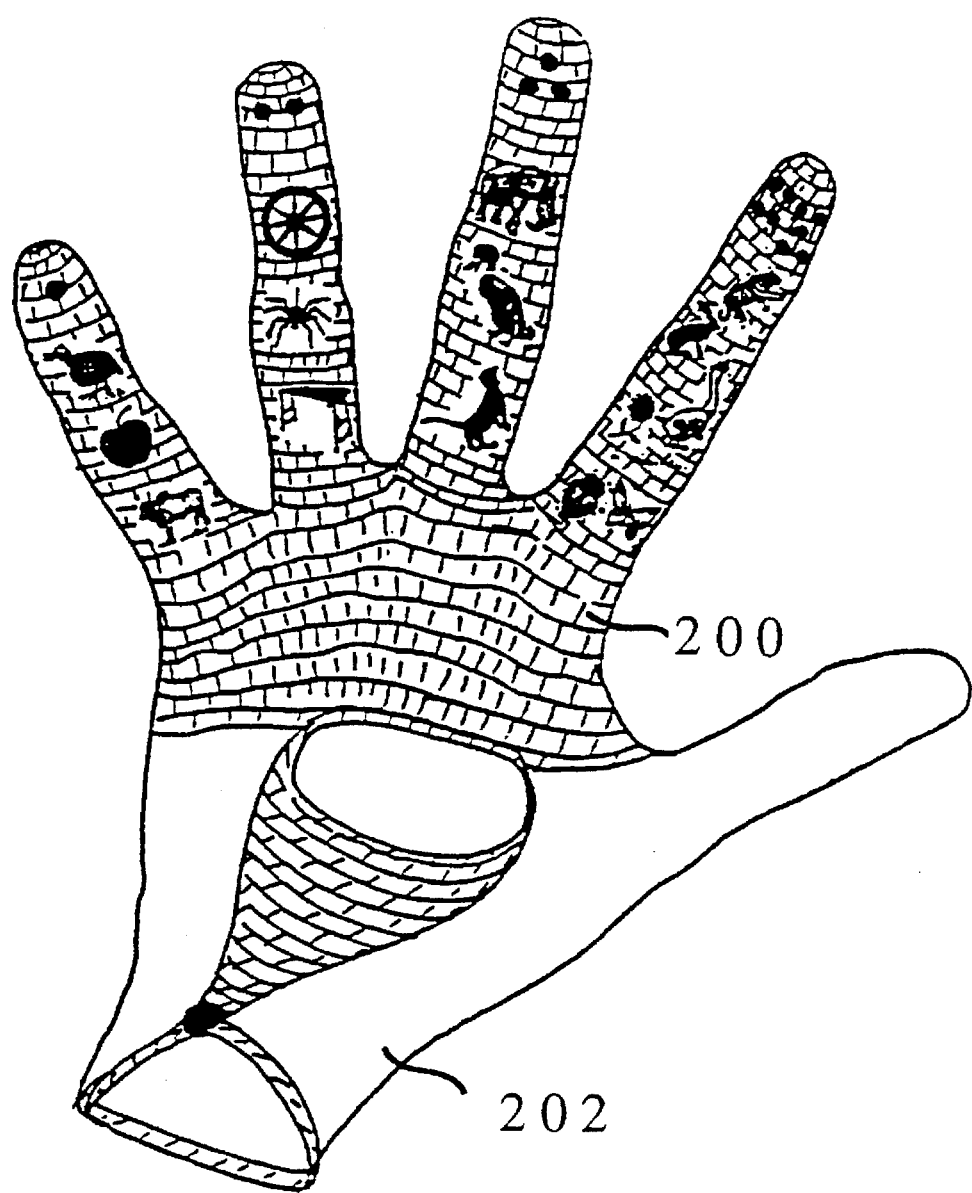
FIG. 3 depicts elevated views of gloves with color-coded picture-indicia on the back portions (illustrated with a first style of gloves) and alphanumeric-indicia on the palm portions (illustrated with a second style of gloves):
 3a: back portion of a first left-hand glove with picture-indicia;
 3b: palm portion of a second right-hand glove with alphanumeric indicia;
 3c: back portion of a first right-hand glove with picture indicia.
Figure 3B:
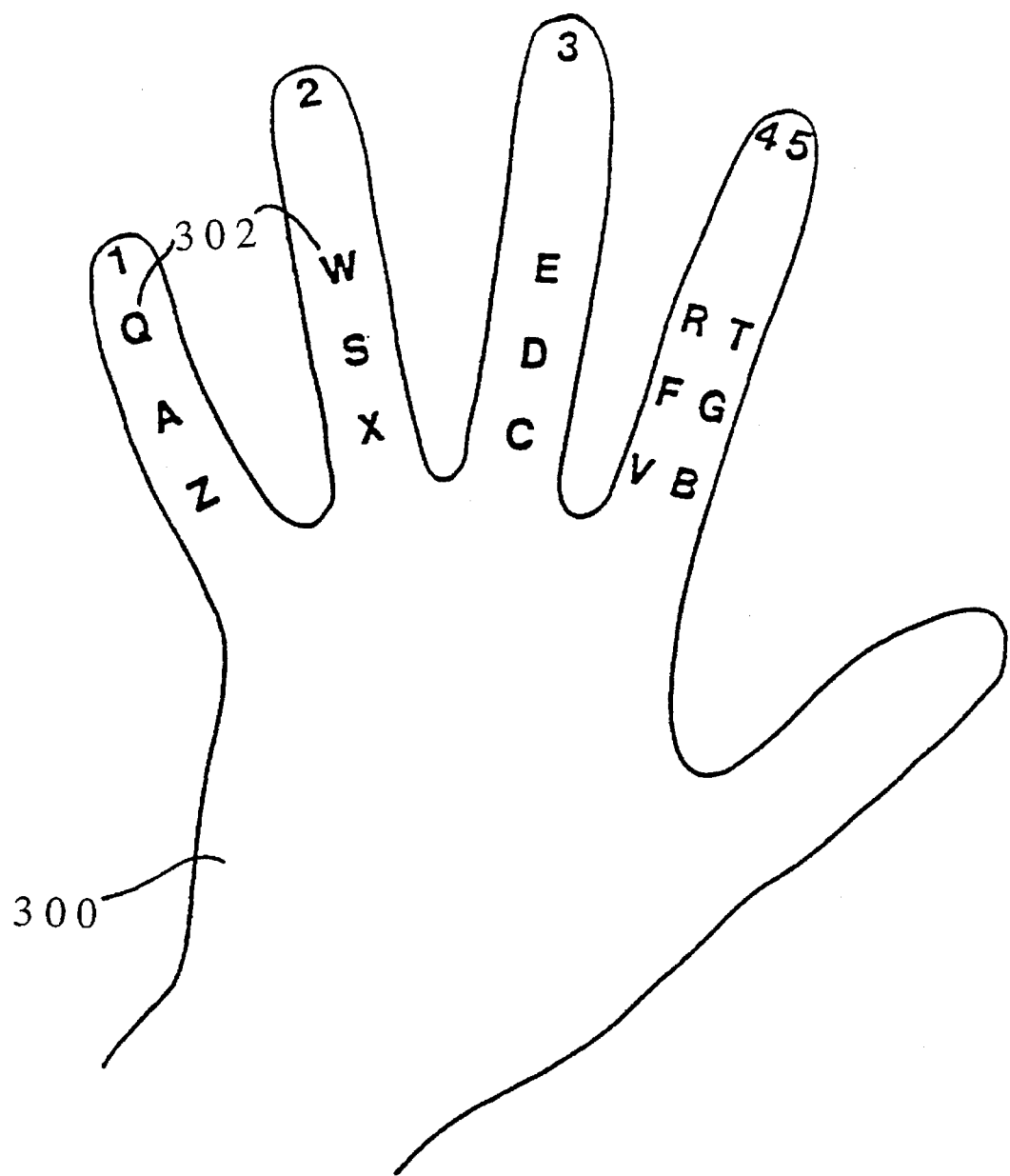
Figure 3C:
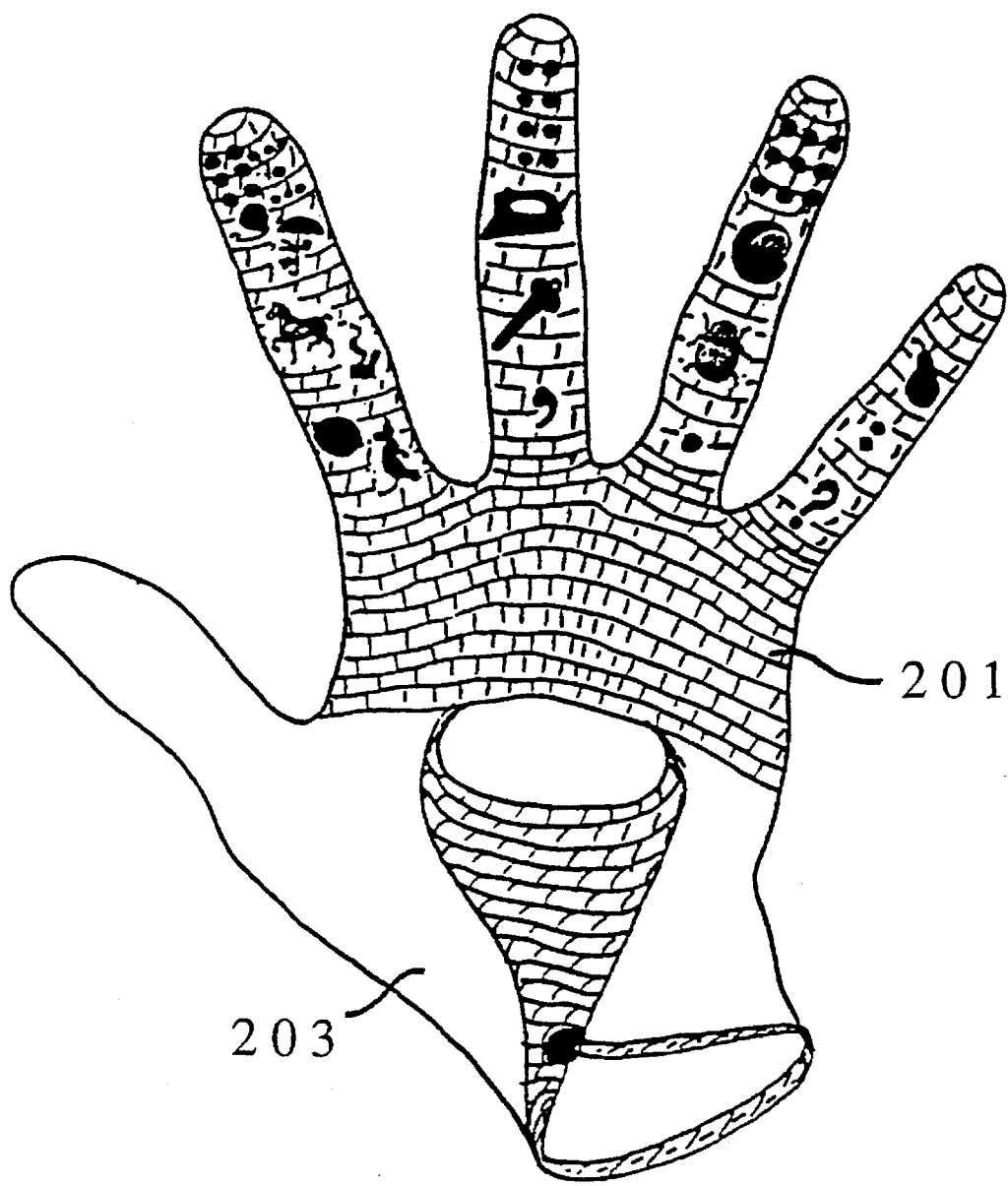
Figure 3D:
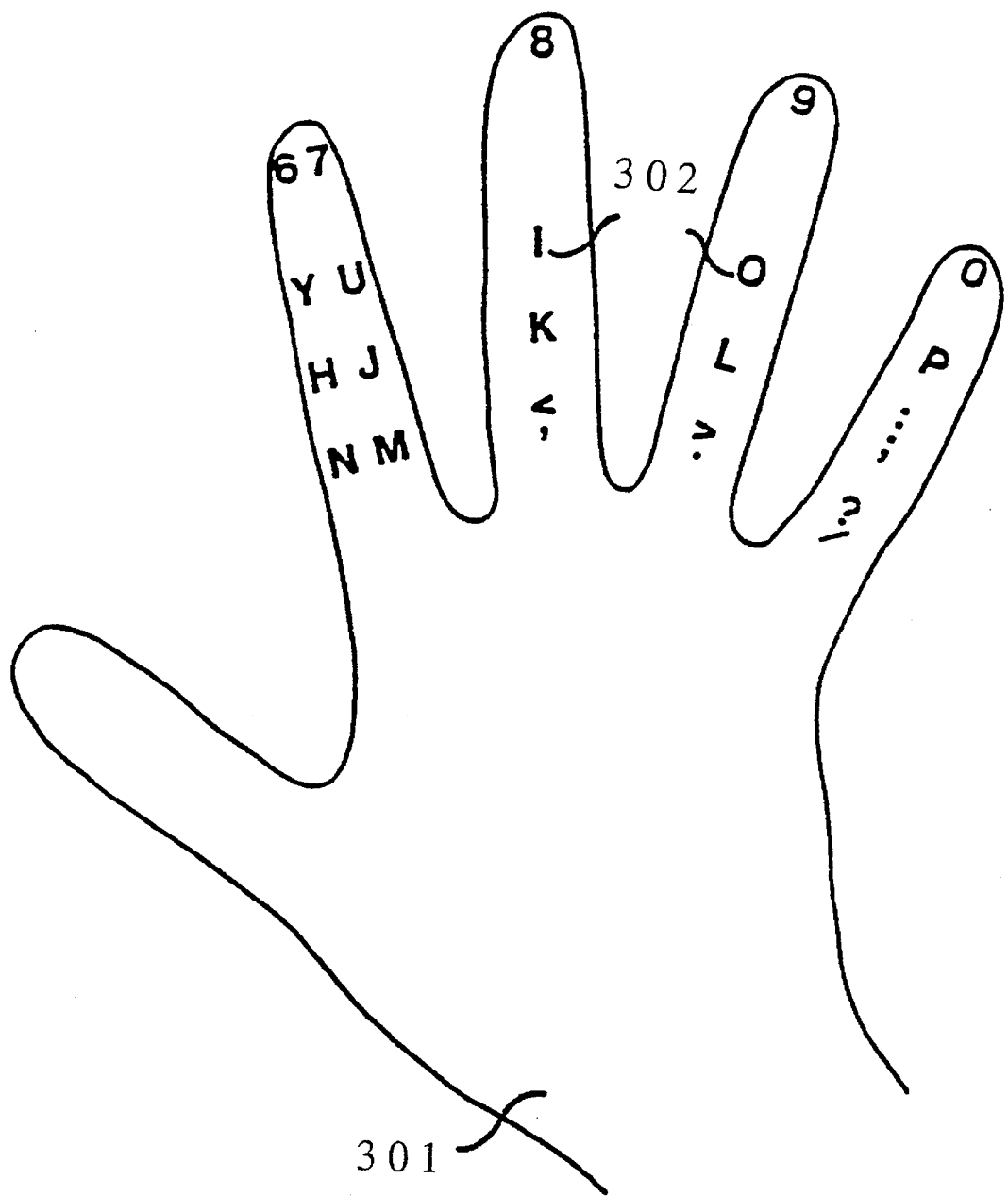
Figure 4A:
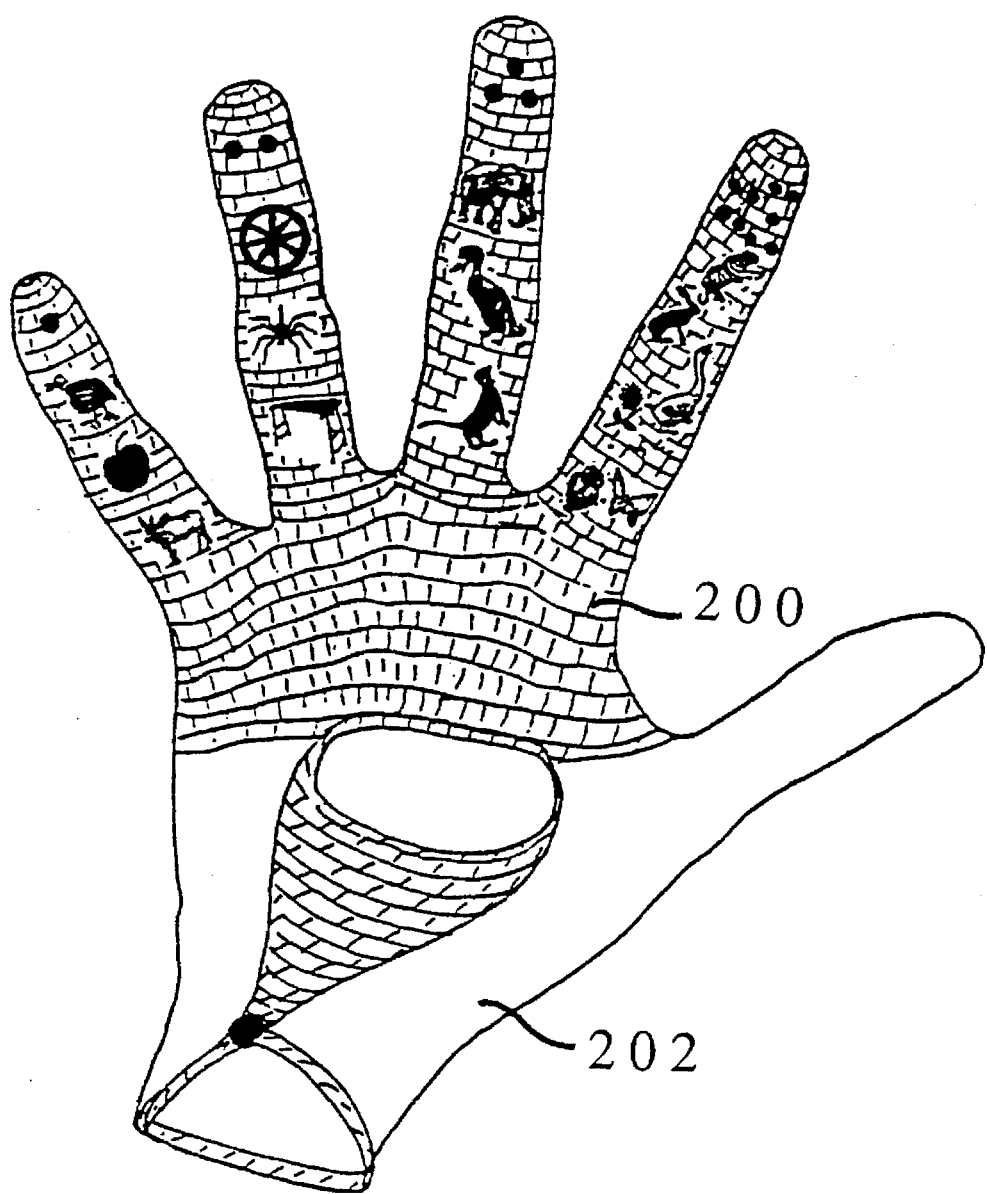
Figure 4B:
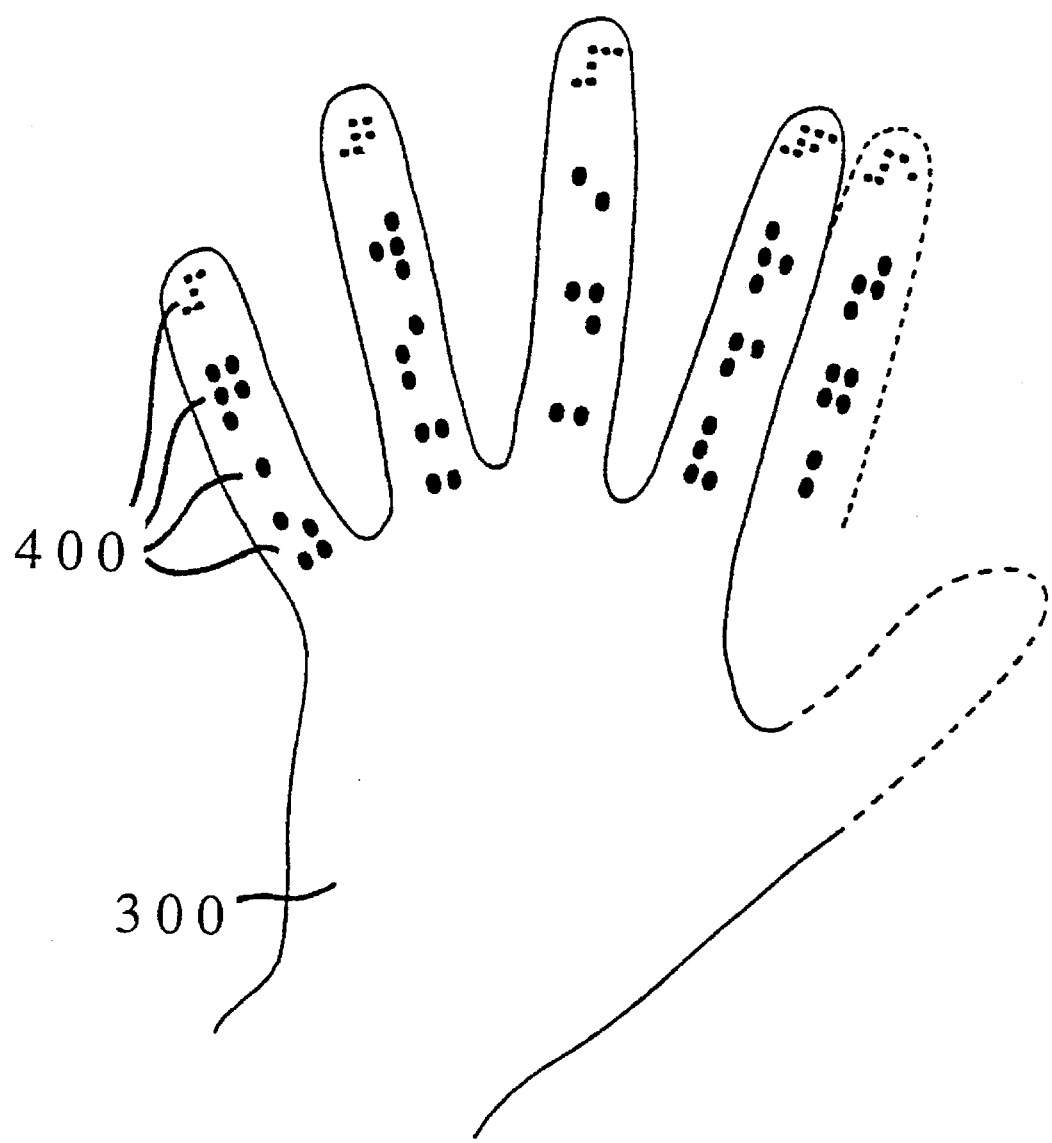
Figure 4C:
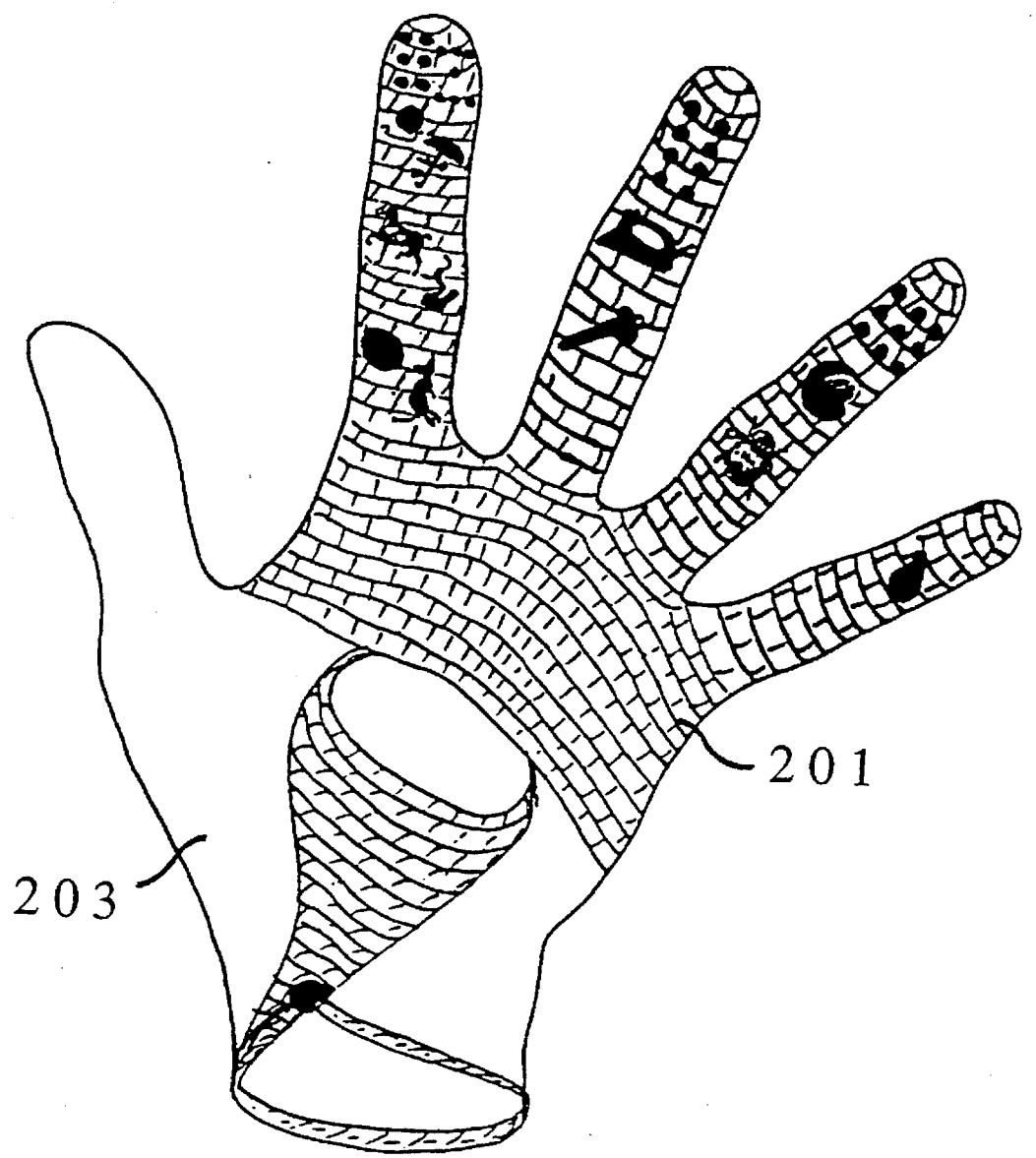
Figure 4D:
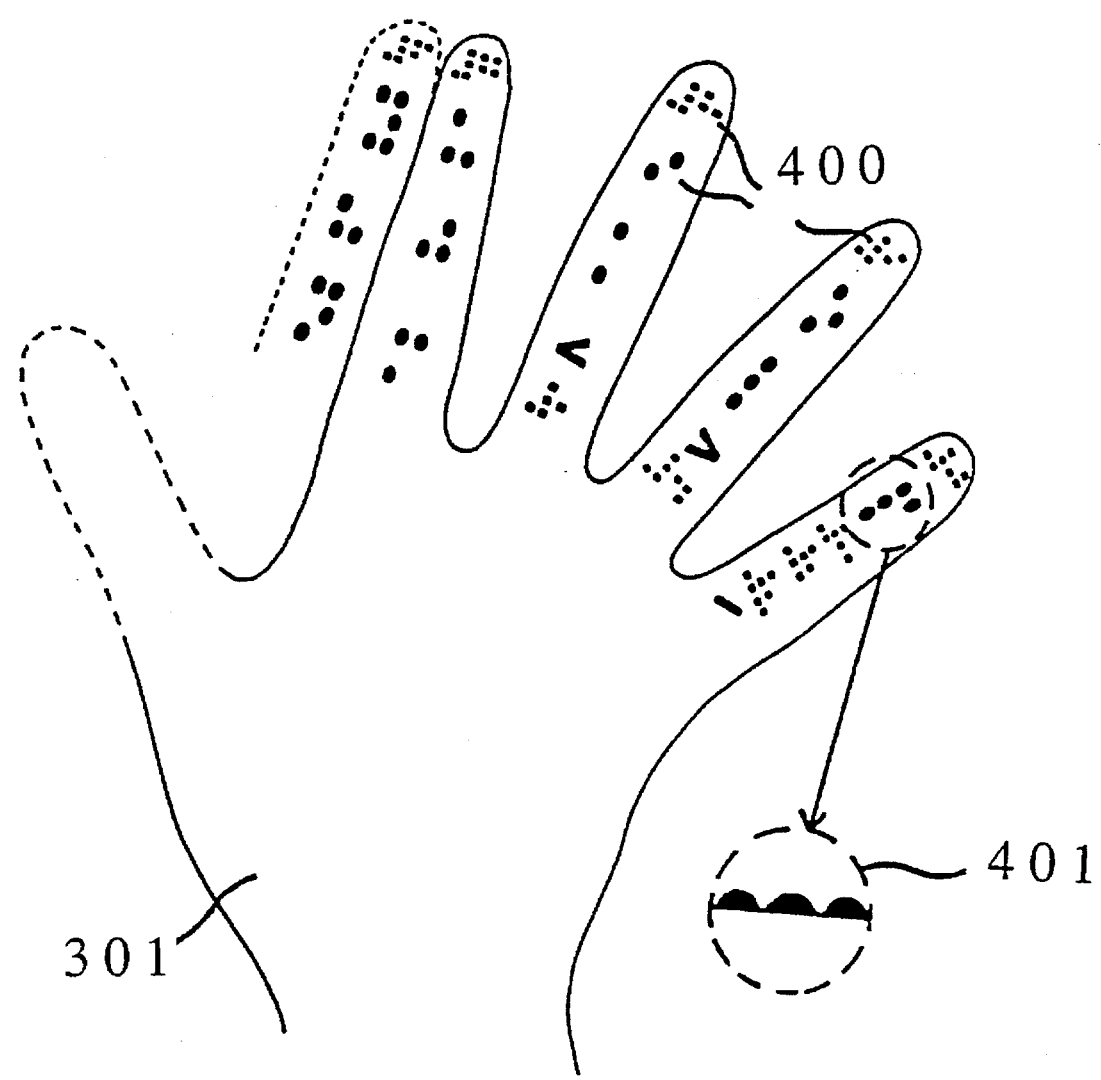
Figure 5A:
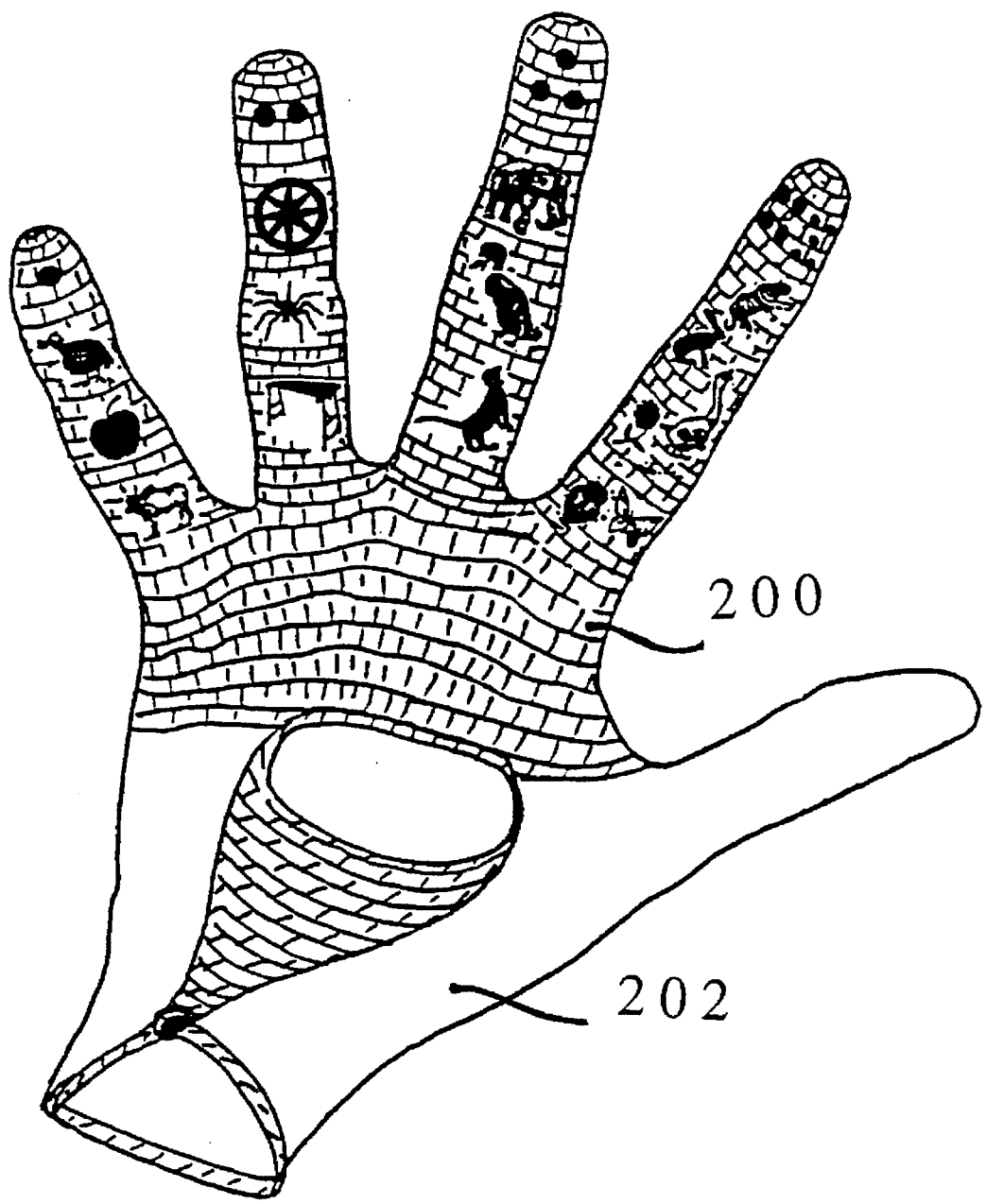
Figure 5B:
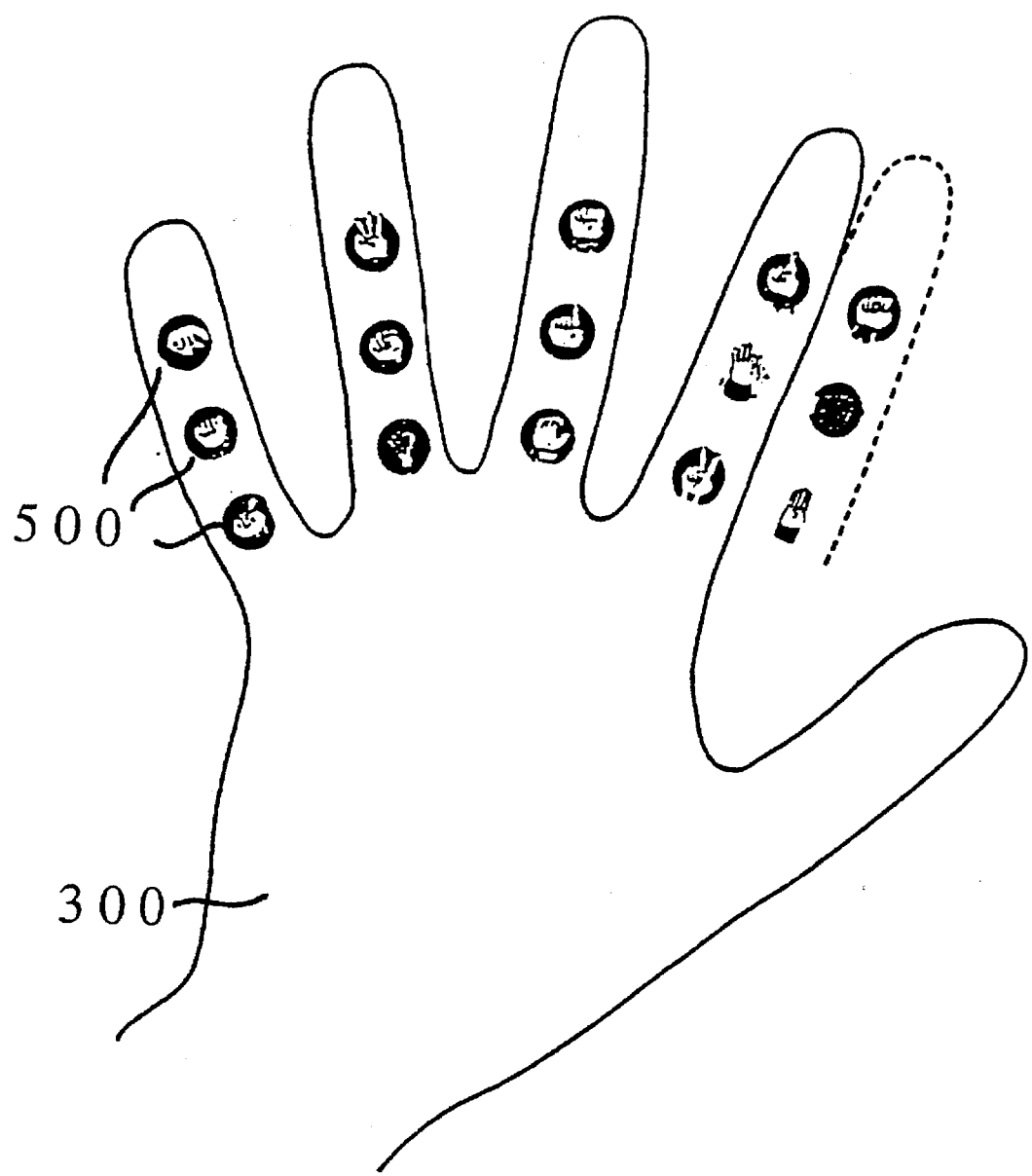
Figure 5C:
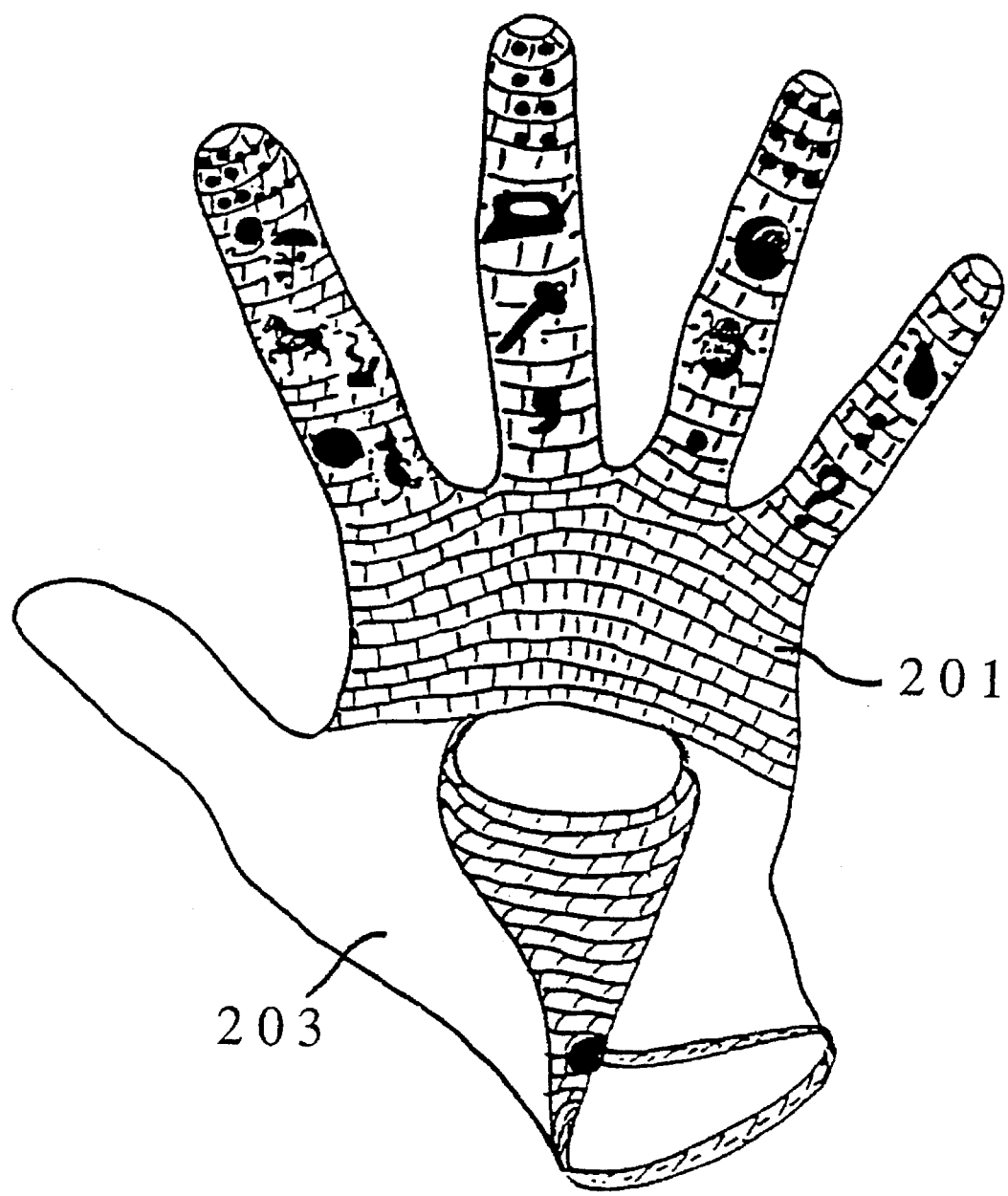
Figure 5D:
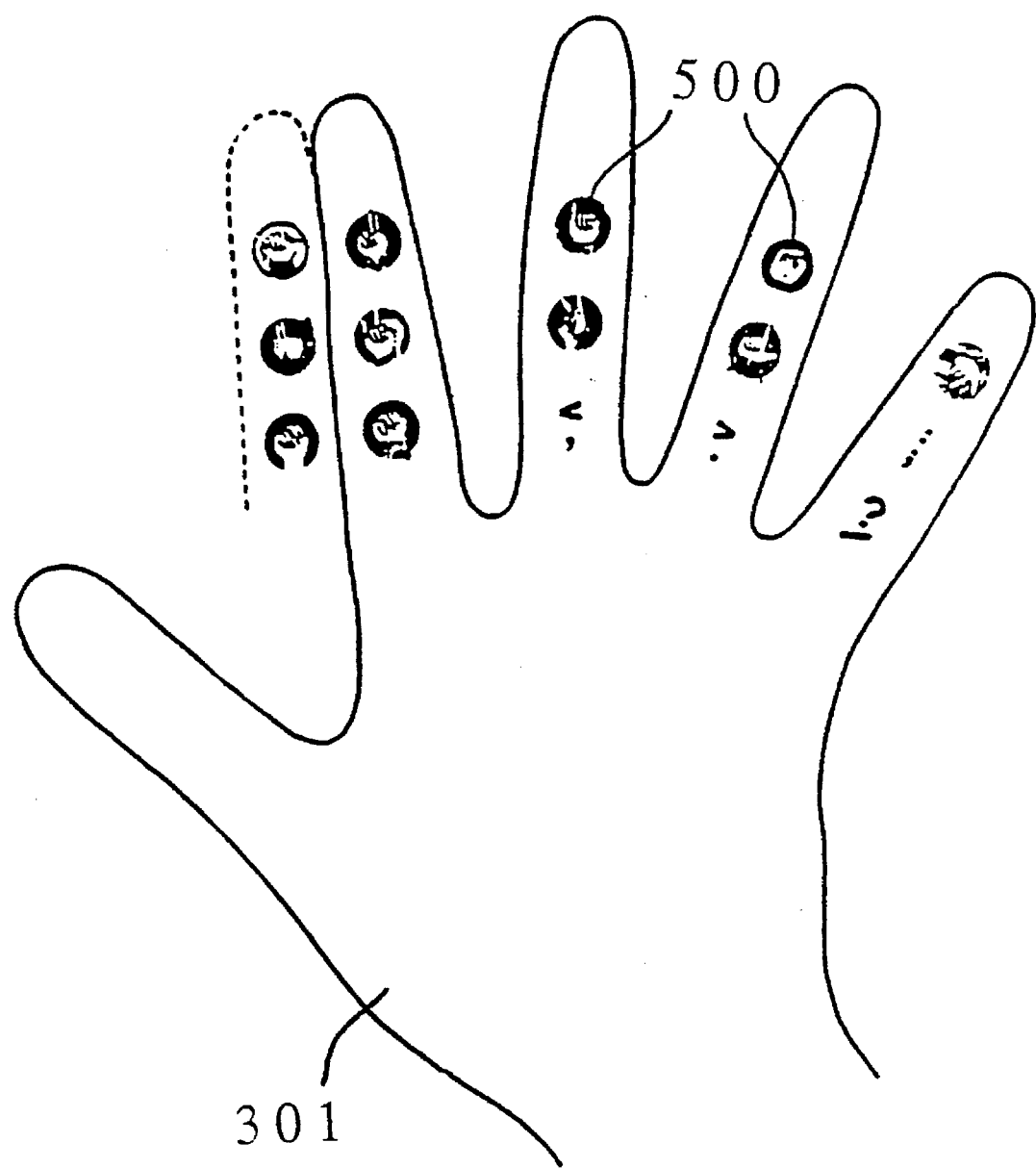

The pre-school age child who would be highly exposed to his glove images would visually memorize the spatial mapping of the spoken words which represent these images. Learning with this glove will be continuous and dynamic. Before reaching the school age, the child will start learning the alphabet by wearing the alphanumeric/picture gloves depicted in Fig.3, and which show how to associate the initial letter of the name of a picture with the picture itself. As shown in Fig.3, the alphanumeric/picture gloves provide the same pictorial representation of the keyboard as the picture gloves on the back sides 200 & 201 of the gloves, yet with an additional alphanumeric representation of the keyboard on the palm sides 300 & 301 of the gloves. As shown in FIG. 3a & 3b, the letters, numbers, and punctuation symbols of the keys to be struck by the fingers of the left hand are indicated on the palm-side 300 of the corresponding fingers of the right-hand glove. For example, the letters 302 "Q", "A", and "Z" corresponding to the keys to be struck by the left little finger are precisely indicated on the palm side 300 of the little finger of the right-hand glove. Likewise in FIGS. 3c & 3d, the letters, numbers, and punctuation symbols of the keys to be struck by the fingers of the right-hand are indicated on the palm-side 301 of the corresponding fingers of the left hand glove, To learn the alphabet and the numbers, the pre-school child wearing the gloves would simply have to turn one of his hands to see the correspondence between each letter and the picture which occupies the same position on the opposite hand, and which picture name begins with the same said letter.

Visually-impaired learners would benefit from the same learning process by wearing Braille-Alphanumeric/Picture Gloves which provide a Braille representation of the alphanumeric keys of the keyboard 100 on the palm sides of the gloves, as shown in FIG. 4. The palm portions of the thumbs of both Braille-Alphanumeric/Picture Gloves are left open; and the alphanumeric characters are made of raised dots 400 to enable their tactile recognition by the person wearing the gloves, as shown in FIG. 4d by the side-view 401 of the Braille representation of the letter "P" located on the palm-side 301 of the left little finger. These raised dots 400 could be cost-effectively implemented by using "puffy" screen-printing techniques. The pictures 204 on the back-side of the Braille-Alphanumeric/Picture Gloves could also be implemented as raised surfaces using the latter techniques, or as three-dimensional objects mounted on the glove fingers in order to facilitate their tactile recognition by the visually-impaired learner wearing the gloves.

Hearing-impaired learners would also benefit from the same learning process by wearing the Sign-Language-Alphanumeric/Picture Gloves which provide a Sign-Language representation 500 of the alphanumeric keys of the keyboard on the palm sides of the gloves, as shown in FIG. 5.

To account for the process-wise nature of learning, the auditory-visual-tactile memorization of the glove pictures, their positions on the glove fingers, their names, and the beginning letter of their names will be enhanced by complementary audio-visual-tactile/psycho-motor means such as the games disclosed in FIGS. 24–30 for the purpose of active involvement. It is recommended that the various games disclosed hereafter be plaid chronologically by the pre-school age group or beginning school age group, unless otherwise preferred for therapeutic reasons or to satisfy special needs.

With the "magic fit-in puzzle" depicted in FIG. 24, reinforcement learning of the glove pictures and their names will take place through the process of identifying the correspondence between every individual piece 2400 of the puzzle and its socket 2401 carved in the three-dimensional moldings 2402 of the gloves shown in FIG. 24. The process of fitting the pieces 2400 of the puzzle into their sockets 2401 will also contribute to the development of psycho-motor skills. In preparation towards learning the alphabet, the beginning letter of the name of the person, animal, or object depicted on each individual piece 2400 of the puzzle can be written on the base of the corresponding socket 2401. A side-view 2402 of a puzzle piece 2403 is illustrated in FIG. 24.

Figure 25A:
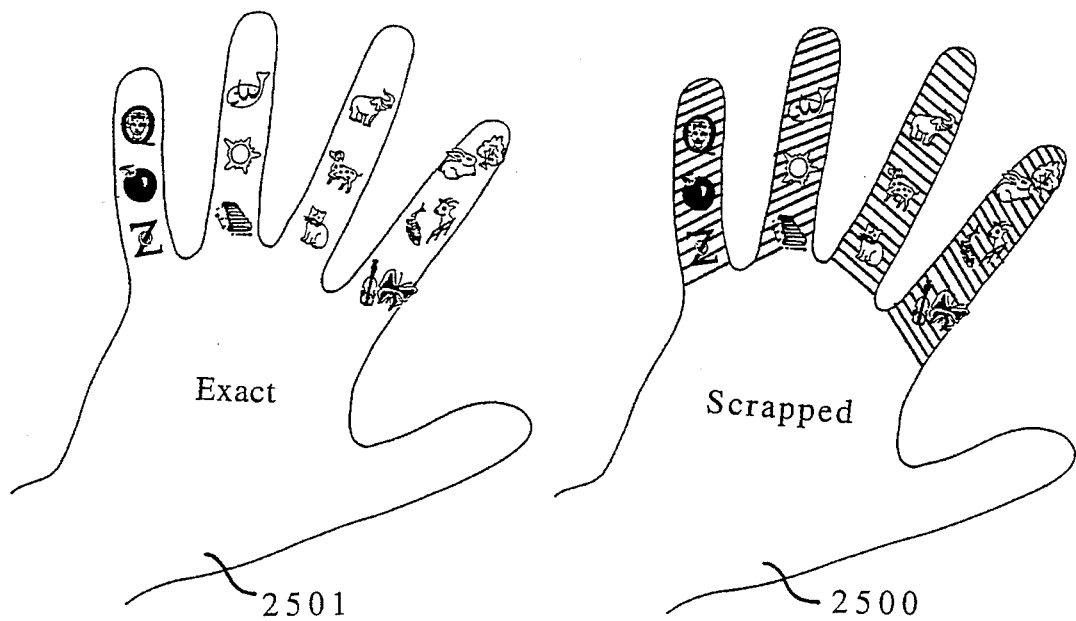
Figure 25B:
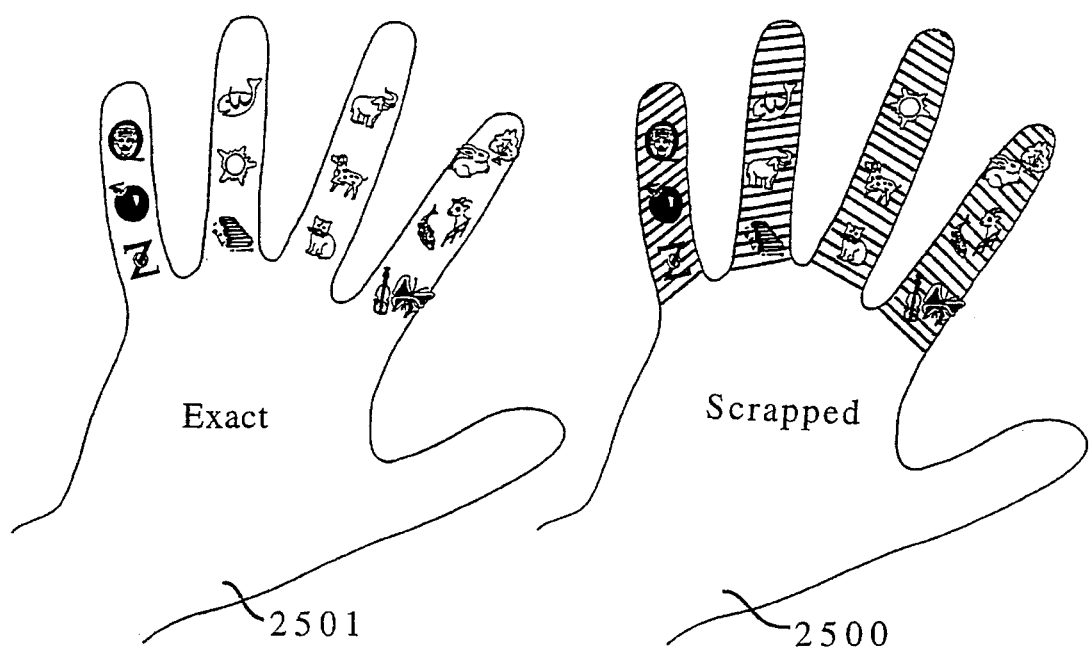

The searching "magic lottery" depicted in FIG. 25 motivates the child to learn the pictures and their positions through the process of 1) scraping the thin opaque layer of the glove representations of the "magic lottery", 2) detecting similarities and/or differences between the scraped glove representations 2500 and the reference glove representations 2501, which reference glove representations 2501 provide pictorial representations of the key-finger assignment of the keyboard 100. For example, FIG. 25*a* is a winner, and FIG. 25*b* is a looser.

With the "magic maze" depicted in FIG. 26, the child is instructed to interconnect the dots 2600, and find the design that is hidden among the shining stars 2601 of the night. The child will be guided to recognize and differentiate geometric forms and structures, e.g. dots 2600 versus stars 2601, and also recognize and differentiate geometric patterns, e.g. columns versus rows. The child will also indirectly be made aware of the benefits of inter-dependency, in the sense that higher forms of knowledge or consciousness (e.g. in this example the line contour 2602 of the glove representations) can emerge from the synergy of inter-relating lower forms of knowledge (e.g. the separate dots 2600).

The "magic box" 2700 shown in FIG. 27 extends the learning environment of the picture gloves to a more abstract framework where the glove fingers are represented by small boxes 2701, and where each glove is represented by a large box 2702. The information content of each small box 2701 is that of the corresponding alphanumeric glove finger, and the information content of each large box 2702 is that of the corresponding picture glove. The dual structure of the "magic box" in terms of small boxes and large boxes conceptualizes the collective evolution of the lower level functions of our fingers into the magnificent higher level functions of our hands. As shown in FIG. 27, the conceptual representation of the series of five small boxes 2701 lends itself to a lateral interpretation of the five columns of letters on each hand in terms of the five working days of the week. Saturday and Sunday are represented by two empty boxes 2703 to symbolize the symmetry-breaking of the week's activities and the necessary phase of contemplation within the context of family interactions. To further inspire the child to develop his/her lateral thinking skills, it is recommended that this "magic box" 2700 be filled with chocolates, nuts, candies, etc. so that the child will develop associations between chocolates as "delicious food for his/her tommy" and learning as "delicious food for his/her thoughts". The feelings of psychological and physiological reward of eating and sharing chocolates with different members of the family will make learning more of a pleasant and memorable experience.

With the "fitting puzzle" shown in FIG. 28, the child will be instructed to assemble all the pieces 2800 of the puzzle into a left hand glove representation 2801 and a right hand glove representation 2802. Through the astute observations of the similarities and differences of the various puzzle pieces 2800, the child will develop associations between the pictures and their relative positions on the fingers of the hands. At the same time, by gradually developing the picture-finger associations, the child will more easily reassemble the hand puzzle, and develop the feeling of self-reliance. By nurturing one learning scheme with the other, and vice versa, the overall learning process will be enhanced.

Figure 30A:
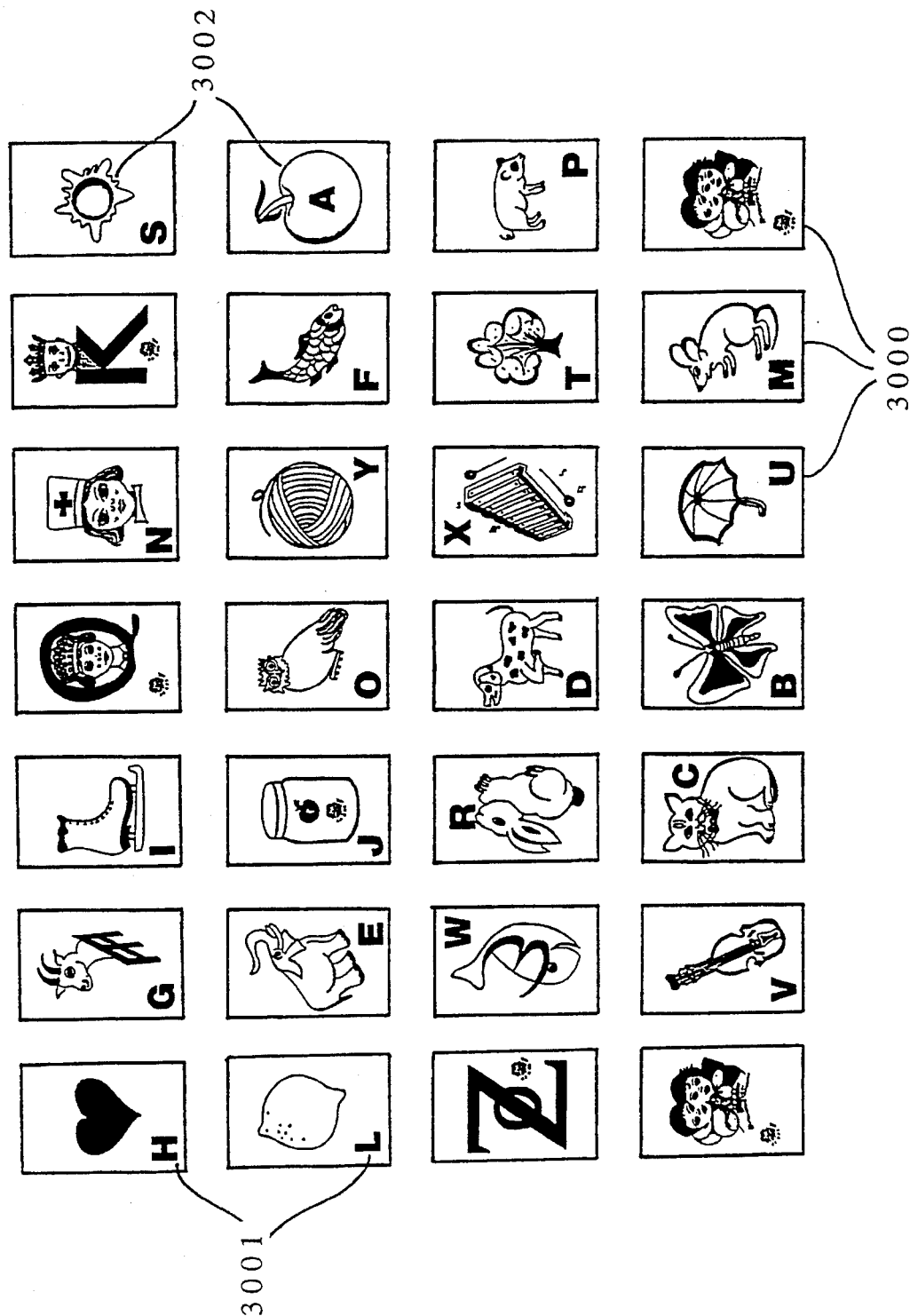
Figure 30B:
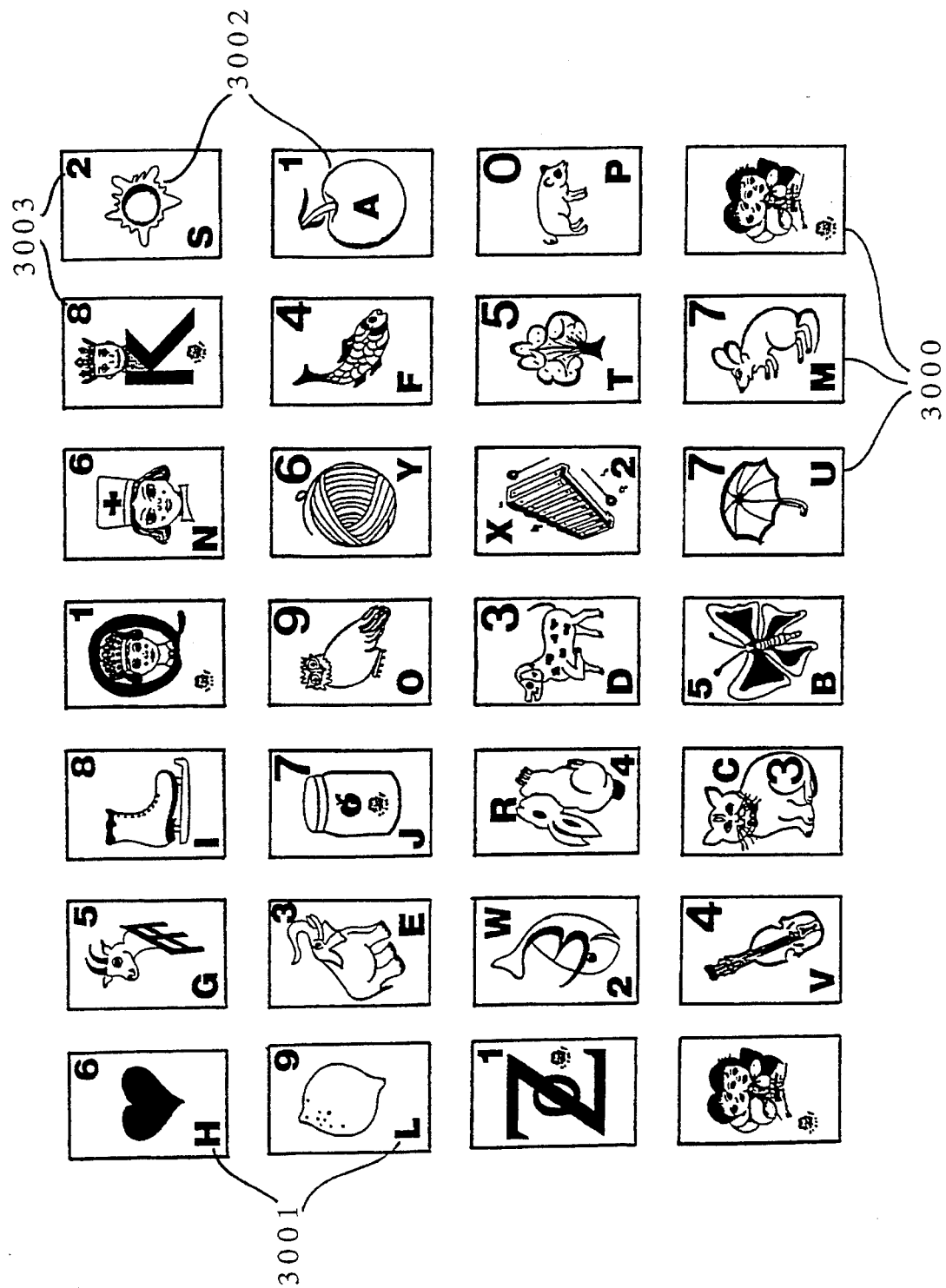

A more elaborate puzzle that could be plaid after the aforementioned "fitting puzzle" is provided by a set of 26 cards 3000 representing the letters 3001 of the alphabet together with pictures 3002 whose names begin with the same letters, as in FIG. 30*a*, and with numbers 3003, as in FIG. 30*b*. This puzzle is referred to as "finger puzzle" since the cards 3000 have to be organized according to the picture arrangement of the picture gloves, or the letter/number arrangement of the alphanumeric gloves. This puzzle is more difficult than the previous ones since there are no guidelines to direct the player other than relying solely on one's own memory using pre-developed associations between pictures/letters and the fingers of the hand.

The "magic bingo" illustrated in Fig.29 is a motivator factor for the child to memorize the picture-finger assignment and to reinforce the learning of the alphabet in the context of the keyboard 100. FIG. 29 shows only one pair of bingo cards 2900, corresponding to a left hand and a right hand, together with the matching tokens 2901. The other cards and tokens that constitute a whole game set show various pictures of people, animals, or objects, still within the key-finger assignment of the keyboard 100. For example, a bingo card 2900 representing the left-hand will show a "Duck", or a "Deer", as the middle picture on the left major finger. As a result, the child gradually associates the "Dog", the "Duck", the "Deer", etc. . . together in the same class, in correspondence with the middle position of the left major finger. This process will facilitate the learning of the alphabet since each letter, in this case the letter "D", is learned as the definition of the class of people, animals, or objects whose names begin with that letter.

The child's memorization and psycho-motor skills can further be enhanced by instructing him/her to play the following card game, referred to as "find & hit". The player is instructed to shuffle a deck of 26 cards 3000, each card representing a letter 3001 of the alphabet together with a picture 3002 whose name begins with that letter (e.g. FIG. 30). The shuffled cards 3000 are placed in a little pile, face down, on a flat surface. The player subsequently picks up the card 3000 at the very top of the pile, lays it down face up, and tries to "hit" it as fast as possible with the finger defined by the key-finger assignment of the keyboard 100. For example, if the laid card is an "Owl" (e.g. FIG. 30), the player should "hit" it with the ring finger of the right hand. While learning how to play this game, the player can either wear picture gloves or alphanumeric gloves. As the player becomes more expert, the game can be plaid without wearing the picture gloves. The correctness of the card-finger association can be double-checked by looking at the picture gloves/alphanumeric gloves, or any similar charts. The player would proceed to pick up the cards until the pile is exhausted. The overall performance would be given by the number of cards correctly "hit". The cards incorrectly "hit" indicate where improvement is needed.

A natural evolution of the aforementioned "find & hit" card game is the following multi-player card game, referred to as "hit & win". This game is plaid with one or more decks of 26 cards 3000, each card representing a letter of the alphabet together with a picture whose name begins with that letter (FIG. 30). The cards are laid face down, on a flat surface. Before starting the game, each player picks up a card, and turns it over. The player who picks up a card associated with the highest number on the alphanumeric gloves gets to play first. For example, if player #1 picks the "Goat" (card number 5), and player #2 picks the "Piggy" (card number 9), player #1 is the first player. If two or more players draw the highest number card, each one of them picks up an additional card until one player only draws the highest number card. The first player shuffles the deck, puts it in a pile, face down, on a flat surface. He/she then picks up the first card at the very top of the pile, and turns it over face up. All the players should then hit the card once with the appropriate finger. The player who hits the card first with the proper finger wins that card. If two or more players hit the card simultaneously, or if no player at all hits the card with the proper finger, the card is placed face down at the bottom of the pile. The game ends when no card is left in the pile. The player with the most cards is the winner.

School Age Group

Alphanumeric Gloves.

When the child leaves the pre-school age and enters the school age, he will normally know very well his alphabet and the numbers, if not more. As the child acquires or further develops his writing/reading skills, he can be given the (additional) opportunity to memorize the key-finger assignment of the keyboard by wearing the Alphanumeric Gloves shown in FIG. 6. The alphanumeric gloves provide a precise representation of the keyboard on the back-side of the glove fingers, by indicating the letters, numbers, and punctuation symbols of the keys to be struck by the corresponding fingers.

To learn the alphabet in the context of the key-finger assignment of the keyboard, the pre-school child wearing the alphanumeric/picture gloves had to turn the palm of one his hands towards him. After learning his alphabet, the child wearing the alphanumeric/picture gloves would have had to turn the palms of his both hands, then bring his right palm on his left-hand side, and his left palm on his right-hand side, to obtain the whole representation of the keyboard as it would appear when practising at the keyboard. There lies the motivation for the process-driven evolution of the alphanumeric/picture gloves of Fig.3 into the alphanumeric gloves of FIG. 6: providing the child knowing his alphabet with a means for visualizing and memorizing the keyboard as it would appear to him if he were actually practising at the keyboard.

If a school child had previously learned his alphabet with the alphanumeric/picture gloves, wearing the alphanumeric gloves would reinforce his visual memorization of the keyboard. If a school child had never used the alphanumeric/picture gloves, he would still be given the opportunity to learn the key-finger assignment of the keyboard by wearing the alphanumeric gloves and/or the alphanumeric/picture gloves, whatever the choice. In both cases, the child will memorize the key-finger assignment of the keyboard before even using a keyboard. As a result, learning to use the keyboard will be much easier, since the child will already know which finger strikes which key. He will therefore only need to focus his attention on developing the motor skills required for efficient touch-typing.

Visually-impaired and hearing-impaired children would also benefit from the same learning opportunities with the Braille and Sign-Language implementation of the alphanumeric gloves, respectively.

The overall process of learning the key-finger assignment of the keyboard is summarized in FIG. 7 which shows the picture gloves of FIG. 2, as well as the alphanumeric gloves of FIG. 6, in relation to the standardized keyboard of FIG. 1.

The learning of the alphanumeric gloves can be enhanced by the complementary "magic addition tables" illustrated in FIG. 31, and by the magic "multiplication tables" illustrated in FIG. 32. FIG. 31 shows the table of addition 3100 by 3 in elementary form (31.*a*) or more advanced equation form (31.*b*). FIG. 32 shows the table of multiplication 3200 by 7 in elementary form (32.*a*), or more advanced equation form (32.*b*). For each operation, the first operand 3101 coincides with the number of the key of the keyboard to be struck by the finger wearing the given operand. All operations are written or printed onto small thin labels 3102 that can be inserted within transparent pockets 3103 that are permanently mounted along the back side of glove fingers. The learner can thus be instructed to replace the old tables by new ones.

Synergistic learning of the alphanumeric gloves in conjunction with the aforementioned addition and multiplication tables can be achieved through the hereafter disclosed "magic numbers" game, where every possible word is attributed a score calculated as follows. As in the example of FIG. 33, each player is instructed to choose a word, and to write it down. Each player assigns to each letter of the chosen word the number (between 0 and 9) corresponding to that letter on the alphanumeric gloves. With the help of the "magic addition tables" (FIG. 31) or "magic multiplication tables" (FIG. 32), each player sums up all the numbers assigned to the letters of his/her chosen word. All the numbers constituting the final sum are added until a single digit number is left. This last digit number is referred to as the "Worth" of the chosen word. In the example of the word "NUMBER", FIG. 33*b*, the numbers assigned to letters N, U, M, B, E, R are according to FIG. 33*a*:

$N=6, U=7, M=7, B=5, E=3, R=4 \longrightarrow$

"NUMBER"= $3 + 4 + 5 + 6 + 2 \times 7 = 32 \longrightarrow 3 + 2 = 5$.
"NUMBER"= 5.

Every player then adds the calculated "worth" to his/her score. No word can be chosen twice in any given game. The first player to reach a score higher than a predetermined threshold is the winner.

To provide a wholistic reinforcement learning of the aforementioned picture gloves/alphanumeric gloves, and the addition/multiplication tables, additional audio-visual-tactile means of memorization are disclosed through the "Find & Match" card game (FIG. 30), the "Rummy-fication" card game (FIG. 30), the "Magic Race" game (FIG. 34), the "Magic Dices" game (FIG. 35), and the "Magic Dominoes" game (FIG. 36).

The "Find & Match" card game is to be plaid by one or more players with a 54 card deck comprising two 26 card decks 3000 of the letters of the alphabet with illustrations (FIG. 30), and two Jokers (e.g. the "Little Challengers" of FIG. 30). Once shuffled, the 54 cards are arranged face down on a flat surface in 9 columns of 6 cards. Each card is assigned a score, or card-score, given by the number of the finger of the alphanumeric gloves that corresponds to the letter of the card. Before starting the game, each player picks up a card, and turns it over. The player who picks the highest card-score gets to play first. If two or more players score the same highest card-score, each one of them picks up an additional card, and so on, until a single player gets the highest card-score. The first player turns three cards of his choice face up. If a player identifies a complete series of pictures (or equivalently letters) corresponding to the same finger of the picture gloves (or equivalently of the alphanumeric gloves), he/she wins that series. A complete series can have three cards, two cards ("IK" or "OL"), or one card ("P"). The player then places his/her complete series in front of him/her face up, so that all the other players can see it at all times. If a card which has been turned over face up by a player cannot contribute to a complete series, it is put back where it was face down. For example, a player who picks the "Piggy", the "Owl" and the "Lemon" wins the three cards. But a player who picks the "Piggy", the "Owl", and the "Queen", only wins the "Piggy", and has to place the "Owl" and the "Queen" back where they were, face down. The "Little Challengers" of FIG. 30 can be substituted to any card. The game ends when no series can be formed. The player with the most cards is the winner.

The "Rummy-fication" card game is to be plaid with three players or more, with the same 54 card 3000 deck used in the previous game, with the same procedure for determining the first player. Each player receives the same number of cards, and the remainder of the deck is placed face down in a pile on a flat surface. In one's turn, each player either picks up the card at the very top of the pile towards completing a series of pictures/letters/numbers corresponding to the same finger, or asks any other player for a card towards completing such a series of pictures/letters/numbers. Such a card request is made by indicating the corresponding finger or by giving the number assigned to the card being sought for. Any player who improperly rebuffs a card request should lower his/her score by an amount equal to the number of the requested card, and subsequently place said card face down at the bottom of the pile. The two cards of the "Little Challengers" can be substituted to any card, but cannot be used together to complete a series. In one's turn, each player can either place one of his/her cards at the very top of the central pile, or lay down in front of him/her any completed series of cards. The game ends when one of the players has no card left, or when no finger-card series can be completed. All the players then count the number of cards laid down in front of them, and subtract therefrom the number of cards left in their hands. The player with the highest total score is the winner.

With the "Magic Race" game illustrated in FIG. 34 and Appendix A, the pool of two or more players is provided with three regular cubic dices, and each individual player is provided with a unique small token. Before starting the game, each player throws the three dices once. The player with the highest score starts the game. If two or more players score the same highest total, the aforementioned procedure is repeated among those players until a single player with the highest score is identified. All players start from the first picture of the "magic track" 3400, e.g. the "Queen" 3401 in FIG. 34. The first player throws the three dices, calculates the total score, and moves his/her token on the track by a number of indicia equal to the score drawn. In the illustration of FIG. 34 for example, the first player who would score a "5" would position his/her token on the "Sun" of the "Magic Track". The player is then instructed to consult a chart telling him/her what to do. With the chart given in Appendix A, the player ending up on the "Sun" would read the instruction: "You need more shade: Go to the Tree". He/she would then move his/her token to the "Tree", and subsequently pass the dices to the next player. In FIG. 34, the first player to reach the "Piggy" 3402 is the winner.

With the game of the "Magic Dices" depicted in FIG. 35, the pool of players is provided with nine cubic dices 3500. The total of 54 dice sides 3501 include 2 jokers 3502 (e.g. the "Little Challengers"), and two sets of the 26 letters of the alphabet. With each letter of the alphabet comes the picture of a person, animal, or object whose name begins with that letter. For simplicity, no dice 3500 carries two letters associated with the same finger. The player who throws the nine dices looks for any complete letter triplet (e.g. "RFV"), letter doublet (e.g. "OL"), or letter singlet (e.g. "P") associated to the same finger. The corresponding score is the sum of the numbers associated with these letters. The first player with the highest score is the winner. This game would not only reinforce the learning of the alphabet and languages, and the addition tables, but it would also introduce the child to the fundaments of computer programming by exposing him/her at early age to the concept of memory (e.g. picture) and instruction (e.g. instruction set of Appendix A).

The game of "Magic Dominoes" 3600 illustrated in FIG. 36 is plaid by two or more players, and the rules are those of conventional domino playing with the following differences. The rules of conventional domino playing instruct to match dominoes on the basis of the number (of dots) printed on their halves. With the set of "Magic Dominoes", the players are instructed to match domino halves 3601 showing pictures corresponding to the same finger. For example, a domino half showing an "Elephant" can either be matched with another domino half showing an "Elephant", or a "Dog", or a "Cat", or any other picture, which picture name starts with "E", "D", or "C". There are various ways of implementing a set of "Magic Dominoes". The set depicted in FIG. 36 was generated by using the 10 column classification of the letters of the keyboard 100, and by adding an extra number for the "Little Challengers". Such a set has therefore 66 dominoes. The "Little Challengers" can be matched as is, or can be used as jokers. Without the "Little Challengers", the "Magic Dominoes" set would have only 55 elements. Each domino picture is assigned a score given by the number of the column to which the initial letter of the name of the picture belongs. The game ends when a player has no domino left, or when no one can play. The score of a player is determined by summing up the numbers assigned to the pictures of his/her remaining dominoes.

Word-Spelling/Picture Gloves.

As the school child simultaneously develops his reading/writing skills, much is to be gained from an educational device that teaches him proper word-spelling in the context of the key-finger assignment. By wearing the word-spelling picture gloves depicted in FIG. 8, the child's memorization of the key-finger assignment of the keyboard is reinforced, while he learns new words and their spelling in a fun and dynamic manner. As illustrated in FIG. 8, the structure of the word-spelling/picture gloves is most simply understood as an extension of the alphanumeric/picture gloves of FIG. 3, where the letters indicated on the palm portion of each glove are replaced by the full written names 800 of the objects represented by the corresponding pictures 204 on the back portion of the other glove. In the illustration of FIG. 8, if the school child wearing the gloves turns the palm of his right hand towards himself, he very easily learns that the name of the top animal on his major left finger is given by the top name written under his right forefinger, i.e. "Elephant". He simultaneously memorizes that the letter "E" is located at the top of the third column of keys of the keyboard to be struck by the left major finger.

The series of pictures 204 or written names 800 corresponding to the same finger would be color-coded, and mounted/printed on flexible labels 801 inserted within transparent covers 802 permanently mounted to the gloves. While being cost-effective, such an implementation can meet any need for picture styles and diversity.

School Age Group And Teenagers

Languages/Sciences Picture Gloves.

As the school child or teenager learns a foreign language, much is also to be gained from the language/picture gloves of FIG. 9 to synergistically teach the child foreign vocabulary in the context of the key-finger assignment of the keyboard. As seen in FIG. 9, the language/picture gloves are most simply understood as an extension of the word-spelling/gloves of FIG. 8 where the identification of the pictures 204 and the writing of said picture names 800 are both made in a foreign language 900. As the school-age child or teenager would have had by then multifarious opportunities to memorize the key-finger assignment of the keyboard, he/she could use the latter memorization to ease the learning of a foreign language. In the learning of French language for example, the letter "A" could be associated with the word "Araignée", or "spider" in English, as in the illustration of FIG. 9, The visual memorization of the "French" spider in the middle of the left little finger, together with the memorization of the "A" key corresponding to that location, will provide a mnemonic means for remembering that the french name for spider, i.e. "Araignée", starts with an "A". Owing to the associative nature of the memory process, it then becomes more easy for the school child or teenager to retrieve the word "Araignée". The pictures can be drawn, painted, printed, or embroidered on small thin labels of paper, or soft plastic, and the names of the people, animals, or objects defined by the corresponding pictures can also be written, typed, or embroidered on small thin labels. These thin labels can comprise 1) soft paper/plastic strips, 2) flexible magnetic strips, 3) soft pieces of material/tissue, or any other means that are safe, and convenient for the learner. When implemented as soft paper/plastic strips, these thin labels can be inserted into transparent pockets mounted or sawn along the back side and palm side of the glove fingers. When implemented as flexible magnetic strips, these thin labels can be affixed onto attracting magnetic strips which have opposite polarity and are permanently mounted lengthwise on the back side and palm side of the glove fingers. When implemented as soft pieces of material/tissue, these thin labels have "press-buttons" which can be pressed into sockets permanently mounted on the back side and palm side of the glove fingers.

Labels showing pictures would be placed on the back side of the glove fingers, and labels indicating their corresponding written names would be placed on the palm side of the glove fingers. An exhaustive collection of picture-labels together with the corresponding word-labels would be provided to the learner as a picture-word dictionary to assist in the learning of spelling, reading/writing, and language vocabulary. To facilitate proper placement of these labels on the appropriate glove fingers, the picture labels and their corresponding word labels would have the same color as the color of the key of the keyboard carrying the beginning letter of the name of the person, animal, or object defined by the said pictures.

The picture gloves can also very conveniently expose the school age group and teenagers to various artistic and scientific fields (e.g. physics, chemistry, mathematics, medical sciences, etc.) and help them to become aware at early age of their own interest/aspirations, and thereby encourage the development of their innate skills or talents. For example, to unveil a possible interest of the child/teenager towards physics, the aforementioned picture labels can show the photos or pictures of great physicists who have had a significant impact in the development of their disciplines. The corresponding word labels would indicate what the contributions of these scientists were, and what was the impact of their contributions. While the word-labels would give an objective account of the scientific discovery/invention, the picture labels would not only help the memorization of the name of the discoverer/inventor, but would also provide an excellent framework to unveil important aspects of the personality of the discoverer/inventor, i.e. whether he/she was sensitive to his/her fellow men, whether he/she was a risk-taker or conservative, etc. All this would not only give some excitement to the learning process, but may also help to prevent artificial stereotypes about science from possibly altering the natural developmental course of the child/teenager.

The major asset of the aforementioned picture gloves is to enhance learning through the synergistic effect of reinforcement learning through a dynamic blending of art and science. As the child learns the alphabet with the picture gloves, he/she also learns to associate letters with pictures, and pictures with fingers, which ultimately will help him/her to associate letters with fingers. When a teenager will learn a language, knowledge of the key-finger assignment of the keyboard together with the visual memorization of the pictures and their new positions on the glove fingers will help to memorize the beginning letter of the names of these pictures, and consequently the name itself due to the associative structure of the memory process.

Languages/Sciences Keygloves.

Figure 40A:
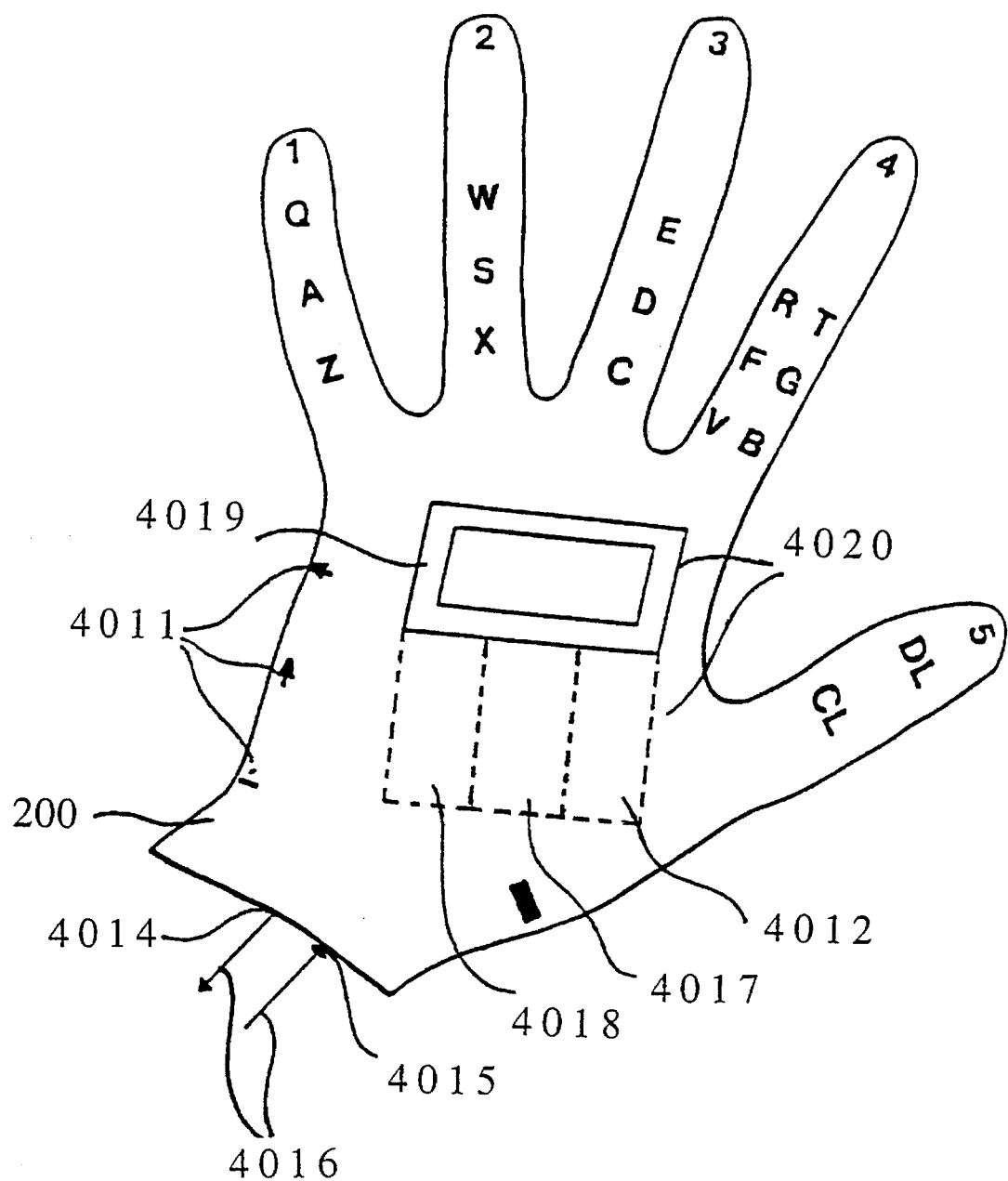
Figure 40B:
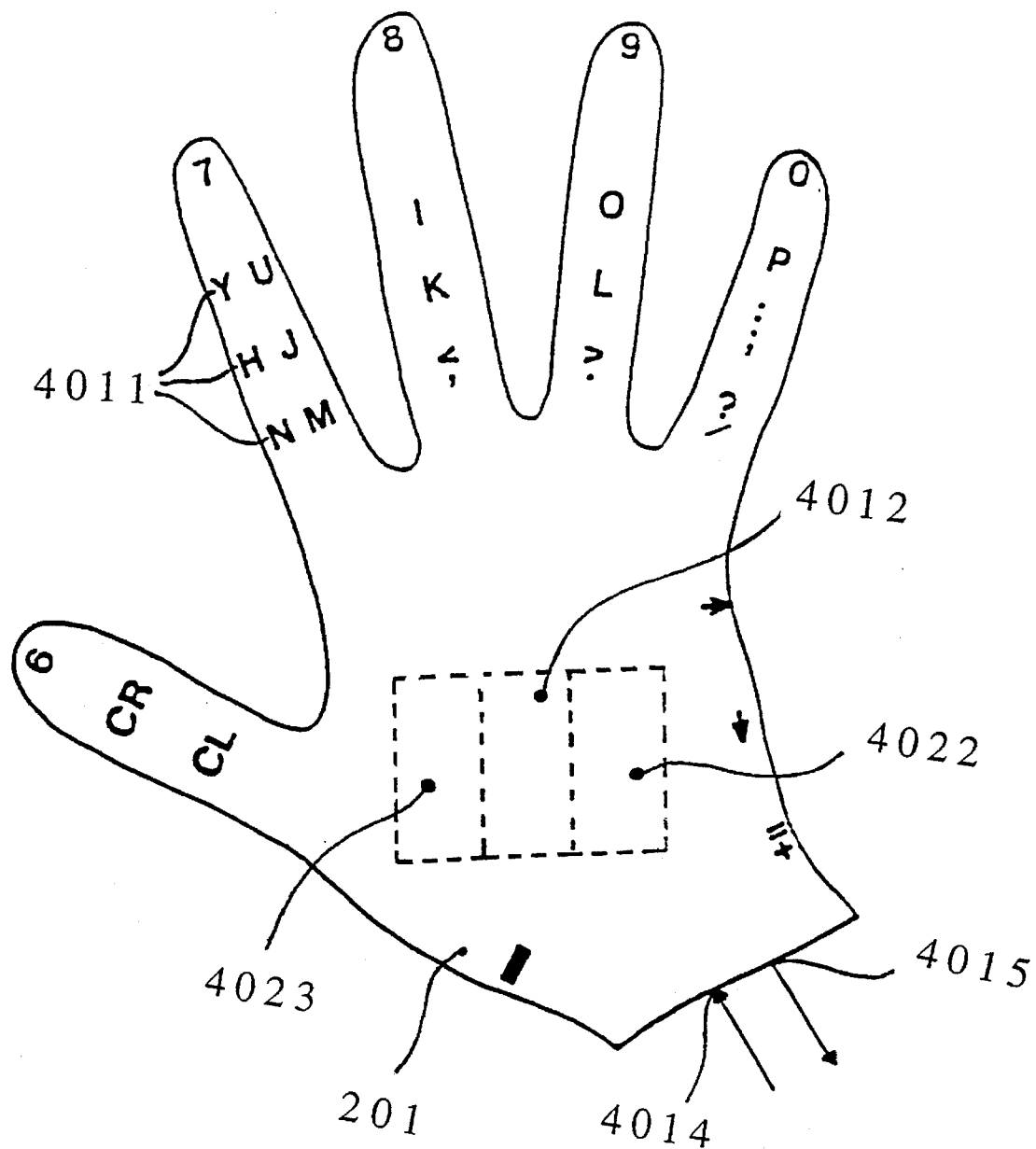
Figure 40C:
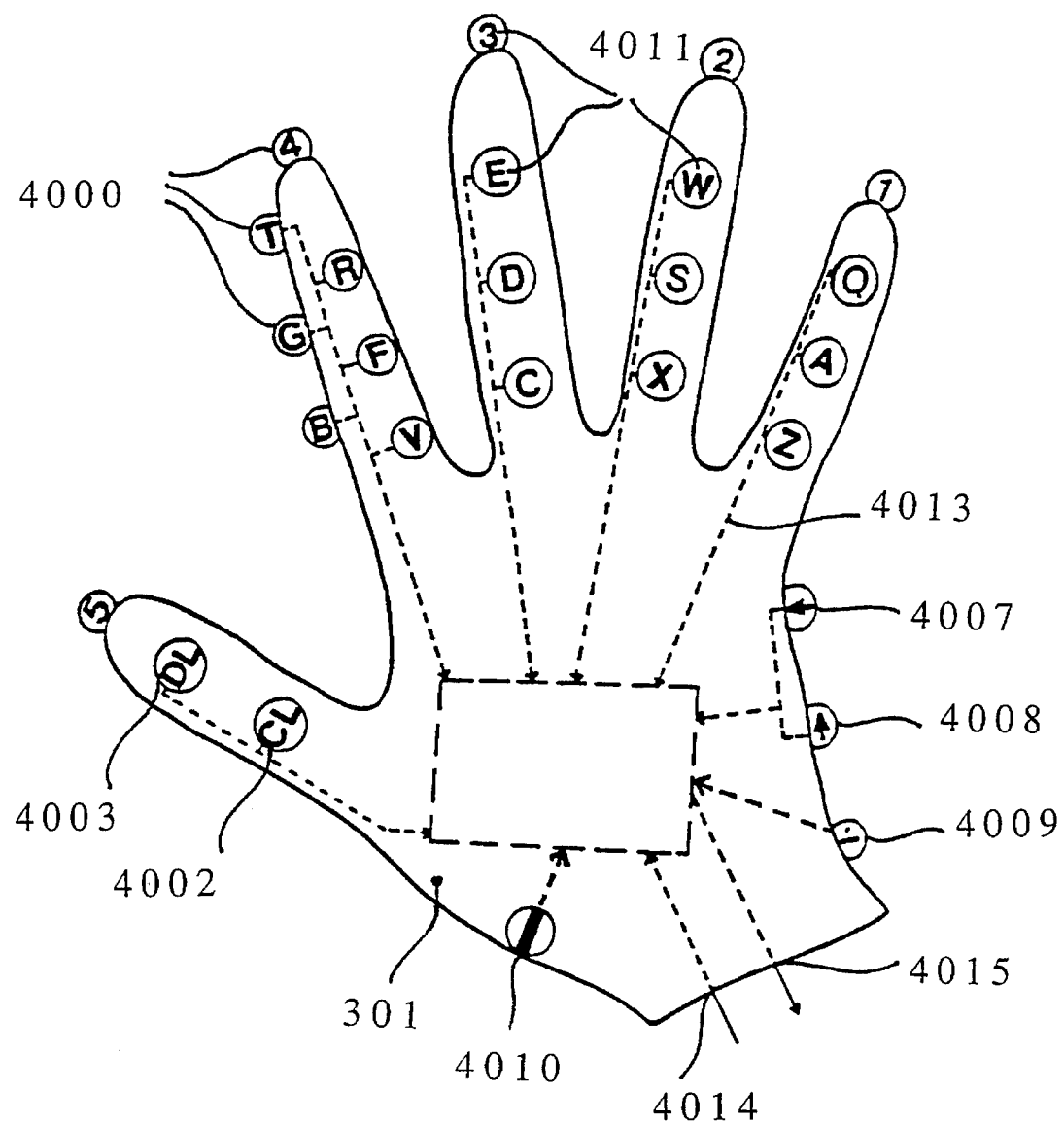
Figure 40D:
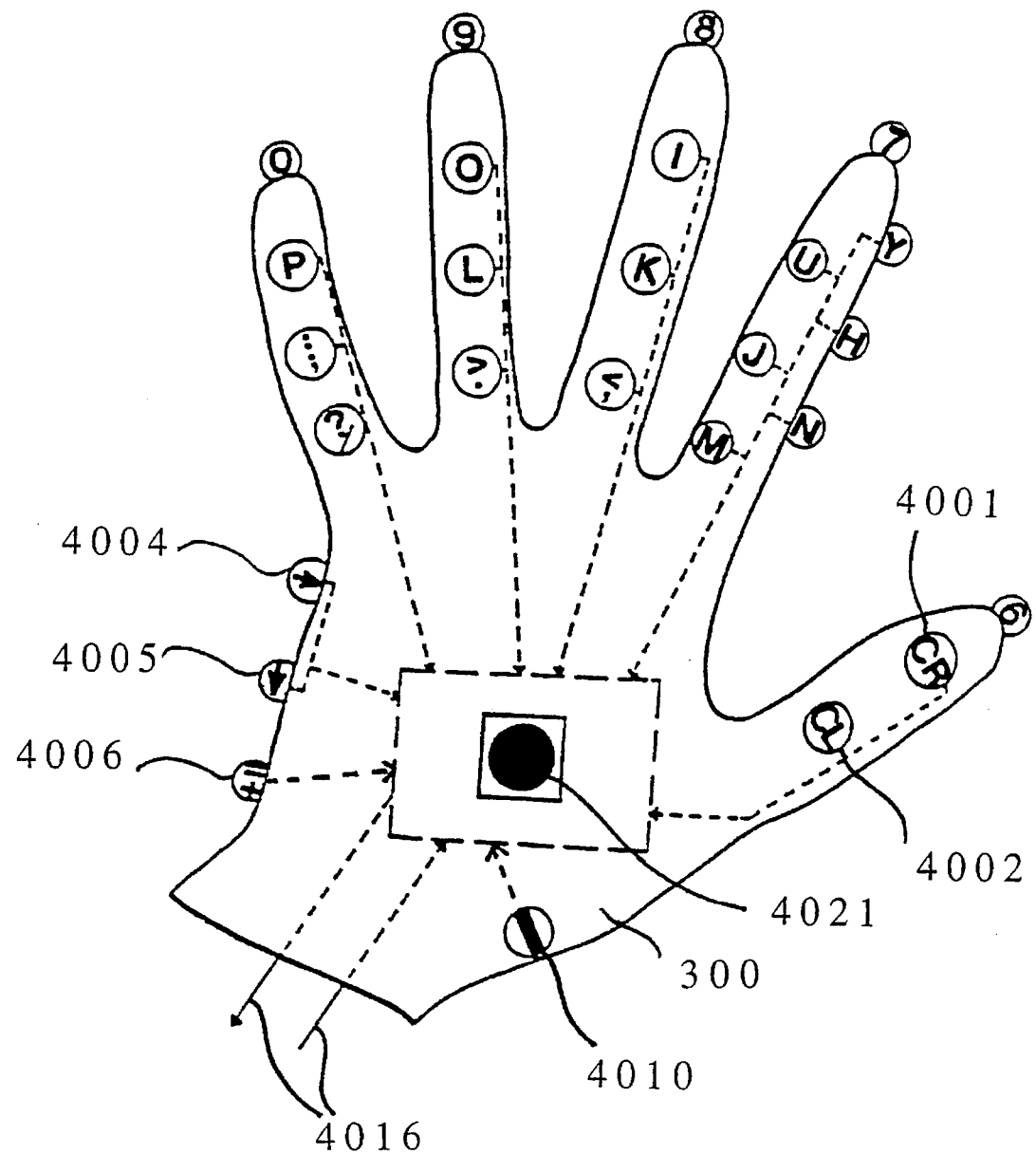

As the learning process evolves, so do the expertise and skills of the learner, who naturally develops needs for educational methods and devices that are faster and more efficient; more practical and convenient; more adaptable and functional. In order to adapt the learning process to the diversified demands of the growth and development of the learner without altering the essence and spirit of the learning environment, the aforementioned picture gloves evolve naturally into a more integrated form with a broader functionality which is being disclosed under the term "keyglove(s)", in analogy with the term "keyboard". As depicted in FIGS. 40*c* & 40*d*, the "keygloves" comprise a pair of gloves 300 & 301 with keys 4000 mounted thereon.

The keys carrying the letters of the alphabet are mounted within the palm side of the fingers of the keygloves, following the conventional key-finger assignment of the keyboard. In particular, the keys "Q", "A", "Z" are mounted columnwise within the palm side of the little finger of the left keyglove. The keys "W", "S", "X" are mounted columnwise within the palm side of the ring finger of the left keyglove. The keys "E", "D", "C" are mounted columnwise within the palm side of the major finger of the left keyglove. The keys "R", "F", "V" are mounted columnwise within the palm side of the left half of the forefinger of the left keyglove. The keys "T", "G", "B" are mounted columnwise within the palm side of the right half of the forefinger of the left keyglove. The keys "Y", "H", "N" are mounted columnwise within the palm side of the left half of the forefinger of the right keyglove. The keys "U", "J", "M" are mounted columnwise within the palm side of the right half of the forefinger of the right keyglove. The keys "I", "K" are mounted columnwise within the palm side of the major finger of the right keyglove. The keys "O", "L" are mounted columnwise within the palm side of the ring finger of the right keyglove; the key "P" is mounted columnwise within the palm side of the little finger of the right keyglove. Since each column comprises at most three keys, and each one of the four fingers of the human hand comprises three phalanges, the keys "Q", "W", "E", "R", "T", "Y", "U", "I", "O", and "P" are mounted on the first phalange of the corresponding fingers. The keys "A", "S", "D", "F", "G", "H", "J", "K", and "L" are mounted on the second phalange of the corresponding fingers; and the keys "Z", "X", "C", "V", "B", "N", and "M" are mounted on the third phalange of the corresponding fingers (closest to the hand). Also mounted within the palm side of the right major finger, right ring finger, and right little finger are the corresponding symbol keys of the keyboard.

The keys bearing the numbers from 0 to 9 are mounted at the finger tip of the fingers of the keygloves following the key-finger assignment of the keyboard. Because of the limited space that is available at the tip of each finger, it may be however more practical to mount the key "number 4" at the tip of the left forefinger, and the key "number 5" at the tip of the left thumb. Likewise, key "number 7" is preferentially mounted alone at the tip of the right forefinger, and key "number 6" at the tip of the right thumb.

The "Carriage Return" key 4001 is mounted on the left lateral side of the first phalange of the right thumb, and a "Capitals Lock" key 4002 (affecting the selection of keys on the right keyglove) is mounted on the left lateral side of the second phalange of the right thumb. The "Delete" key 4003 is mounted on the right lateral side of the first phalange of the left thumb, and a "Capitals Lock" key 4002 (affecting the selection of keys on the left keyglove) is mounted on the left lateral side of the second phalange of the left thumb. The "Forward" key 4004, the "Downward" key 4005, and the "Plus Sign" key 4006 are mounted columnwise on the right lateral side of the right hand glove. Likewise, the "Backward" key 4007, the "Upward" key 4008, and the "Minus Sign" key 4009 are mounted columnwise on the left lateral side of the left hand glove. There is a "Bar" key 4010 ("blank space" key) under the thumb of each keyglove, as further seen from FIG. 40.

The keys of the keyglove are functionally identical to those of the keyboard in that they can be struck through tactile pressure by the person wearing the "keygloves". These keys play the role of switches (whether electronic, photonic, mechanical, or otherwise). They can be implemented as pop-in-and-out keys (preferentially with a spherical type of cap), or as piezo-electric patches, or any other means that is convenient to the user. The aforementioned set of keys can be very conveniently used with a simple flat surface having an edge, or with the help of the fingers themselves. While the keys mounted on the palm sides or lateral sides of the keygloves are very easily struck on the surface edge through lateral motions of the hand(s), the keys mounted at the tip of the keyglove fingers are very easily struck on the flat surface through perpendicular motions of the fingers. In order not to restrict the use of the disclosed keygloves to persons who know the key-finger assignment of the keyboard 100, indicia 4011 can be applied to the keys 4000 of the keygloves and/or to the back sides 200 & 201 of the keygloves (FIGS. 40a & 40b) so as to provide the person wearing the keygloves with a pictorial or alphanumeric representation of the palm sides of the keygloves, and thereby facilitate the learning of "keygloving".

Like the conventional keyboard, the keys of the keygloves are all connected to a microprocessor 4012 which monitors the flow of data input through the keys, and which is referred to as "keyglove microprocessor" (or keyglove microcontroller). Each keyglove has its own microprocessor 4012 which is mounted, for practical purposes, within the material of the back side of each keyglove (to let the palm(s) of the hand(s) unhindered). The keys can be connected to the keyglove microprocessor by electrical wires 4013 mounted and isolated within the glove material. There are input ports 4014 and output ports 4015 (connected to the keyglove microprocessor) in each keyglove, as shown in FIG. 40. Such I/0 ports would allow the keygloves to be connected 4016 into any computer that can be interfaced with a standard keyboard.

A mini radio 4022 and/or mini tape recorder 4023 with audio cassette could be mounted within the material of the back side of a keyglove together with the keyglove microprocessor. This would allow the learner to program the keygloves so as to associate musical notes (or even tunes) with the individual keys of the keyglove, towards creating for example a musical environment for the learning of the numbers and arithmetic. Sensory-motor detectors of the motions of the hands and fingers could also be implemented within the glove material, and extend the aforementioned musical learning environment to that of a learning environment that would integrate music and dance together for the reinforcement learning of writing, reading, and arithmetic.

To provide the learner with more autonomy and more processing capabilities, a computer microprocessor 4017 (i.e. including a central processing unit) together with with microdisk interfacing capabilities 4018, and output display/printing device(s) 4019 can be integrated with the keyglove microprocessor and embedded into the keyglove material (e.g. on the back-side of the keyglove). For practical purposes, this computing unit could be implemented in a medallion type of structure 4020, where the screen would be housed within the internal movable side of the medallion (FIG. 40a), and the keyglove microprocessor, the computer microprocessor, and the microdisk (interface) would constitute the base of the medallion, and would be mounted within the back-side of the keyglove. For enhanced utilization and functionality, a small mouse 4021 could also be mounted within the palm side of a keyglove (as in the illustration of FIG. 40d for the right keyglove). Such a mouse would allow the learner to play videogames, or to benefit from efficient menu-driven software (e.g. enhancing the keyglove functionality).

The flow of information (from one keyglove to another) which is needed for the internal data processing of the computing keygloves can be achieved either through wires interconnecting the keygloves, or through the propagation of electromagnetic (radio-)waves. In the first type of interconnection, the data flow from external output port(s) 4014 of one keyglove to external input port(s) 4015 of the other keyglove through pairs of interconnecting wires, which can either be electrical or optical. To maintain the freedom of motion of the user's hands, thereby enhancing the practicality of the utilization of the keygloves, these interconnecting wires can also be embedded within, or mounted to, clothing being worn by the user. Such clothing includes shirts, dresses, or capes such that the mounted/embedded wires can be readily plugged into the external input/output port(s) of the keygloves, e.g. at the edges of shirt/dress sleeves, thereby eliminating the inconvenience of having loose wires hanging around. In the second type of interconnection, the external output ports of the keygloves comprise radiowave transmitters, and the keyglove external input ports comprise radiowave receivers, so that data can flow from one keyglove microprocessor to the other keyglove microprocessor through radio wave transmission/propagation/reception. This radiowave communication between the two keygloves can be readily extended to the communication with an external (and possibly remote) processing unit by providing the keygloves with adequate power supply.

Expert Keygloves

Transfer, Exchange, & Processing of Information(Data)

Harmonizer Keygloves

The aforedisclosed radiowave keygloves can allow a dancer to further express his/her own feelings to an audience without interfering with the harmonious motions of the dance (which would not be the case if the dancer were to use his/her own voice for example ). Since the "keygloves" can exhibit the functionality of a keyboard of arbitrary format and content, the information-content of the keys of the keygloves could be re-programmed at the touch of simple switches (mounted within the keyglove material), thus allowing the dancer to use, at any time, the keygloves as a substitute for a standard type-writer or computer keyboard, or the keyboard of a standard musical instrument, or the keyboard controlling the direction and color-blending of a set of lights (possibly mounted on the keygloves themselves, and possibly including lasers). By wearing these keygloves, a dancer would indeed be able to communicate his/her inner feelings in a unique blending of poetry remotely typed on a huge video-screen to be visualized by the whole audience, and with music remotely plaid on a music synthesizer to be heard by the whole audience, and with a show of lights remotely activated by the dancer himself/herself. Keygloves having the functionality of providing a dancer, and more generally an artist, with such artistic harmonizing power are naturally referred to as "harmonizer keygloves".

Telecommunications Keygloves

Such radiowave keygloves are also implementable as "tele-keygloves" to allow voice-telecommunication by means of cellular telephone units housed within the keygloves. The speaker and receiver of a pair of "tele-keygloves" can be removable and adaptively placed in the back-side or palm-side of the keygloves depending upon the user's needs or preference. In the illustrations of FIG. 42 which depict a pair of "tele-keygloves" 4200 & 4201, the speaker 4202 is applied to the palm-side 301 of the left "tele-keyglove" 4200, the receiver 4203 is applied to the back-side 201 of the right "tele-keyglove" 4201, and a stretchable antenna 4204 is mounted along the side of the left "tele-keyglove" 4200. This type of implementation can be quite appealing to a person driving a car, or any other machine(ry) requesting unhindered motions of at least one hand for safety purposes. For other applications or in other settings where privacy is of the essence, the "tele-keygloves" could be configured with the speaker located within the palm-side of one of the "tele-keygloves", the associated receiver within the palm-side of the other keyglove. In the example of FIG.42, the positioning of the number-keys 4205 and letter-keys 4206 is the same as that of a standard computer keyboard. The letter-keys could also be positioned on the glove fingers following the number-letter association of a standard telephone set, i.e, "ABC" on finger #2, "DEF" on finger #3, "GHI" on finger #4, "JKL" on finger # 5, "MNO" on finger #6, "PRS" on finger #7, "TUV" on finger #8, "WXY" on finger #9, and the "*" key, the "#" key, the "MUTE" key on finger #0 for example; the letter-keys on finger #1 could be used to indicate the programmed numbers of the fire-station, medical emergency, etc. These radiowave "tele-keygloves" are also readily extendable to the integration of tele communication services such as voice, video, and data from telephone cells 4207, camera, and computer processing units that would be mounted on, or housed within the "tele-keygloves".

Control Keygloves

Radiowave keygloves will also be very convenient for assisting people, in particular those with physical disabilities, in remotely controlling their environment. Such keygloves could be used to control and program various types of electronic equipment such as TVs, VCRs, etc., and home-based as well as car-based security/alarm systems. Such keygloves would be particularly attractive in working environments or in situations where time is of the essence, and where a few seconds can make a difference in responding efficiently to emergencies or critical situations, such as those encountered in nuclear power plants, military defense, etc.

Security Keygloves

Radiowave keygloves can also be embodied as a practical and convenient tool against crime and to enhance personal safety. Certain keys can indeed be programmed as macro-numbers, such as 911, to alert emergency services while indicating one's own location through voice or electronic mail (e-mail), by means of automated radiowave emission. Sound-alarms that can be easily activated in times of danger could also be mounted within the glove material together with other types of protecting devices connected to police monitors.

Paging Keygloves

The radiowave keygloves can also incorporate "paging" functions (in addition to the other aforementioned features), thereby providing an attractive alternative to the use of more traditional devices that require to be carried in pockets, or to be attached to the body.

Instructional keygloves

Keygloves could also serve as an autonomous wearable work manual to conveniently instruct (new) workers by allowing them to independently enter their inquiries in their "expert keygloves", and instantaneously receive the answer(s) without having to wait for a human expert to become available.

Business Keygloves

The disclosed keygloves also provide business environments with opportunities to increase productivity by enhancing employee empowerment as defined by TQM (Total Quality Management). In the case of department stores for example, sale associates could have their own keygloves to enter information at their own will, and instantaneously receive answers either from the keygloves themselves, or from a remote processing unit or data base of the store easily accessible from the keygloves. A particularly important asset of such application of the keygloves would be to facilitate the emergence of motivation by allowing the employees to check their own itemized productivity, at the end of the day. Furthermore, the computing power of the keygloves could also be used by the employees to unveil possible areas of self-improvement. By limiting the negative effects of external human interferences, and by decreasing the fear of the employees of being told off, the keygloves may promote a higher sense of fairness and security among the employees, without suppressing their sense of responsibility, thereby generating more motivation, and, as a way of consequence, more productivity (Total Quality Management).

Service Keygloves

Keygloves can also facilitate the working conditions in restaurant or fast-food establishments, thereby contributing to enhance productivity and success of the business. For example, waiters/waitresses would be likely to make less mistakes in handling orders by benefiting from the accuracy and convenience of their keygloves. In that regard, it is also noted that the structure of the aforementioned keygloves can easily be extended to incorporate small keyboards mounted within the back-sides of the keyglove material. Such keyboards would have a limited set of keys containing macro-information extending beyond letters, numbers, or symbols. Such macro-keys would be particularly useful for operating menu-driven software, that would have been downloaded in the keyglove computing unit(s), from a foldable mini-screen mounted within the back-side of the keyglove material. Keygloves with such a functionality could be quite appropriately named "servi-keygloves". The computing capabilities (e.g. calculator) of the "servi-keygloves" would allow the employees to know more readily, for example, how much money they make for the restaurant and how much tip they receive daily. The interactive nature of this "keygloving" process would help to track difficulties as they arise, and respond to them more efficiently.

Organizer/Scheduler Keygloves

The keygloves also provide professionals with convenient (electronic-based) organizing/scheduling capabilities. The internal (central) processing units of the keygloves, or their capabilities of remote login in computer mainframes or powerful databases, can indeed facilitate workload organization and appointment scheduling towards more efficiency and productivity. At nearly any time and any place, businessmen or other professionals can access electronic mail at their finger tips, and communicate nationwide, or even worldwide, with their clients and colleagues.

Travel Keygloves

The electronic keygloves are particularly attractive for the traveler in search of practicality and freedom. The traveler wearing these keygloves will indeed be able to find his/her directions in a foreign country, or even find the shortest path to his/her destination in an unknown area. The travel keygloves will also provide instantaneous access to the needed foreign vocabulary, i.e. right at the traveler's finger tips, and provide a myriad of practicalities such as daily update of currency exchange, etc. The traveler will also be able to gain precious cultural information that will make the journey more meaningful and enriching, and thereby more enjoyable.

Teacher Keygloves

Teachers would also benefit from the keygloves to do their lesson plans more efficiently, keep their students' records at hand and up-to-date, and monitor the progress of each one of them more closely. With the help of the keygloves, teachers could give to their students the needed feedbacks at nearly any time, and nearly anywhere. Students would therefore also have easy access to their own records, and be more likely to develop a stronger sense of responsibility for their own work. The objective feedbacks provided to both teacher and student would be of great value towards genuinely identifying areas for self-improvement, and bring more fairness and dynamism to the teacher/student interaction.

"Self-Learning/Self-Expression Keygloves"

Figure 41A:
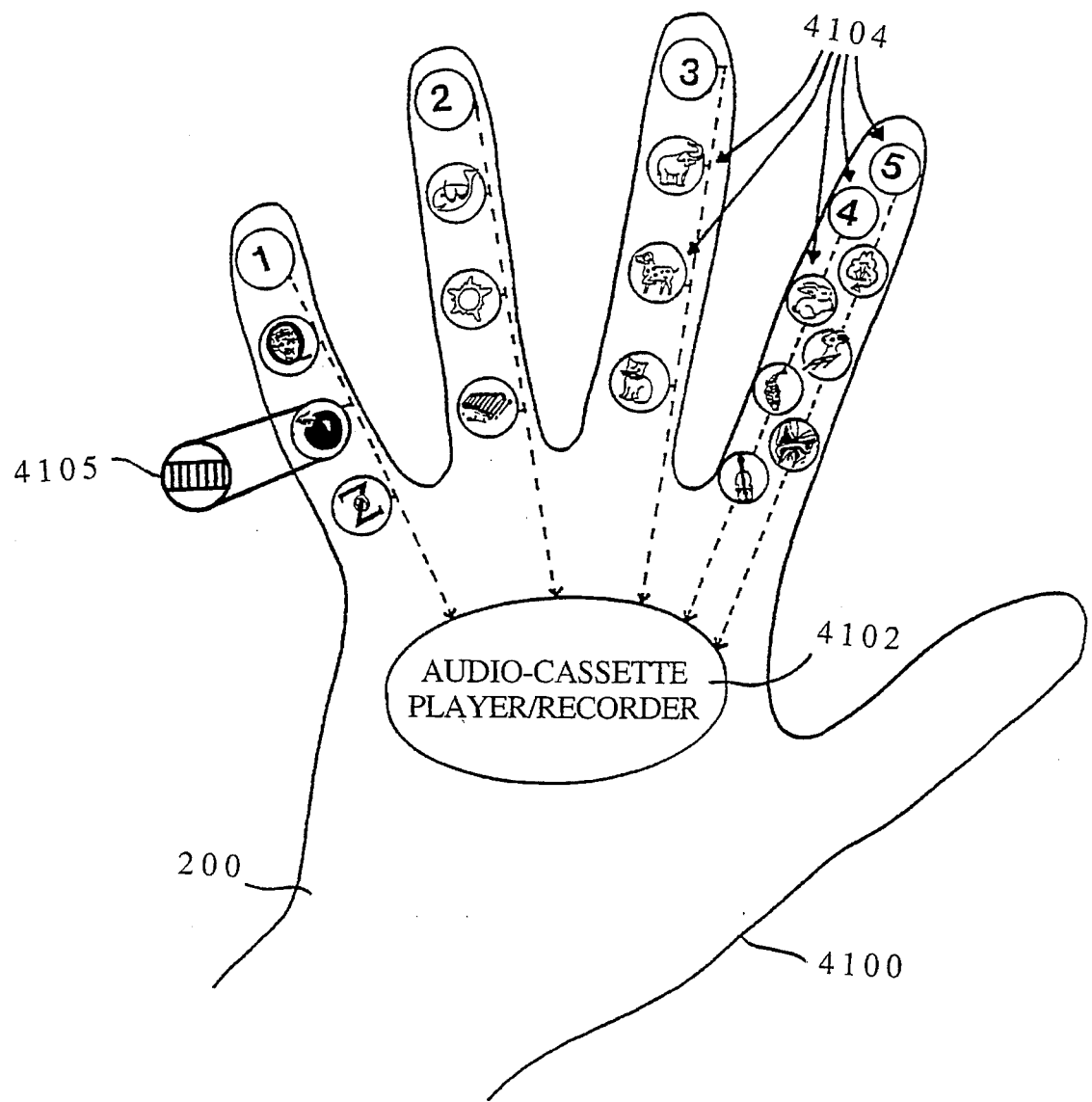
Figure 41B:
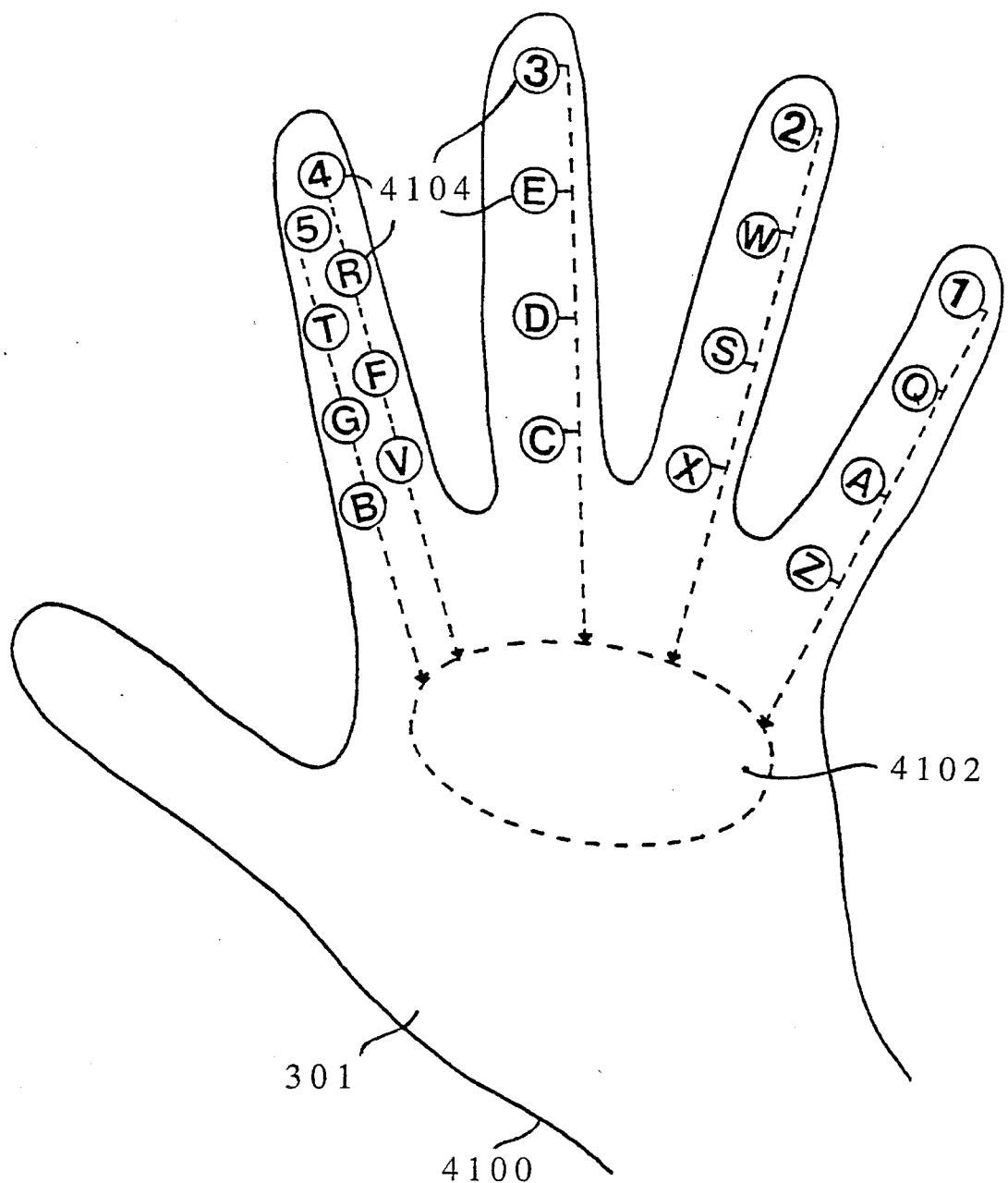
Figure 41C:
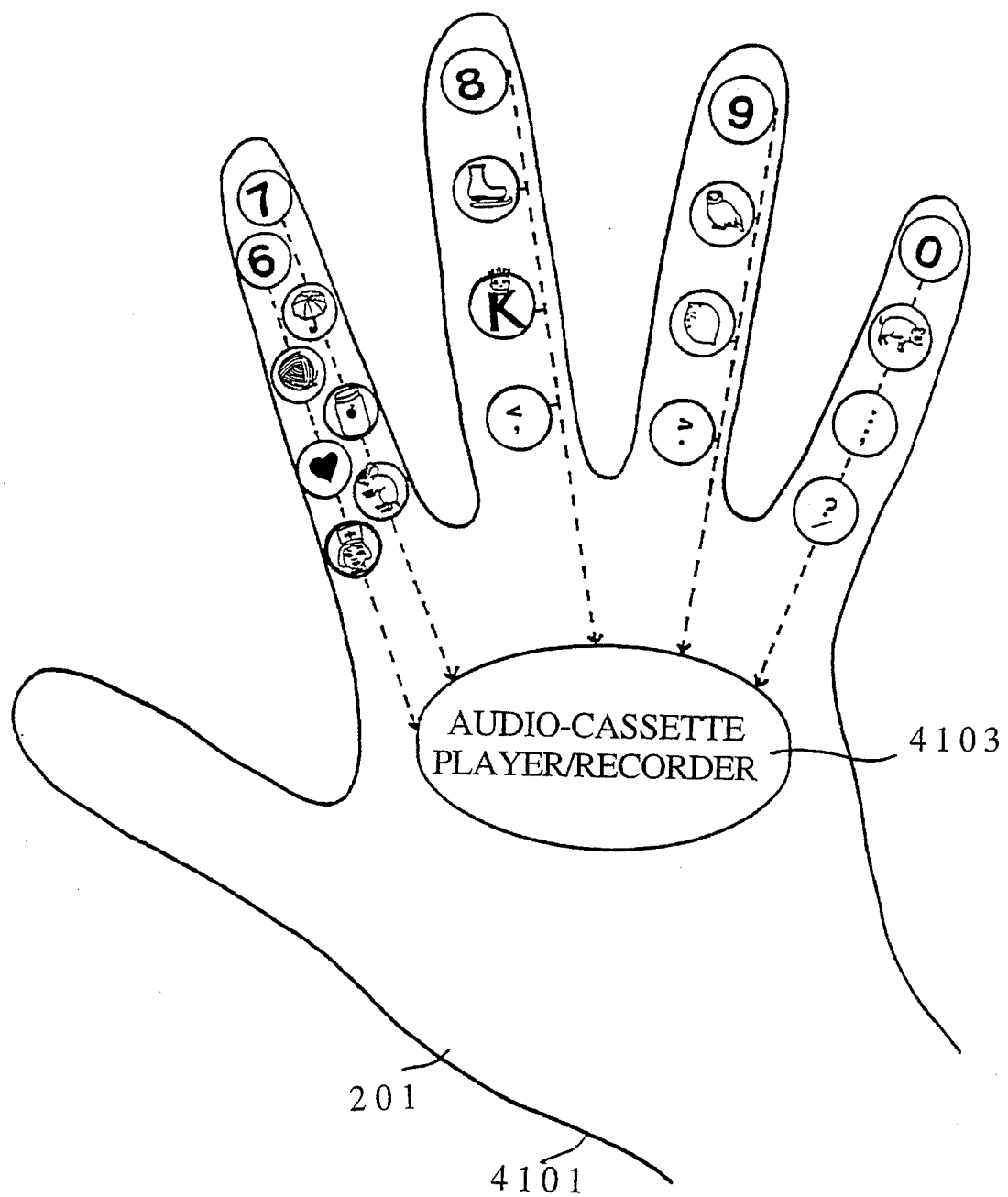
Figure 41D:
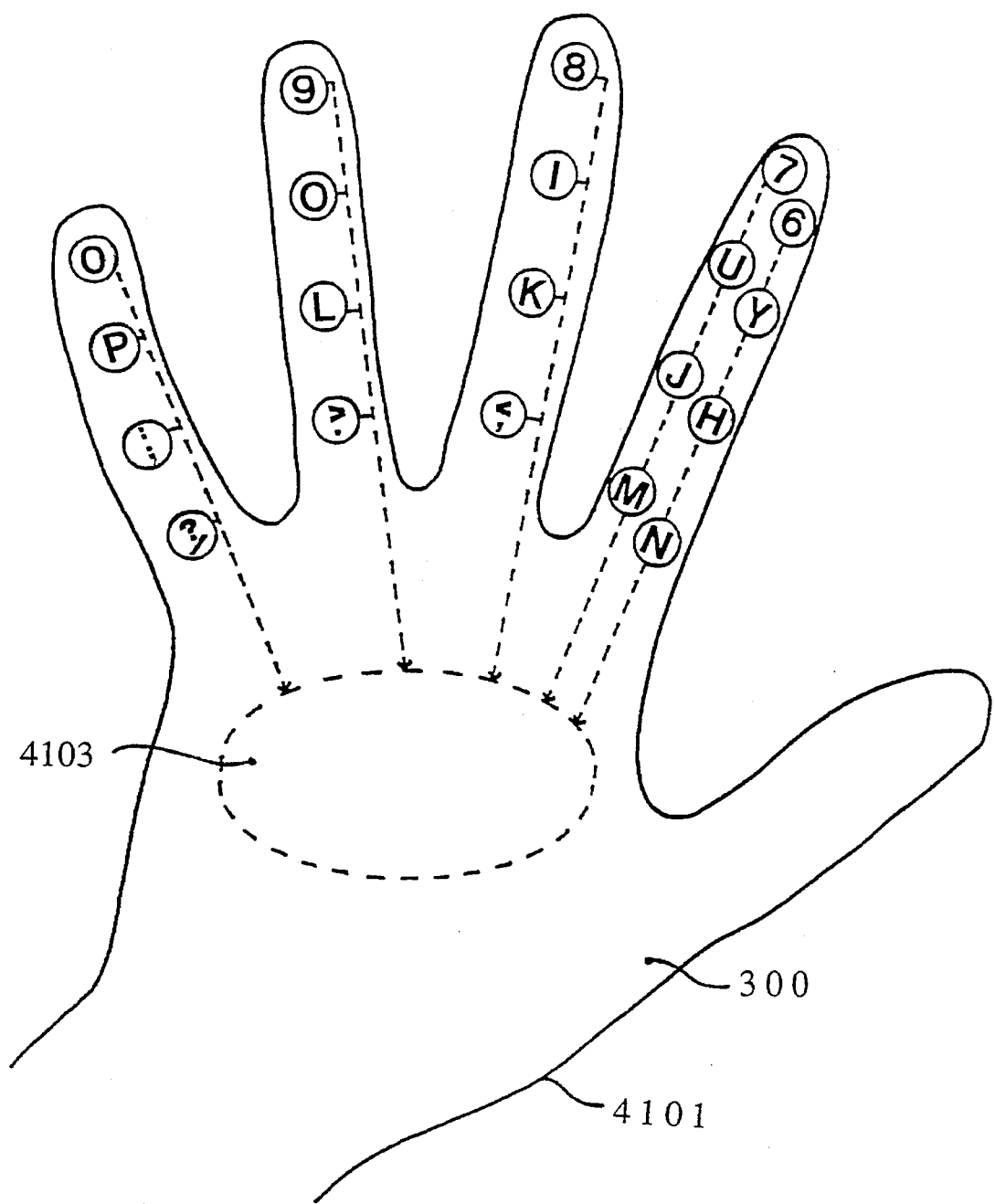
Figure 42A:
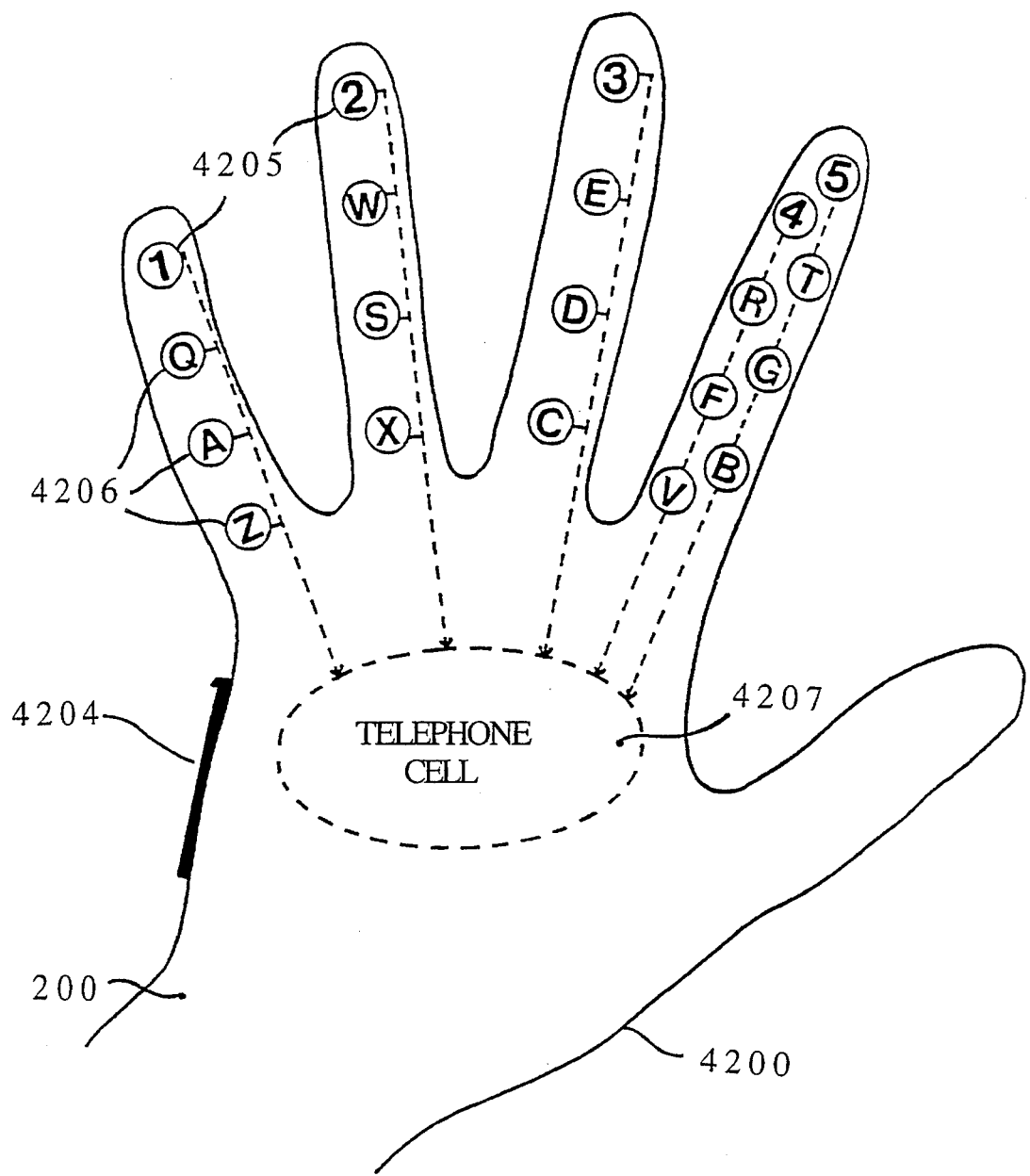
Figure 42B:
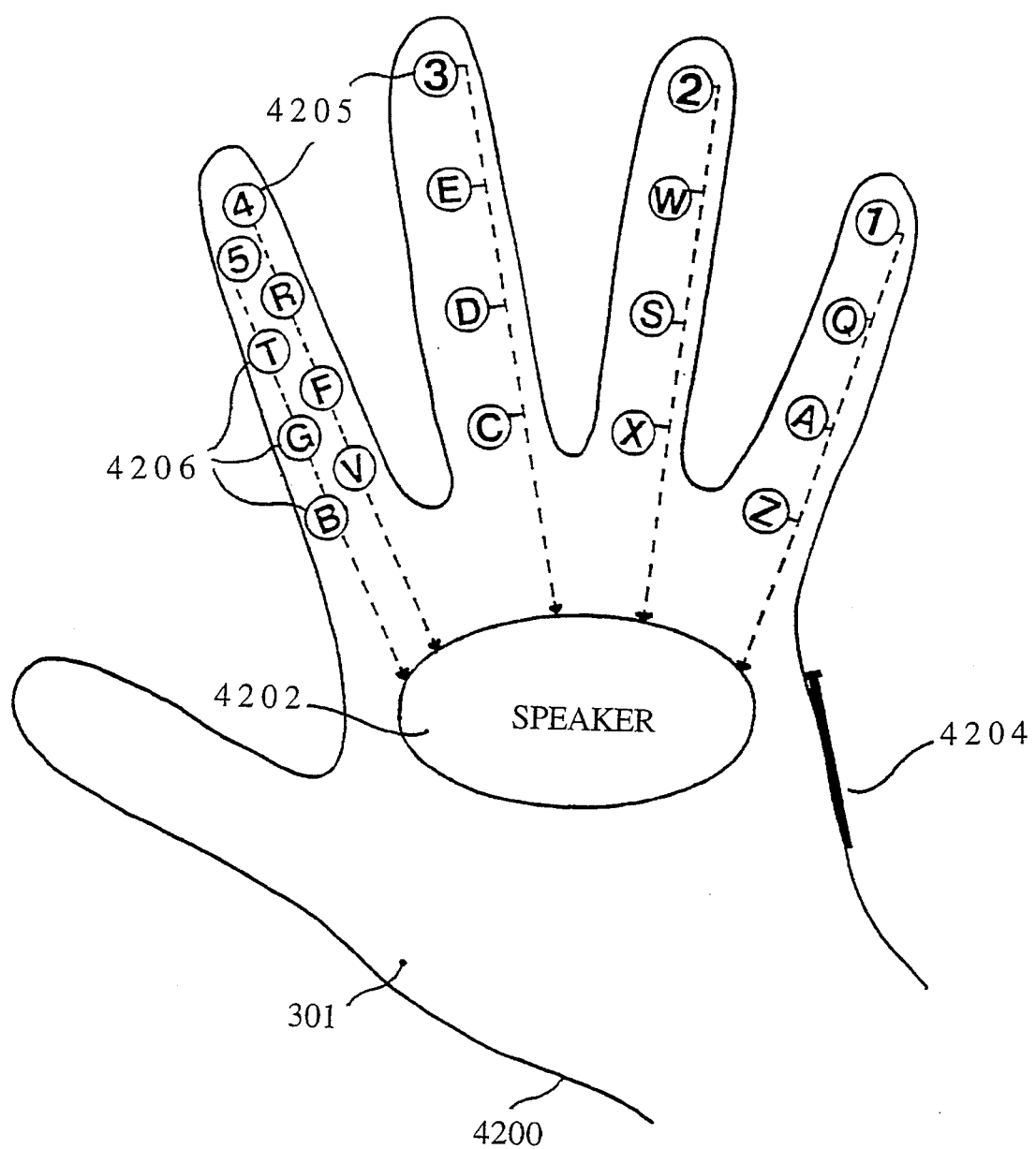
Figure 42C:
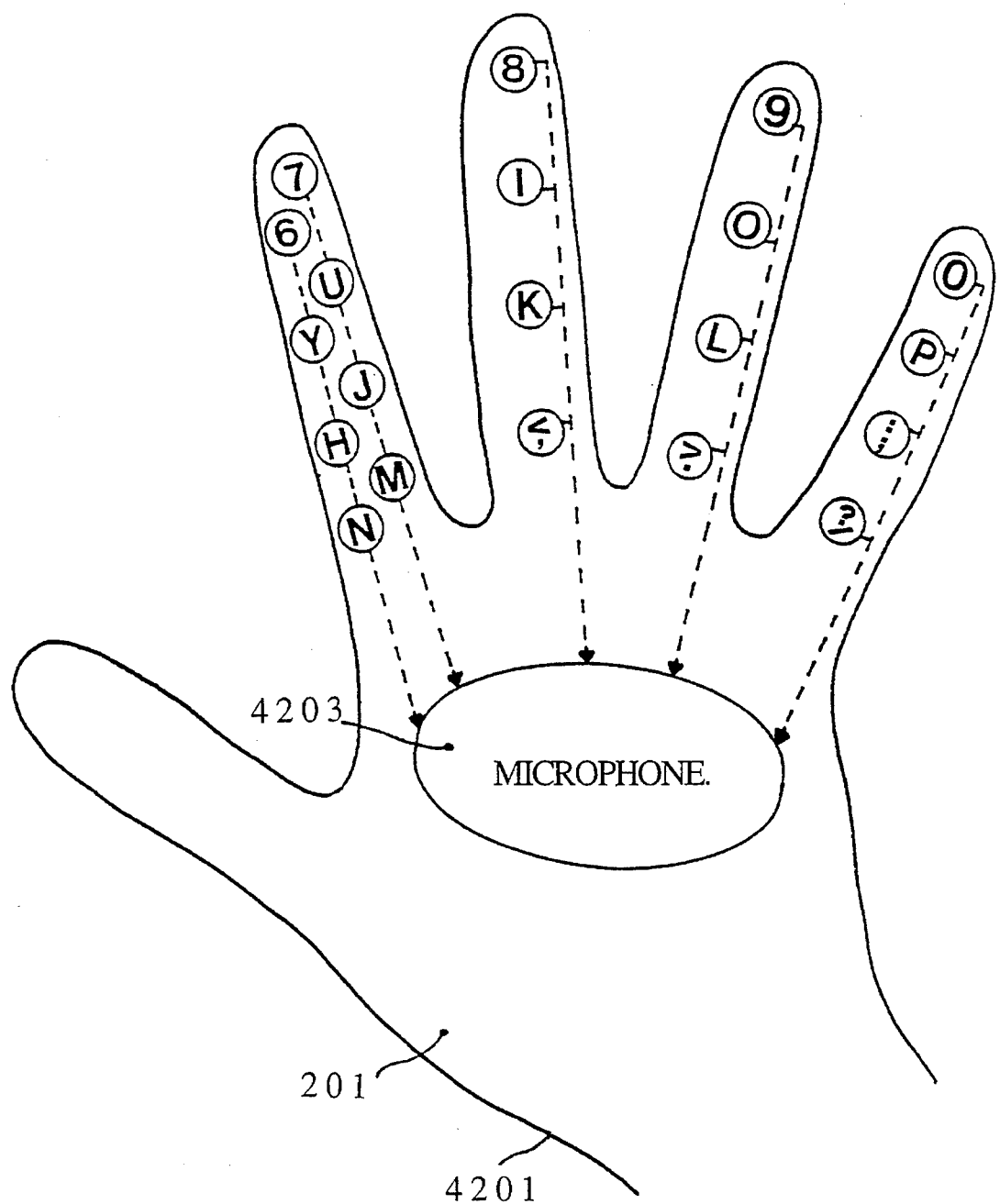
Figure 42D:
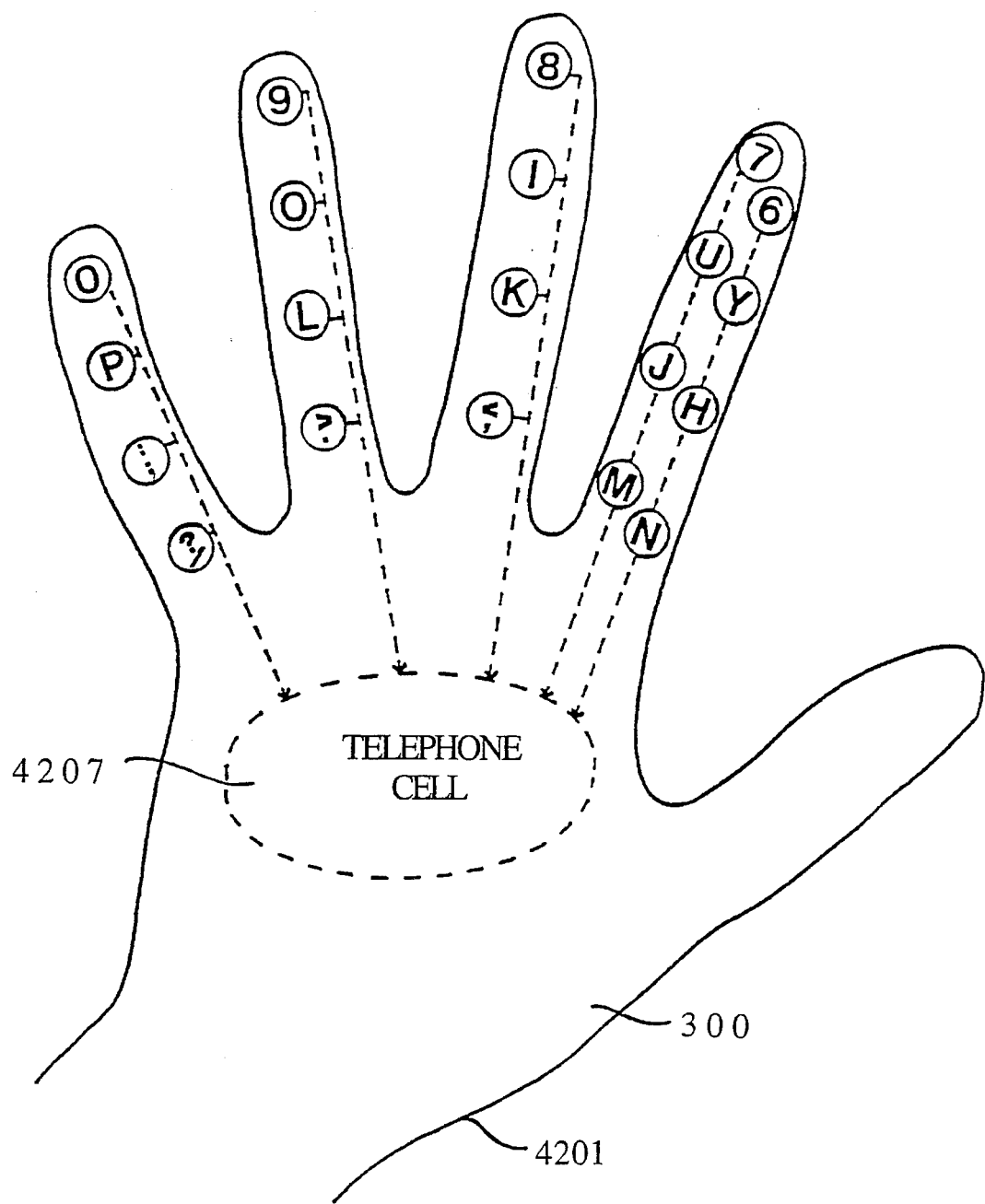

Teenagers and school age children who would not have benefited from the picture-gloves at a very early age can still pleasantly learn the key-finger assignment of the keyboard by wearing keygloves having keys that are connected to audio-cassette player(s)/recorder(s). These keys are mounted within the glove material of the back-side and/or the palm-side of the fingers of the keygloves. Sets of keys that are mounted within the back-side and the palm-side of the glove fingers are mirror-images of each other with respect to the median plane of the two planes defined by the palm portion and the back portion of the same glove. Keys that are mirror-images wear indicia that correspond to the same letters, numbers, or symbols. In the illustration of FIG. 41, the keys mounted within the back-sides 200 & 201 of the glove fingers carry images or three-dimensional forms defining people, animals, or objects whose names begin the letters that characterize the mirror-image keys mounted within the palm-sides 300 & 301 of the glove fingers. For example, a whale is shown on the first phalange of the back-side 200 of the ring finger of the left keyglove 4100 (FIG. 41a), and the letter "W" is shown on the corresponding mirror-image key in the palm-side 301 of the ring finger of the left keyglove 4100 (FIG. 41b). The keys of both keygloves are connected to two audio-cassette players/recorders 4102 & 4103 mounted within the back-sides of the left hand keyglove 4100 and right hand keyglove 4101 respectively. In order not to hinder the holding and grasping capabilities of the hands of the teenager/child wearing the keygloves, the keys can be implemented as two-position switches 4104 that can only be switched "on" or "off" through twisting lateral motions of the fingers as illustrated by the side view 4105 of FIG. 41a, as an alternative to tactile pressure perpendicular to the glove surfaces. The (first) set of keys with indicia that are mounted within the back-side of the keygloves also provide a pictorial representation of the (second) set of keys with indicia that are mounted within the palm-side of the keygloves. It is therefore natural to characterize the first set of keys as "information output set", and the second set of keys as "information input set". For example, when the "Apple"-key of the left keyglove of FIG. 41a is switched-on, the left audio-cassette player is activated, and provides the child/teenager with some information relating to the "Apple". More generally, such key-related information can be pre-recorded on audio-cassettes in the form of spoken words, sounds, or musical tunes relating to the corresponding keys. Pre-recorded sounds are characteristic of a person, animal, or an object whose name begins with the letter of the key being activated. Pre-recorded musical tunes can be uniquely associated to individual keys in order to simultaneously provide the learner with opportunities of developing musical skills. When the "A"-key of the palm-side of the left keyglove of FIG. 41b is switched-on, the left audio-cassette recorder is activated, thereby giving the child/teenager an opportunity to self-express, and record his/her own knowledge gained about the letter "A", the "Apple", or any other name starting with an "A". Such a "local" information exchange (providing definitions and characteristics) is complemented by a "global" information exchange (towards creating/developing associations), whereby:

1) switching-on the back-side keys carrying numbers activates the cassette players to play stories dealing with the characters represented by the indicia that are mounted on the same glove fingers;

2) switching-on the palm-side keys carrying numbers gives the child/teenager the opportunity to self-express by telling and recording his/her own story about the characters represented by the indicia shown on the corresponding mirror-image keys. For example, activating key number 2 in FIG. 41a (back side) would play a story about a "Whale", a "Sunshine", and a "Xylophone"; whereas activating key number 2 in FIG. 41b (palm side) would record a story uniquely created by the learner about a "Whale", a "Sunshine", and a "Xylophone".

"Need-Adaptive Health-Keygloves"

The aforementioned keygloves could also be used as a convenient and practical means of information exchange between patient and care-taker whereby pre-recorded audio-cassettes could be both plaid and recorded by the patient following a time-schedule indicated by key-indicia. For example, the number-keys at the tip of the glove-fingers could index the days of the week, i.e. "2" for Tuesday, or the months of the year, i.e. "3" for March. The other indicia could be used to index the partitioning of the corresponding time periods. For example, if the number-keys indicate days, the other indicia could indicate "Morning" (first phalange ), "Afternoon" (second phalange), and "Evening" (third phalange). If the number-keys are chosen to indicate months, then the first phalange key could indicate the first ten day period, the second phalange key the next ten day period, and the third phalange key the last ten day period. As previously, the number-keys are used for global information exchange, i.e. at the level of a day, month, etc. For example, if the number-keys indicate the days, the patient activating key number 2 on the back-side of the ring finger of the left keyglove would hear recommendations, prescriptions, or medical advice from the care-taker concerning Tuesday. More specific health-care information about Tuesday morning, Tuesday afternoon, and Tuesday evening would be provided to the patient by activating the first, second, and third phalange keys on the back-side of the ring glove finger respectively. In return, the patient could express his/her feelings and health-care information relating to his/her condition by activating the mirror-image keys located on the palm-side of the ring finger of the left keyglove. Due to their functionality, these keygloves are referred to as "health-keygloves". Besides facilitating information exchange between patients and care-takers, these "health-keygloves" have the potential to also establish and strengthen new avenues of interaction between the five entities of Patients, Nurses/Doctors, Hospitals, Public Communities, and Educational Settings unveiled in the need-adaptive management model of health care disclosed by the author in 1987.

"Keygloves as a Practical and Convenient Tool for Psycho-Motor Training"

Once the young learner has memorized the locations and functions of the keys with the help of the picture-gloves, he/she can be further assisted in developing the psycho-motor skills needed for "keygloving" with the help of audio-visual-tactile-motor-olfactory aids that are mounted on the keygloves. Keygloves having such a functionality are referred to as "psycho-motor training keygloves". The psycho-motor training keygloves comprise a set of keys mounted within the palm-sides of the keyglove fingers, and logically connected to a set of actuators-with-indicia mounted within the back-sides of the keyglove fingers. Both sets of keys and actuators are mirror-images of each other with respect to the median plane of the palm-side and back-side of the corresponding keygloves.

As the learner strikes a key by application of light tactile pressure to the corresponding finger, the actuator which is the mirror-image of that key is activated, thereby indicating to the learner, by means of the aforementioned aids, which key is being struck.

Audio aids are mounted within the glove material by means of pre-recorded words, sounds, and/or musical notes or tunes relating to the keys being struck. Pre-recorded spoken words would include the letters characteristic of the keys being struck, or the names of people, animals, or objects beginning with these letters, or even stories about such people, animals, or objects. Pre-recorded sounds would be characteristic of people, animals, or objects whose names begin with the letters of the keys being struck. While pre-recorded or pre-programmed musical notes or tunes would assist the psycho-motor development of the learner, they would also provide said learner with opportunities of developing musical skills. Such keyglove audio aids would be especially practical for visually-impaired learners.

Visual aids comprise lights with colors that are characteristic of the corresponding mirror-image keys. All lights corresponding to the keys mounted on the same glove fingers have the same color, and lights corresponding to keys mounted on different glove fingers have different colors. When the corresponding keys are being struck, these lights are switched on, and can also illuminate the inside of a two-dimensional representation of the key letters or the inside of three-dimensional forms/structures which form/structure names begin with the said key letters. Lights with strong intensity would facilitate the learning of keygloving by amblyopic people.

Motor aids comprise small boxes that are mounted on the back side of the glove fingers. These boxes contain three-dimensional objects mounted on springs that are attached therein. Anytime the learner strikes a key, the lid of the corresponding box is released, which makes the three-dimensional object pop out the box. In a low level implementation of these tactile-motor aids, the released box lids can be closed by the learner by folding the popped-out object back into its box, and by subsequently locking the box lid with a clipping switch. In a high level implementation of these aids that would be more appropriate for older children, the mechanically activated switches would be substituted by electronically activated switches allowing the three-dimensional objects to pop out and then go back automatically into their boxes (without requiring the learner to push them back in manually). The power needed by such electronic implementations could either be provided by small chemical-based batteries or by small devices enabling the transformation of the heat of the hands confined into the keygloves into electrical/mechanical power.

Tactile aids comprise actuators applying mechanical or electrostatic pressure on the skin of the learner's fingers anytime the learner strikes the corresponding keys that are mirror-images of the associated actuators. Such tactile aids would be of particular benefit for blind people.

Olfactory aids comprise actuators releasing scents that are characteristic of the keys being struck by the learner. All scents corresponding to the keys mounted on the same fingers are identical, whereas scents corresponding to keys mounted on different fingers are different for identification purposes.

Therapeutic Keygloves

The functional input/output synergy of the aforedisclosed keygloves can also be implemented in sets of gloves, referred to as "therapeutic keygloves", to assist pregnant women in facilitating their labor and delivery. The vital signs of pregnant women are to be measured for diagnostic purposes, and actions are to be taken on the basis of the results of the diagnosis [8]. In the same Ref.[8], the degree of integration of the data processing of the sensor measurements was identified as a potentially significant factor in enhancing precision, and thereby the quality of the overall diagnostic process. The disclosed "therapeutic keygloves" precisely achieve that goal by providing an integrated framework for the processing of the sensor measurements. Micro-gauges (playing the role of "keys") are mounted on and/or within the glove material to measure four of the vital signs identified in Ref.[8]:

1) blood pressure (systolic/diastolic);
2) pulse;
3) skin temperature;
4) galvanic skin response.

The fifth vital sign identified in Ref.[8] as being 5) behavioral response, can be "measured" through facial expressions of the mother during labor contractions. These facial expressions can be filmed by a fixed camera, and interpreted by a neural network that would have been previously trained to associate the facial expressions of the mother with her inner feelings, i.e. joy, pain, relief, etc. The output of the "behavioral neural network" is nearly instantly transmitted (preferentially through radio-waves) to a central processing unit, which is either external to the keygloves, or internal to the keygloves if the degree of electronic integration (VLSI/ULSI) permits it. The measurement sampling and the data processing would alternate during a predetermined number of labor contractions [8]. The interpretation of the five sampled measurements, i.e. the automated diagnosis phase, could be achieved by means of a (neuro)-fuzzy system (expected to lend itself to a high degree of integration) possibly mounted within the material of the keygloves themselves. This system of expert therapeutic keygloves would therefore be substituted to a human expert for the diagnosis purpose. It is yet emphasized that machines will not substitute the human touch, but rather help the husband to better know when and how to provide the touch treatment to his wife. Far from eliminating the human aspect of the care, the expert therapeutic keygloves will actually enhance it by saving the time of the attending professional, thereby allowing a better quality service to both mother and baby. Audio mini-cassette player/recorder connected to the central processing unit would be programmed to play musical tunes with self-adjustable intensity, or tell jokes or funny stories, depending upon the mother's condition as assessed by the automated diagnosis process. During the antepartum period, the parents would become familiarized with the use of these therapeutic keygloves, e.g. under Lamaze classes supervision. They would learn how to best utilize this device to breathe, laugh, and enjoy the process of child bearing (and later child rearing) as a truly memorable experience. The initial acquaintance phase with the device could also be facilitated by complementing the electronically automated diagnosis process of the keygloves by "lower level" devices mounted within said keygloves to indicate variations in the stress of the user through gradual color changes on the keygloves. During labor and delivery, the mother will then fully benefit from the "soothing" effect of the keygloves in terms of soft musical tunes, jokes, and funny stories, and by laughing and/or being relaxed, contribute to the dilatation of the cervix. The recording capabilities of the mini-cassette player/recorder will "immortalize" the mother's breathing during labor and delivery, the excitement of mother and father on the arrival of the baby, and the first cry of the baby. These will be there later for all to hear and enjoy, while looking at the filmed scenes of the delivery process (like a family album).

The inner material of the keygloves will comprise an insulator surrounding all electrical components. The keygloves will be manufactured so as to be safe, washable, and desinfectable. A possible, yet non restrictive, embodiment of the external surface could be that of a water-proof and smooth plastic material. The keygloves can also be made isothermal through thermo-regulating devices mounted therein, whereby heat is transformed in electrical power to be consumed by the keyglove electrical inner components.

Keysocks

All the aforementioned implementations of the disclosed keygloves can be readily extended in scope and functionality to socks to be worn on the feet of a user, and denominated "keysocks". Keysocks can provide the functionality of all the aforementioned keygloves to a learner/user who cannot benefit from the use of the hands, or in situations where it is more desirable and practical to have the hands free, e.g. the use of therapeutic keysocks for mothers in labor and delivery.

Self-Expression/Picture Gloves

As the educational process evolves, the school age or teenager will progressively develop a feeling of companionship for his mnemonic gloves which will have provided him with comfort, security, and so many joyful experiences throughout the difficult stages of his growth and development. Next to, or during the adolescence, the school child or teenager experiences one of the most challenging physical and emotional transformations of his life. Much is therefore to be gained from an educational device such as the Self-Expression/Picture gloves of FIG. 10 to alleviate the pain of this stressful transformation by encouraging the self-expression of the school child or teenager. As seen in FIG. 10, the Self-Expression/Picture Gloves are most simply understood as the following extension of the Word-Spelling/Picture Gloves of FIG. 8: the removable pictures on the back side of the gloves can now include the photos 1000 of people having a direct impact on the life of the school child or teenager, e.g. father/mother or brother/sister, and the photos of pets or familiar objects. The real names 1001 of the said people, pets, and objects are written in the corresponding finger location of the palm sides of the gloves.

By creating a real life-like situation, yet far less threatening than in reality, the self-expression/picture gloves will help the child/teenager wearing the gloves to express stressful feelings or emotions that would otherwise be difficult to verbalize. The child/teenager would then be encouraged to express himself freely, yet within the limitation of the keyboard, which would also reinforce the memorization of the keyboard.

METHOD OF SELF-EXPRESSION AND/OR THERAPY

A process-oriented method based on the previously disclosed concept of picture-gloves is now proposed to help the care giver understand the child and help him/her learn the needed coping skills, whether physical or psychological, through self-expression. The method comprises successive individual stages adapted to the child's age-group and specific needs or condition.

In the first stage of the method, the child's attention is focused on his hands and his fingers through the set of four cards 1900 depicted in FIG. 19. Each card 1900 represents both a left hand with its thumb and only one finger, and a right hand with its thumb and only one finger (functionally identical to that of the left hand). Both fingers are colored like the corresponding color-coded keys of the keyboard (to be struck by said fingers). The purpose of these cards is to initiate a bonding between the child's "mind" and "hands", through the discovery process of:

1) realizing the symmetry/asymmetry of the hands, and the fingers;
2) identifying and differentiating the fingers in terms of similarities/differences to unveil their individual and collective potential;
3) freely activating each individual finger of both hands;
4) associating the fingers with given colors (chosen to match those of the key-finger assignment);
5) becoming aware of the interrelationship of all the fingers.

As a result, the cards 1900 of FIG. 19 will also help to diagnose any color vision impairment, sensory-motor impediments, and lack of motion coordination. When all the cards are superimposed over one another, they give rise to representations of fully fingered left and right hands, with the color matching of the key-finger assignment of the keyboard[5]. Through this simple process, the child is made aware that his fingers are independent physical entities, and at the same time are functionally dependent upon one another to give to the hand its marvellous gripping capability. This indirectly exposes the child to the dynamics of interdependency, as a tool to be used in his problem-solving and later for practising the art of compromise[6].

[5] "Trudy's Short Stories", Farideh Troudet, Vantage Press. Inc., New York, 1993.
[6] "A Need-Adaptive Model of Nursing Practise", Farideh Troudet, Ph.D. Thesis, CPU, 1987 (University International Microfilms).

The introduction of colors among fingers not only prepares the child towards keyboarding, but, may be more importantly, sets the foundations for establishing a framework in his learning environment. The thumbs represented in each card are left free of illustration to provide the youngster with self-expression outlets, and hidden opportunities for growth through self-improvement. This will inspire the child to accommodate the constraints of life without suppressing one's own potential, and thereby help one to grow creative through the simultaneous practise of vertical and lateral thinking[7].

[7] "Can Creativity Be Taught", Farideh Troudot, Cleveland State University, 1988.

In the second stage of the method, the child is first provided with a second set of cards comprising a subset of picture-finger cards and a subset of picture-thumb cards. Some cards are also left blank (i.e. without pictures) for allowing the child to do his own drawing if so desired or needed.

The subset of picture-finger cards 2000 depicted in FIG. 20. is an extension of the first card set (depicted in FIG. 19), where each finger is replaced by a color-matching illustration representing a person, an animal, or object, or the photo of a family member or family friend whose name begins with a letter corresponding to the key-finger assignment of the keyboard. As in the example of FIG. 20, the picture of a Whale 2001 is shown in place of the ring finger of the left hand, and the picture of a Mouse 2002 is shown in place of the forefinger of the right hand. This subset of cards 2000 is accompanied by a set of small thin labels 801 (of paper or very soft plastic) showing the same card illustrations. The size of these small thin labels 801 is such that they can be easily slipped into the inserts 802 that are mounted on the adaptive picture gloves, e.g. as disclosed in FIGS. 8–9.

The subset of picture-thumb cards 2100 depicted in FIG. 21 is also an extension of the first card set (depicted in FIG. 19) without any finger, and where the thumb is replaced by an illustration 2101 representing a person, an animal, or an object. As in the example of FIG. 21, the picture of an unhappy face 2101 has been drawn in place of the thumb of the left hand (21.a), and a heart 2101 is shown in place of the thumb of the right hand (21.b). This subset of cards 2100 is accompanied by a set of small puppets 2200 (FIG. 22) to be worn on the corresponding thumbs of the hands, and referred to as thumb-puppets.

The care giver would then suggest the child to choose the cards 2000 & 2100 of the second set that he prefers the most, and those that he dislikes the most. The child would then self-express by talking (e.g. in front of a tape recorder), or writing on the blank part of the cards (which corresponds to the back portion of the hand), about what he likes or dislikes about these cards. This will also give the child the opportunity to ask questions about the card pictures if so desired. The chosen cards will also be dated, and numbered in the order they will have been picked up by the child. Once the child has expressed and talked about the motivation behind his choice, the care giver identifies the small thin labels showing the same illustrations as the chosen cards. These thin labels are subsequently slipped into the inserts of a pair of picture gloves following the key-finger assignment of the keyboard. The care giver then gives to the child this personalized pair of gloves showing the uniquely chosen illustrations. He then suggests the child to choose two thumb-puppets among an exhaustive display: for example, one puppet with which the child identifies himself, and another puppet with which he identifies someone or something playing an important role in his life. The two thumb-puppets are given to the child to be worn in synergy with his adaptive picture-gloves. FIG. 22 depicts a pair of adaptive picture gloves and two thumb-puppets 2200 for the choice of picture-finger cards 2000 of FIG. 20 and of the picture-thumb cards 2100 of FIG. 21.

The first stage of the method addressed the acquaintance and learning process of the child with this new device. The second stage of the method strives at unveiling the child's self-expression and initiating the dialogue with the care giver, through the feelings of comfort and togetherness provided by the picture-gloves (at home, before sleeping), and the excitement of the thumb-puppets. These are key factors for motivating him to create, in his own privacy, the stories that best reflect his feelings about the characters that are represented on his personalized gloves. At the next interaction with the care giver, the child will be asked to tell his newly created story, and even encouraged to play it by moving his fingers accordingly. This will give the child the opportunity to express his feelings of happiness and joy, as well as pain, sadness, and sorrow; in order to release his stress. At the same time, the care giver will gain precious information to help the child's growth or recovery process though positive reinforcement and timely questioning within the on-going dialogue. Following every interaction, the child will be asked to choose within a new second set of cards those that he prefers the most, and dislikes the most. The labels of the child's adaptive picture gloves will be changed accordingly. New labels will be added, or will replace the old ones, leading to new gloves for motivating the child to create new stories towards further self-expression. These picture gloves will evolve in form and substance according to the child's growth process, like a moulting where a new skin is grown and the old one is shed to accommodate for the growth of the mind and the body. The ritual of taking off the old gloves and putting on the new ones would allow the psychological detachment needed by the child to liberate himself with respect and dignity from any unhappy memory. (The resulting growth would indeed free the mind, thereby facilitating a more objective appreciation of reality). This is the time when he learns how to compromise, i.e. by seeing the benefit of synergistic interaction as a growth process. To further motivate self-expression, the child could be provided with a tape recorder to record the stories that he has created in his own privacy. Such tapes would allow to detect revealing changes in the child's voice and feelings as expressed through the stories, changes which otherwise might have gone unnoticed. By witnessing the evolution of his voice and feelings, the child will be encouraged to gain a more global perspective, and not to overfocus on his frustrations. These picture gloves can also help towards psychological detachment, by allowing the child who wears them to punch or pound the pictures that are associated with bad feelings. The child could also hard-stuff the fingers of his/her picture gloves while talking about his/her own frustrations, and subsequently seal the gloves, write the date on them, and keep them for ever as a sign of victory over his/her own frustrations. By seeing himself more detached from his own frustrations, the child can gradually put them aside, and thereby avoid falling into the extreme cases of obsessive behavior or indifference.

These gloves are a safe and healthy outlet for the child. They give him the opportunities to not only get rid of what he is not happy about, but also to gradually shed off his negative feelings, retain the good ones, and invest on them towards becoming a more complete person in terms of sensitivity, skills, and maturity. With a freer mind, the child would then be ready to make new goals, and fix new objectives for himself.

The third state of the method is the culmination of the program towards problem-solving, conflict resolution, and hope building. This stage is to take place once the child has gained the adequate knowledge (e.g. of the key-finger assignment), and has acquired the thinking skills that can allow him to appreciate the situation or the conflict with all the expected objectivity. The youngster will then be oriented towards problem-solving by being guided to asses the situation, reasonably anticipate the consequences of each choice or alternative, and choose the "best compromised" outcome. This orientation process will also take place gradually, with a third representation of the picture-gloves given by the third set of cards 2300 illustrated in FIG. 23. The third set 2300 is an extension of the second set 2000 & 2100 where the pictures are no longer constrained to be on a pre-assigned finger (e.g. as in the key-finger assignment), but are placed onto the thumbs previously left blank. In the example of FIG. 23, the picture of a queen is shown in place of the left thumb, and that of a king is shown in place of the right thumb. Since the purpose of such cards is of of course to encourage the child to tap his own potential and imagination towards problem-solving, there are cards with one or two thumbs left in blank for the child to draw or write his own idea(s) and hope(s) for the future. The second set of cards used the constraints of the key-finger assignment of the keyboard as a constant reminder for the child to accept the limitations of reality, and not to seek refuge in unproductive dreams, lies, or denials. The thumb-extension in the third card set 2300 reminds the child that it is equally important to use constructively his own imagination as a way of creating dreams for the future. Experiencing the duality of the second and third card sets will help the child to reach his own balance between the limitations of life and his own aspirations. In essence, the thumb-extension is a physical support for positive thought projection into the future, towards making new goals, and fixing new objectives. At this final stage of the method, the card illustrations which express the child's view of the present and his hope for the future can be screen-printed on the picture gloves, as symbols of his successful growth and development. In analogy with the concept of "security-blanket", these gloves may become "security-gloves", and remind each adult of his courage when coping with the problems of his childhood, thereby also helping conflict resolution later in life. They may even inspire the next generations when parents and grandparents will show to their children how they courageously coped with the problems and conflicts of their own childhood and adolescence.

It is noted that the aforementioned representations of people, animals, or objects used to facilitate the child's self-expression are not limited to a card set embodiment. Such representations could be implemented in any other type of medium, from soft material to computer software where the child could choose among computer generated pictures or even draw his own on the computer.

This method of self-expression will be of high value for therapists, doctors, nurses, in clinics and hospitals to deal with children in the most pleasant and nurturing dialogue towards a more healthy communication and healing.

The ritual aspect of this method through the wearing of the gloves is a key factor to instill a bonding between the child's "mind" and "hands", towards making out of him not only a more educated but also a more sensitive and compassionate human being. The child's sensitivity could be indeed nurtured through caring massages[8] of his hands with a soft refreshing cream prior to wearing the gloves at night. By subsequently wearing his picture gloves, while listening to a soft low music, the child would experience feelings of comfort and togetherness that would last long after he would fall asleep. There are striking similarities between the feelings of comfort provided by the picture-gloves through the detachment from daily unpleasant experiences, and the feelings of the mothers after delivery. Like mothers only remember the joy, and not the pain of the delivery process, the children will always remember the soft warm feeling of their gloves and the accompanying music, and not the unpleasant feelings of the day.

[8] "The Effect Of Controlled Breathing And Supportive Physical Touch Upon Women's Responses To Their Labor Contractions", Farideh Farahbod, Master Thesis, University of Utah, 1979.

The benefits of this method of self-expression enjoyed by the child can serve as motivator factors to enhance learning and develop new skills. For example, the child can be made aware of the similarity or analogy between what this method of self-expression does to the brain and what physical exercise does to the body. This method of self-expression helps the brain to get rid of its toxins, e.g. in terms of lies, denials, or any other unhealthy defense mechanisms, and replaces them with objectivity and honesty. Just like physical exercise helps the body to get rid of its toxins, in prevention of illness and disease, this simple therapeutic method will not only promote mental hygiene, but it will also motivate the child to keep thinking of his hands as beautiful, functional, and productive.

Some teenagers are confronted with early pregnancy, drug abuse, sexual abuse[9-10-11], etc. . . as the results of many unexpressed and unresolved frustrations leading in some unfortunate circumstances to suicide or gun-fire. This method will be of great value in dealing with such problems, and demonstrating that these adaptive picture Gloves are ultimately more powerful than Guns in replacing Violence by the Victory of wisdom.

[9] "A Tentative Proposal To Answer The Problems Of Teenage Pregnancy", Farideh Troudet, Cleveland State University, 1988.
[10] "A Tentative Proposal Of Health Promotion", Farideh Troudet, Cleveland State University, 1989.
[11] "A Cost-Effective Educational Tool To Generate Dynamic Interactions Between Parents And Teachers", Proposal submitted to the Principal of Mayfair Elementary School, East Cleveland, based upon the School-Parent Survey of April 1990, and to the Supervisor of Early Childhood Education Principal, 1992.

By guiding problem-solving and conflict-resolution through constrained learning and free self-expression, the benefits of this dynamic method can be as far-fetched as the innovation of interdisciplinary educational programs.

Teenagers & Adults

Picture Rings.

The picture gloves provided the pre-school child with comfort and protection, and satisfied his needs for feeling of togetherness and control. In contrast, teenagers like challenge and diversity, and they want to be treated as adults seeking independence. It is to satisfy such needs that the picture gloves have been transformed into the picture rings 1100 illustrated in FIG. 11 on the left hand 202 and right hand 203 of a learner.

As shown in FIG. 11, the ring of the left little finger carries the pictures of a Queen, an Apple, and a Zero to indicate the QAZ-keys. The ring of the left ring-finger carries the pictures of a Whale, a Sun-shine, and a Xylophone to indicate the WSX-keys. The ring of the left major finger carries the pictures of an Elephant, a Dog, and a Cat to indicate the EDC-keys. The ring of the left forefinger carries the pictures of a Rabbit, a Fish, and a Violin to indicate the RFV-keys, and a Tree, a Goat, and Butterfly to indicate the TGB-keys.

Also in FIG. 11, the ring of the right little finger carries the picture of a Pig to indicate the P-key, and various punctuation symbols. The ring of the right ring-finger carries the pictures of an Owl and a Lemon to indicate the OL-keys, and some symbols. The ring of the right major finger carries the pictures of an Ice-skate and a King to indicate the IK-keys, and some symbols. The ring of the right forefinger carries the pictures of an Umbrella, Jam, and a Mouse to indicate the UJM-keys, as well as the pictures of Yarn, a Heart, and a Nurse to indicate the YHN-keys.

It should yet be clear that the selection of the objects depicted on the picture rings is not unique, the only requirement being that the ring to be worn on any given finger carries objects (the ring objects) or representations of objects which names begin with a letter corresponding to the key of the keyboard to be struck by the finger wearing the ring. These objects can be three-dimensional forms or structures that are either mounted on the rings or loosely attached thereon by means of a hanging device such as thread or wire. These mnemonic objects can also be represented by raised or flat surfaces mounted on the rings. Such object representations can be printed, drawn or painted on the crowns of the rings.

In order to discretely indicate how to properly wear these rings 1100, each ring could carry the name or a pictorial representation of the finger that should wear it; such name or pictorial representation could be either engraved or applied on the inner side of the ring. To facilitate proper wearing of the rings on the fingers of the learner, the four rings of the left hand could be all connected with little chains 1200 in a nearest neighbor manner, and likewise for the four fingers of the right hand, as depicted in FIG. 12.

Figure 13A:
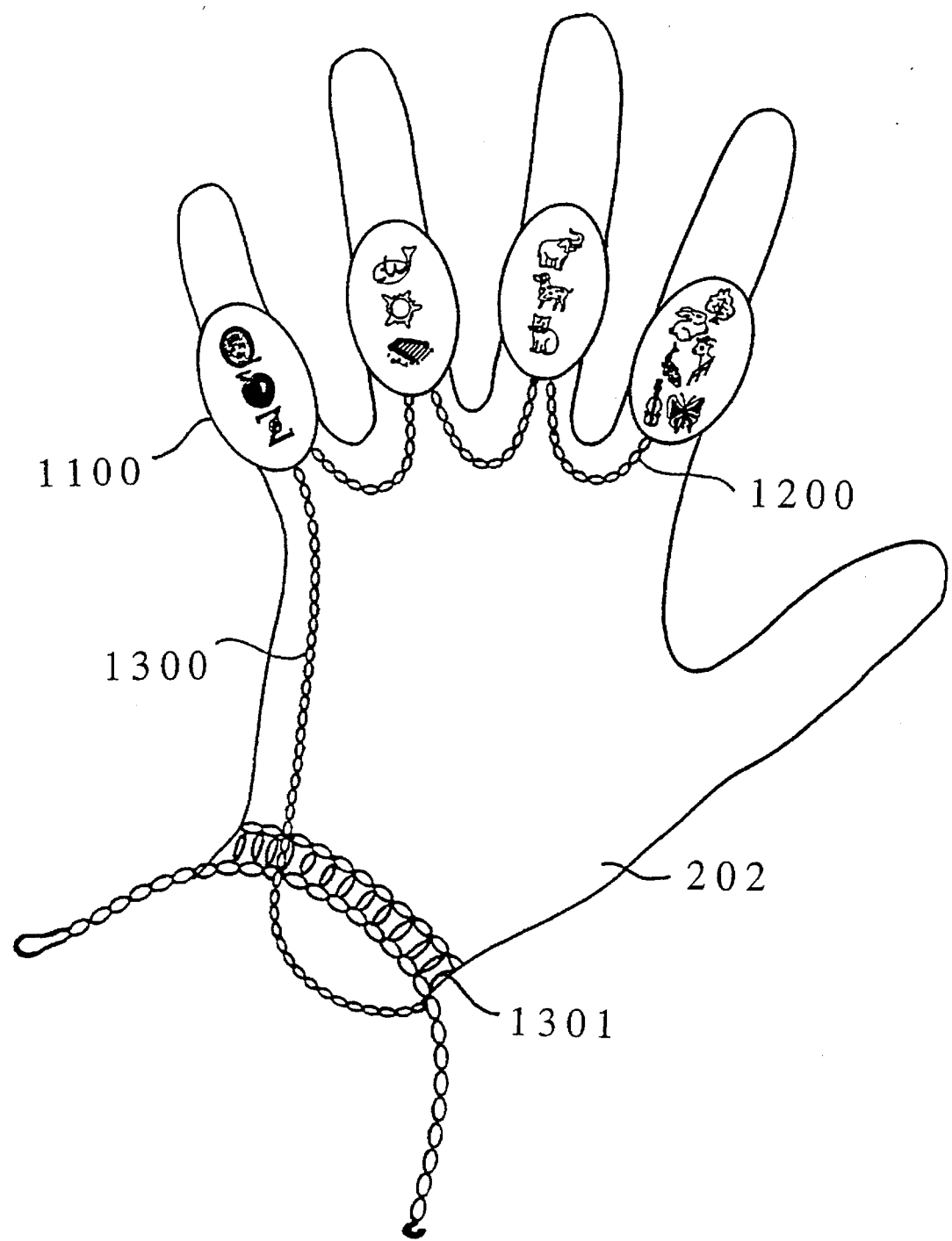
Figure 13B:
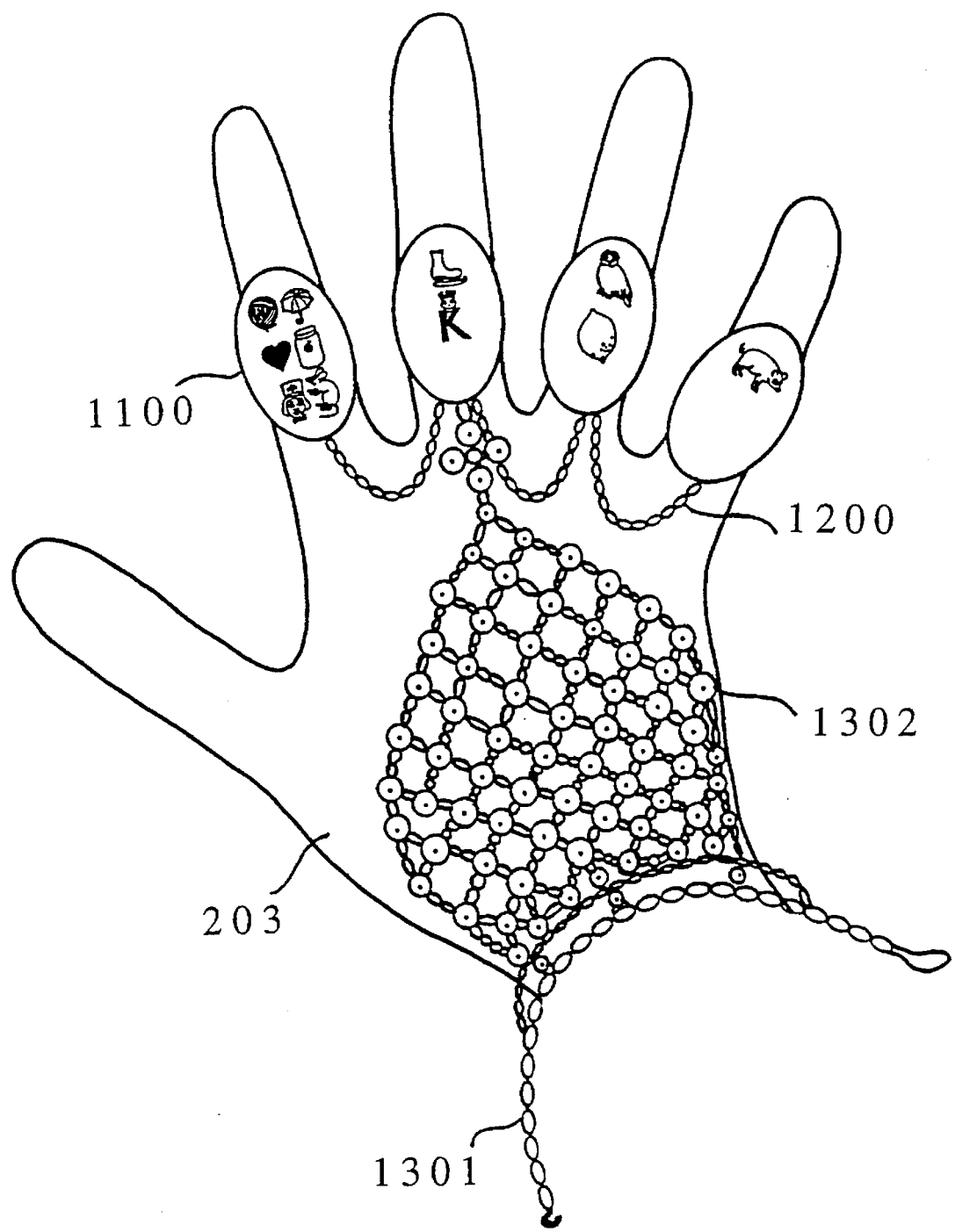

The learner interested in giving a touch of simplicity to the device could choose a configuration where the rings 1100 to be worn by the little fingers are attached by little chains 1300 to wrist-bracelets 1301 on the corresponding hands, as depicted in FIG. 13a for the left hand. For the learner interested in giving a sophisticated touch to the device, the rings to be worn on the major fingers are attached to the top of triangular-shaped networks 1302 of interconnected chains ending at their base to wrist-bracelets 1301, as illustrated in FIG. 13b for the right hand.

For ease and practicality purposes, these ring-based devices could be made out of crocheted material or out of light metal. In the former implementation, the rings themselves, the various linkages, the triangular networks of interconnections, as well as the wrist bracelets would all be crocheted; this would make the device light, attractive, safe, flexible, and expandable. In the latter implementation, the light metallic rings are interconnected by light metallic chains, and the triangular-shaped networks of interconnections are made of light, attractive, and flexible metallic chains. With such a chain-like structure of the device, the aforementioned ring objects (e.g. the Queen, the Apple, and the Zero for the left little finger) could be most harmoniously implemented as three-dimensional structures hanging loose from the ring crowns.

Medallion Rings.

The need for secrecy and individuality that is so characteristic of teenagers and young adults can become a vivid learning drive with the help of medallion rings disclosed in the set of FIGS. 14–18.

Figure 14A:
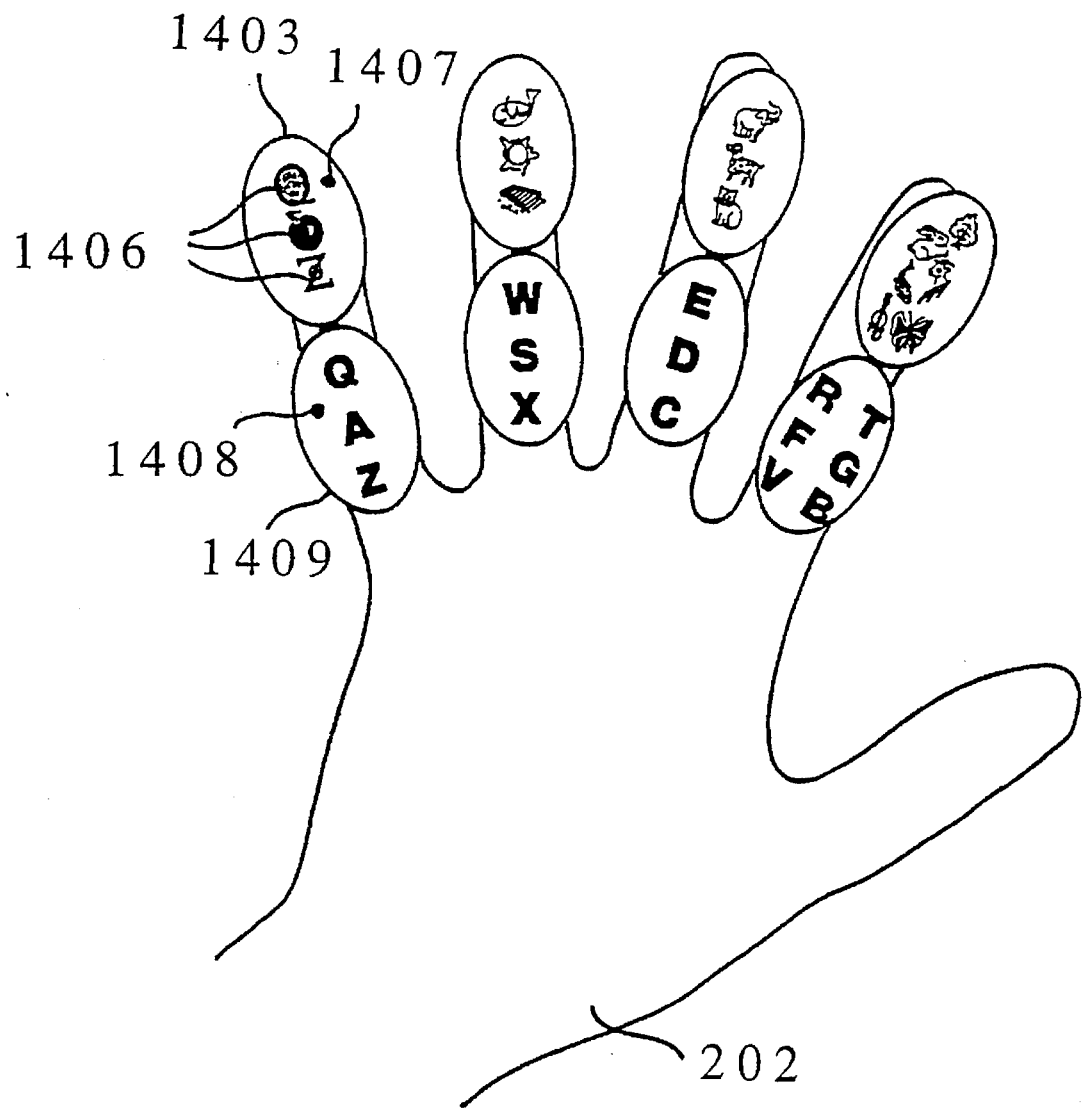
Figure 14B:
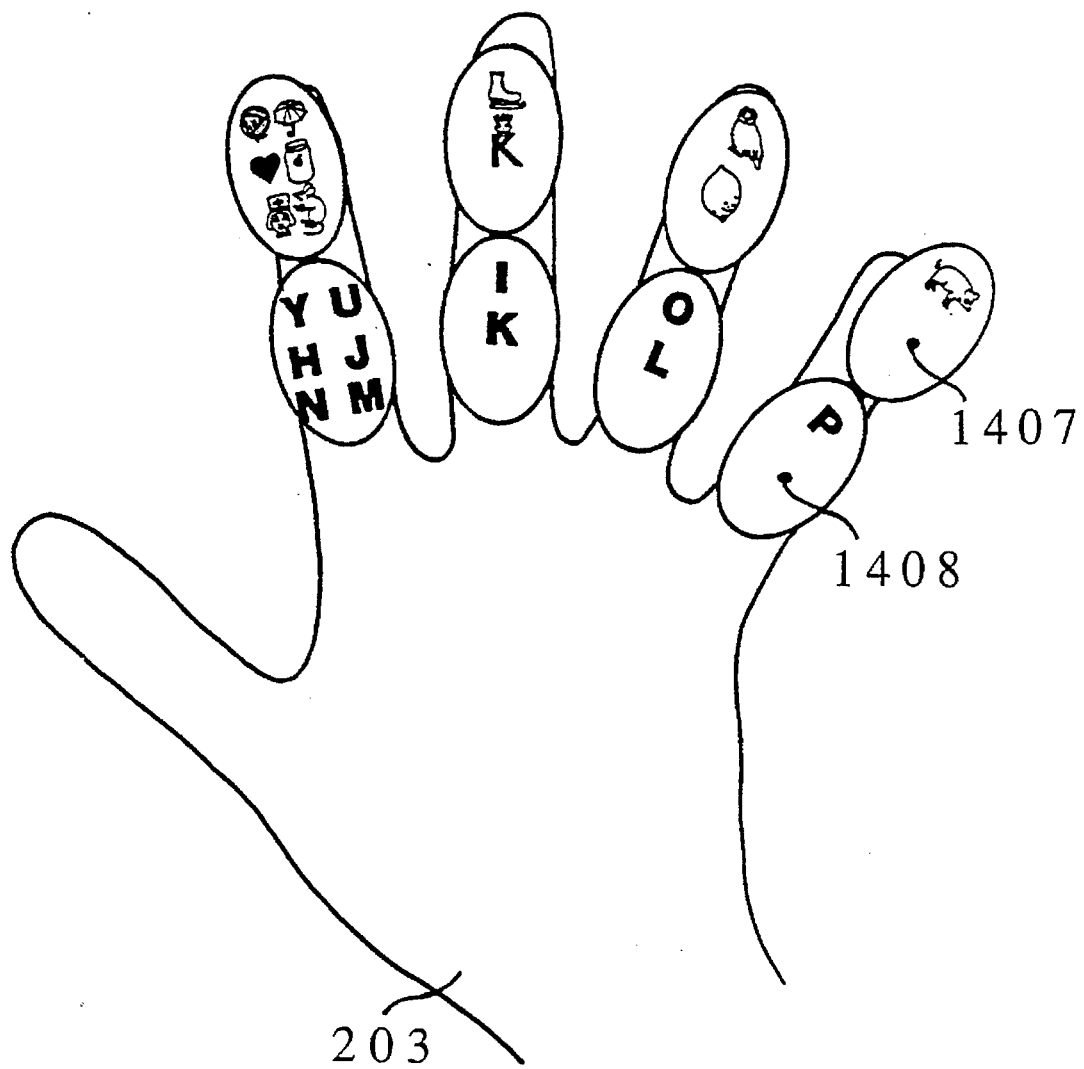
Figure 14C:
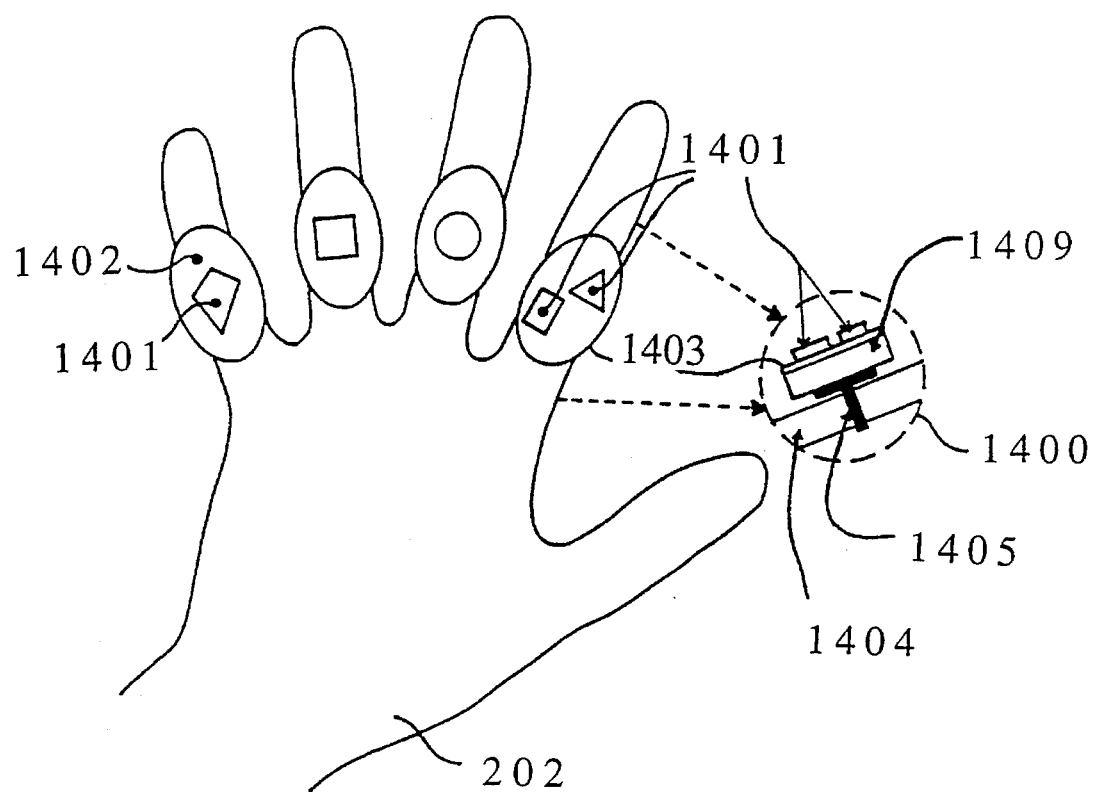
Figure 14D:
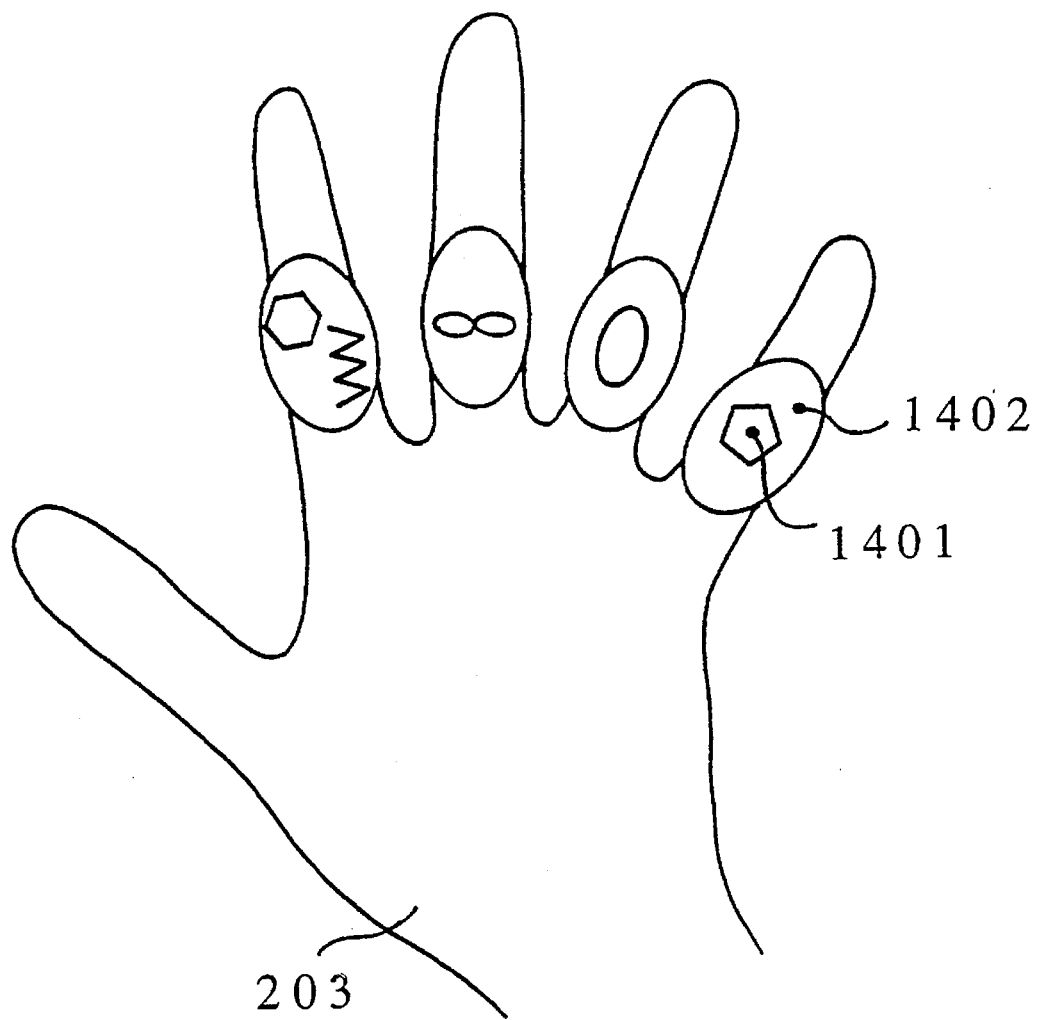
Figure 15A:
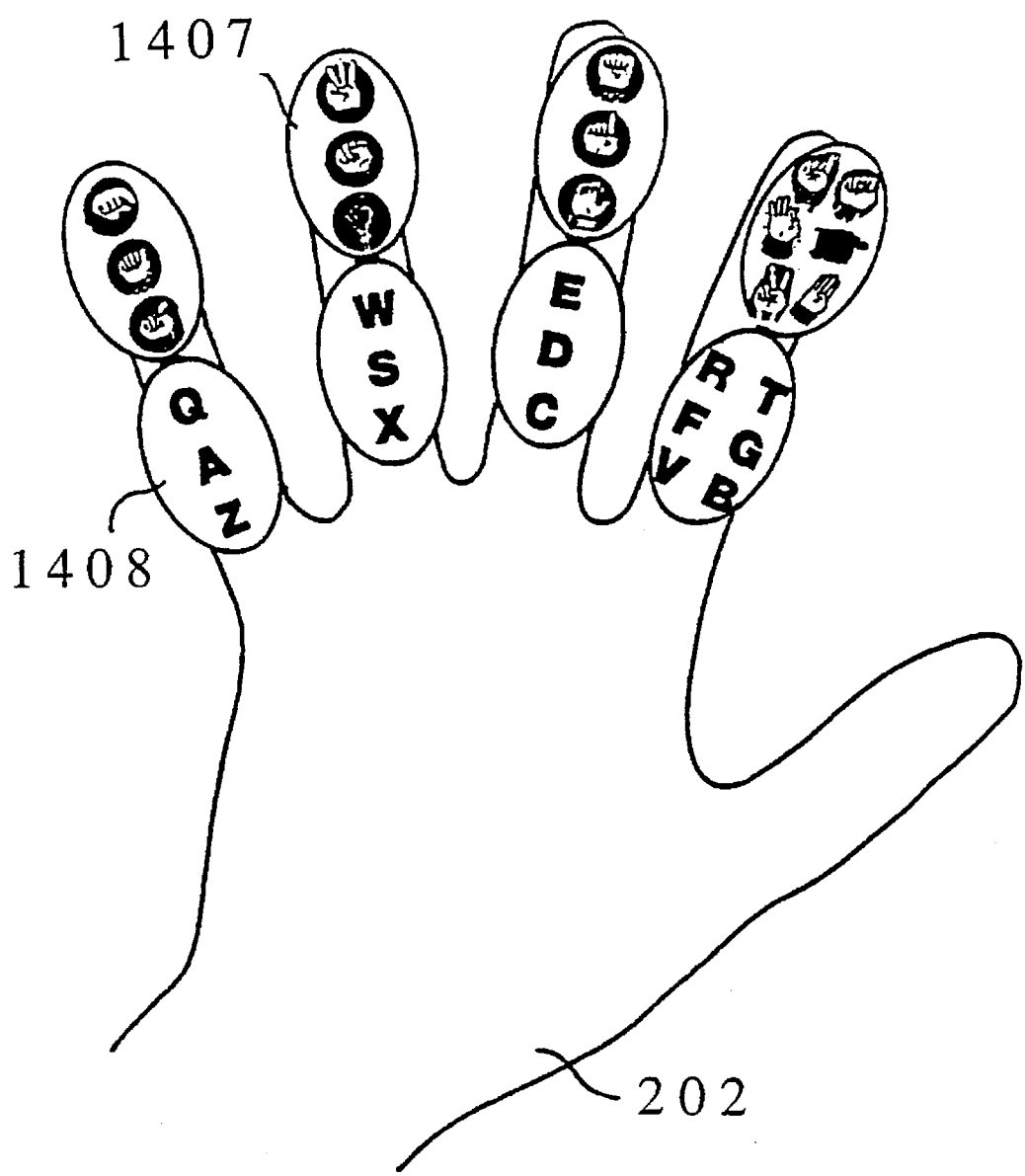
Figure 15B:
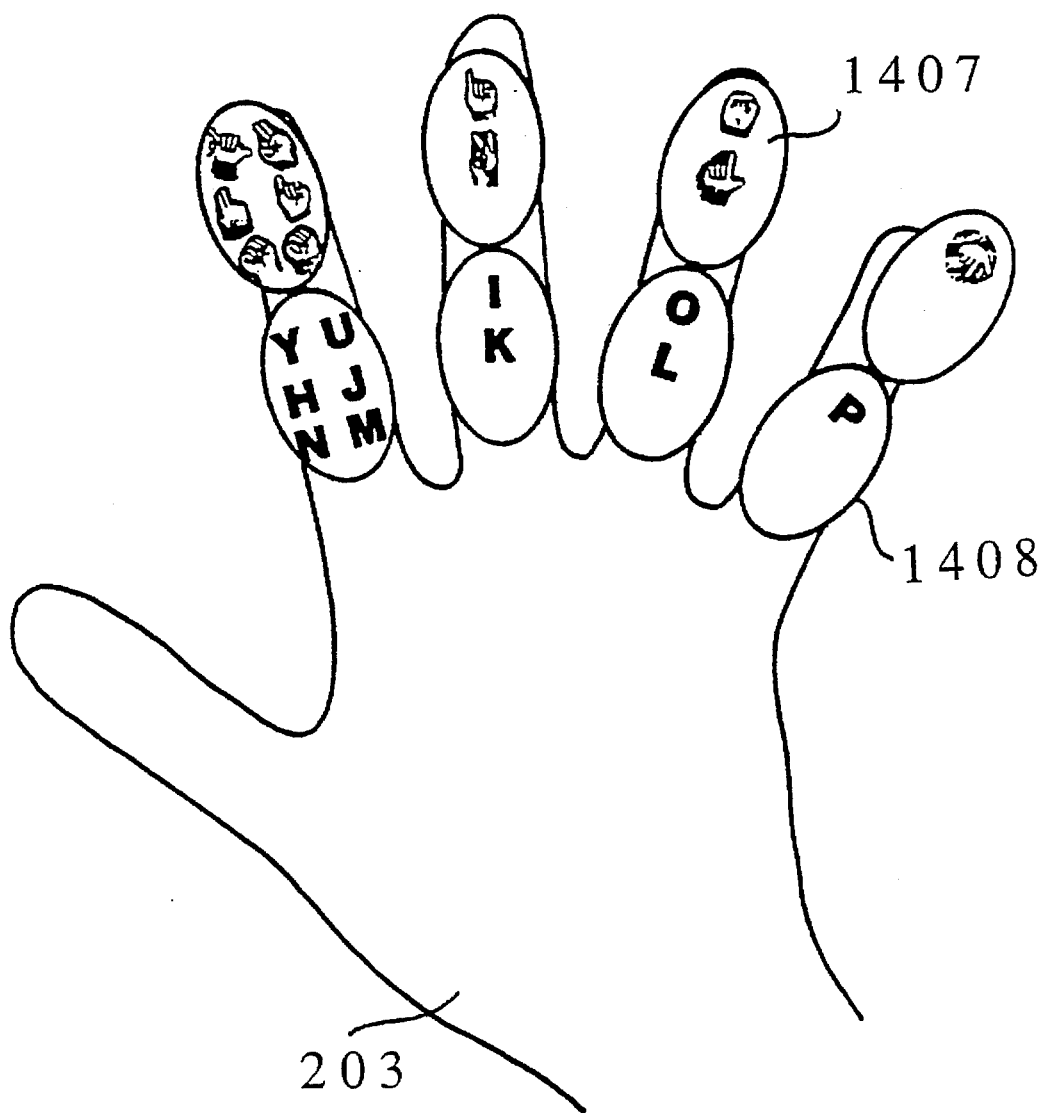
Figure 15C:
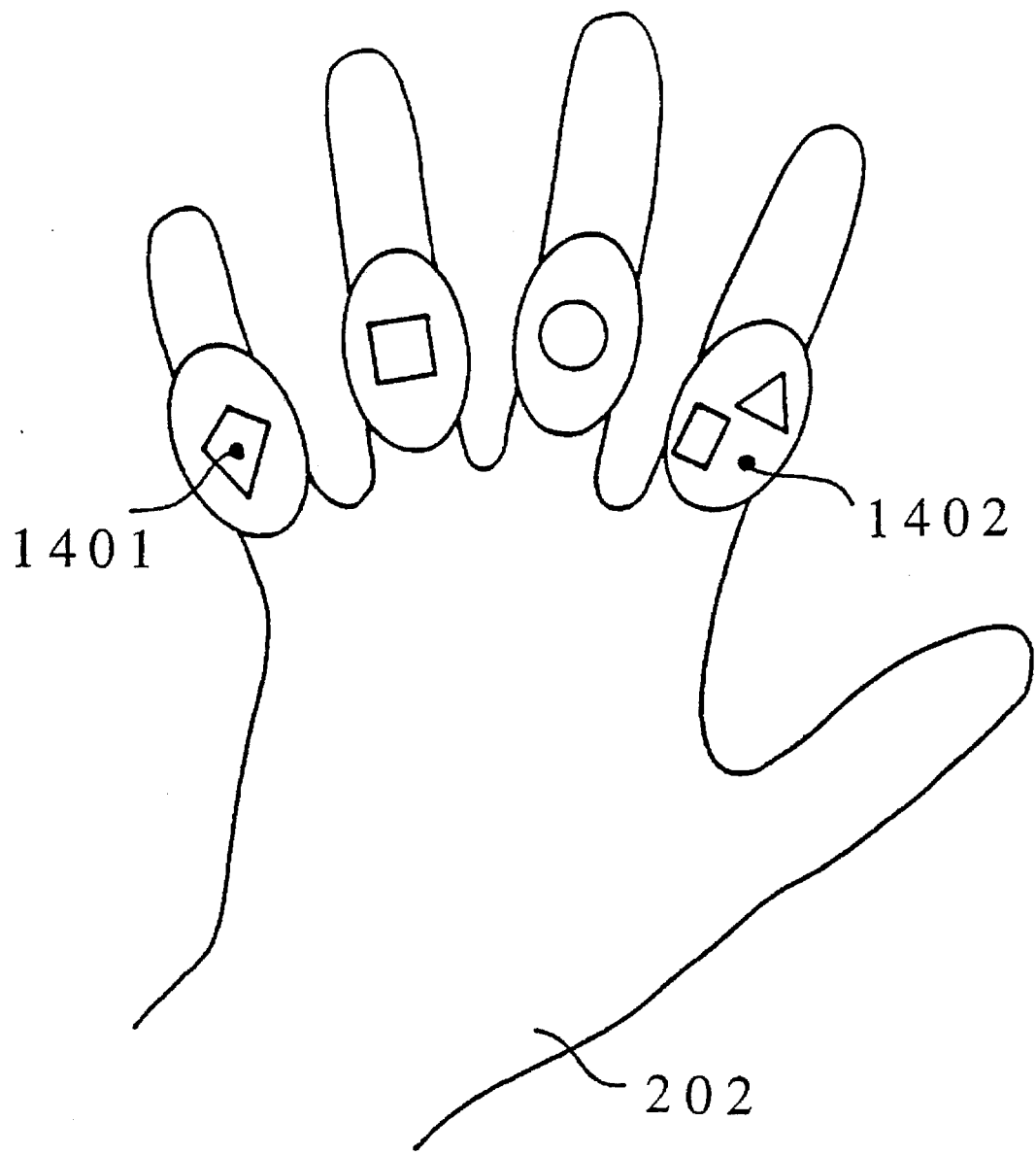
Figure 15D:
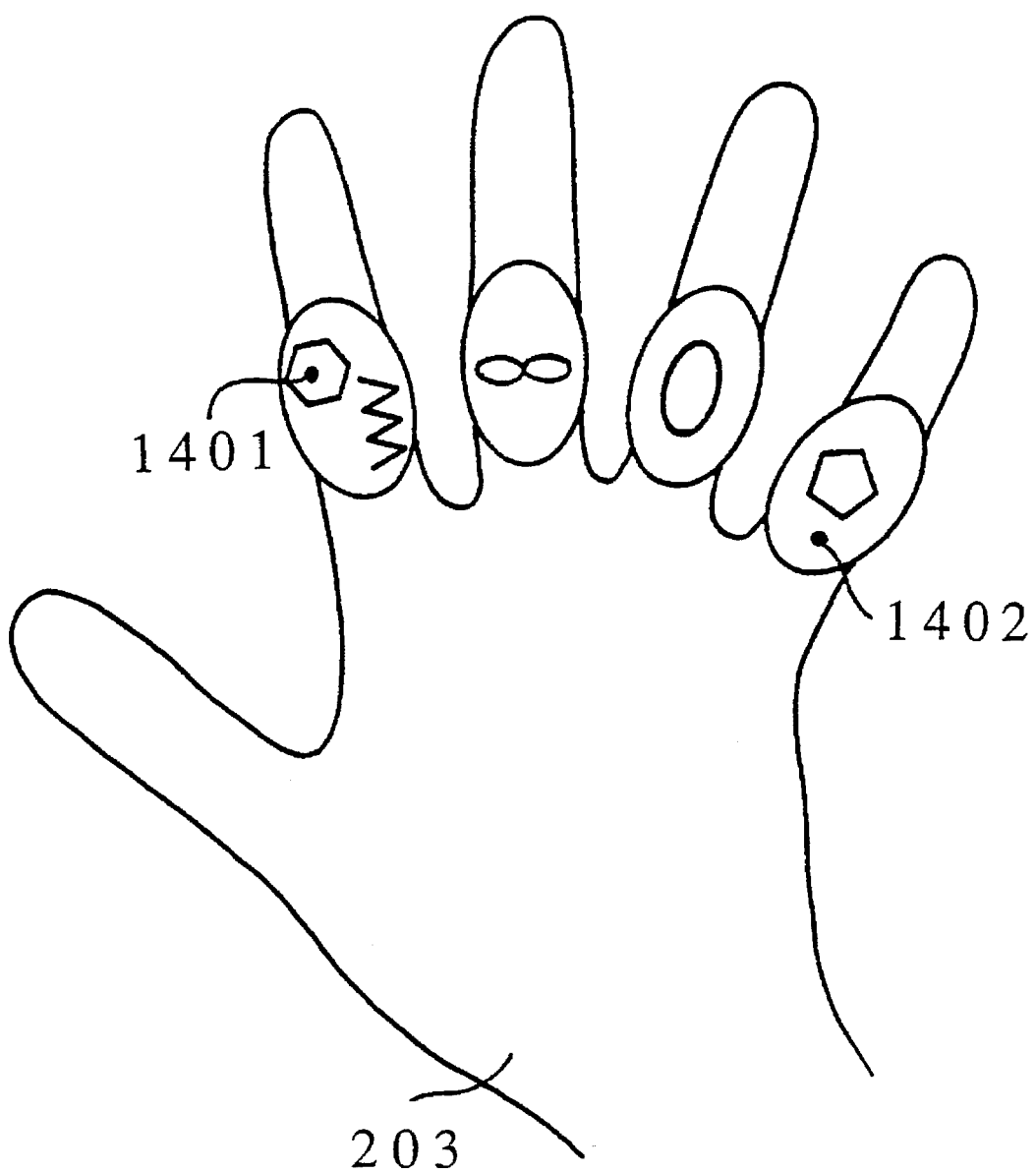
Figure 16A:
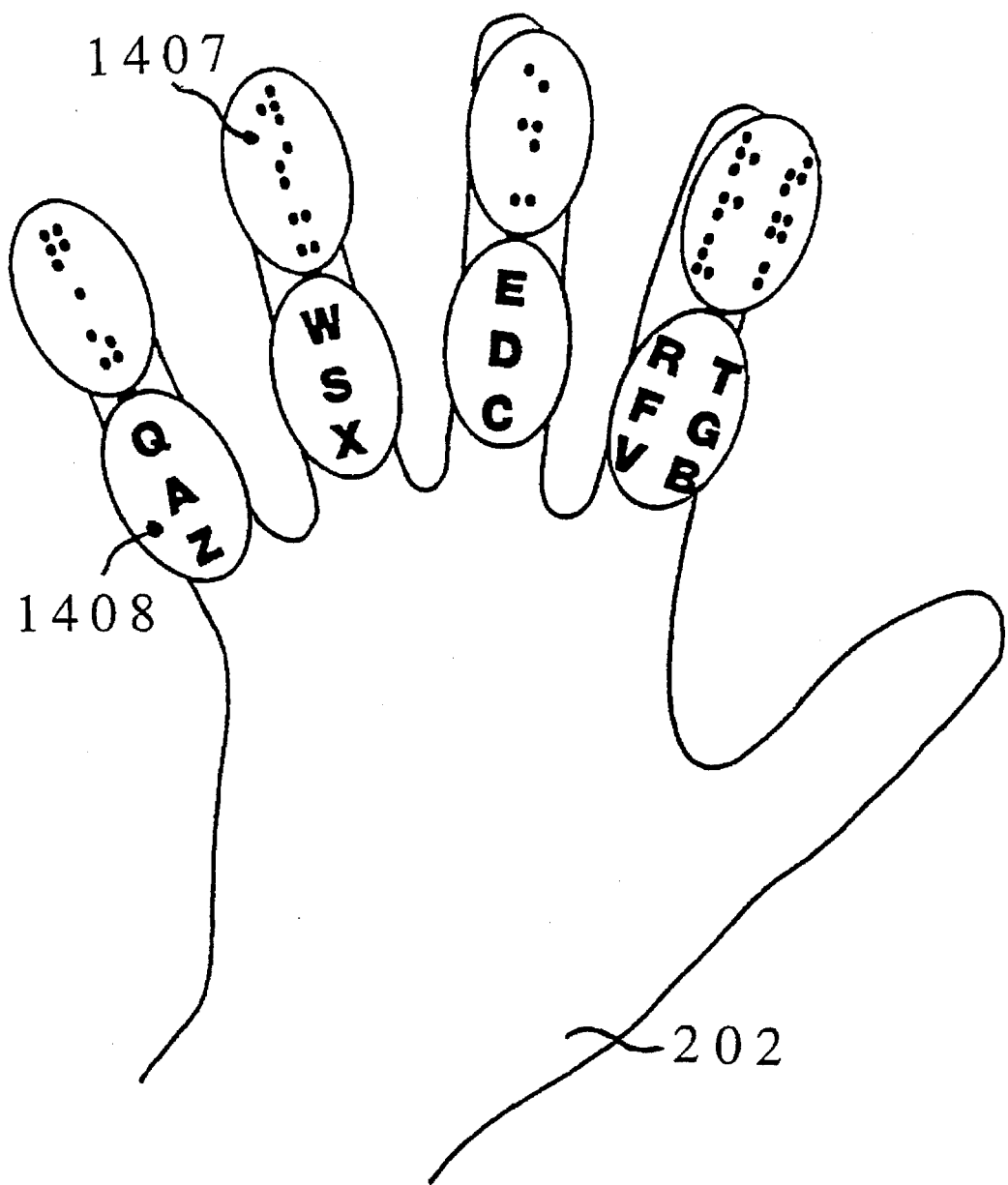
Figure 16B:
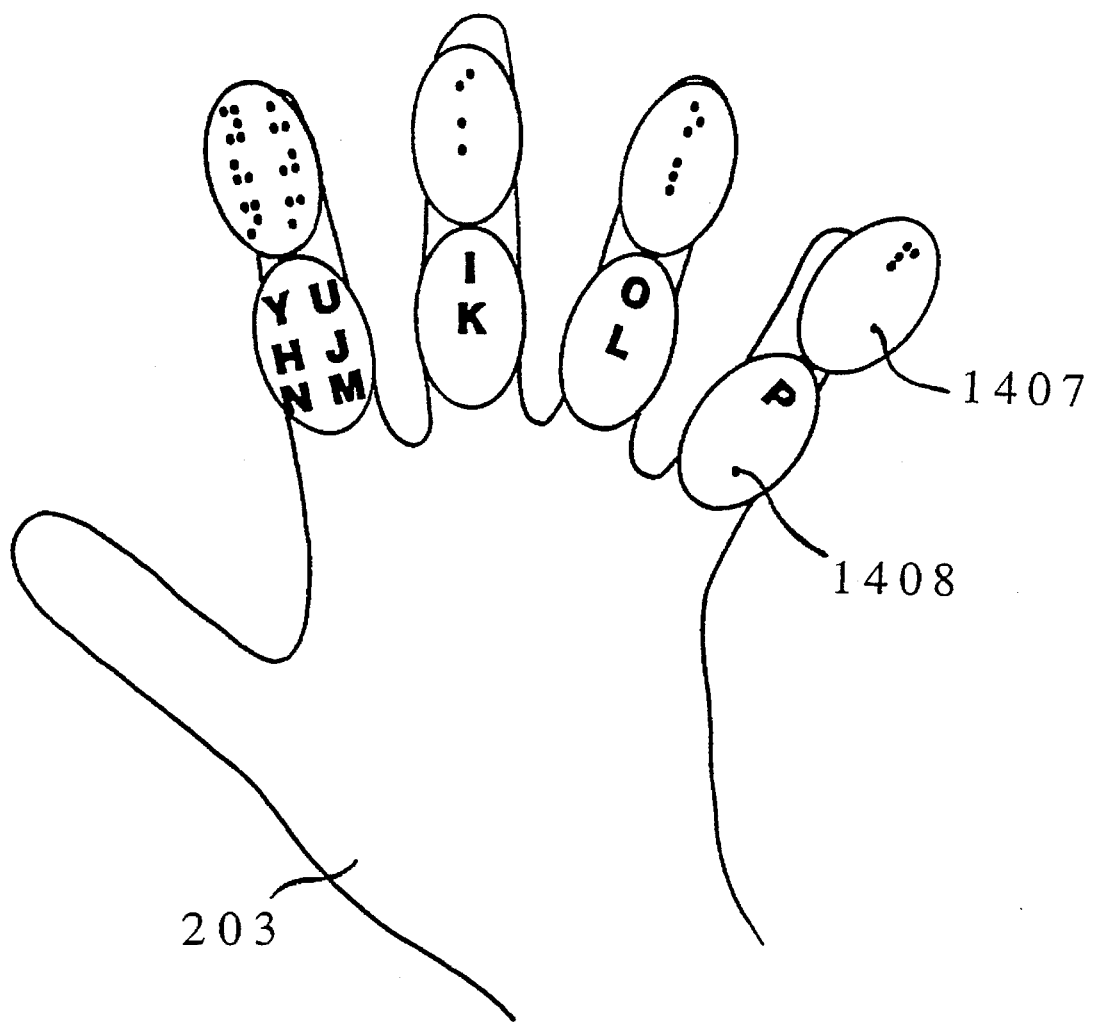
Figure 16C:
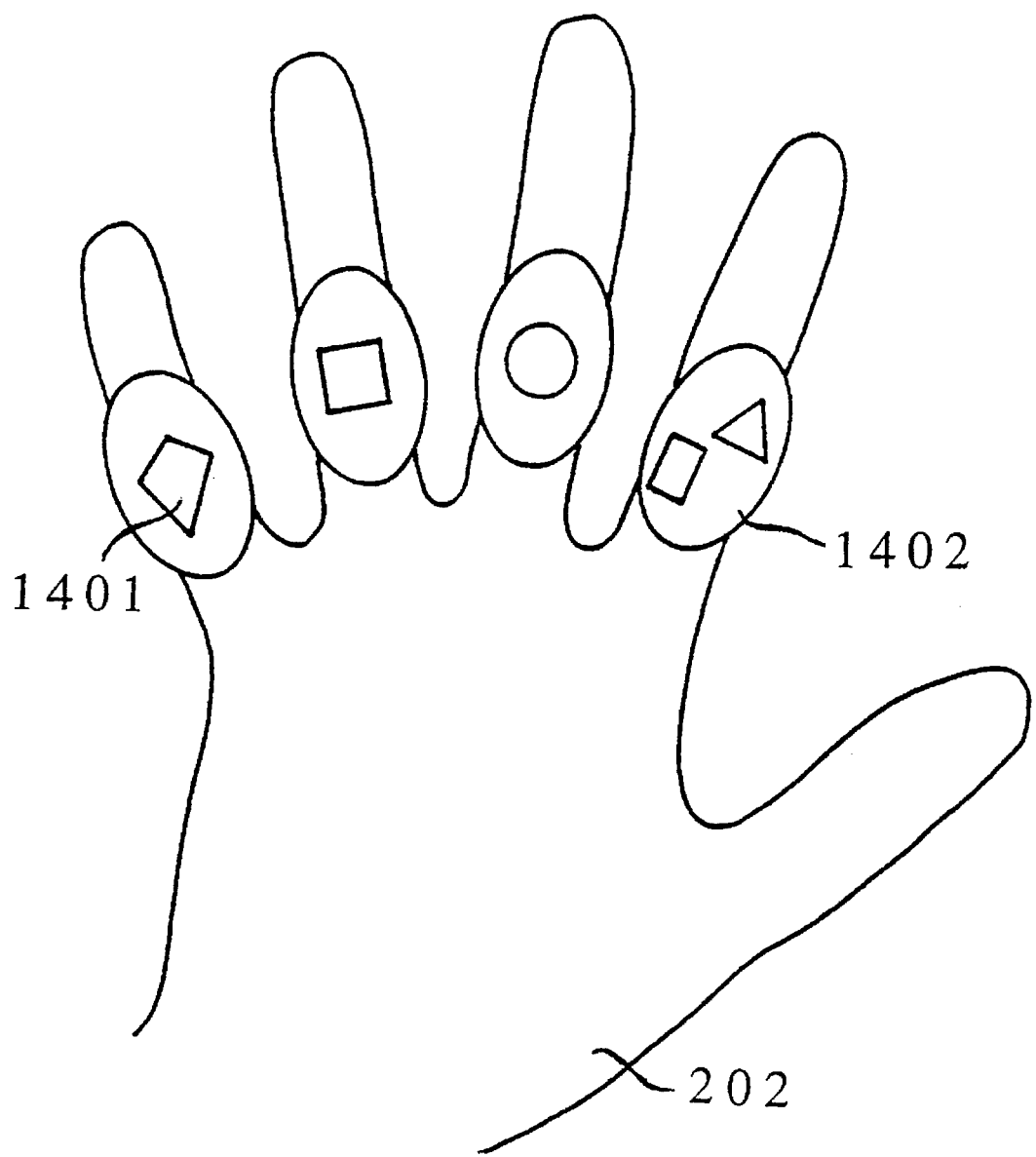
Figure 16D:
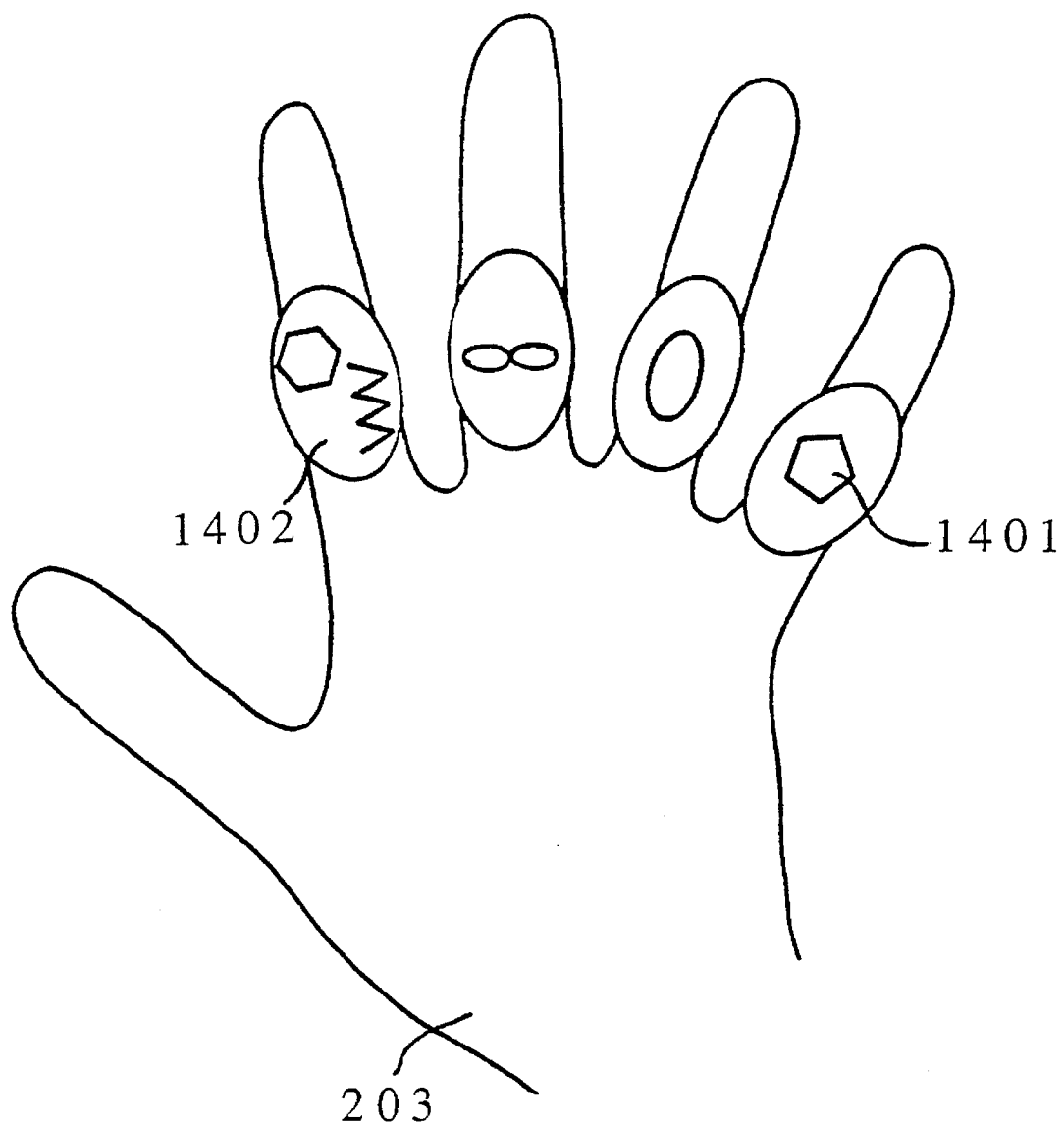

FIGS. 14c & 14d show the ring medallions in closed position on the left hand 202 and right hand 203 respectively. FIG. 14c provides a side view 1400 of a medallion ring worn on the left forefinger, with the medallion in closed position. A stone 1401 (either rhinestone or gemstone) is mounted on the external surface 1402 of each medallion lid 1403, as depicted in FIG. 14. The stone color matches that of the color-coded key of the keyboard to be struck by the finger 1404 wearing the ring 1405 crowned with the stone 1401. In addition, the stones are cut in shapes that define geometrical patterns which pattern names start with a letter corresponding to the key of the keyboard to be struck by the finger wearing the shaped stone. As shown in the illustration of FIG. 14c for the left hand, the pink stone of the little finger is shaped as a Quadrangle, the red stone of the ring finger is shaped as Square, the green stone of the major finger is shaped as a Circle, the yellow stone of the fourth finger is shaped as a Rectangle, and the orange stone of the fourth finger is shaped as a Triangle. Likewise for the right hand depicted in FIG. 14d, the orange stone of the fourth finger is shaped as an Hexagon, the yellow stone of the fourth finger is shaped in a Jigsaw pattern, the green stone of the major finger has the symbolic shape of the symbolic shape of Infinity, the red stone of the ring finger is shaped as an Oval, and the pink stone of the little finger is shaped as a Pentagon.

To assist in the learning of the keyboard, the aforementioned ring objects 1406 are now mounted on the internal surface 1407 of the medallion lid, as illustrated in FIGS. 14a & 14b representing the ring medallions in open position on the left and right hands respectively. For practicality purposes, the medallion lids 1403 open towards the finger tips, and close towards the wrist. The ring objects 1406 could either be raised/flat surfaces, or three-dimensional structures mounted on or magnetically attracted to the internal surface 1407 of the medallion lid 1403. The internal surface 1408 of the medallion base 1409 of a ring medallion shows the precise letter(s) of the key(s) of the keyboard to be struck by the finger of the hand wearing the corresponding medallion rings. Although depicted as oval forms in the accompanying figures, the ring medallions can be of any shape, height, and width provided safety and practicality are preserved.

These medallion rings also allow teenagers as well as adults to learn the manual alphabet in the context of the key-finger assignment of the keyboard, as shown in FIG. 15. The sign language representations[4] of the letters that are engraved in a medallion base are affixed on the internal surface 1407 of the lid 1403 of the same medallion. Likewise, the Braille alphabet can be conveniently learned by indicating the Braille representation of the letters on the inner side of the medallion lids, as depicted in FIG. 16. The Braille alphabet is implemented as a set of raised dots for the visually-impaired learner. [4] "Handmade ABC: A Manual Alphabet", by Linda Bourne, Addison-Wesley Publishing Company, Inc., 1981.

Languages/Sciences Medallion Rings.

To assist a learner in learning a language at his/her own pace, the aforementioned medallion rings are extended to adaptive electronic medallion rings and adaptive mechanical medallion rings.

Figure 17A:
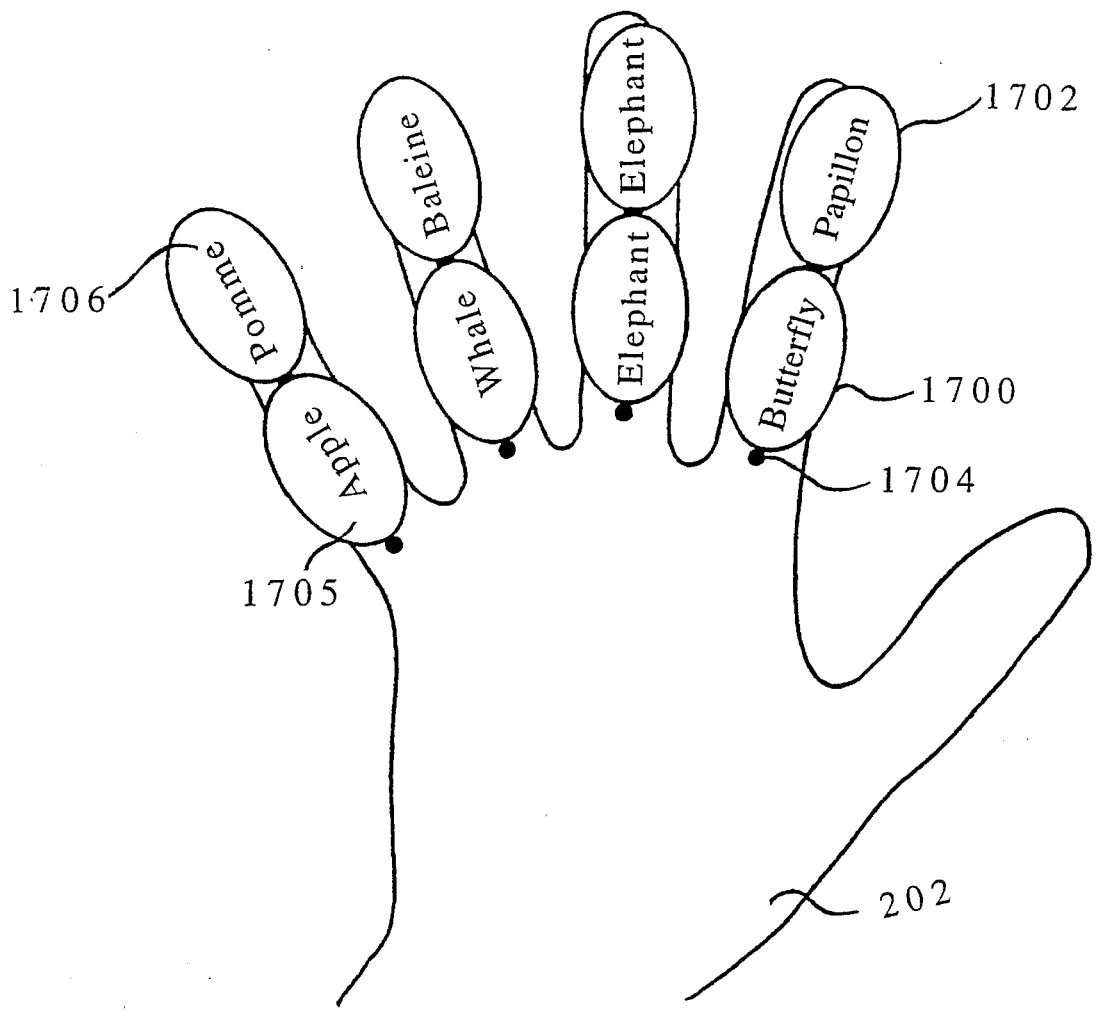
Figure 17B:
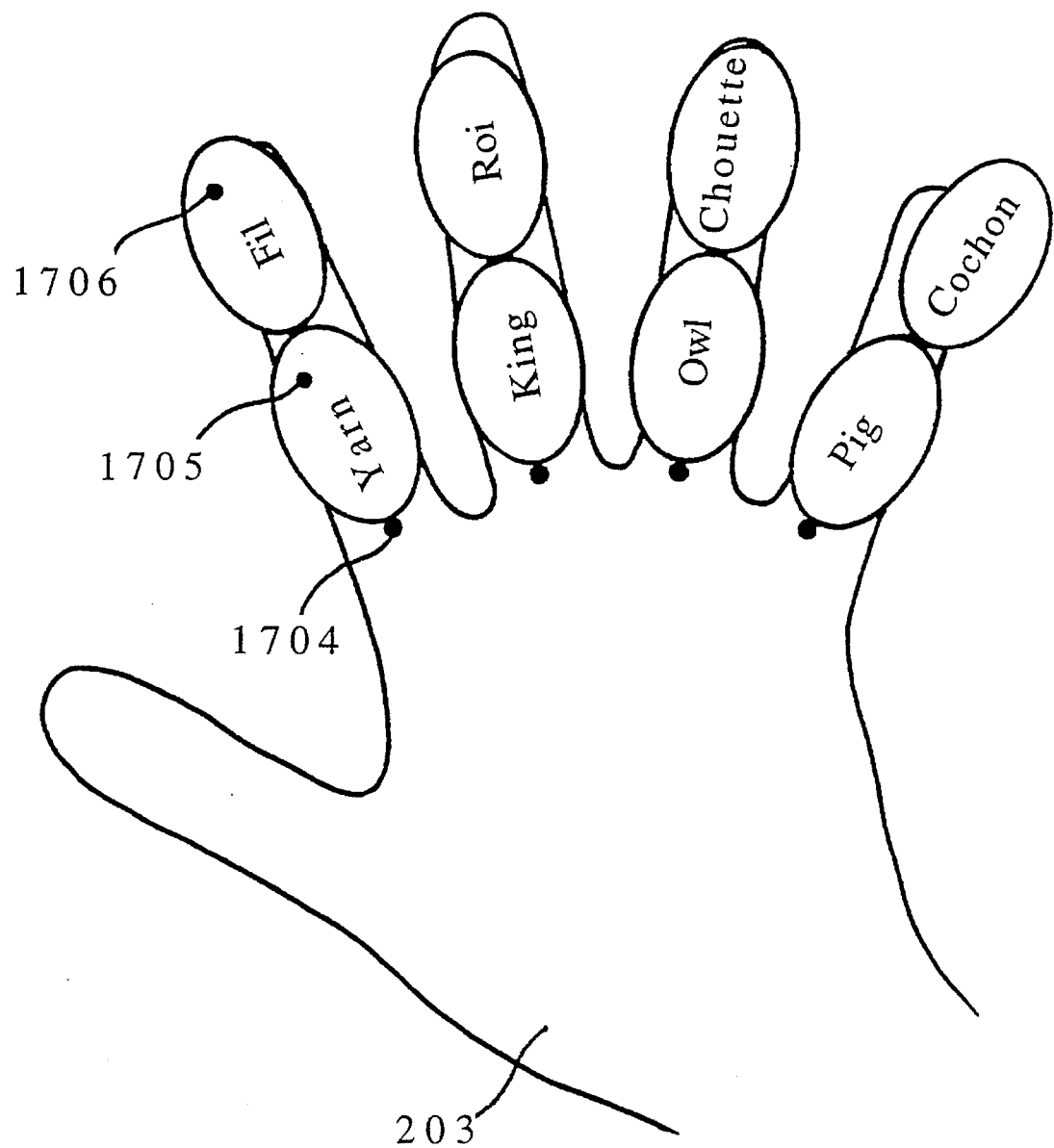
Figure 17C:
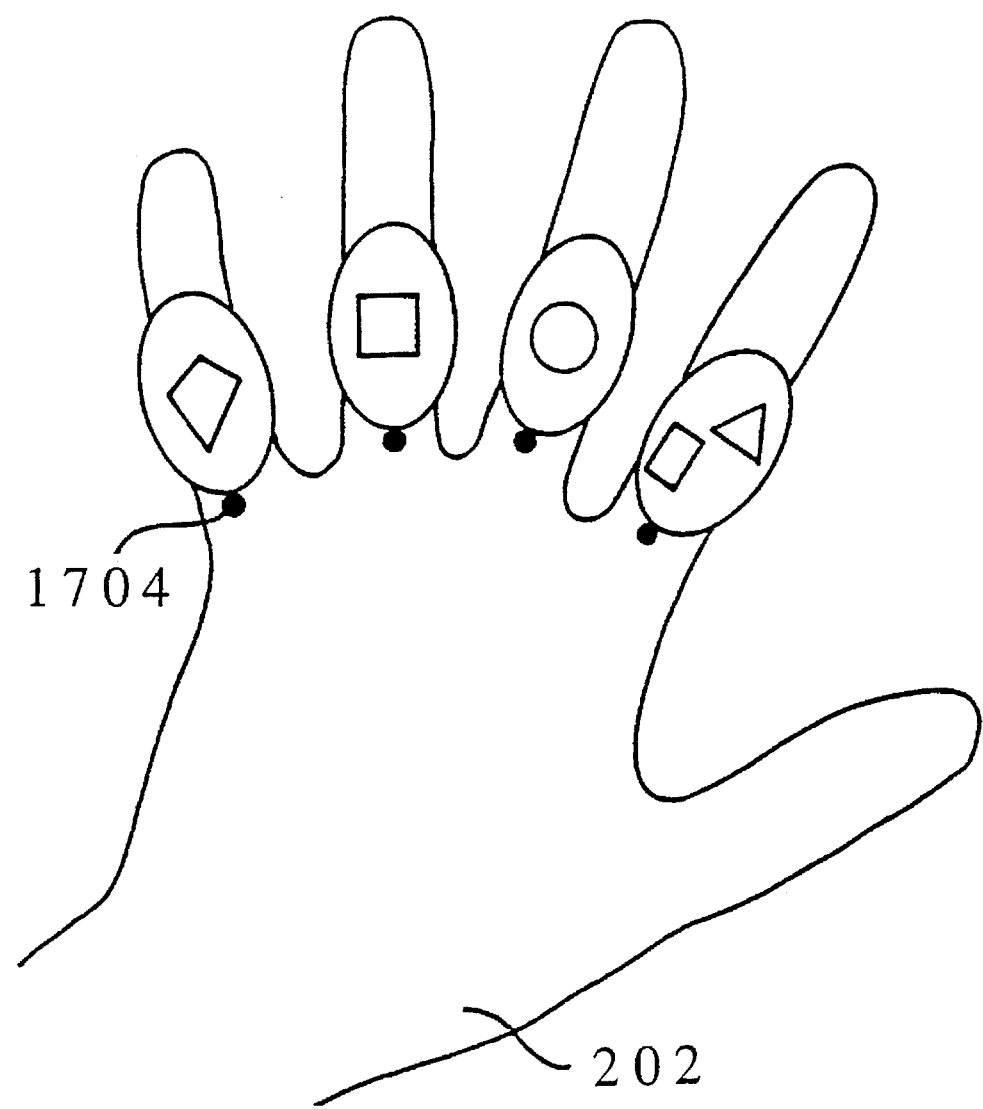
Figure 17D:
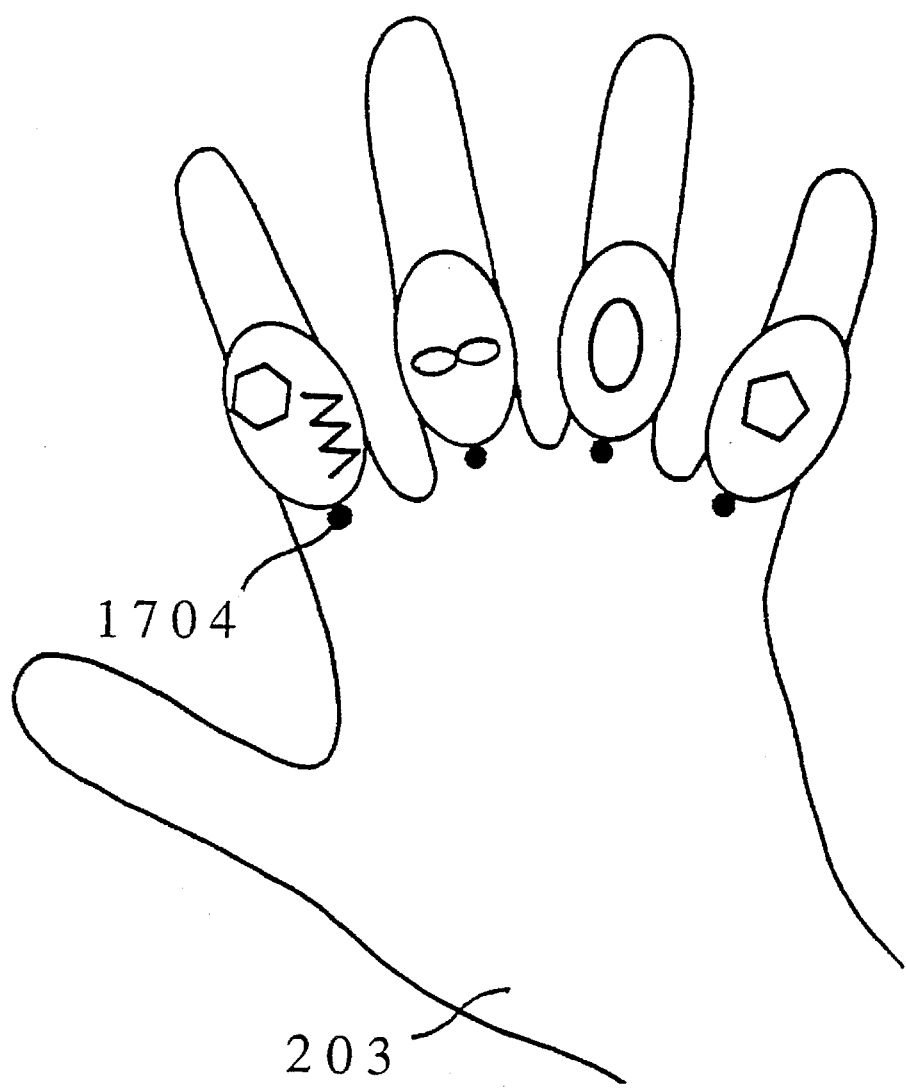
Figure 18A:
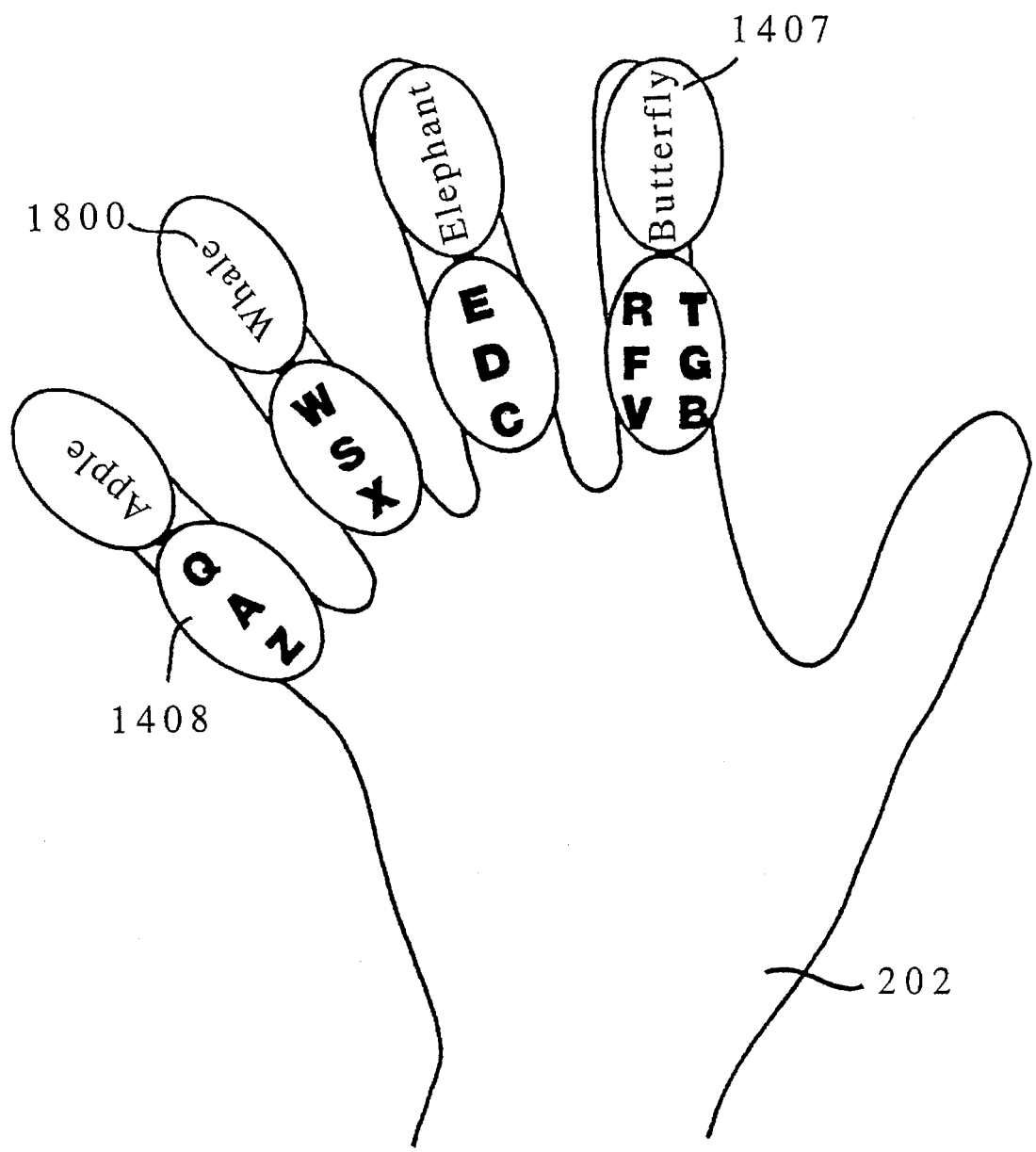
Figure 18B:
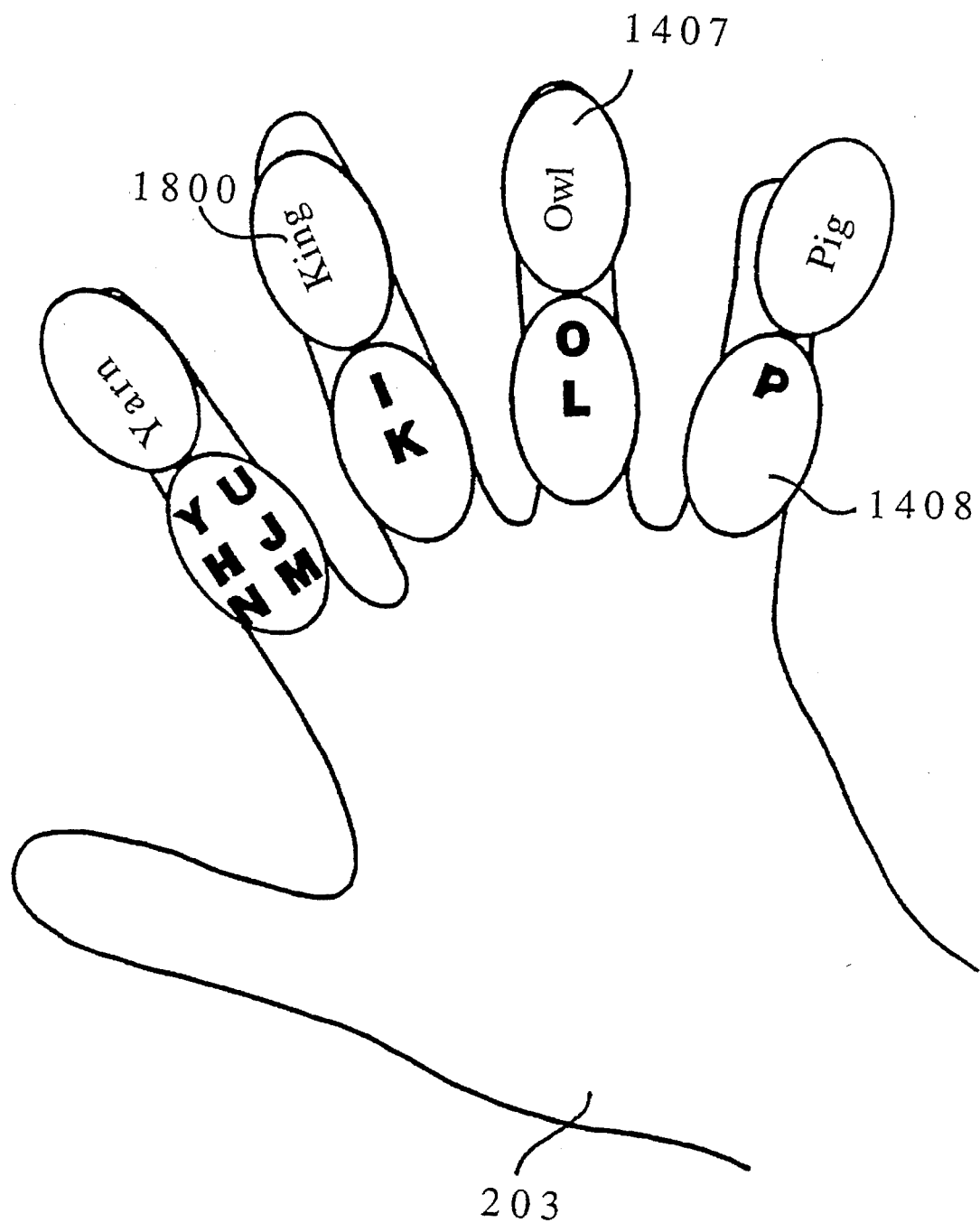
Figure 18C:
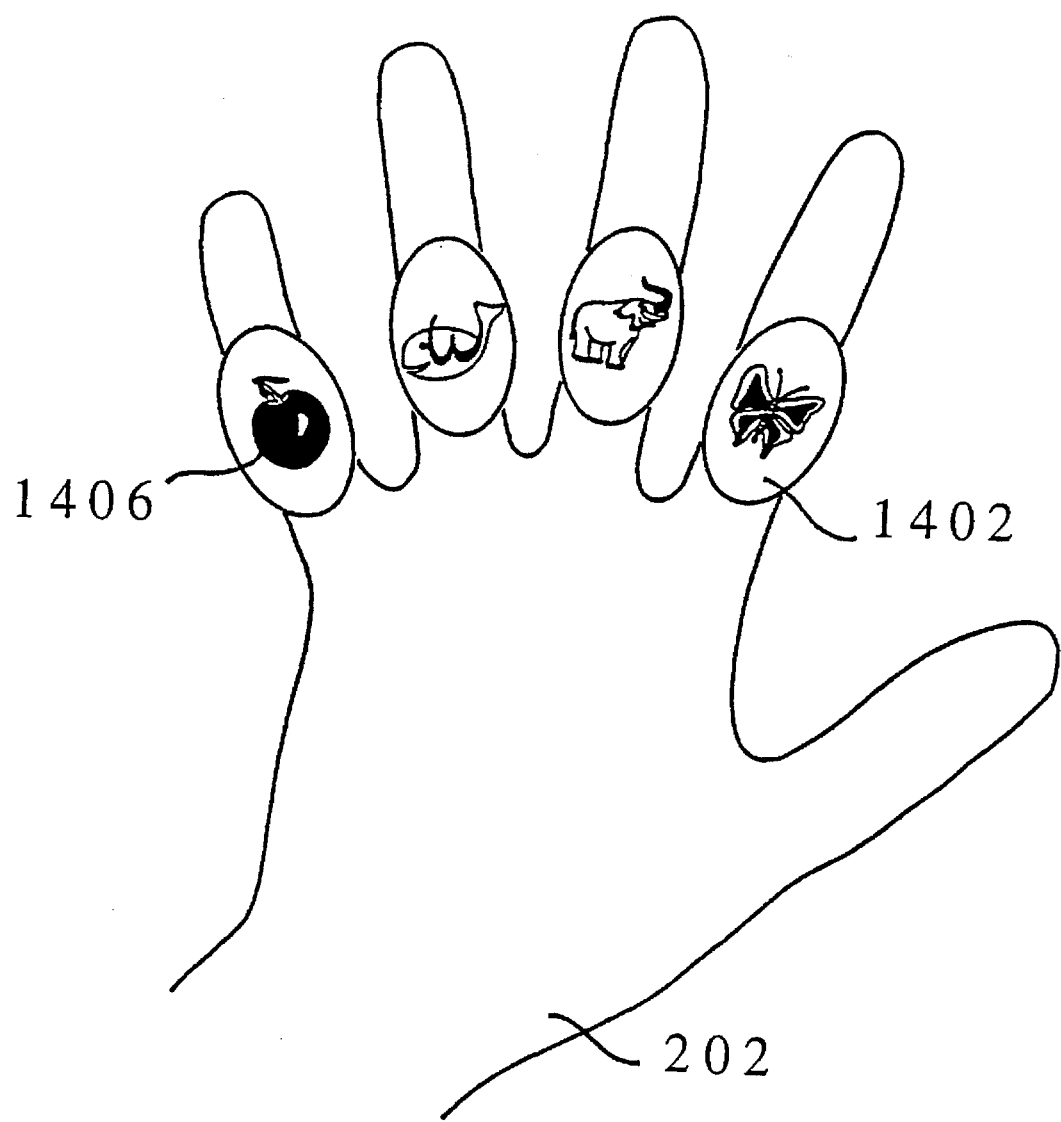
Figure 18D:
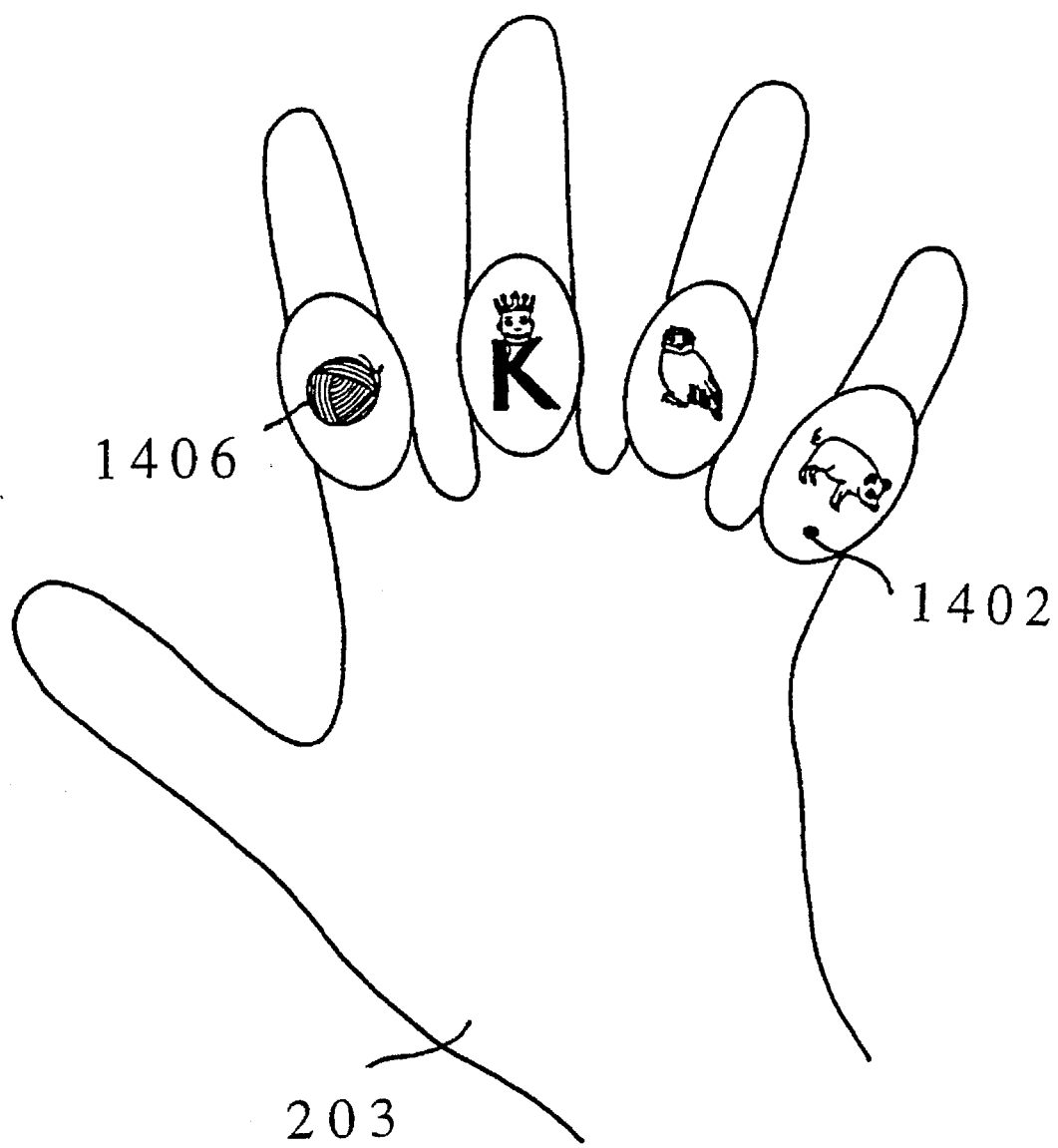

The adaptive electronic medallion rings are depicted in FIGS. 17a & 17b in the open position, and in FIGS. 17c & 17d in the closed position. The medallion 1700 is now a simple electronic device that is battery-powered and switches to "on" or "off" whenever the medallion lid 1702 is "open" or "closed". This electronic device is a special purpose computer which, for economy purposes, would be implemented as an electronically activated memory (read-only-memory), which memory content would be output to an appropriate display output (e.g. liquid crystal display or LCD). Incremental memory addressing would be achieved by pushing and releasing a popin-and-out switch 1704 (most conveniently located at the front end of the medallion ring as shown in FIG. 17). For translation purposes, the memory of each medallion would have been programmed in advance, and would contain an exhaustive collection of English words together with their corresponding foreign language translation. For example, the memory content of the electronic medallion of the little finger would consist of a series of names starting with the letter Q, A, or Z, which names would have been either randomly or orderly pre-written in memory. The English words would systematically appear on the display output 1705 niched within the medallion base, and their foreign correspondents would appear on the display output 1706 located on the inner side of the medallion lid. For each language, there would be a pre-programmed set of such adaptive electronic medallion rings.

The adaptive mechanical medallion rings are depicted in FIG. 18 for learning vocabulary. The lid of a mechanical medallion comprises a pair of glasses, between which glasses the learner would insert and remove at his/her own pace thin insertable labels representing an object 1406 on one side 1402, and its English spelling or foreign translation 1800 on the other side 1407. For each language, there is an exhaustive set of such insertable labels. The subset of insertable labels associated with a given medallion would comprise names starting with one of the letters corresponding to the key of the keyboard which is to be struck by the finger wearing the medallion. For example, if the mechanical medallion rings are to assist an illiterate adult in learning how to read, write, or spell, the medallion of the left little finger would contain a collection of insertable labels showing objects and their English names starting with Q, A, or Z, as in the example of FIG. 18. For practicality purposes, the medallion lids could also include a pair of magnifying glasses to facilitate object visualization and reading of the names, if needed.

Figure 37A:
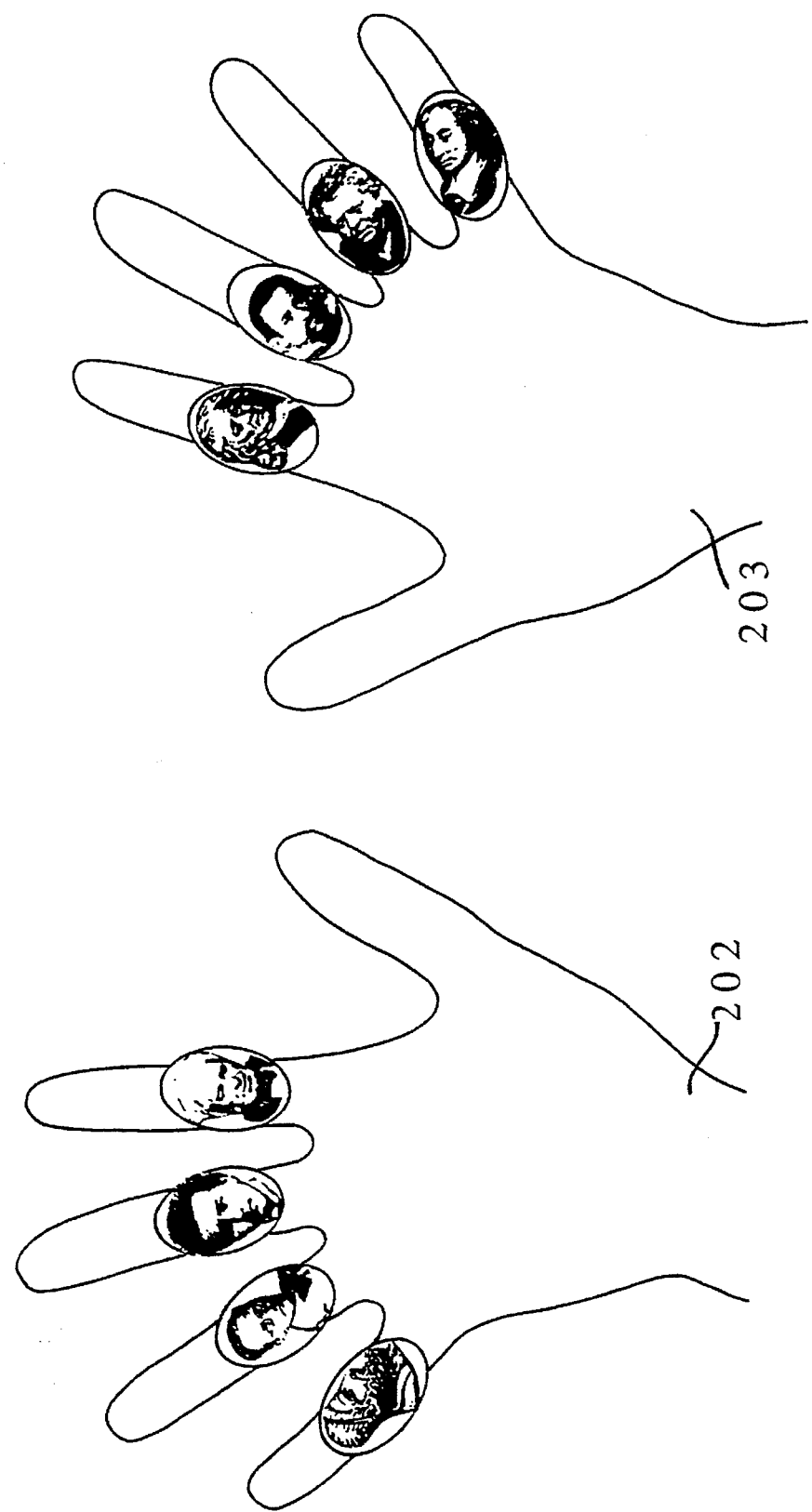
Figure 37B:
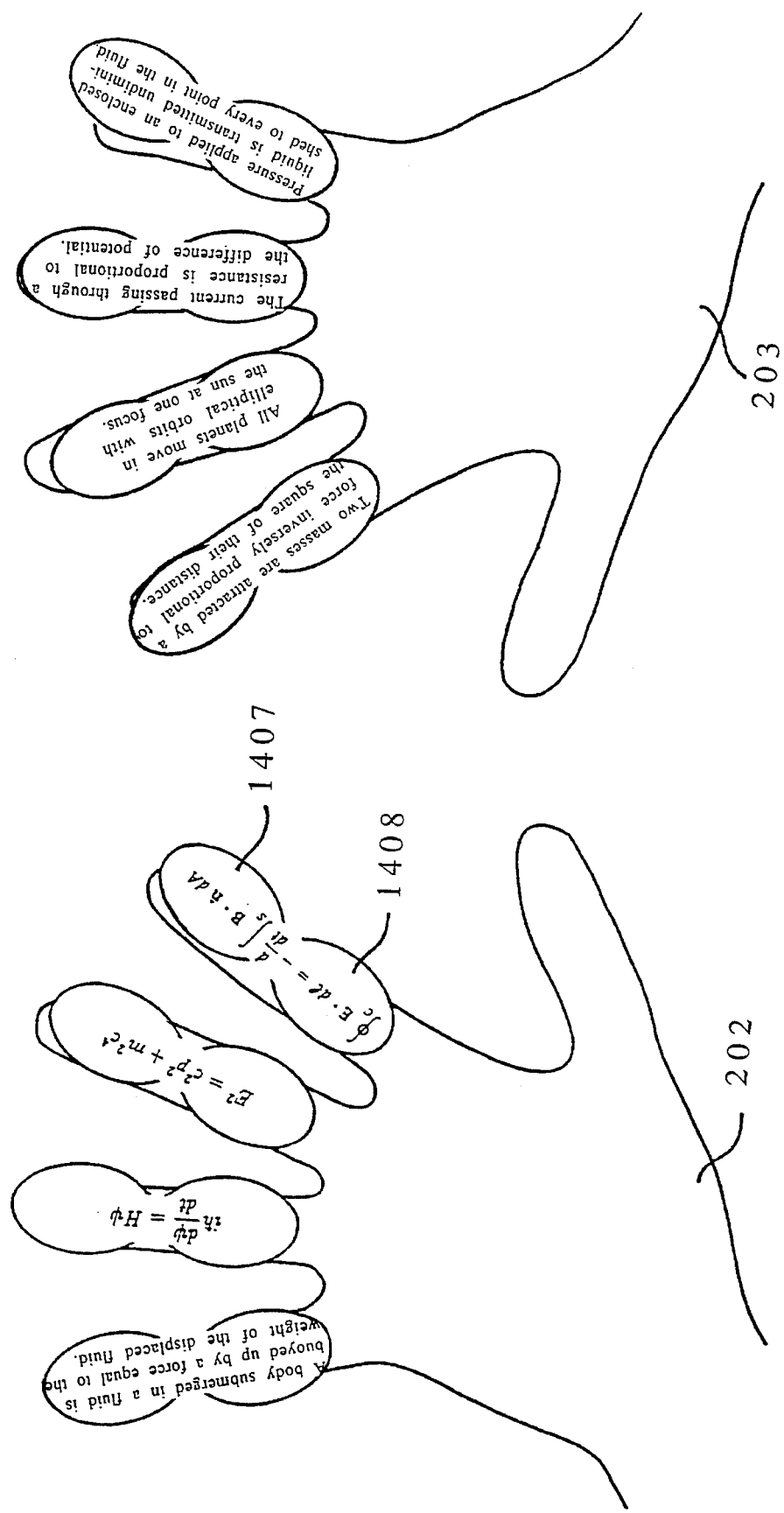

The adaptive medallion rings can also assist teenagers/adults in learning various arts/sciences whereby the pictures or photos of artists/scientists are inserted onto the medallions, and a short description of their work is written on small labels within the said medallions. The name of the artist/scientist whose picture/photo is inserted into a medallion lid begins with the letter of the key of the keyboard which is to be struck by the finger wearing the ring of the given medallion. In the physics example of FIG. 37, the picture of Archimedes, and the photos of Schroedinger, Einstein, and Faraday are shown on the medallions worn by the little finger, the ring finger, the major finger, and the forefinger of the left hand respectively (FIG. 37a). Their discoveries/inventions are briefly stated in text form or equation form on small labels contained in the corresponding medallions, as shown in FIG. 37b which depicts the medallions in open position. Portraits of Newton and Kepler, a photo of Ohm, and a painting of Pascal are shown on the medallions worn by the forefinger, the major finger, the ring finger, and the little finger of the right hand respectively (FIG. 37a). Likewise, the physical laws or principles discovered or postulated by these physicists are briefly stated on small labels contained in the corresponding medallions, as illustrated in FIG. 37b which depicts the medallions in open position.

A set of medallion labels, which feature the names of chemists and physicists who had a significant impact in chemistry, is shown in FIG. 38 to illustrate how the medallion rings can assist in learning the foundation of chemistry. The names of these scientists are Avogadro, Schroedinger, Curie, and Gibbs for the little finger, the ring finger, the major finger, and the forefinger of the left hand respectively, and Mendeleev, Kelvin, Lavoisier, and Pauling for the forefinger, the major finger, the ring finger, and the little finger of the right hand respectively as shown in FIG. 38a. It is part of the educational process for the learner to go and photocopy pictures or photos of these scientists, and subsequently substitute them to the aforementioned labels indicating the names of the said scientists. As shown in FIG. 38, each medallion indicates the name of a chemist (to be later replaced by his/her picture), and also contains a small label that briefly states in text form or equation form the discovery/invention made by that chemist.

FIG. 39 shows a set of medallion picture rings for learning about various inspiring leaders. The left hand medallions show the statue of Aesculapius, the Roman God of medicine, Harriet Stowe, an American novelist, Amelia Earhart, the first woman to fly the Atlantic, and Mary Bethune, an American Educator. The right hand medallions show Florence Nightingale, the pioneer of nursing profession, Helen Keller, a deaf and blind American author and lecturer, Amy Lowell, an American poet, and Frances Perkins, the first woman cabinet member.

Self-Expression/Medallion Rings.

The aforementioned adaptive mechanical medallion rings can also be used to facilitate self-expression and conflict resolution among teenagers, and even more generally adults. The set of insertable labels would now include the photos of people, pets, or objects having a direct impact on the life or conflict of the teenager or adult, The real names of such people, pets, and objects would be written on the opposite side of these thin labels, which would either be inserted in the corresponding medallion lids, or kept in the medallions themselves. By promoting self-expression and facilitating conflict resolution, the therapeutic medallion rings would be the object of substantial attention from the learner, which would further reinforce the memorization of the keyboard.

Such diversified sets of rings will give teenagers the opportunity to explore and create their own world by choosing the type of objects they like, and the type of stories that they like to create with these objects. They will also provide teenagers with a healthy and challenging means of communication among peers and with their parents. The practicality and attractiveness of these rings make them also convenient to wear during a variety of activities, such as walking, watching TV, driving, etc. . . Yet, these rings will also discipline the thought processes of the teenagers by directing their imagination to remain within the limitation of the keyboard.

Repetition and reinforcement with the aid of visualization are key factors in psycho-motor development. Giving every child time-driven opportunities to use symbols is a key-factor in the development of his/her intellectual abilities. It is therefore expected that the variety of learning experiences provided by the process-based use of all the aforementioned mnemonic gloves and rings constitute a unique opportunity for the child/teenager not only to acquire the psycho-motor skills required for touch-typing, but also develop the assimilation and accommodation skills required for the growth of his/her conceptual thinking.

In scope and spirit, this invention is thus not limited to learning the computer keyboard. It is equally well adapted to assist the child/teenager in the learning of any other finger-based man-machine interfaces, wether literary, alphanumeric, symbolic, or musical. Moreover, the benefit of this invention can be naturally extended to any other types of pictorial and symbolic associations that can help the development of cognitive and relational skills, and promote self-expression (language/therapy) towards a synergistic nurturing of mental growth and self-confidence, in other words towards a fulfilling life.

CONCLUSION

The greatest asset of this method of teaching and learning is that while the child, teenager, or young adult is learning one skill, he/she is simultaneously exposed and motivated towards a new incoming learning experience. Through the repetition and induced linkages of a great diversity of learning experiences, the learner will not only gain an understanding of the method and the device, but also of the interactions between both. Through the various stages of one's own growth and development, the learner will witness how the device evolves to account for the demands of the method, and at the same time how the method is architectured, or "trimmed", to account for the inherent limitations of the device. In other words, the learner will be given the opportunity to truly witness and internalize the benefit of interdependency, or synergy, between "method" and "device". This will motivate the child later to develop a more wholistic view of computers in terms of software and hardware, and discover that the best software is the one that takes full advantage of the hardware asset, and that hardware can be itself geared to the features of the software for last results. In a broader context, the child will be made aware of the richness of the interactive process between concept or idea and product.

The constant involvement of the learner with fun and joy is to make learning an enjoyable way of life, i.e. a genuine life-long learning. By witnessing how the disclosed "key-gloves" emerge as a synthesis of art and science, the learner will be inspired to develop likewise his own blending of lateral and vertical thinking towards the creation of a new product, and possibly the emergence of a new technology. In an even broader context, the child will be made aware of the importance of the interdependency between our own words and our own deeds towards the construction of our brave new world.

As Emerson wrote:

---

"To laugh often and much;
to win the respect of intelligent people
and affection of children;
to earn the appreciation of honest critics
and endure the betrayal of false friends;
to appreciate beauty, to find the best in others;
to leave the world a bit better,
whether by a healthy child, a garden patch,
or a redeemed social condition;
to know even one life has breathed easier
because you have lived.
This is to have succeeded.

---

The invention has been described in detail with particular emphasis on the preferred embodiments thereof, but it should be understood that variations and modifications within the spirit and scope of the invention may occur to those skilled in the art to which the invention pertains.

EPILOGUE

This whole invention process originated from a hand that could not link itself to the mind, and From a mind that could not stand the sight of a computer in spite of the inventor's need and good will to utilize the computer.

Due to a memory loss, the inventor found herself unable to remember the location of the keys of the computer keyboard, and was therefore at a loss on how to do so in view of her intolerance to the sight of the computer and the keyboard.

The dilemma faced by the inventor was therefore to find a way to be driven (drive) towards the memorization and psycho-motor efforts needed to do her computer work, without seeing nor using the keyboard and the computer that she could not stand (at least, the sight of it).

In the first phase of this conflict resolution, the inventor benefited from her own expertise as a health/care professional and as an educator, which helped her to recognize the problem, accept it, and respond to it through detachment, which, in this instance, meant detaching herself from the mere sight of the computer and its keyboard. As a health/care professional, the inventor knew that it was imperative to first free herself as a patient, from the negative feelings of the problem. To pierce through tears and depressive feelings, the inventor gradually forced herself to get moving at home with the soft head-, hand-, and finger-motions of Persian dancing complemented with the stirring sound of Western music, while reflecting upon the fairy-tales of her grandfather.

In the second phase of this conflict resolution, the inventor searched for a healing framework that would help herself to get reconciled with the computer and its keyboard. As self-healing is one of the most beautiful God Given Gifts to nature, it is therefore not surprising that this healing framework was provided by the hand itself through the making of picture-rings and picture-gloves, and through their transcendence into a simple, but powerful tool for human expression. While the disclosed picture-rings and picture-gloves are separate entities from our hands, they are linked to our own feelings. These picture-rings and picture-gloves are representative of our own emotions through our hands that are in them, similar to the mother-fetus relationship.

The dynamic learning generated with these gloves bears indeed striking similarities with the growth and development of an unfolding fetus. It is through the growth and development process of the infant within the womb that the bond between mother and child is established, a bond that will last after the baby's birth, and will remain in essence throughout all life stages. Likewise, the picture-gloves self-adapt to the stages of learning to create a joy of learning that will last long after these gloves have been used. These gloves will remain long after we are gone, conveying our past feelings and experiences to our descendants, and helping the future generations to better understand their roots. By better understanding their roots, and by being inspired to bravely face the challenges of their times, the future generations will be encouraged to become[12] self-actualized members of their society, all heartedly committed to make a better tomorrow.

[12] Hegel's Triad of "being/nothing→becoming".

The reconciliation of the inventor with the keyboard and the computer grew with the wholistic process of:

(1) substituting(/complementing) the dryness of the letters of the keys with the pleasantness of familiar pictures;

(2) substituting(/complementing) the strainful finger motions of keyboarding with the pleasant finger motions of dancing;

(3) substituting(/complementing) keyboard-bound learning or chart-bound learning with the quasi-free learning environment of the gloves that allowed the inventor to learn nearly anywhere;

(4) substituting(/complementing) the dull and repetitive practice of learning the keyboard with a creative singing & dancing, or a story-telling where each key became alive as an ever changing character geared to the mood and self-expression of the inventor;

(5) substituting(/complementing)the machine based interactions with the human based interactions (with the Parents, Grand-Parents and Children of the inventor's family).

Such a detachment from the computer and the keyboard allowed the feelings of freedom and comfort that were necessary to initiate the reconciliation of the inventor with the same computer/keyboard. Yet, this reconciliation could not have been carried out without the limitation of assigning the pictures to the glove fingers according to the key-finger assignment of the keyboard:

Being able to choose any set of pictures while being constrained to assign them to certain fingers and inter-relate them through stories, is what brought the discipline blended with gradual feelings of accomplishment which was needed to motivate the inventor towards reconciliation with the computer. This blending of self-discipline and self-satisfaction not only helped the reconciliation process, but even went beyond it.

This personal experience, together with the parent-child nursing expertise of the inventor, further motivated the inventor to apply her innovative approach to acquaint very young children with the keyboard before they actually use it, or even see it. More importantly, the inventor's picture gloves are disclosed as a learning framework which encourages the child's imagination and self-expression, while exposing him/her at a very early age to the concept of limitation and of its benefit for the learning process. For example, the child wearing the picture gloves is motivated to memorize pictures within the limitation of the key-finger assignment of the keyboard, by inter-relating these pictures through story-telling. As the learning progresses, the picture-gloves evolve into alphanumeric/picture gloves to teach the alphabet within the limitation of the key-finger assignment of the keyboard. Since the child has already been acquainted with the glove pictures, he/she can use the spatial correlations of the indicia on the gloves to learn more easily the alphabet in the context of the key-finger assignment). It proceeds likewise, for the language/picture gloves.

When the child will have developed mental associations of the key-finger assignment of the keyboard with the help of the alphanumeric-picture gloves and, he/she will be given the opportunity to develop the needed psycho-motor skills within the same learning environment thanks to the "keygloves". The disclosed "keygloves" are indeed a natural evolution of the alphanumeric-picture gloves into an autonomous wearable input/output device where the letters mounted on the palm-side of the "keygloves" become input keys that are characteristic of these letters, and the indicia mounted on the back-side of the "keygloves" become actuator outputs to be "visualized" by the learner/user. It is precisely such input/output duality that provides the "keygloves" with their unique autonomy and flexibility of use, which sets this self-contained device apart from prior art.

Consequently, the picture gloves, the alphanumeric-picture gloves, and the "keygloves" differ from the prior art not only in functionality (nature of task to be accomplished), but also in that they are the root base (initiator) of a lifelong learning process where the children will develop a learning environment to consistently build upon prior knowledge. Therefore, children gradually learn to accommodate the constraints of life without suppressing their own potential, and thereby help them to grow creative and responsible through the simultaneous practise of vertical and lateral thinking, and by complementing "key-bored-ing" with "key-g-loving".

Like an Escher lithography, the concept of gloves disclosed in this work integrates artistic expression within the limitation of the scientific approach. It reflects how the inventor has organized her acquired knowledge and past experiences within her life limitations, in a cost-effective manner, to transform a concept into a product that is safe, functional, beautiful, and to be used for a life-long learning full of activity and liveliness, wether at professional or personal levels.

Finally, the five-finger-glove/five-toe-sock concept which has been implemented in an adaptive system (method/device) of learning and self-expression to provide parents, children, grandparents, teachers, and medical professionals with a framework of continuous and dynamic learning, has also the potential to facilitate interactions among people and organizations as anticipated in the need-adaptive management model of health care disclosed by the author in 1987.

APPENDIX A

| | |
|---|---|
| Q | The Queen gets to play once more. |
| A | The Apple is cursed. You eat it, and fall asleep: You loose one turn. |
| Z | The temperature has dropped to Zero. Go to the Sun. |
| X | If you can sing your "QAZ", you get to move to the Violin. |
| S | You need more shade. Go to the Tree. |
| W | Enjoy the Waves. |
| E | You move slowly, but surely. |
| D | Every dog likes hunting. Go to the Rabbit. |
| C | A good Cat deserves A Fish. Go to the Fish. |
| V | If you can sing your "QAZ", you have become a Butterfly, and you can move ahead by 5. If not, go and practise with the Xylophone. |
| F | Do you know how to swim? |
| R | Do you like running? |
| T | If you climb in a tree, you will need more time to get down safely. You loose one turn. |
| G | You should not jump over the gate. Go back to the Elephant. |
| B | You like dancing, and you forgot to play. You loose one turn, unless you know your "QAZ". |
| N | She cares for you. Go to the Heart. |
| H | If you are winning, all the other players move ahead by 1. |
| Y | The cat should have it, not you. Go to the Cat. |
| U | It just started to rain. Go and protect the two children located on the thumbs. You can only go back to the Umbrella, by drawing a 2, a 4, or a 6. |
| J | Ah, what a sweet move! |
| M | Beware of the Owl. Go to the Lemon. |
| < | Move backward by 1. |
| K | The King should meet the Queen half-way. Go to the Rabbit. |
| I | You are Skating towards victory (if you do not slip!). |
| O | Fly right over to the little finger, and land on the semi-column. |
| L | Lemon starts with an "L". Can you transform, or twist the "L" into a ">", or a ".", or a "/", or a "?", or a ";", or a ":"? If yes, you are granted to move to the ">", ".", "/", "?", ";", or ":". |
| > | Move forward by 1. |
| ? | Ask a question about the "QAZ" to one of the players. If he/she answers correctly, he/she moves ahead by 1. If he/she answers wrong, you move ahead by 1. |
| ; | The best victory always comes with patience and perseverance. |
| P | Congratulations! You are the winner. If you know perfectly your "QAZ", all the other players must give you a gift for your Piggy-box. If not, well, here is an excellent occasion to play this game one more time. |

We claim:

1. An autonomous wearable computing device comprising:

a first glove having fingers and a second glove having fingers, said first glove being adapted to fit the left hand of a user, said first glove having a first portion on a palm side and a second portion on a back side, said second glove being adapted to fit the right hand of said user, said second glove having a third portion on a palm side and a fourth portion on a back side, said first glove having a first set of indicia mounted on said first portion thereof and a second set of indicia mounted on said second portion thereof, said second glove having a third set of indicia mounted on said third portion thereof, and a fourth set of indicia mounted on said fourth portion thereof;

first keys mounted within the first portion of said first glove in association with each indicium of said first set of indicia, said first keys corresponding to the keys of a keyboard of arbitrary format and content to be struck by the fingers of the left hand, said first keys having indicia mounted thereon, said indicia mounted on said first keys identifying the letters, numbers, or symbols associated to said first keys;

second keys mounted within the third portion of said second glove in association with each indicium of said third set of indicia, said second keys corresponding to the keys of said keyboard to be struck by the fingers of the right hand, said second keys having indicia mounted thereon, said indicia mounted on said second keys identifying the letters, numbers, or symbols associated to said second keys;

the positions of said first set of indicia and said second set of indicia being mirror images of each other, said second set of indicia thereby corresponding to said first keys of said first glove, and providing said user with a representation of said first keys;

the positions of said third set of indicia and said fourth set of indicia being mirror images of each other, said fourth set of indicia thereby corresponding to said second keys of said second glove, and providing said user with a representation of said second keys;

a first microprocessor connected to said first keys of said first glove with a first set of interconnections, said first set of interconnections being embedded within said first glove;

a second microprocessor connected to said second keys of said second glove with a second set of interconnections, said second set of interconnections being embedded within said second glove;

said first microprocessor having the functionality of a conventional keyboard microprocessor for the keys of said first glove to be struck by the fingers of the left hand, said second glove microprocessor having the functionality of a conventional keyboard microprocessor for the keys of said second glove to be struck by the fingers of the right hand; said first microprocessor monitoring the flow of data input through the keys of said first glove, said second microprocessor monitoring the flow of data input through the keys of said second glove;

a first set of external input/output ports mounted within said first glove, a second set of external input/output ports mounted within said second glove;

said first and second sets of ports allowing said gloves to be interfaced with any processing unit that can be interfaced with a conventional keyboard;

first means for enabling said gloves to transmit and receive information to and from any data processing unit that can be interfaced with said gloves, and allowing said user to easily interpret the information that is transmitted or received;

second means for providing said gloves with autonomous computing capabilities.

2. The autonomous wearable computing device as claimed in claim 1 wherein said second means comprise:

a first internal interface connecting said first microprocessor with a first internal data processing unit mounted within said first glove, said first internal data processing unit being internally connected to said first external input/output ports;

a second internal interface connecting said second microprocessor with a second internal data processing unit mounted within said second glove, said second internal data processing unit being internally connected to said second external input/output ports;

said first and second input/output ports allowing said first and second gloves to be interconnected.

3. The autonomous wearable computing device as claimed in claim 1 wherein said first means comprise:

a first interface connecting a first internal data processing unit to a first screen-based mini output display, and a second interface connecting a second internal data processing unit to a second screen-based mini output display;

screens of said displays being mounted on said gloves, and foldable for the convenience of said user, and for protection purposes;

said connections between said mini output displays and said data processing units mounted within said gloves providing said user with fully autonomous input/processing/output sequences.

4. The autonomous wearable computing device as claimed in claim 1 wherein said first means comprise:

a set of connections between said second set of indicia of said first glove and a said first internal processing unit, said connections being embedded within said glove, and allowing said second indicia to indicate letters, numbers, and symbols transmitted and received by said first glove;

a set of connections between said fourth set of indicia of said second glove and a second internal processing unit, said connections being embedded within said glove, and allowing said fourth set of indicia to indicate letters, numbers, and symbols transmitted and received by said second keyglove.

5. The autonomous wearable computing device as claimed in claim 1 wherein a first means comprise:

a first interface connecting a first internal data processing unit to a first audio-based mini output display, and a second interface connecting a second internal data processing unit to a second audio-based mini output display;

said audio-based output displays being mounted within the glove and connected into a headset through said first and second external ports, said headset allowing said user to hear the information transmitted to and received by said gloves.

6. The autonomous wearable computing device as claimed in claim 1 wherein:

said ports comprise radio-wave receptors, and radio-wave transmitters;

said radio-wave receptors of a given glove capturing electromagnetic waves emitted by the radio-wave transmitters of the opposite glove;

said radio-wave transmitters of a given glove emitting electromagnetic waves to be captured by the radio-wave receptors of the opposite glove.

7. The autonomous wearable computing device as claimed in claim 6 wherein first means comprise:

an antenna interfaced to said external input/output ports to communicate with a remote processing unit, said antenna being stretchable and mounted on said gloves.

8. The autonomous computing wearable device as claimed in claim 1 wherein:

a said first external port is connected to a said second external port by first external interconnections, a said second external port is connected to a said first external port by second external interconnections.

9. The autonomous computing wearable device as claimed in claim 8 wherein said first and second external interconnections are embedded within clothing being worn by said user, and can be directly plugged into said first and second external input/output ports.

10. The autonomous wearable computing device as claimed in claim 1 wherein a said first port is connected to a first mouse, said first mouse being mounted within said first portion of said first glove, and a second port is connected to a second mouse, said second mouse being mounted within said third portion of said second glove.

11. The autonomous wearable computing device as claimed in claim 1 wherein said first means comprise:

a first microdisk interface mounted within said first glove and connected to a first internal data processing unit;

a second microdisk interface mounted within said second glove and connected to a second internal data processing unit;

said microdisk interfaces providing said gloves with data input and output capabilities.

12. A method of artistic expression through a unique creative blending of dance, music, poetry, and colorful light show, within the limitation of a single signal generating tool, comprising the following identifiable steps of:

1) providing an artist with a first glove having fingers and a second glove having fingers, said first glove being adapted to fit the left hand of said artist, said first glove having a first portion on a palm side and a second portion on a back side, said second glove being adapted to fit the right hand of said artist, said second glove having a third portion on a palm side and a fourth portion on a back side, said first glove having a first set of indicia mounted on said first portion thereof and a second set of indicia mounted on said second portion thereof, said second glove having a third set of indicia mounted on said third portion thereof and a fourth set of indicia mounted on said fourth portion thereof;

first keys mounted within the first portion of said first glove in association with each indicium of said first set of indicia, said first keys corresponding to the keys of a keyboard to be struck by the fingers of the left hand, said first keys having indicia mounted thereon, said indicia identifying the letters, numbers, or symbols associated to said first keys;

second keys mounted within the third portion of said second glove in association with each indicium of said third set of indicia, said second keys corresponding to the keys of said keyboard to be struck by the fingers of the right hand, said second keys having indicia mounted thereon, said indicia identifying the letters, numbers, or symbols associated to said second keys;

the positions of said first set of indicia and said second set of indicia being mirror images of each other, said second set of indicia being individually connected on a one-to-one basis with their said mirror-image first set of indicia, said second set of indicia thereby providing a representation of said first keys;

the positions of said third set of indicia and said fourth set of indicia being mirror images of each other, said fourth set of indicia being individually connected with their said mirror-image third set of indicia; said fourth set of indicia thereby providing a representation of said second keys;

means for providing said first keys with the same functionality as the keys of said keyboard to be struck by the fingers of the left hand, and for providing said second keys with the same functionality as the keys of said keyboard to be struck by the fingers of the right hand;

a first microprocessor connected through a first set of interconnections to said first keys of said first glove, said first set of interconnections being embedded within said first glove;

a second microprocessor connected through a second set of interconnections to said second keys of said second glove, said second set of interconnections being embedded within said second glove;

said first microprocessor having the functionality of a keyboard microprocessor for the keys of said first glove, said second microprocessor having the functionality of a keyboard microprocessor for the keys of said second glove; said first microprocessor monitoring the flow of data input through the keys of said first glove, said second glove microprocessor monitoring the flow of data input through the keys of said second glove;

a set of internal switches mounted within said gloves, said switches being activated by light tactile pressure, said activated switches providing said gloves with a specific and pre-programmed information content corresponding to that of a keyboard having the desired format and content;

a first set of external output ports mounted within said first glove and connected to said first microprocessor, and a second set of external output ports mounted within said second glove, and connected to said second microprocessor; said output ports comprising radio-wave emitters for emitting electromagnetic waves to be captured by an external processing unit;

said gloves allowing said artist to adaptively choose during performance among pre-programmed glove configurations the one having the desired format and content;

2) instructing said artist to adaptively switch said glove configuration to the desired format and content through light tactile pressure of the corresponding switches;

3) instructing said artist to strike said keys of said gloves through light tactile pressure of the thumbs; and 4) instructing said artist to self-express by harmonizing the motions of the dance with art media remotely controlled and blended by said artist.

13. The method in claim 12 further comprising harmonizing:

poetry, said poetry being remotely typed by said artist with said gloves on a huge video-screen to be visualized by an audience;

music, said music being remotely played by said artist with said gloves on a music synthesizer to be heard by said audience; and a show of colorful lights, said lights being directed by said artist with said gloves.

14. The method claimed in claim 13 further comprising mounting said colorful lights on the back-side of said second and fourth portions, said lights being locally directed by said artist wearing said keygloves.

15. The method claimed in claim 13 further comprising remotely directing and color-blending colorful laser lights of different frequencies.

* * * * *